(12) United States Patent
Jones et al.

(10) Patent No.: US 9,339,761 B2
(45) Date of Patent: *May 17, 2016

(54) CARBON DIOXIDE SEQUESTRATION METHODS USING GROUP 2 SILICATES AND CHLOR-ALKALI PROCESSES

(75) Inventors: Joe David Jones, Austin, TX (US); Al Yablonsky, Austin, TX (US)

(73) Assignee: Skyonic Corporation, Austin, TX (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/004,095

(22) PCT Filed: Mar. 9, 2012

(86) PCT No.: PCT/US2012/028535
§ 371 (c)(1),
(2), (4) Date: Dec. 13, 2013

(87) PCT Pub. No.: WO2012/122496
PCT Pub. Date: Sep. 13, 2012

(65) Prior Publication Data
US 2014/0093441 A1   Apr. 3, 2014

Related U.S. Application Data

(60) Provisional application No. 61/451,101, filed on Mar. 9, 2011.

(51) Int. Cl.
| | | |
|---|---|---|
| *C01F 11/18* | (2006.01) | |
| *B01D 53/62* | (2006.01) | |
| *C01B 7/03* | (2006.01) | |
| *C01F 5/24* | (2006.01) | |
| *C01F 11/24* | (2006.01) | |

(52) U.S. Cl.
CPC ............... *B01D 53/62* (2013.01); *C01B 7/035* (2013.01); *C01F 5/24* (2013.01); *C01F 11/18* (2013.01); *C01F 11/24* (2013.01); *B01D 2251/402* (2013.01); *B01D 2251/404* (2013.01); *B01D 2251/502* (2013.01); *B01D 2251/60* (2013.01); *B01D 2251/604* (2013.01); *B01D 2257/504* (2013.01); *B01D 2258/0283* (2013.01); *Y02C 10/04* (2013.01); *Y02P 20/121* (2015.11); *Y02P 20/152* (2015.11)

(58) Field of Classification Search
CPC ........................... C01F 11/18; B01D 2257/504
See application file for complete search history.

(56) References Cited

U.S. PATENT DOCUMENTS

| | | | |
|---|---|---|---|
| 4,720,375 A | 1/1988 | Ainscow et al. | 423/175 |
| 7,727,374 B2 | 6/2010 | Jones et al. | 205/508 |
| 7,947,239 B2 * | 5/2011 | Lackner et al. | 423/220 |
| 8,062,418 B2 | 11/2011 | Constantz et al. | 106/738 |
| 2006/0185985 A1 | 8/2006 | Jones et al. | 205/508 |
| 2009/0127127 A1 | 5/2009 | Jones et al. | 205/464 |
| 2009/0169452 A1 | 7/2009 | Constantz et al. | 423/230 |
| 2010/0051859 A1 | 3/2010 | House et al. | 252/182.32 |
| 2010/0084283 A1 | 4/2010 | Gomez et al. | 205/742 |
| 2011/0091366 A1 | 4/2011 | Kendall et al. | 423/220 |
| 2011/0203939 A1 | 8/2011 | Jones et al. | 205/480 |
| 2012/0034144 A1 | 2/2012 | Jones et al. | 423/220 |

FOREIGN PATENT DOCUMENTS

| | | |
|---|---|---|
| WO | 2009/039445 | 3/2009 |
| WO | 2011/075680 | 6/2011 |
| WO | 2012/006601 | 1/2012 |

OTHER PUBLICATIONS

Goldberg, P., et al., "CO2 Mineral Sequestration Studies" in US. Proceedings of the First National Conference on Carbon Sequestration, May 14-17, 2001, Washington, DC, session 6C.

S. Eloneva, "Reducation of CO2 Emissions by Mineral Carbonation: Steelmaking Slags as Raw Material with a Pure Calcium Carbonate End Product," PhD Thesis, Aalto University School of Science and Technology, Espoo Finaland, (online URL) http://lib.tkk.fi/Diss/2010/isbn9789526034577/isbn978526034577.pdf. pp. 31-33 (2010).

Spycher, N. et al., "CO2—H2O Mixtures in the Goeological Sequestration of CO2. II. Partitioning in Chloride Brines at 12-100C and up to 600 bar," Lawrence Berkeley National Laboratory (online URL) http://escholarship.org/uc/item/2z23v4zc . Sep. 13, 2004.

Mazotti, M., et al., "Mineral Carbonation and Industrial Uses of Carbon Dioxide," Chapter 7 of Report Edited by Metz, B., et al., 2005, Intergovernmental Panel on Climate Change (online URL) http://www.ipcc.ch/pdf/special-reports/srccs/srccs_chapter7.pdf . p. 325. May 31, 2012.

Haywood, H. et al., Carbon Dioxide Sequestration as Stable Carbonate Minerals—Environmental Barriers, Environmental Geology, Springer Berlin, Heidelberg, Aug. 21, 2001.

* cited by examiner

*Primary Examiner* — Stuart Hendrickson

(74) *Attorney, Agent, or Firm* — Norton Rose Fulbright US LLP

(57) ABSTRACT

The present invention relates to an energy efficient carbon dioxide sequestration processes whereby Group 2 silicate minerals and $CO_2$ are converted into limestone and sand using a two-salt thermolytic process that allows for the cycling of heat and chemicals from one step to another.

23 Claims, 44 Drawing Sheets

CARBON DIOXIDE SEQUESTRATION METHODS USING GROUP 2 SILICATES AND CHLOR-ALKALI PROCESSES The present application is a national phase application under 35 U.S.C. §371 which claims priority to PCT Application No. PCT/US2012/028535 filed Mar. 9, 2012, which claims priority to U.S. Provisional Patent Application Ser. No. 61/451,101 filed Mar. 9, 2011, both of which are incorporated herein by reference in their entirety.

BACKGROUND OF THE INVENTION

I. Field of the Invention

The present invention generally relates to the field of removing carbon dioxide from a source, such as the waste stream (e.g. flue gas) of a power plant, whereby Group 2 silicate minerals are converted into Group 2 chloride salts and $SiO_2$, Group 2 chloride salts are converted into Group 2 hydroxide and/or Group 2 hydroxychloride salts. These in turn may be reacted with carbon dioxide to form Group 2 carbonate salts, optionally in the presence of catalysts. These steps may be combined to form a cycle in which carbon dioxide is sequestered in the form of carbonate salts and byproducts from one or more steps, such as heat and chemicals, are re-used or recycled in one or more other steps.

II. Description of Related Art

Considerable domestic and international concern has been increasingly focused on the emission of $CO_2$ into the air. In particular, attention has been focused on the effect of this gas on the retention of solar heat in the atmosphere, producing the "greenhouse effect." Despite some debate regarding the magnitude of the effect, all would agree there is a benefit to removing $CO_2$ (and other chemicals) from point-emission sources, especially if the cost for doing so were sufficiently small.

Greenhouse gases are predominately made up of carbon dioxide and are produced by municipal power plants and large-scale industry in site-power-plants, though they are also produced in any normal carbon combustion (such as automobiles, rain-forest clearing, simple burning, etc.). Though their most concentrated point-emissions occur at power-plants across the planet, making reduction or removal from those fixed sites an attractive point to effect a removal-technology. Because energy production is a primary cause of greenhouse gas emissions, methods such as reducing carbon intensity, improving efficiency, and sequestering carbon from power-plant flue-gas by various means has been researched and studied intensively over the last thirty years.

Attempts at sequestration of carbon (in the initial form of gaseous $CO_2$) have produced many varied techniques, which can be generally classified as geologic, terrestrial, or ocean systems. An overview of such techniques is provided in the *Proceedings of First National Conference on Carbon Sequestration*, (2001). To date, many if not all of these techniques are too energy intensive and therefore not economically feasible, in many cases consuming more energy than the energy obtained by generating the carbon dioxide. Alternative processes that overcome one or more of these disadvantages would be advantageous.

The referenced shortcomings are not intended to be exhaustive, but rather are among many that tend to impair the effectiveness of previously known techniques for removing carbon dioxide from waste streams; however, those mentioned here are sufficient to demonstrate that the methodologies appearing in the art have not been altogether satisfactory and that a significant need exists for the techniques described and claimed in this disclosure.

SUMMARY OF THE INVENTION

Disclosed herein are methods and apparatuses for carbon dioxide sequestration, including removing carbon dioxide from waste streams. In one aspect there are provided methods of sequestering carbon dioxide produced by a source, comprising:

(a) admixing a magnesium chloride salt and water in a first admixture under conditions suitable to form (i) magnesium hydroxide, magnesium oxide and/or MgCl(OH) and (ii) hydrogen chloride; (b) admixing (i) magnesium hydroxide, magnesium oxide and/or MgCl(OH), (ii) $CaCl_2$ and (iii) carbon dioxide produced by the source in a second admixture under conditions suitable to foam (iv) calcium carbonate, (v) a magnesium chloride salt, and (vi) water;

(c) separating the calcium carbonate from the second admixture; and (d) admixing a Group 2 silicate mineral with hydrogen chloride under conditions suitable to form a Group 2 chloride salt, water, and silicon dioxide, where some the hydrogen chloride in this step is obtained from step (a) and wherein some of the hydrogen chloride is obtained from a chlor-alkali electrolytic cell, whereby the carbon dioxide is sequestered into a mineral product form.

In some embodiments, some or all of the hydrogen chloride of step (a) is admixed with water to form hydrochloric acid.

In some embodiments, some or all of the magnesium hydroxide, magnesium oxide and/or MgCl(OH) of step (b)(i) is obtained from step (a)(i).

In some embodiments, some of all the water in step (a) is present in the form of a hydrate of the magnesium chloride salt.

In some embodiments, step (a) occurs in one, two or three reactors.

In some embodiments, the magnesium hydroxide, magnesium oxide and/or MgCl(OH) of step (a)(i) is greater than 90% by weight Mg(OH)Cl (e.g., between about 90%, 95%, or 97% and 99% by weight Mg(OH)Cl). In some aspects, the magnesium chloride salt is greater than 90% by weight $MgCl_2 \cdot 6(H_2O)$ (e.g., between about 90%, 95%, or 97% and 99% by weight $MgCl_2 \cdot 6(H_2O)$).

In some embodiments, step (d) further comprises agitating the Group 2 silicate mineral with the hydrochloric acid.

In some embodiments, some or all of the magnesium chloride salt in step (a) is obtained from step (d).

In some aspects, a method of the embodiments further comprises a separation step, wherein the silicon dioxide is removed from the Group 2 chloride salt formed in step (d).

In certain embodiments, some or all of the water of step (a) is obtained from the water of step (d).

In some embodiments, the Group 2 silicate mineral of step (d) comprises a Group 2 inosilicate. In certain aspects, the Group 2 silicate mineral of step (d) comprises $CaSiO_3$, $MgSiO_3$, olivine, serpentine, sepiolite, enstatite, diopside, and/or tremolite. In some aspects, the Group 2 silicate further comprises mineralized iron and/or manganese.

In certain aspects, step (b) of a method of the embodiments further comprises admixing $CaCl_2$ and water to the second admixture.

In further aspects, a method of the embodiments further comprises:

(e) admixing a magnesium chloride salt and water in a third admixture under conditions suitable to form (i) magnesium hydroxide, magnesium oxide and/or MgCl(OH) and (ii) hydrogen chloride;

(f) admixing (i) magnesium hydroxide, magnesium oxide and/or MgCl(OH), (ii) $CaCl_2$ and (iii) carbon dioxide produced by the source in a fourth admixture under conditions suitable to form (iv) calcium carbonate, (v) a magnesium chloride salt, and (vi) water;

(g) separating the calcium carbonate from the fourth admixture; and (h) admixing a Group 2 silicate mineral with hydrogen chloride under conditions suitable to form a Group 2 chloride salt, water, and silicon dioxide, where some or all of the hydrogen chloride in this step is obtained from step (e), whereby the carbon dioxide is sequestered into a mineral product form.

In some embodiments, some or all of the hydrogen chloride in step (h) is obtained from step (e).

In certain aspects, a method of the embodiments further comprises:

(i) admixing (i) sodium hydroxide produced from the chlor-alkali electrolytic cell, and (ii) the carbon dioxide produced by the source in a fifth admixture under conditions suitable to form (iii) sodium bicarbonate and/or sodium carbonate.

BRIEF DESCRIPTION OF THE DRAWINGS

The following drawings form part of the present specification and are included to further demonstrate certain aspects of the present disclosure. The invention may be better understood by reference to one of these drawings in combination with the detailed description of specific embodiments presented herein.

| | |
|---|---|
| $1^{st}$ Chamber: $MgCl_2 \cdot 6H_2O \rightarrow MgCl_2 \cdot 4H_2O + 2H_2O$ | 100° C. |
| $2^{nd}$ Chamber: $MgCl_2 \cdot 4H_2O \rightarrow MgCl_2 \cdot 2H_2O + 2H_2O$ | 125° C. |
| $3^{rd}$ Chamber: $MgCl_2 \cdot 2H_2O \rightarrow MgCl_2 \cdot H_2O + H_2O$ (HCl vapor present) | 160° C. |
| $4^{th}$ Chamber: $MgCl_2 \cdot H_2O \rightarrow Mg(OH)Cl + HCl$ HCl recirculates to the $3^{rd}$ chamber. | 130° C. |

| Chamber | Reaction | Model Temp. | Preferred Temp. Range | Notes |
|---|---|---|---|---|
| $1^{st}$ | $MgCl_2 \cdot 6H_2O \rightarrow MgCl_2 \cdot 4H_2O + 2H_2O$ | 100° C. | 90° C.-120° C. | |
| $2^{nd}$ | $MgCl_2 \cdot 4H_2O \rightarrow MgCl_2 \cdot 2H_2O + 2H_2O$ | 125° C. | 160° C.-185° C. | |
| $3^{rd}$ | $MgCl_2 \cdot 2H_2O \rightarrow MgCl_2 \cdot H_2O + H_2O$ | 160° C. | 190° C.-230° C. | * |
| $4^{th}$ | $MgCl_2 \cdot H_2O \rightarrow Mg(OH)Cl + HCl$ | 130° C. | 230° C.-260° C. | ** |

\* HCl Vapor Present
\*\* HCl Vapor Recirculates to the $3^{rd}$ Chamber

The first three reactions above may be characterized as dehydrations, while the fourth may be characterized as a decomposition. Results from this simulation, which is explained in greater detail in Example 2, indicate that at lower temperatures (130-250° C.) the decomposition of $MgCl_2 \cdot 6H_2O$ results in the formation of $Mg(OH)Cl$ instead of $MgO$. The $Mg(OH)Cl$ then reacts with $H_2O$ to form $MgCl_2$ and $Mg(OH)_2$, which then reacts with a saturated $CaCl_2/H_2O$ solution and $CO_2$ from the flue gas to form $CaCO_3$, which is filtered out of the stream. The resulting $MgCl_2$ formed is recycled to the first reactor to begin the process again.

Figure 7:
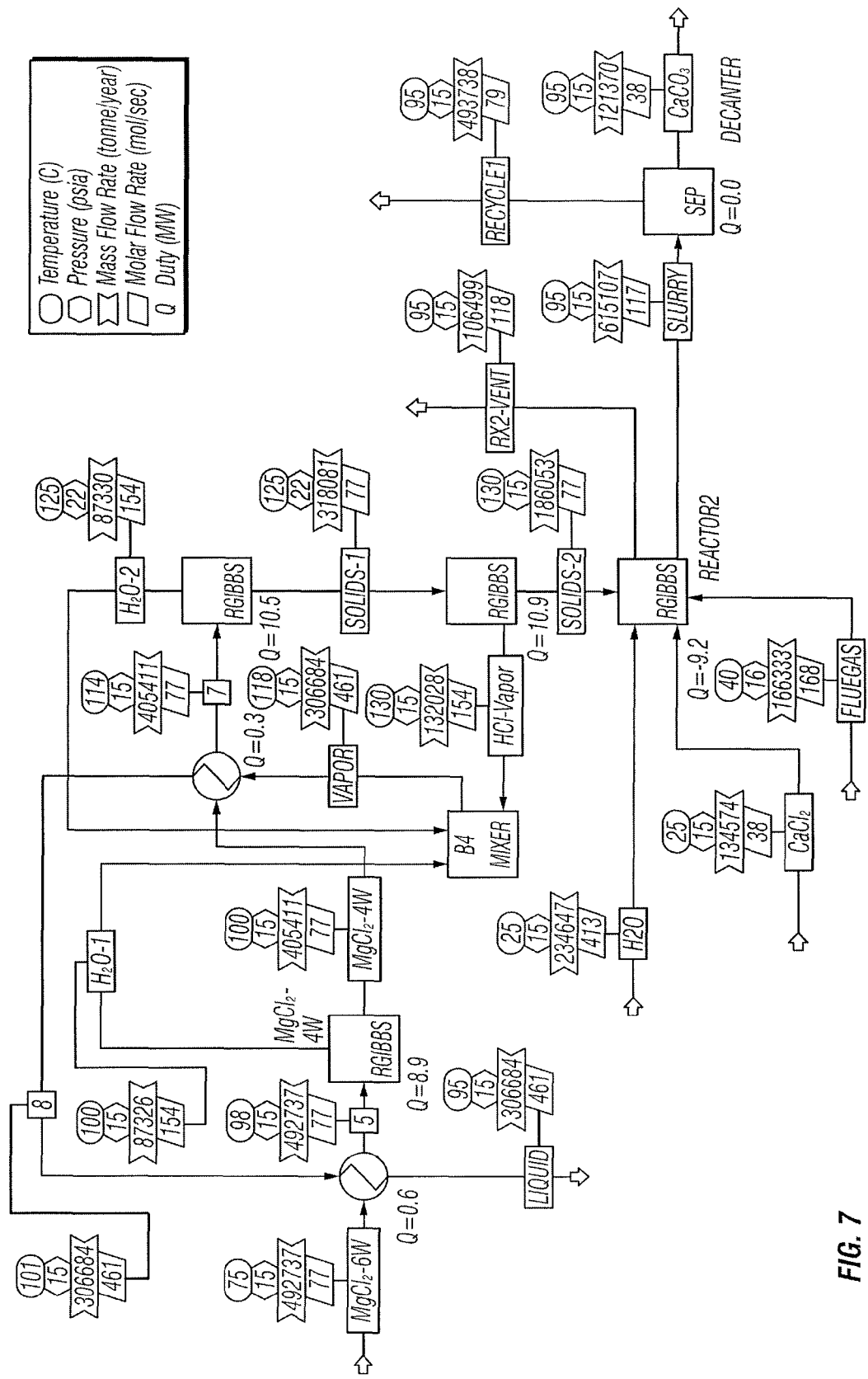

FIG. 7 is a process flow diagram showing parameters and results from a process simulation using Aspen Plus process software. The net reaction is the capture of $CO_2$ from flue gas using inexpensive raw materials, $CaCl_2$ and water, to form $CaCO_3$. In this embodiment, the magnesium hexahydrate is dehydrated in two separate chambers and decomposed in a third chamber. Both dehydration and decomposition reactions occur in the third chamber. There is no recirculating HCl. Reactions occurring in these chambers include the following:

| | |
|---|---|
| $1^{st}$ Chamber: $MgCl_2 \cdot 6H_2O \rightarrow MgCl_2 \cdot 4H_2O + 2H_2O$ | 100° C. |
| $2^{nd}$ Chamber: $MgCl_2 \cdot 4H_2O \rightarrow MgCl_2 \cdot 2H_2O + 2H_2O$ | 125° C. |
| $3^{rd}$ Chamber: $MgCl_2 \cdot 2H_2O \rightarrow Mg(OH)Cl + HCl + H_2O$ | 130° C. |
| $3^{rd}$ Chamber: $MgCl_2 \cdot 2H_2O \rightarrow MgCl_2 \cdot H_2O + H_2O$ | 130° C. |

| Chamber | Reaction | Model Temp. | Preferred Temp. Range | Notes |
|---|---|---|---|---|
| $1^{st}$ | $MgCl_2 \cdot 6H_2O \rightarrow MgCl_2 \cdot 4H_2O + 2H_2O$ | 100° C. | 90° C.-120° C. | |
| $2^{nd}$ | $MgCl_2 \cdot 4H_2O \rightarrow MgCl_2 \cdot 2H_2O + 2H_2O$ | 125° C. | 160° C.-185° C. | |
| $3^{rd}$ | $MgCl_2 \cdot 2H_2O \rightarrow Mg(OH)Cl + HCl + H_2O$ | 130° C. | 190° C.-230° C. | * |
| | $MgCl_2 \cdot 2H_2O \rightarrow MgCl_2 \cdot H_2O + H_2O$ | | | |

* No recirculating HCl

Figure 6:
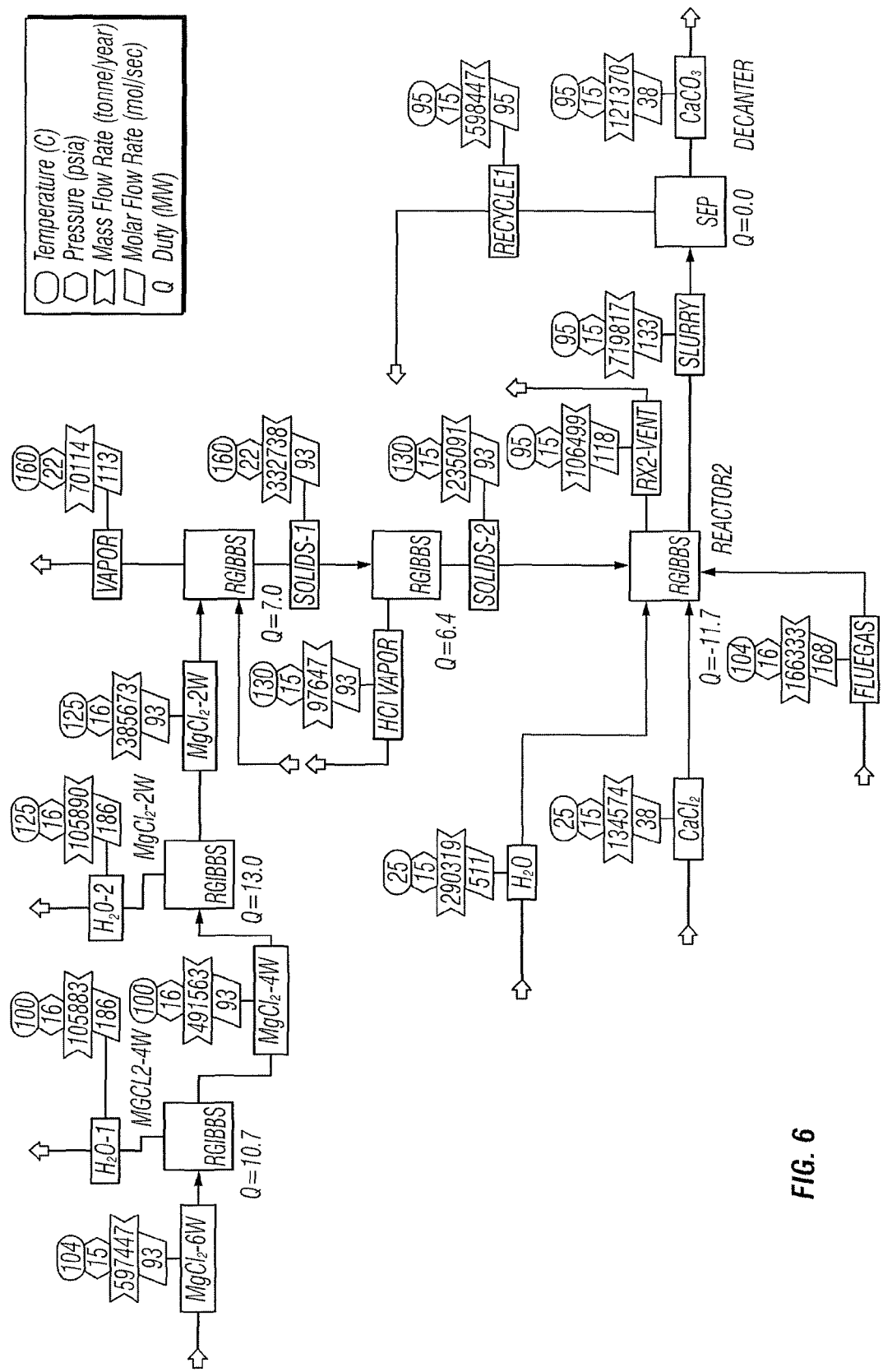
FIG. 6 is a process flow diagram showing parameters and results from a process simulation using Aspen Plus process software. The net reaction is the capture of $CO_2$ from flue gas using inexpensive raw materials, $CaCl_2$ and water, to form $CaCO_3$. In this embodiment, the hexahydrate is dehydrated in three separate chambers and decomposed in the fourth chamber where the HCl that is formed from the decomposition is recirculated back to the third chamber to prevent any side reactions. Reactions occurring in these chambers include the following.

The first, second and fourth reactions above may be characterized as dehydrations, while the third may be characterized as a decomposition. As in the embodiment of FIG. 6, the temperatures used in this embodiment result in the formation of $Mg(OH)Cl$ from the $MgCl_2 \cdot 6H_2O$ rather than $MgO$. The $Mg(OH)Cl$ then reacts with $H_2O$ to form $MgCl_2$ and $Mg(OH)_2$, which reacts with a saturated $CaCl_2/H_2O$ solution and $CO_2$ from the flue gas to form $CaCO_3$, which is filtered out of the stream. The resulting $MgCl_2$ formed is recycled to the first reactor to begin the process again. Additional details regarding this simulation are provided in Example 3 below.

Figure 8:
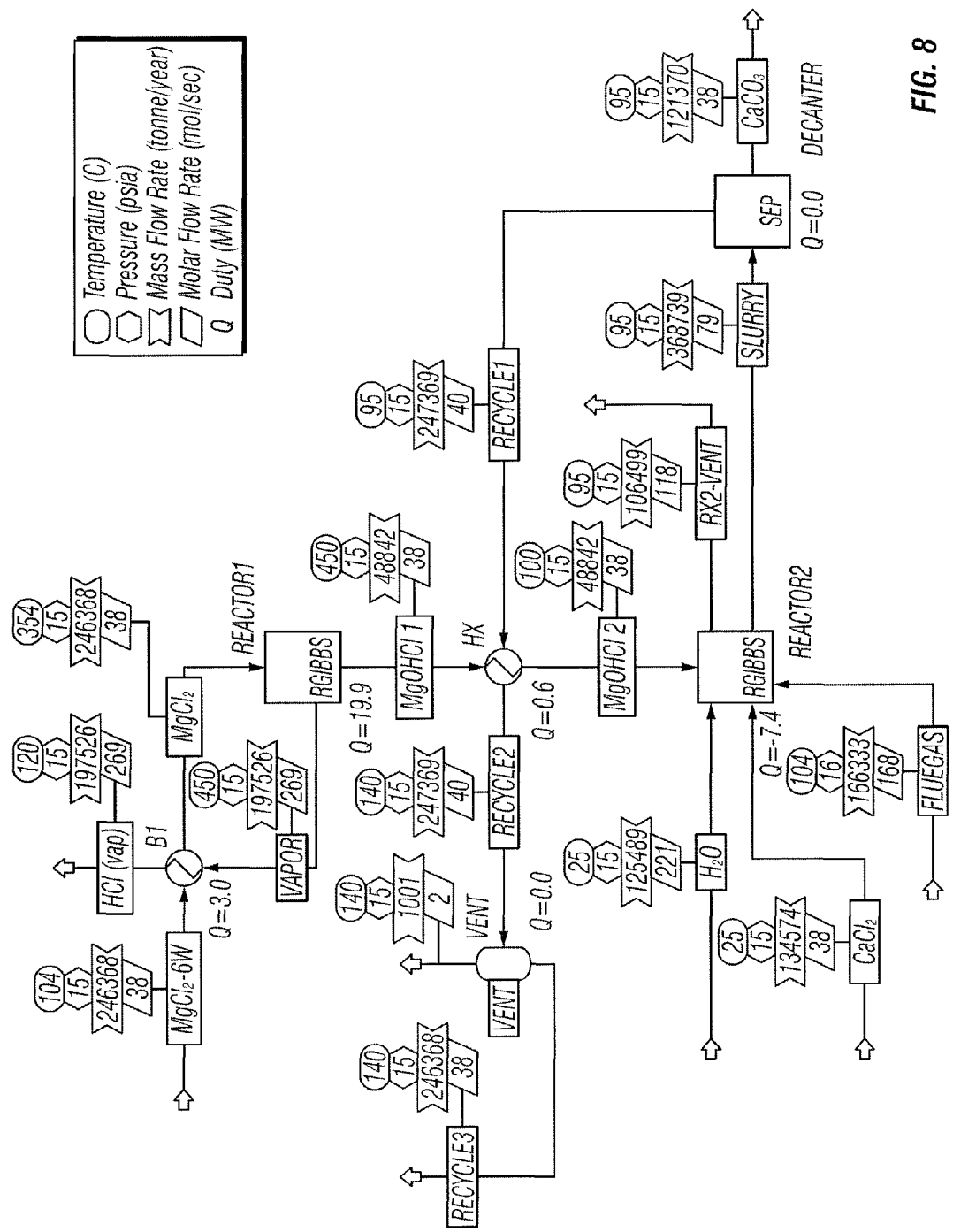

FIG. 8 is a process flow diagram showing parameters and results from a process simulation using Aspen Plus process software. The net reaction is the capture of $CO_2$ from flue gas using inexpensive raw materials, $CaCl_2$ and water, to form $CaCO_3$. Results from this simulation indicate that it is efficient to heat $MgCl_2 \cdot 6H_2O$ to form $MgO$. The $MgO$ then reacts with $H_2O$ to form $Mg(OH)_2$, which then reacts with a saturated $CaCl_2/H_2O$ solution and $CO_2$ from the flue gas to form $CaCO_3$, which is filtered out of the stream. The resulting $MgCl_2$ formed is recycled to the first reactor to begin the process again. In this embodiment, the magnesium hexahydrate is simultaneously dehydrated and decomposed in one chamber at 450° C. This is the model temperature range. The preferred range in some embodiments, is 450° C.-500° C. Thus the decomposition goes completely to $MgO$. The main reaction occurring in this chamber can be represented as follows:

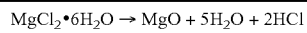

$$MgCl_2 \cdot 6H_2O \rightarrow MgO + 5H_2O + 2HCl \qquad 450° C.$$

Additional details regarding this simulation are provided in Example 4 below.

Figure 9:
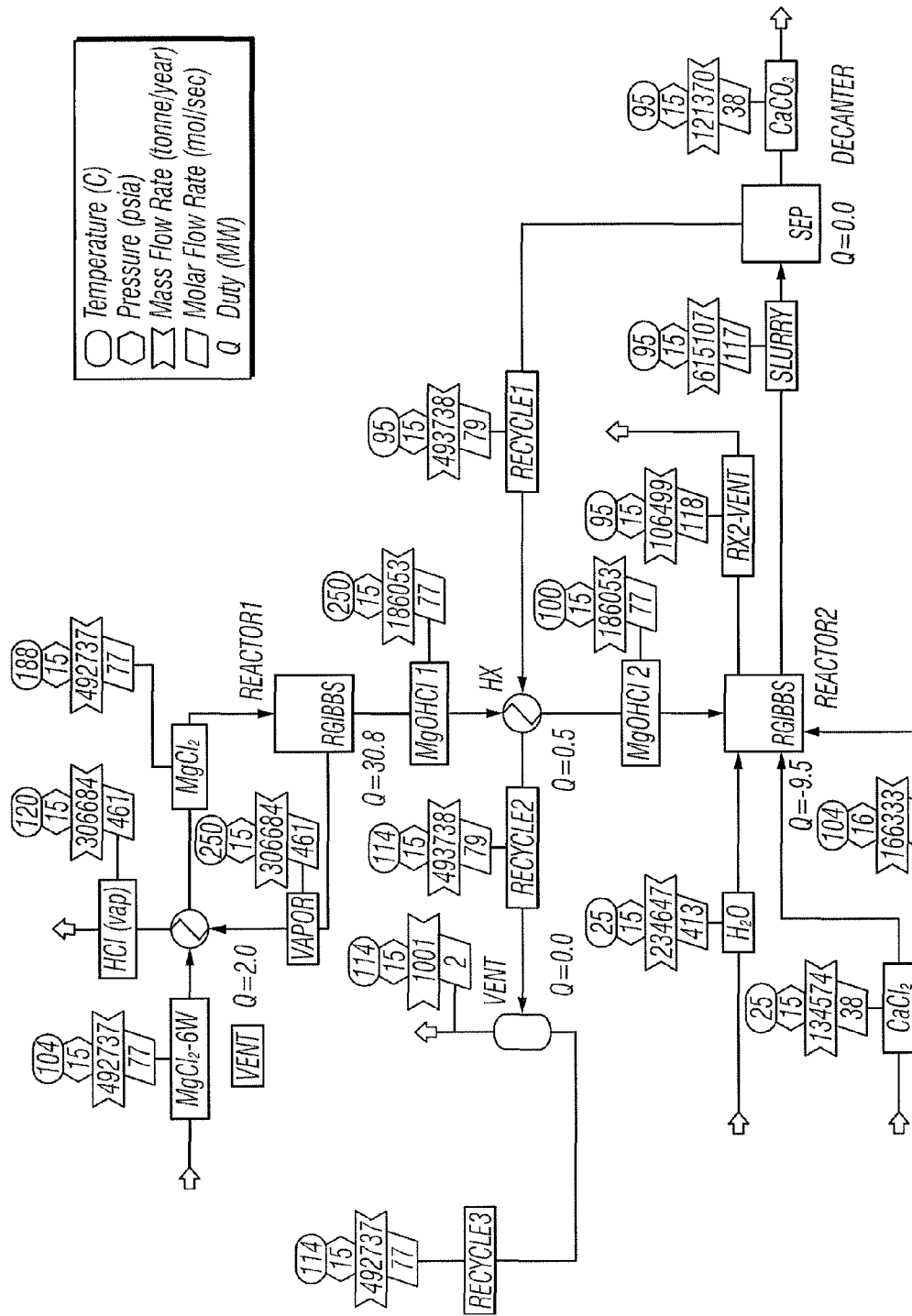

FIG. 9 is a process flow diagram showing parameters and results from a process simulation using Aspen Plus process software similar to the embodiment of FIG. 8 except that the $MgCl_2 \cdot 6H_2O$ is decomposed into an intermediate compound, $Mg(OH)Cl$ at a lower temperature of 250° C. in one chamber. The $Mg(OH)Cl$ is then dissolved in water to form $MgCl_2$ and $Mg(OH)_2$, which follows through with the same reaction with $CaCl_2$ and $CO_2$ to form $CaCO_3$ and $MgCl_2$. The main reaction occurring in this chamber can be represented as follows:

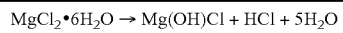

$$MgCl_2 \cdot 6H_2O \rightarrow Mg(OH)Cl + HCl + 5H_2O \qquad 250° C.$$

The reaction was modeled at 250° C. In some embodiments, the preferred range is from 230° C. to 260° C. Additional details regarding this simulation are provided in Example 5 below.

Figure 10:
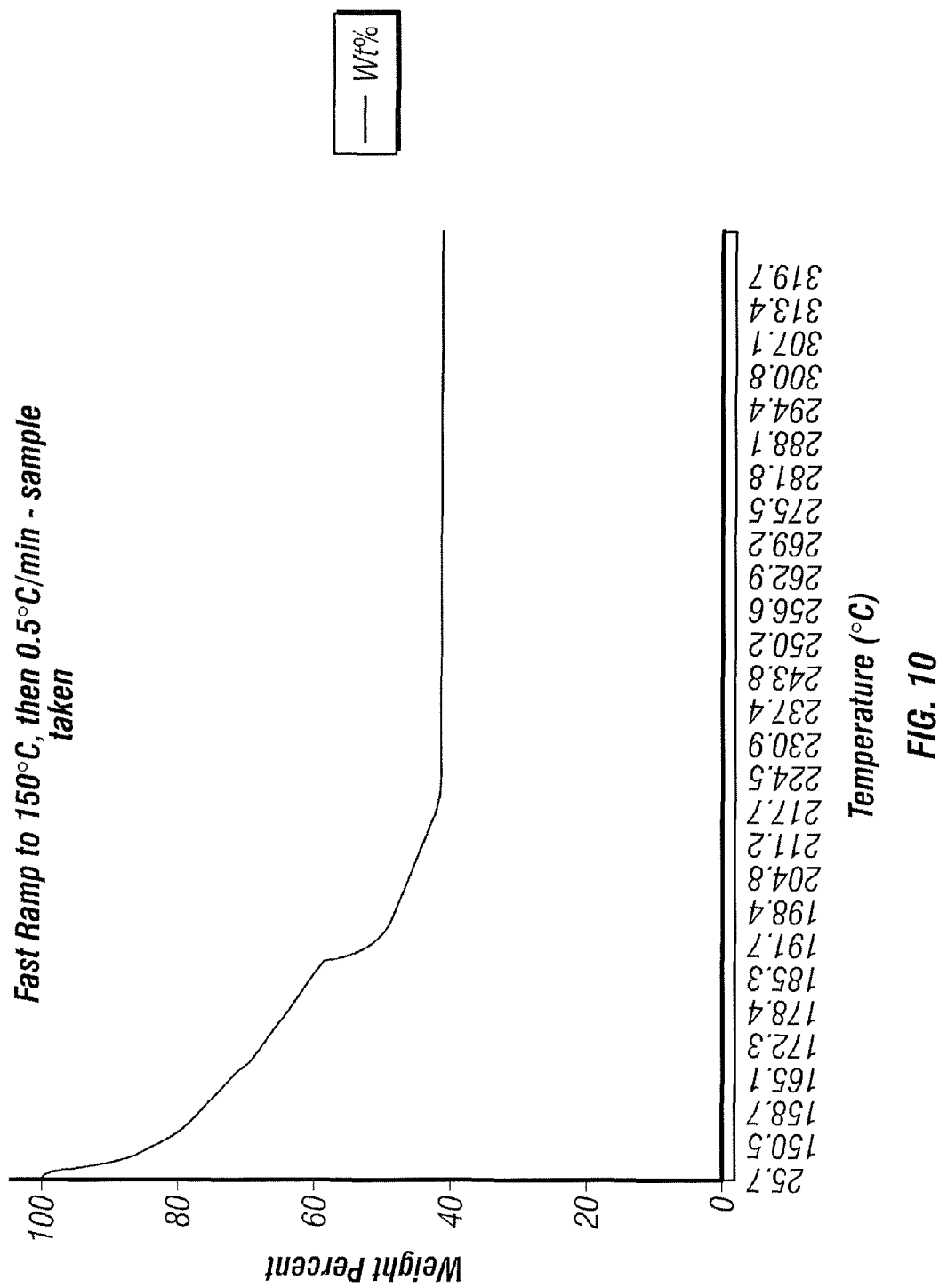

FIG. 10 shows a graph of the mass percentage of a heated sample of $MgCl_2 \cdot 6H_2O$. The sample's initial mass was approximately 70 mg and set at 100%. During the experiment, the sample's mass was measured while it was being thermally decomposed. The temperature was quickly ramped up to 150° C., and then slowly increased by 0.5° C. per minute. At approximately 220° C., the weight became constant, consistent with the formation of $Mg(OH)Cl$.

Figure 11:
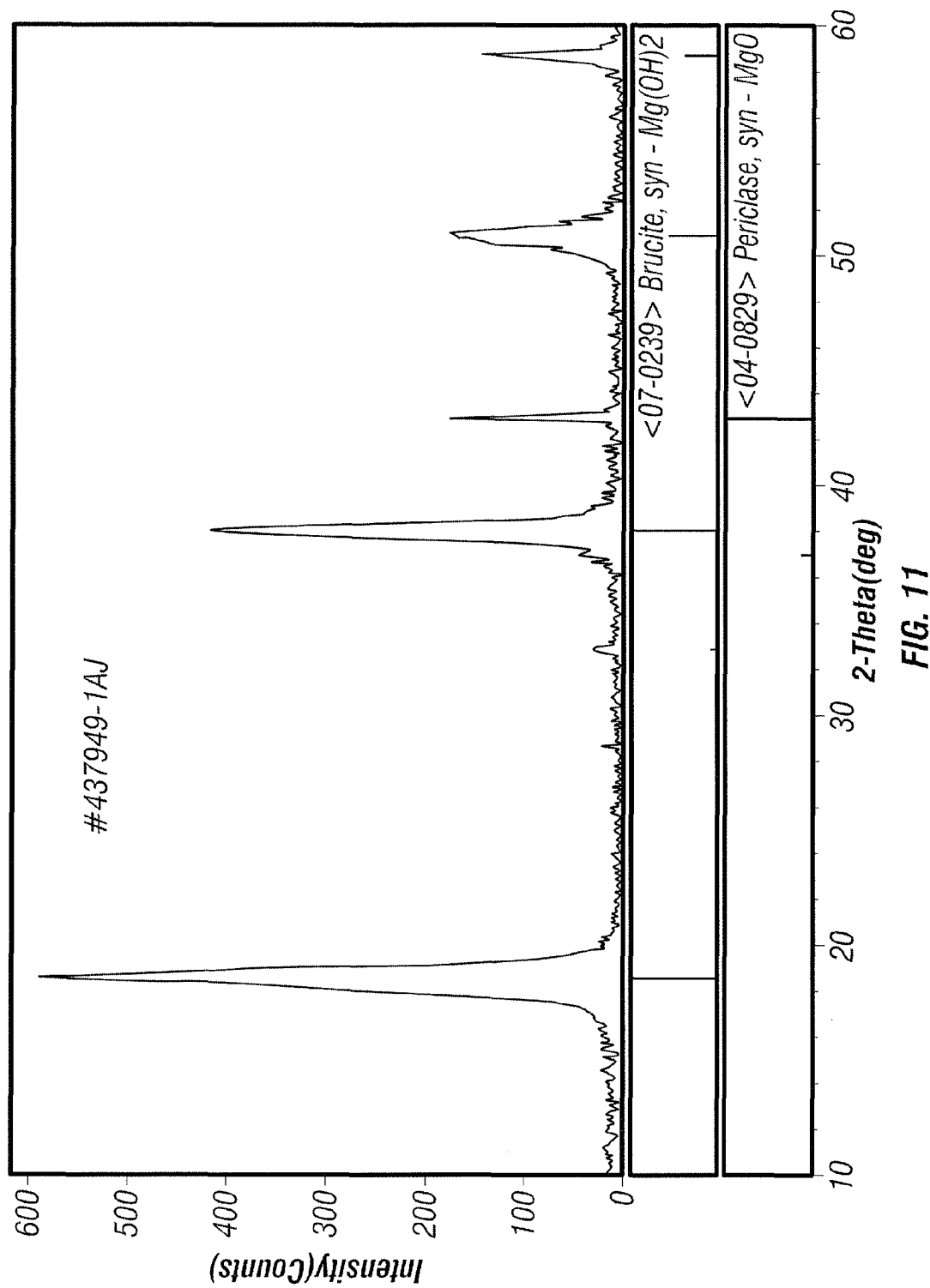

FIG. 11 shows X-ray diffraction data corresponding to the product of Example 7.

Figure 12:
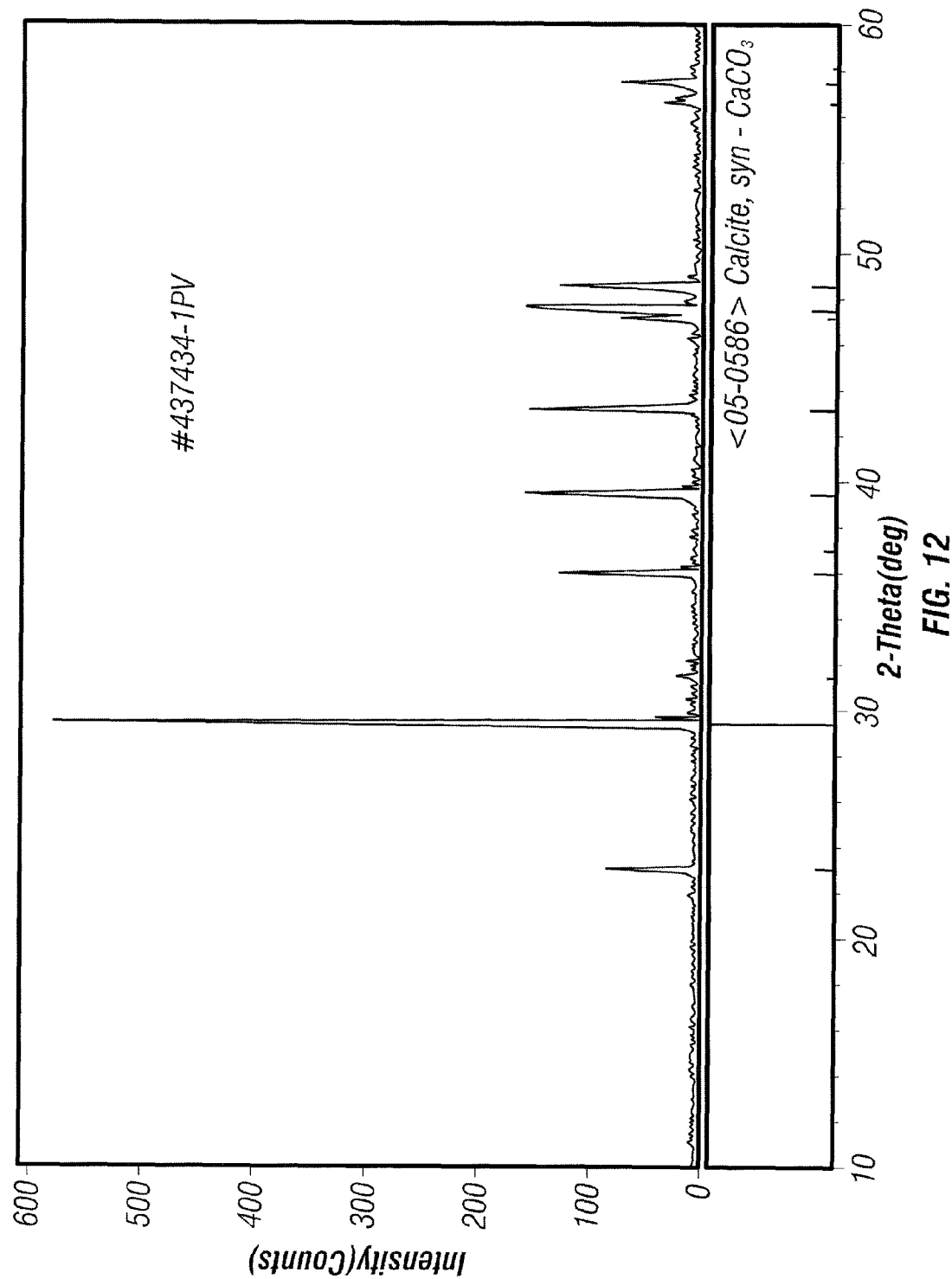

FIG. 12 shows X-ray diffraction data corresponding to the product from the reaction using $Mg(OH)_2$ of Example 8.

Figure 13:
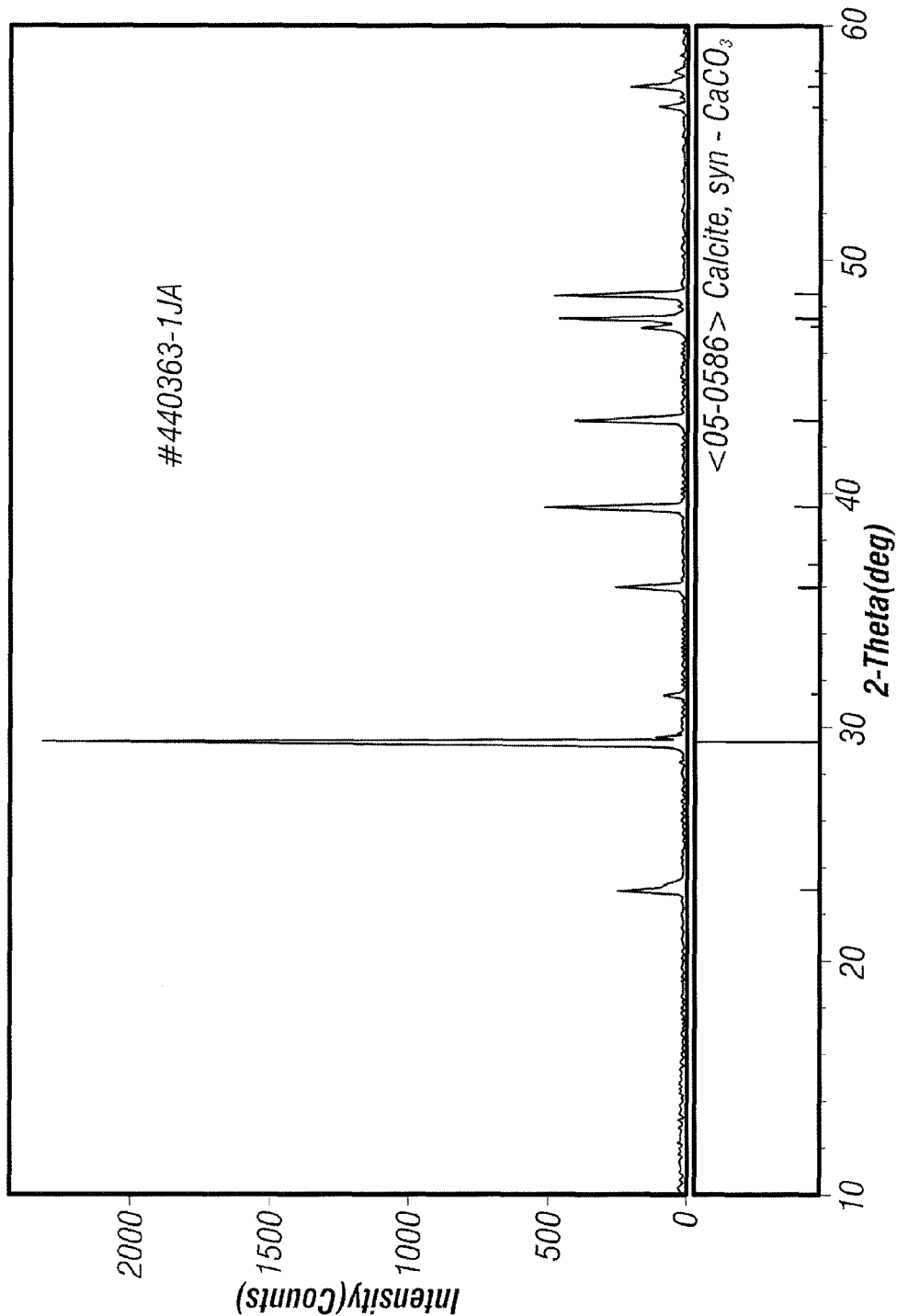

FIG. 13 shows X-ray diffraction data corresponding to the product from the reaction using $Mg(OH)Cl$ of Example 8.

Figure 14:
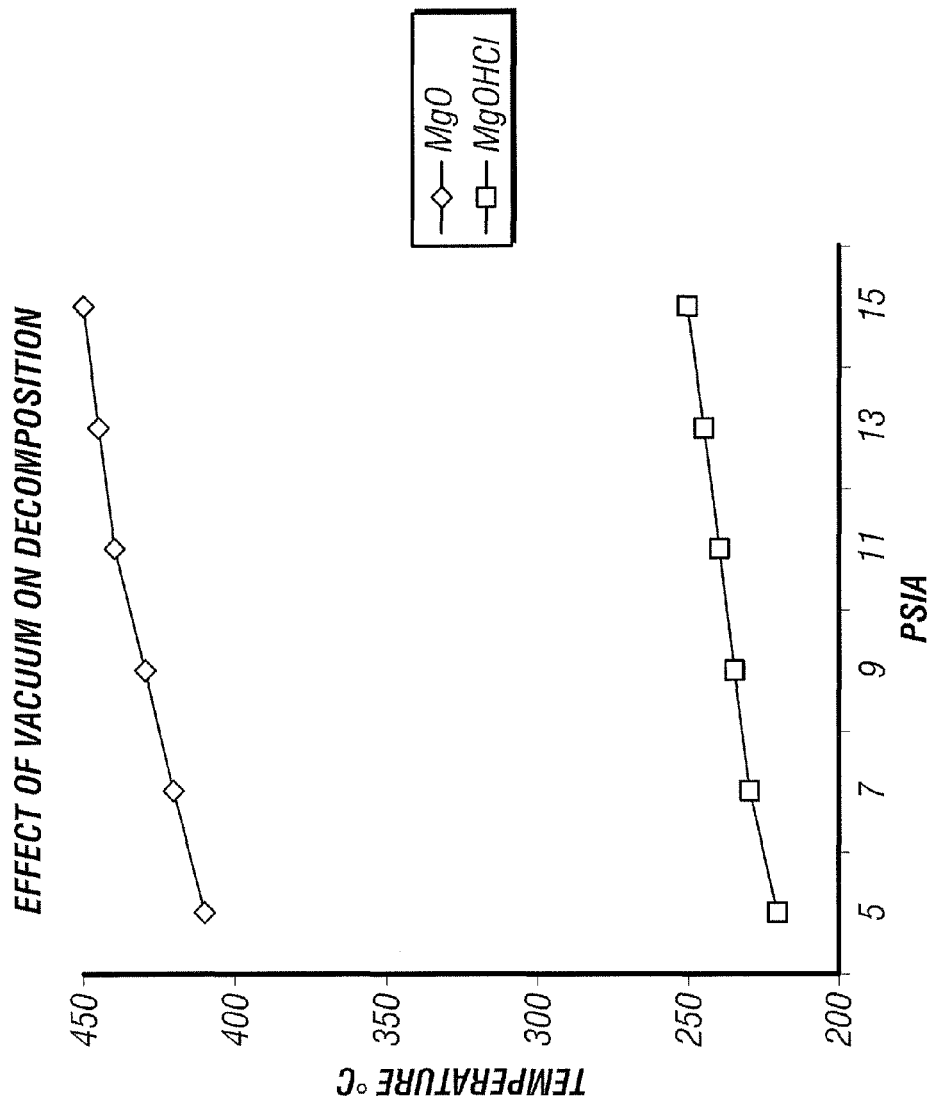

FIG. 14 shows the effect of temperature and pressure on the decomposition of $MgCl_2 \cdot (H_2O)$.

Figure 15:
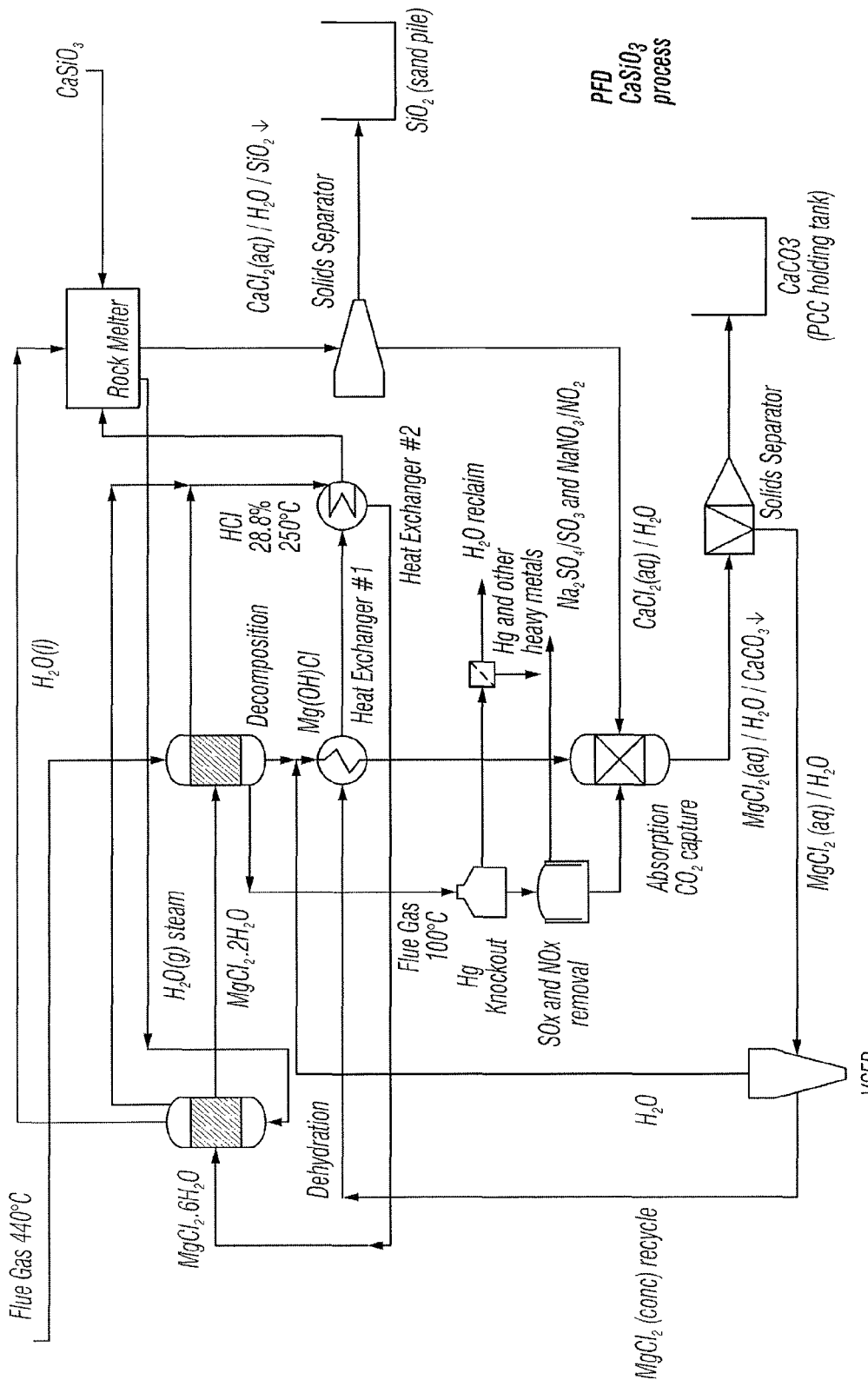

FIG. 15 is a process flow diagram of an embodiment of the Ca/Mg process described herein.

Figure 16:
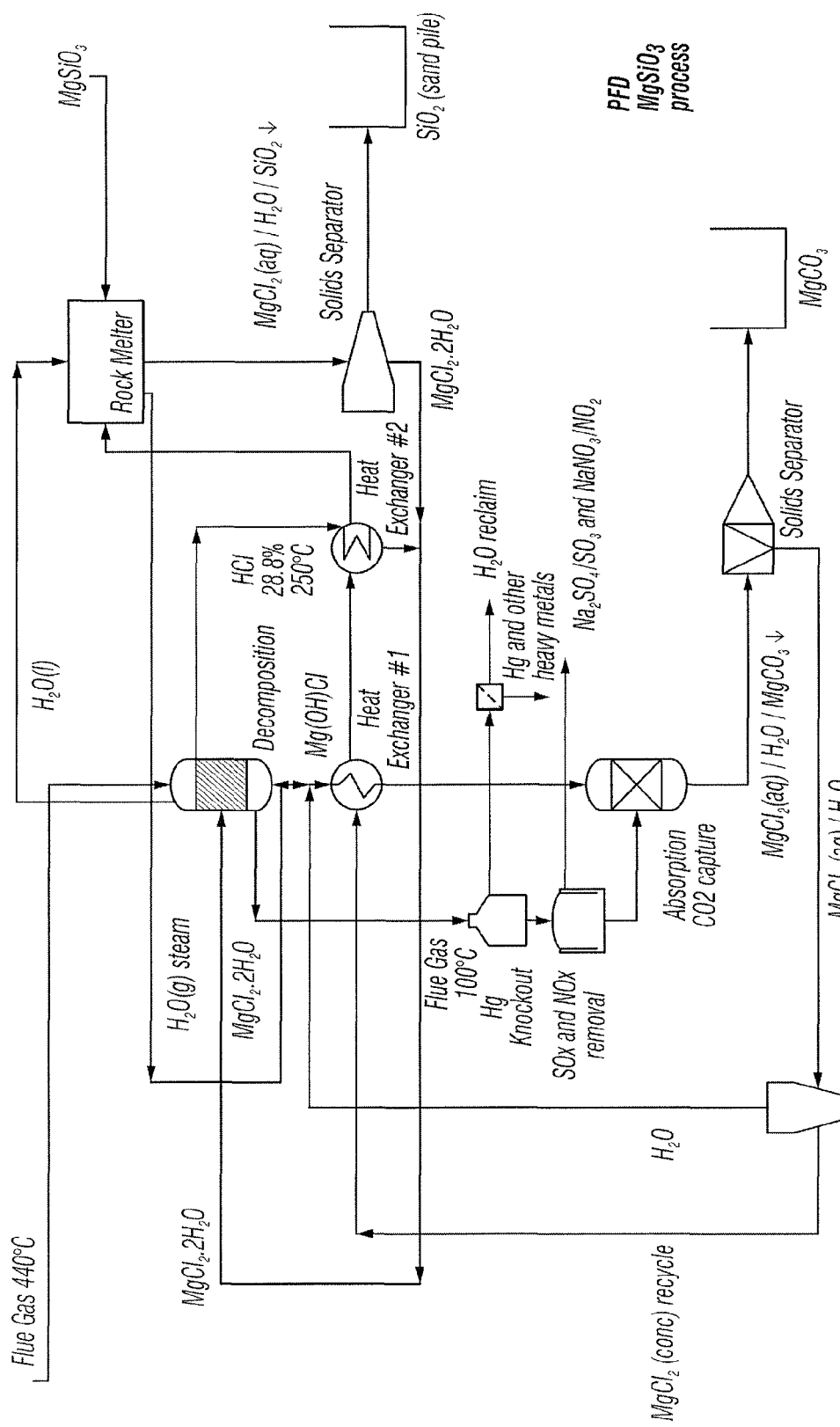

FIG. 16 is a process flow diagram of a variant of the process, whereby only magnesium compounds are used. In this embodiment the $Ca^{2+}$—$Mg^{2+}$ switching reaction does not occur.

Figure 17:
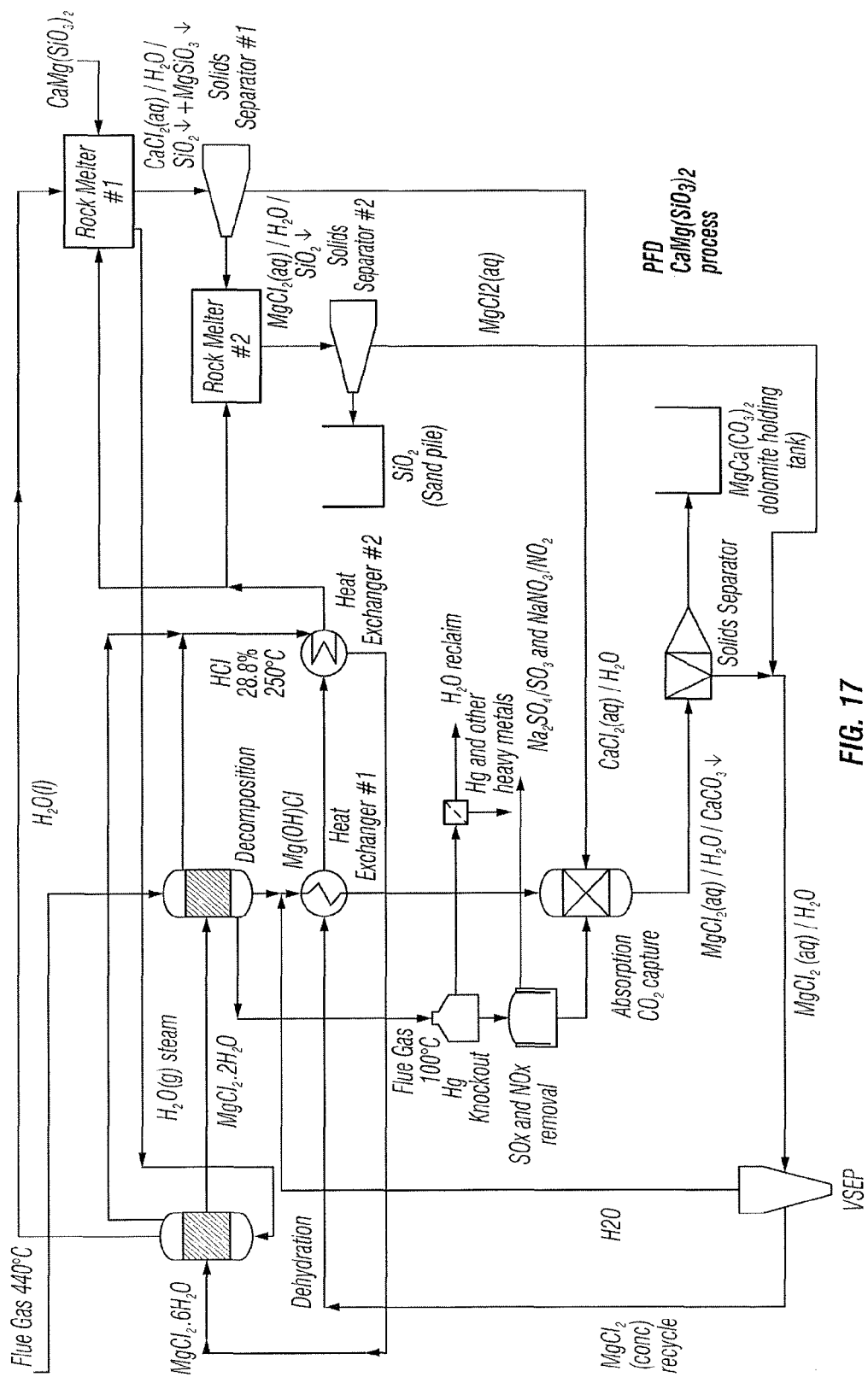

FIG. 17 is a process flow diagram of a different variant of the process which is in between the previous two embodiments. Half of the $Mg^{2+}$ is replaced by $Ca^{2+}$, thereby making the resulting mineralized carbonate $MgCa(CO_3)_2$ or dolomite.

Figure 18:
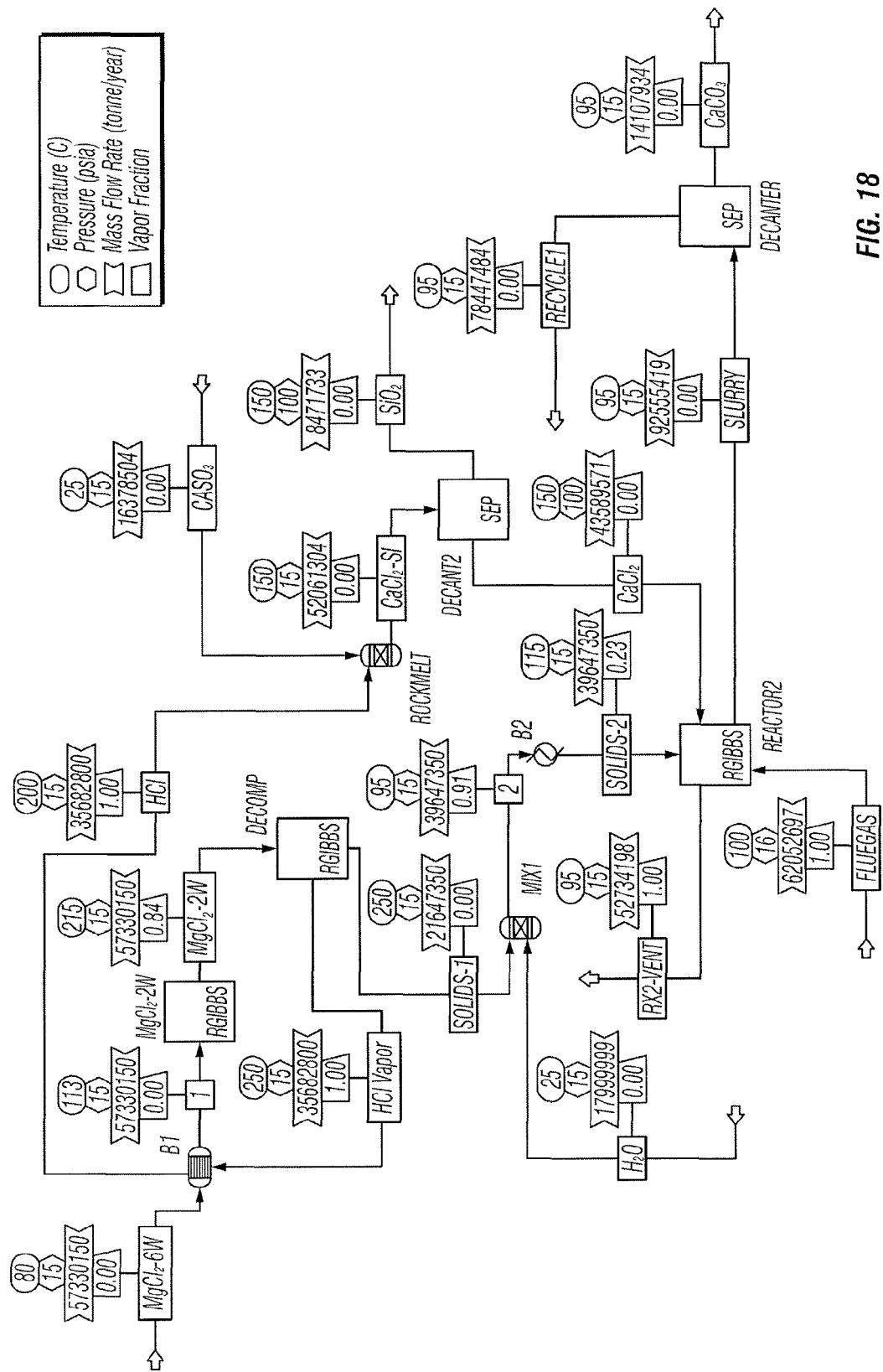

FIG. 18—$CaSiO_3$—$Mg(OH)Cl$ Process, Cases 10 & 11. This figure shows a process flow diagram providing parameters and results from a process simulation using Aspen Plus process software. The net reaction is the capture of $CO_2$ from flue gas using inexpensive raw materials, $CaSiO_3$, $CO_2$ and water, to form $SiO_2$ and $CaCO_3$. Results from this simulation indicate that it is efficient to use heat from the HCl reacting with $CaSiO_3$ and heat from the flue gas emitted by a natural gas or coal fired power plant to carry out the decomposition of $MgCl_2 \cdot 6H_2O$ to form Mg(OH)Cl. The Mg(OH)Cl then reacts with $H_2O$ to form $MgCl_2$ and $Mg(OH)_2$, which then reacts with a saturated $CaCl_2/H_2O$ solution and $CO_2$ from the flue gas to form $CaCO_3$, which is filtered out of the stream. The resulting $MgCl_2$ formed is recycled to the first reactor to begin the process again. In this embodiment, the magnesium chloride hexahydrate is dehydrated to magnesium chloride dihydrate $MgCl_2 \cdot 2H_2O$ in the first chamber using heat from the HCl and $CaSiO_3$ reaction and decomposed in a second chamber at 250° C. using heat from the flue gas. Thus the decomposition goes partially to Mg(OH)Cl. The main reactions occurring in this chamber can be represented as follows:

| Reaction | ΔH** kJ/mole | Reaction Temp. Range |
|---|---|---|
| $MgCl_2 \cdot 6H_2O \rightarrow Mg(OH)Cl + 5H_2O + HCl$ | 433 | 230° C.-260° C. |
| $2HCl(g) + CaSiO_3 \rightarrow CaCl_2(aq) + H2O + SiO_2 \downarrow$ | −259 | 90° C.-150° C. |
| $2Mg(OH)Cl + CO_2 + CaCl_2 \rightarrow 2MgCl_2 + CaCO_3 \downarrow + H_2O$ | −266 | 25° C.-95° C. |

**Enthalpies are based on reaction temperatures, and temperatures of incoming reactant and outgoing product streams. Additional details regarding this simulation are provided in Examples 10 and 11 below.

Figure 19:
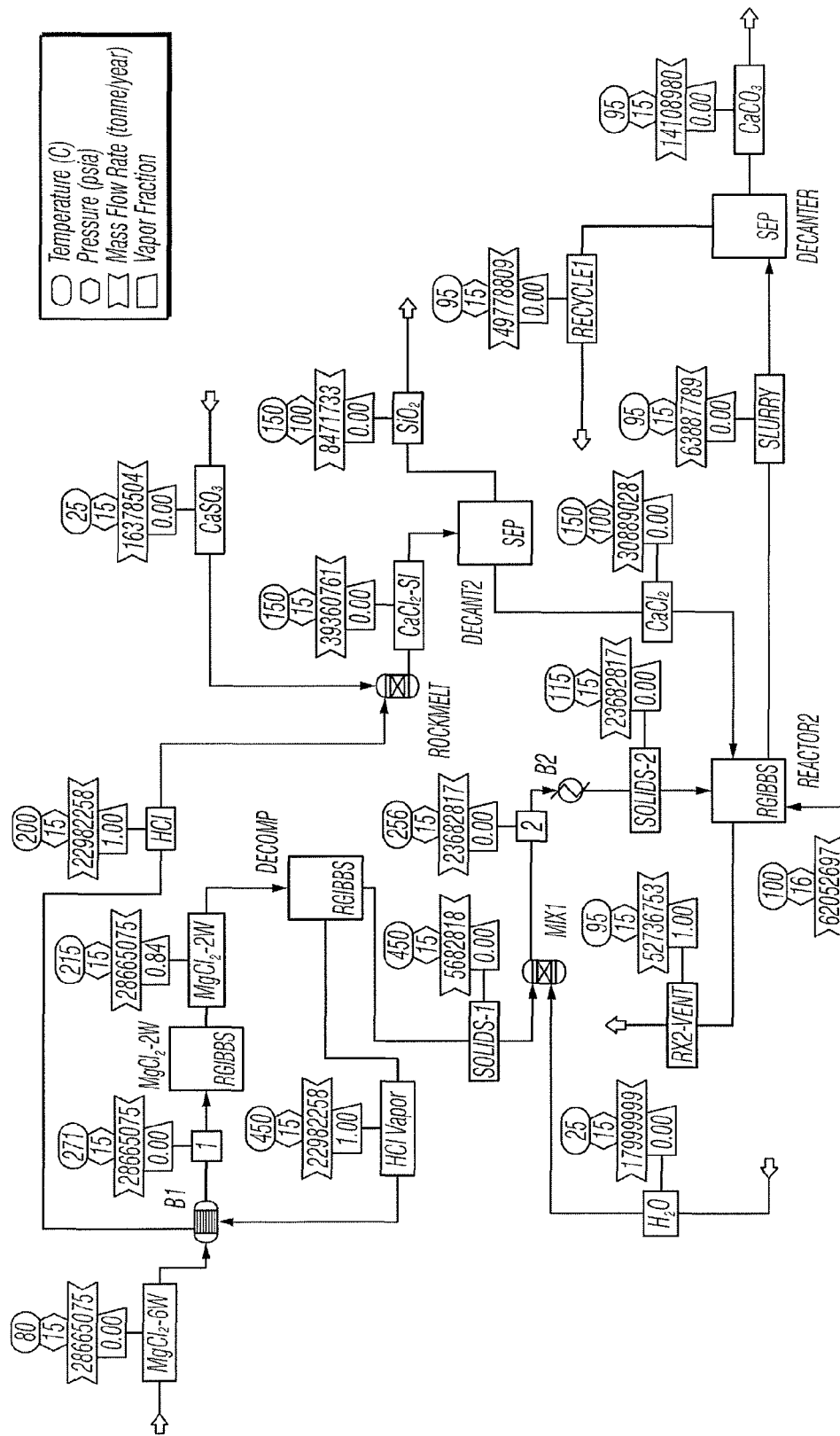

FIG. 19—$CaSiO_3$—MgO Process, Cases 12 & 13. This figure shows a process flow diagram providing parameters and results from a process simulation using Aspen Plus process software. The net reaction is the capture of $CO_2$ from flue gas using inexpensive raw materials, $CaSiO_3$, $CO_2$ and water, to form $SiO_2$ and $CaCO_3$. Results from this simulation indicate that it is efficient to use heat from the HCl reacting with $CaSiO_3$ and heat from flue gas emitted by a natural gas or coal fired power plant to carry out the decomposition of $MgCl_2 \cdot 6H_2O$ to form MgO. The MgO then reacts with $H_2O$ to form $Mg(OH)_2$, which then reacts with a saturated $CaCl_2/H_2O$ solution and $CO_2$ from the flue gas to form $CaCO_3$, which is filtered out of the stream. The resulting $MgCl_2$ formed is recycled to the first reactor to begin the process again. In this embodiment, the magnesium chloride hexahydrate is dehydrated to magnesium chloride dihydrate $MgCl_2 \cdot 2H_2O$ in the first chamber using heat from the HCl and $CaSiO_3$ reaction and decomposed in a second chamber at 450° C. using heat from the flue gas. Thus the decomposition goes completely to MgO. The main reactions occurring in this chamber can be represented as follows:

| Reaction | ΔH kJ/mole** | Reaction Temp. Range |
|---|---|---|
| $MgCl_2 \cdot 6H_2O \rightarrow MgO + 5H_2O + 2HCl$ | 560 | 450° C.-500° C. |
| $2HCl(g) + CaSiO_3 \rightarrow CaCl_2(aq) + H_2O + SiO_2 \downarrow$ | −264 | 90° C.-150° C. |
| $MgO + CO_2 + CaCl_2(aq) \rightarrow MgCl_2(aq) + CaCO_3 \downarrow$ | −133 | 25° C.-95° C. |

**Enthalpies are based on reaction temperatures, and temperatures of incoming reactant and outgoing product streams. Additional details regarding this simulation are provided in Examples 12 and 13 below.

Figure 20:
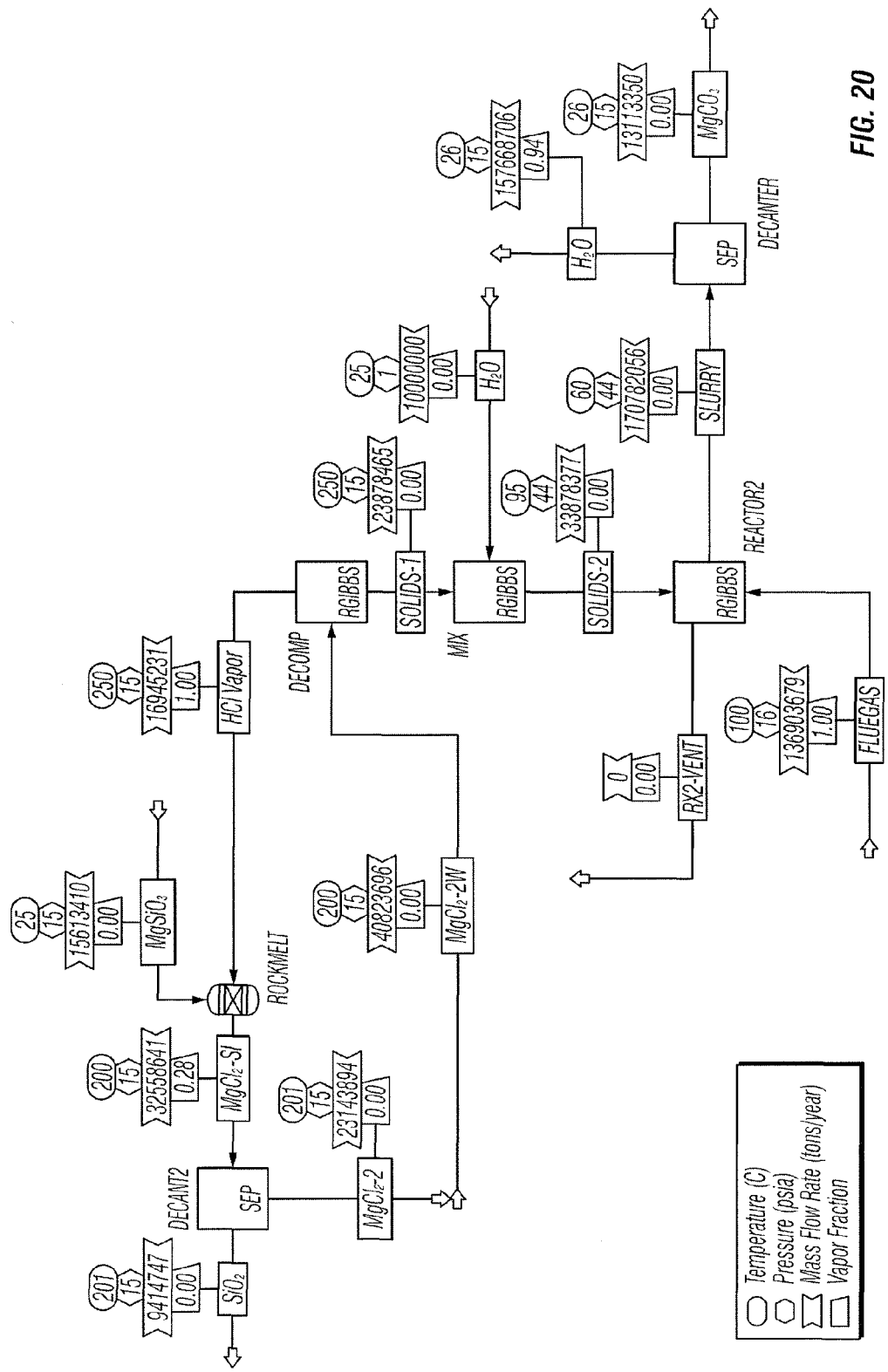

FIG. 20—$MgSiO_3$—Mg(OH)Cl Process, Cases 14 & 15. This figure shows a process flow diagram providing parameters and results from a process simulation using Aspen Plus process software. The net reaction is the capture of $CO_2$ from flue gas using inexpensive raw materials, $MgSiO_3$, $CO_2$ and water, to form $SiO_2$ and $MgCO_3$. Results from this simulation indicate that it is efficient to use heat from the HCl reacting with $MgSiO_3$ and heat from the flue gas emitted by a natural gas or coal fired power plant to carry out the decomposition of $MgCl_2 \cdot 2H_2O$ to form Mg(OH)Cl. The Mg(OH)Cl then reacts with $H_2O$ to form $MgCl_2$ and $Mg(OH)_2$, which then reacts with $CO_2$ from the flue gas to form $MgCO_3$, which is filtered out of the stream. The resulting $MgCl_2$ formed is recycled to the first reactor to begin the process again. In this embodiment, the magnesium chloride remains in the dihydrate form $MgCl_2 \cdot 2H_2O$ due to the heat from the HCl and $MgSiO_3$ prior to decomposition at 250° C. using heat from the flue gas. Thus the decomposition goes partially to Mg(OH)Cl. The main reactions occurring in this chamber can be represented as follows:

| Reaction | ΔH kJ/mole** | Reaction Temp. Ranges |
|---|---|---|
| $MgCl_2 \cdot 2H_2O \rightarrow Mg(OH)Cl + H_2O(g) + HCl(g)$ | 139.8 | 230° C.-260° C. |
| $2HCl(g) + MgSiO_3 \rightarrow MgCl_2 + H_2O + SiO_2 \downarrow$ | −282.8 | 90° C.-150° C. |
| $2Mg(OH)Cl + CO_2 \rightarrow MgCl_2 + MgCO_3 \downarrow + H_2O$ | −193.1 | 25° C.-95° C. |

**Enthalpies are based on reaction temperatures, and temperatures of incoming reactant and outgoing product streams. Additional details regarding this simulation are provided in Examples 14 and 15 below.

Figure 21:
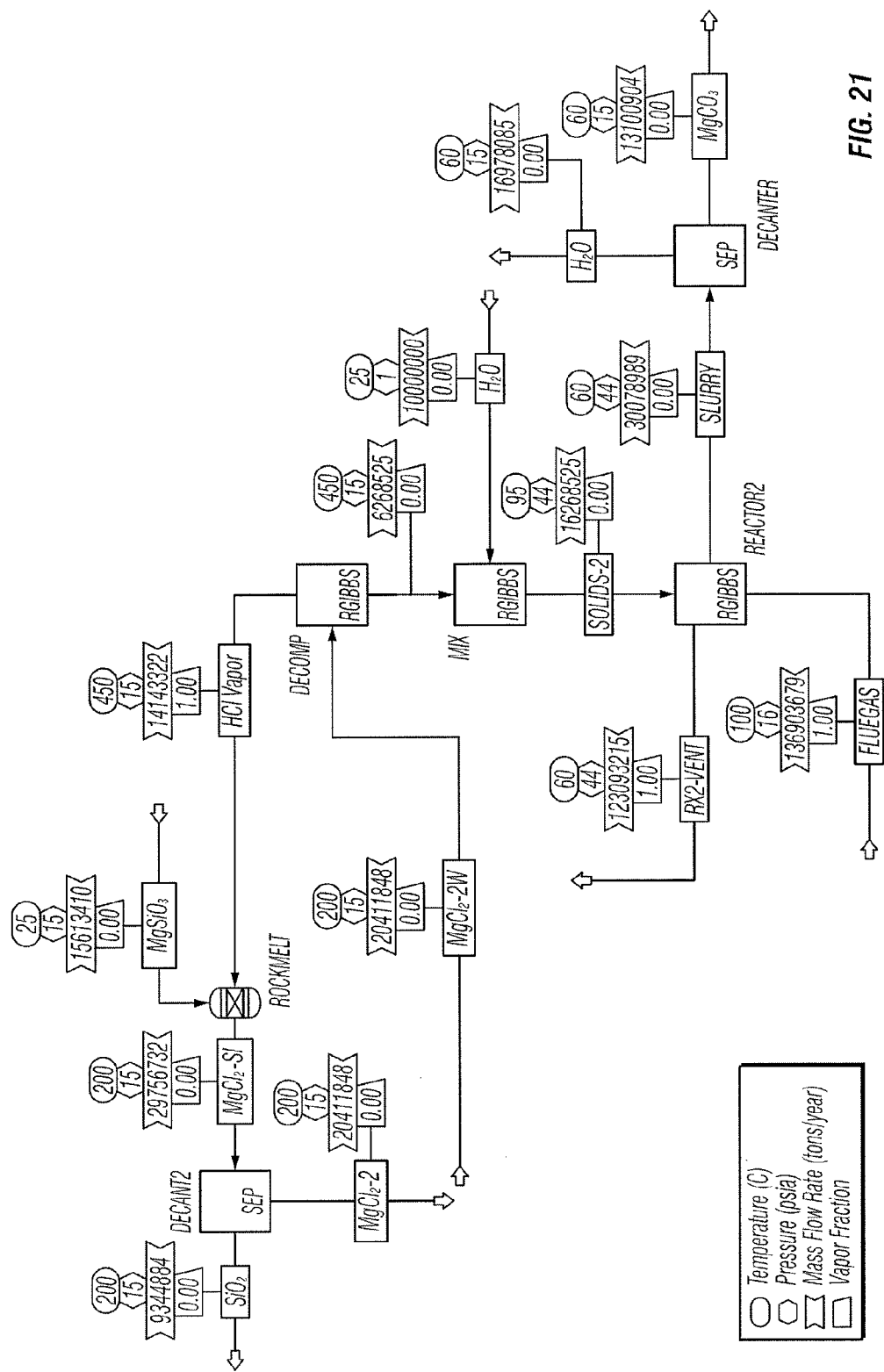

FIG. 21—$MgSiO_3$—MgO Process, Cases 16 & 17. This figure shows a process flow diagram providing parameters and results from a process simulation using Aspen Plus process software. The net reaction is the capture of $CO_2$ from flue gas using inexpensive raw materials, $MgSiO_3$, $CO_2$ and water, to form $SiO_2$ and $MgCO_3$. Results from this simulation indicate that it is efficient to use heat from the HCl reacting with $MgSiO_3$ and heat from the flue gas emitted by a natural gas or coal fired power plant to carry out the decomposition of $MgCl_2 \cdot 2H_2O$ to form MgO. The MgO then reacts with $H_2O$ to form $Mg(OH)_2$, which then reacts with $CO_2$ from the flue gas to form $MgCO_3$, which is filtered out of the stream. In this embodiment, the magnesium chloride remains in the dihydrate form $MgCl_2 \cdot 2H_2O$ due to the heat from the HCl and $MgSiO_3$ prior to decomposition at 450° C. using heat from the flue gas. Thus the decomposition goes completely to MgO. The main reactions occurring in this chamber can be represented as follows:

| Reaction | ΔH kJ/mole** | Reaction Temp. Range |
|---|---|---|
| $MgCl_2 \cdot 2H_2O \rightarrow MgO + H_2O(g) + 2HCl(g)$ | 232.9 | 450° C.-500° C. |
| $2HCl(g) + MgSiO_3 \rightarrow MgCl_2(aq) + H_2O(g) + SiO_2 \downarrow$ | −293.5 | 90° C.-150° C. |
| $MgO + CO_2 \rightarrow MgCO_3 \downarrow$ | −100 | 25° C.-95° C. |

**Enthalpies are based on reaction temperatures, and temperatures of incoming reactant and outgoing product streams. Additional details regarding this simulation are provided in Examples 16 and 17 below.

Figure 22:
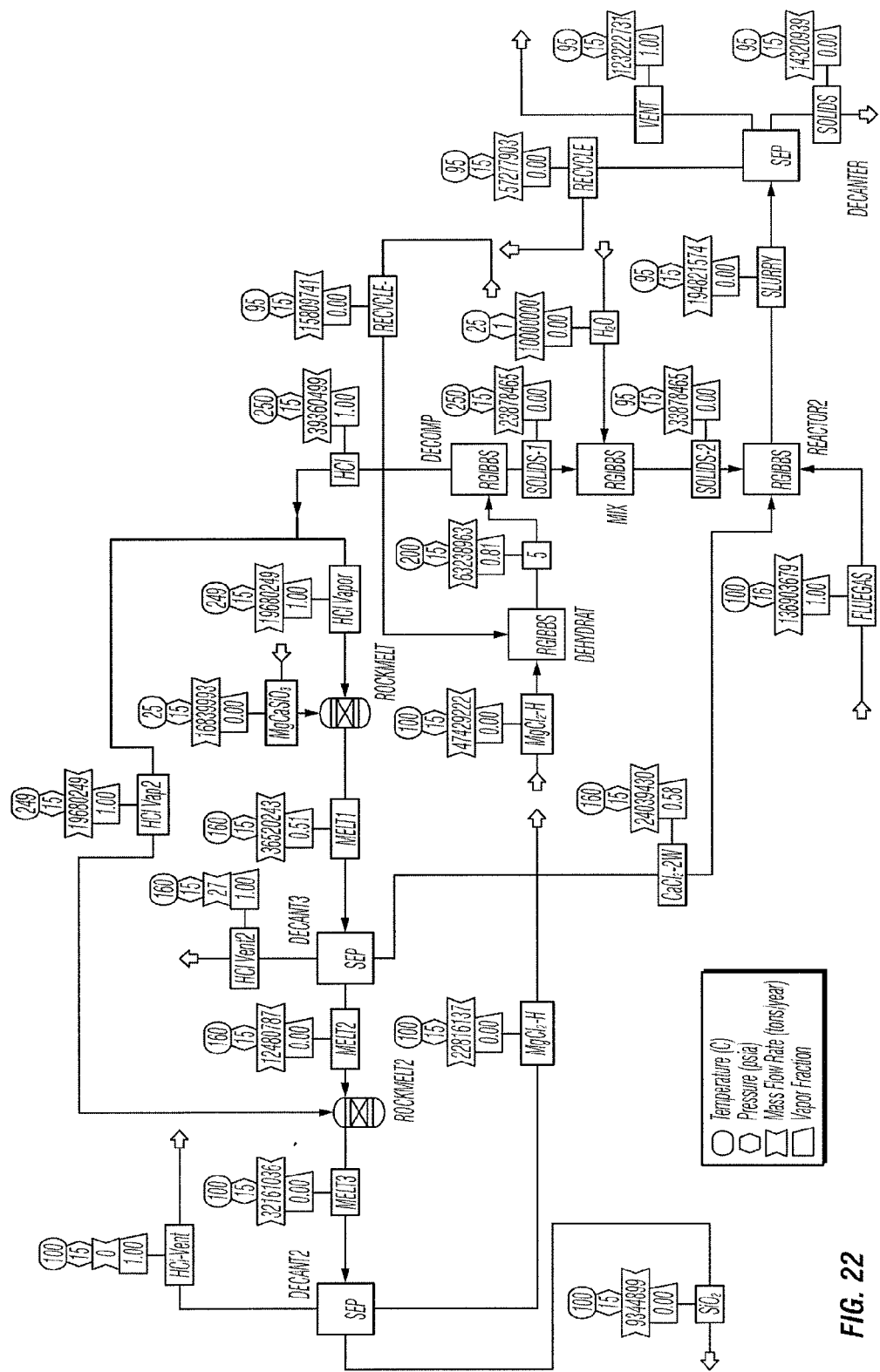

FIG. 22—Diopside-Mg(OH)Cl Process, Cases 18 & 19. This figure shows a process flow diagram providing parameters and results from a process simulation using Aspen Plus process software. The net reaction is the capture of $CO_2$ from flue gas using inexpensive raw materials, diopside $MgCa(SiO_3)_2$, $CO_2$ and water, to form $SiO_2$ and dolomite $MgCa(CO_3)_2$. Results from this simulation indicate that it is efficient to use heat from the HCl reacting with $MgCa(SiO_3)_2$ and heat from the flue gas emitted by a natural gas or coal fired power plant to carry out the decomposition of $MgCl_2 \cdot 6H_2O$ to form $Mg(OH)Cl$. The $Mg(OH)Cl$ then reacts with $H_2O$ to form $MgCl_2$ and $Mg(OH)_2$, which then reacts with a saturated $CaCl_2/H_2O$ solution and $CO_2$ from the flue gas to form $MgCa(CO_3)_2$ which is filtered out of the stream. The resulting $MgCl_2$ formed is recycled to the first reactor to begin the process again. In this embodiment, the magnesium chloride hexahydrate is dehydrated to magnesium chloride dihydrate $MgCl_2 \cdot 2H_2O$ in the first chamber using heat from the HCl and $CaSiO_3$ reaction and decomposed to $Mg(OH)Cl$ in a second chamber at 250° C. using heat from the flue gas. The main reactions occurring in this chamber can be represented as follows:

| Reaction | ΔH kJ/mole** | Reaction Temp. Range |
|---|---|---|
| $MgCl_2 \cdot 6H_2O \rightarrow Mg(OH)Cl + 5H_2O(g) + HCl(g)$ | 433 | 230° C.-260° C. |
| $2HCl(g) + MgCa(SiO_3)_2 \rightarrow CaCl_2(aq) + MgSiO_3\downarrow + SiO_2\downarrow + H_2O$ | −235 | 90° C.-150° C. |
| $2HCl(g) + MgSiO_3 \rightarrow MgCl_2(aq) + SiO_2\downarrow + H_2O$ | −282.8 | 90° C.-150° C. |
| $4Mg(OH)Cl + 2CO_2 + CaCl_2(aq) \rightarrow MgCa(CO_3)_2\downarrow + 3MgCl_2(aq) + 2H_2O$ | −442 | 25° C.-95° C. |

**Enthalpies are based on reaction temperatures, and temperatures of incoming reactant and outgoing product streams. Additional details regarding this simulation are provided in Examples 18 and 19 below.

Figure 23:
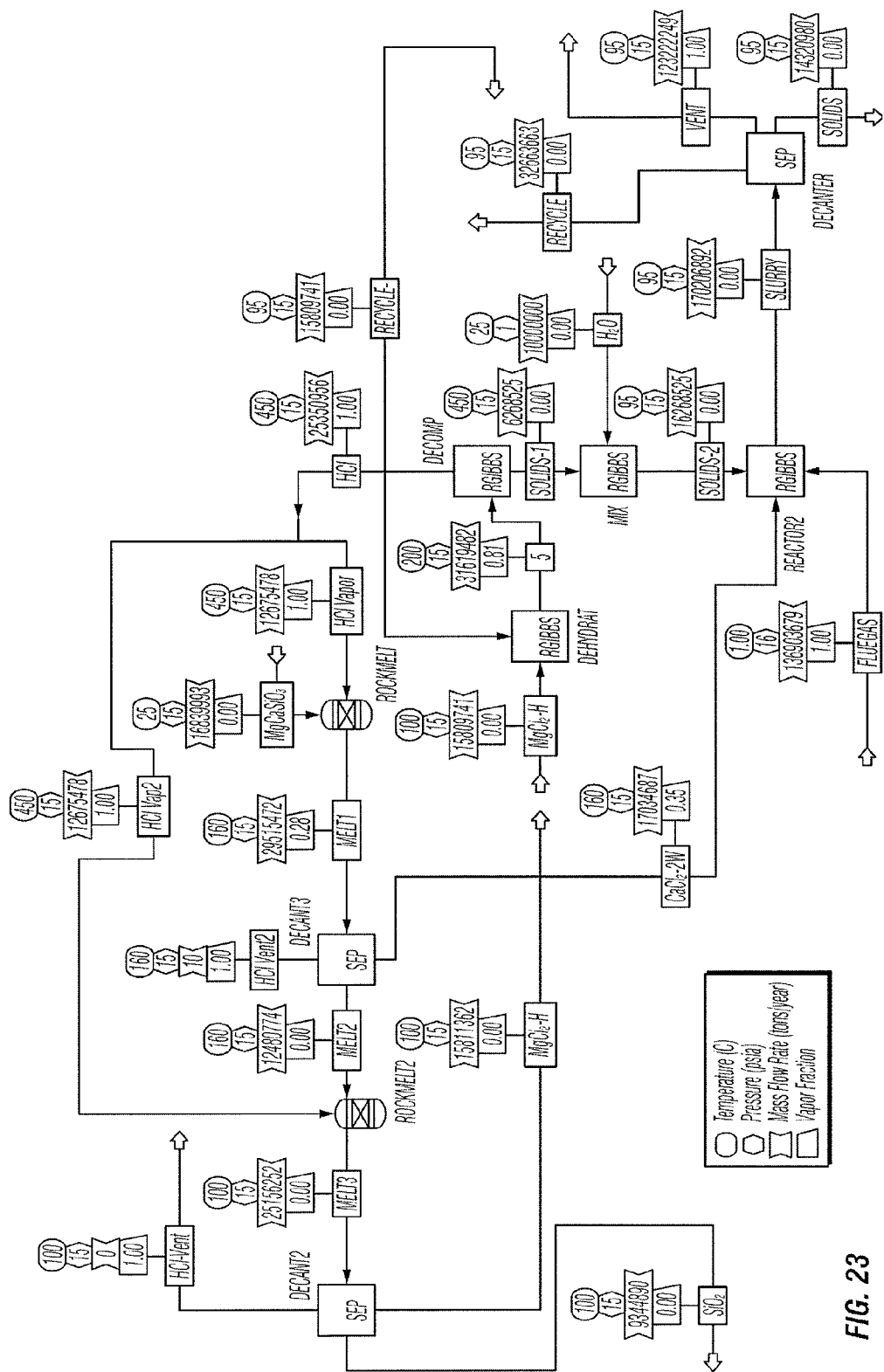

FIG. 23—Diopside-MgO Process, Cases 20 & 21. This figure shows a process flow diagram providing parameters and results from a process simulation using Aspen Plus process software. The net reaction is the capture of $CO_2$ from flue gas using inexpensive raw materials, diopside $MgCa(SiO_3)_2$, $CO_2$ and water, to form $SiO_2$ and dolomite $MgCa(CO_3)_2$. Results from this simulation indicate that it is efficient to use heat from the HCl reacting with $MgCa(SiO_3)_2$ and heat from the flue gas emitted by a natural gas or coal fired power plant and/or other heat source to carry out the decomposition of $MgCl_2 \cdot 6H_2O$ to form MgO. The MgO then reacts with $H_2O$ to form $Mg(OH)_2$, which then reacts with a saturated $CaCl_2/H_2O$ solution and $CO_2$ from the flue gas to form $MgCa(CO_3)_2$ which is filtered out of the stream. The resulting $MgCl_2$ formed is recycled to the first reactor to begin the process again. In this embodiment, the magnesium chloride hexahydrate is dehydrated to magnesium chloride dihydrate $MgCl_2 \cdot 2H_2O$ in the first chamber using heat from the HCl and $CaSiO_3$ reaction and decomposed to MgO in a second chamber at 450° C. using heat from the flue gas. The main reactions occurring in this chamber can be represented as follows:

| Reaction | ΔH kJ/mole** | Reaction Temp. Range |
|---|---|---|
| $MgCl_2 \cdot 6H_2O \rightarrow MgO + 5H_2O + 2HCl$ | 560 | 450° C.-500° C. |
| $2HCl(g) + MgCa(SiO_3)_2 \rightarrow CaCl_2(g) + MgSiO_3\downarrow + SiO_2\downarrow + H_2O$ | −240 | 90° C.-150° C. |
| $2HCl(aq) + MgSiO_3 \rightarrow MgCl_2(aq) + SiO_2\downarrow + H_2O$ | −288 | 90° C.-150° C. |
| $2MgO + 2CO_2 + CaCl_2(aq) \rightarrow MgCa(CO_3)_2\downarrow + MgCl_2(aq)$ | −258 | 25° C.-95° C. |

**Enthalpies are based on reaction temperatures, and temperatures of incoming reactant and outgoing product streams. Additional details regarding this simulation are provided in Examples 20 and 21 below.

Figure 24:
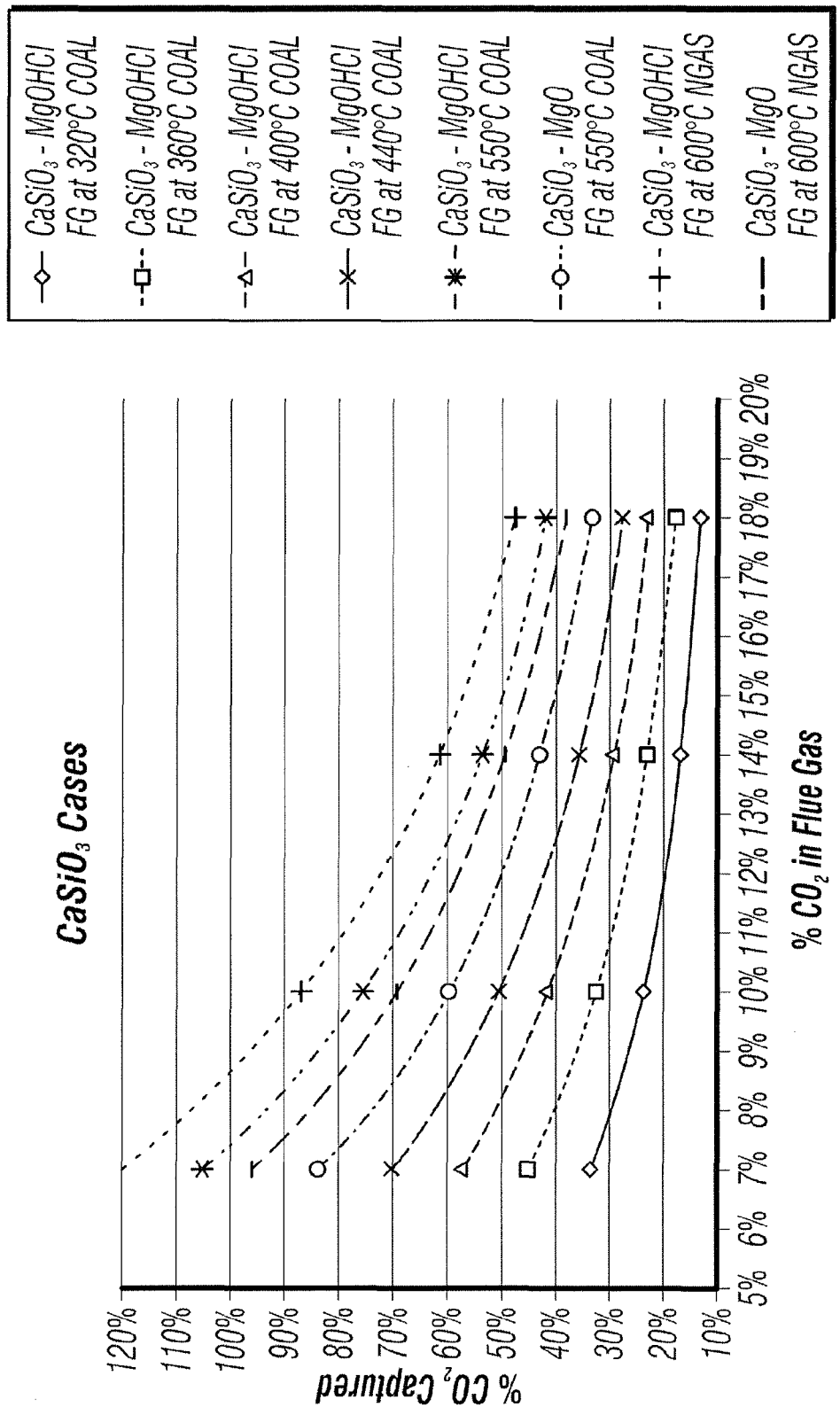

FIG. 24 illustrates the percent $CO_2$ captured for varying $CO_2$ flue gas concentrations, varying temperatures, whether the flue gas was originated from coal or natural gas, and also whether the process relied on full or partial decomposition. See Examples 10 through 13 of the $CaSiO_3$—$Mg(OH)Cl$ and $CaSiO_3$—MgO processes.

Figure 25:
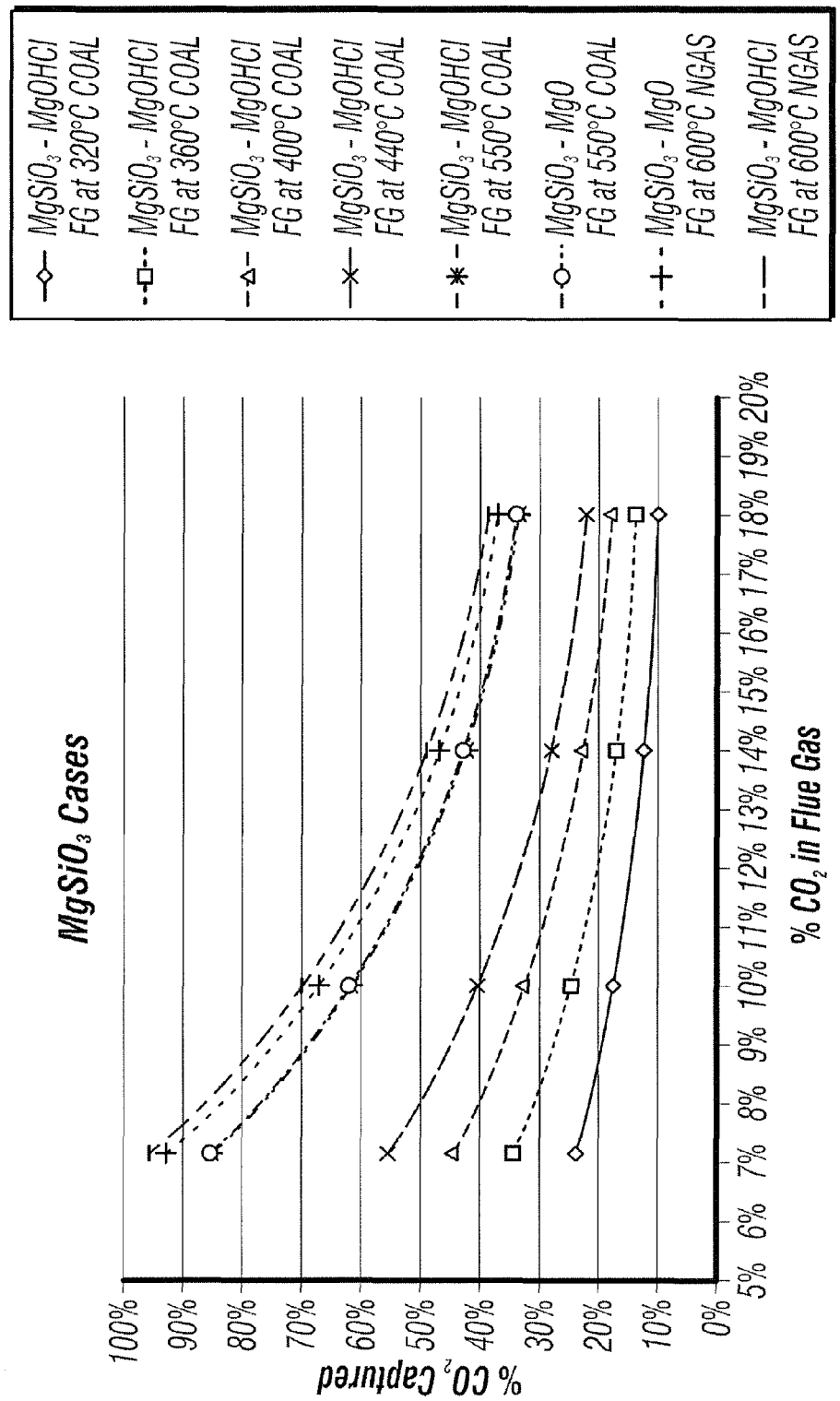

FIG. 25 illustrates the percent $CO_2$ captured for varying $CO_2$ flue gas concentrations, varying temperatures, whether the flue gas was originated from coal or natural gas, and also whether the process relied on full or partial decomposition. See Examples 14 through 17 of the $MgSiO_3$—$Mg(OH)Cl$ and $MgSiO_3$—MgO processes.

Figure 26:
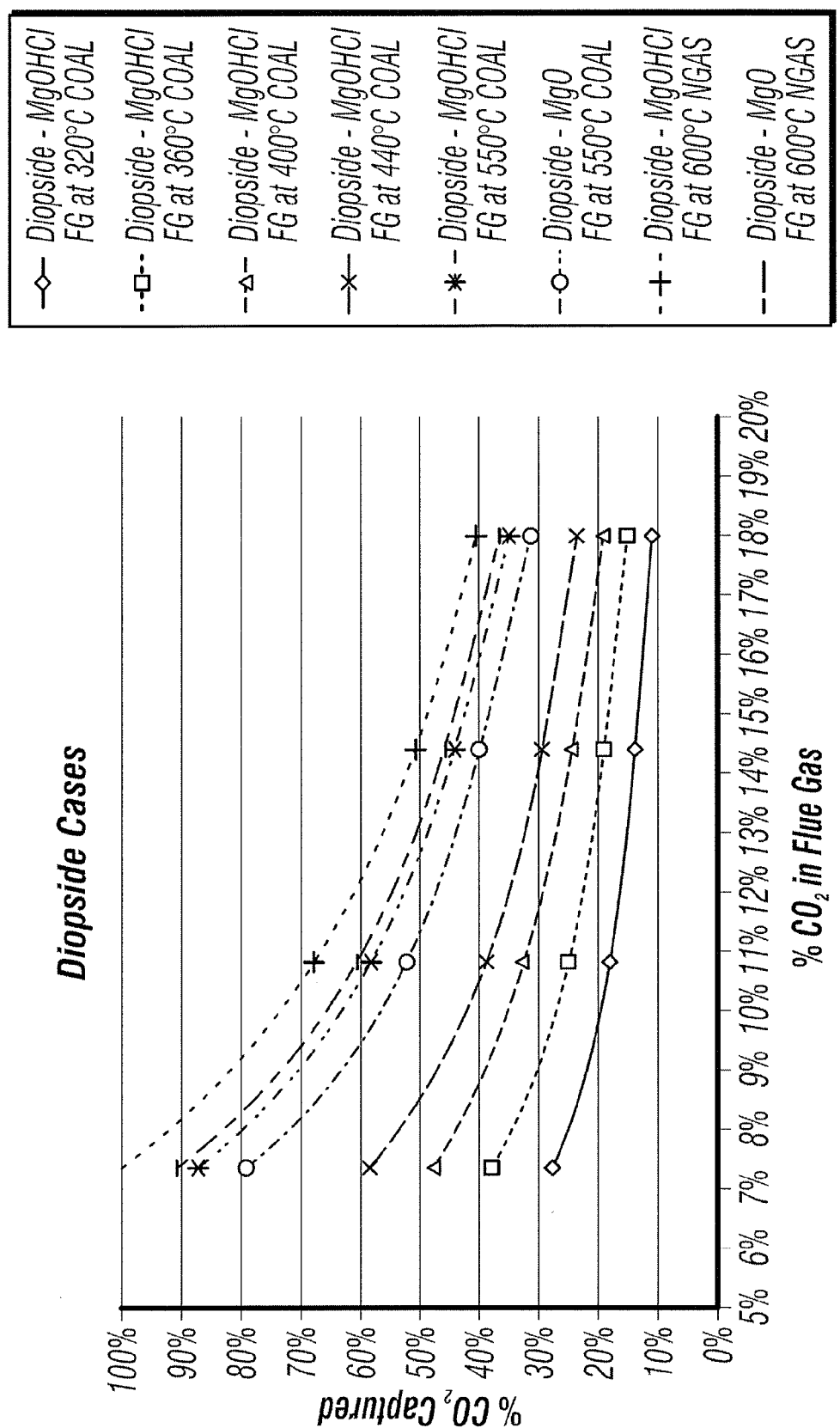

FIG. 26 illustrates the percent $CO_2$ captured for varying $CO_2$ flue gas concentrations, varying temperatures, whether the flue gas was originated from coal or natural gas, and also whether the process relied on full or partial decomposition. See Examples 18 through 21 of the Diopside-$Mg(OH)Cl$ and Diopside-MgO processes.

Figure 27:
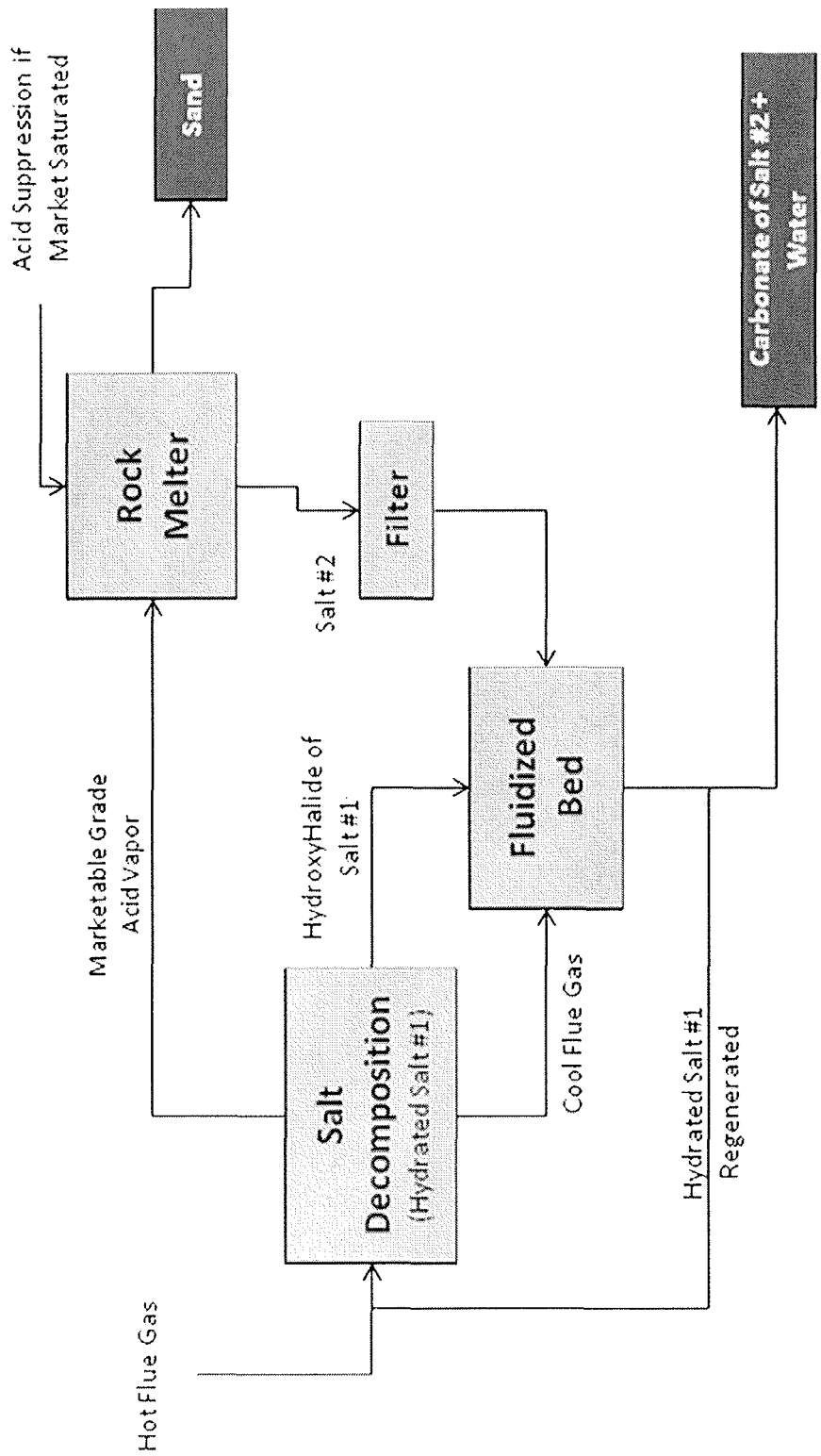

FIG. 27 is a simplified process-flow diagram corresponding to some embodiments of the present invention in which two different salts, e.g., $Ca^{2+}$ and $Mg^{2+}$, are used for decomposition and carbonation.

Figure 28:
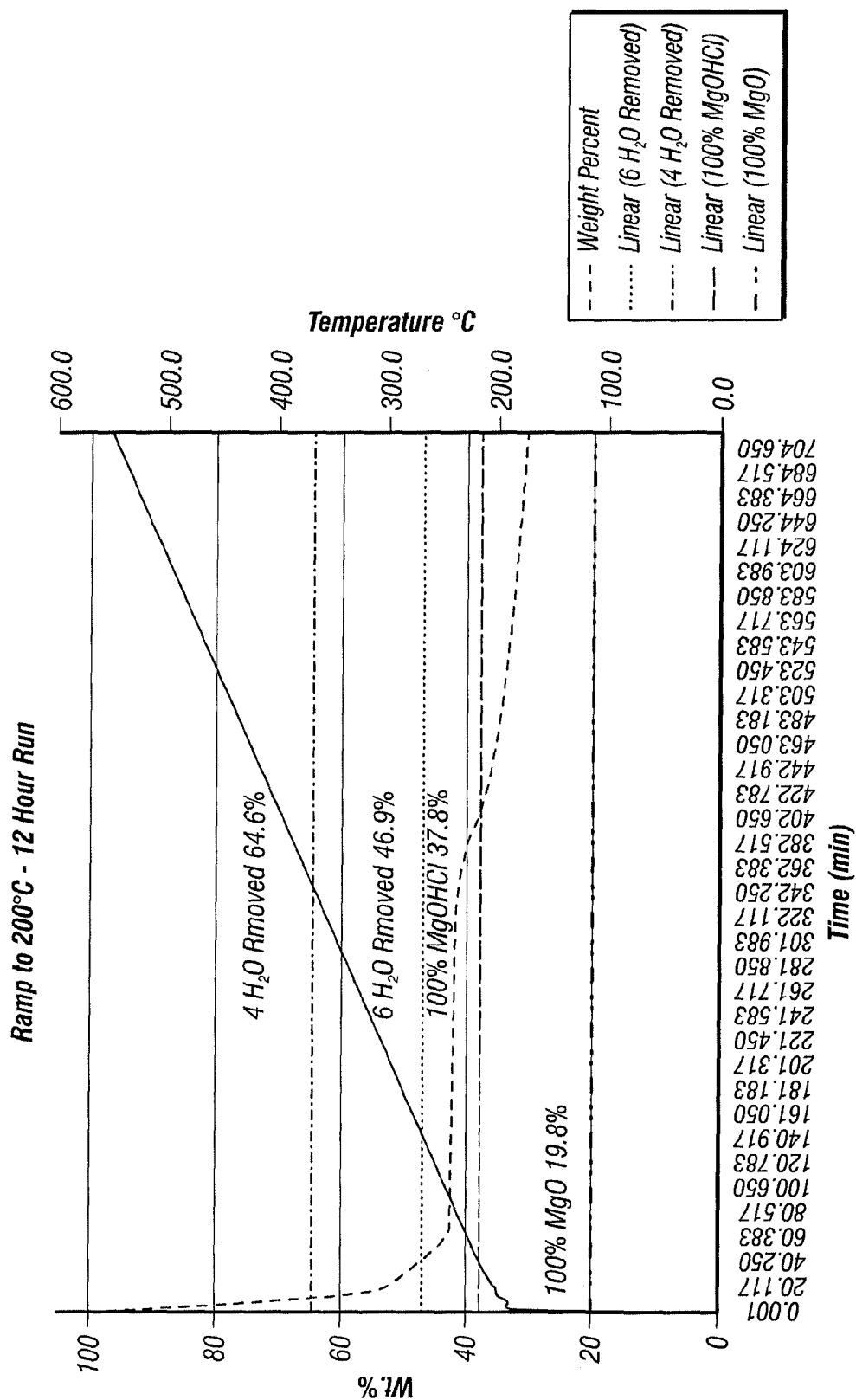
Figure 29:
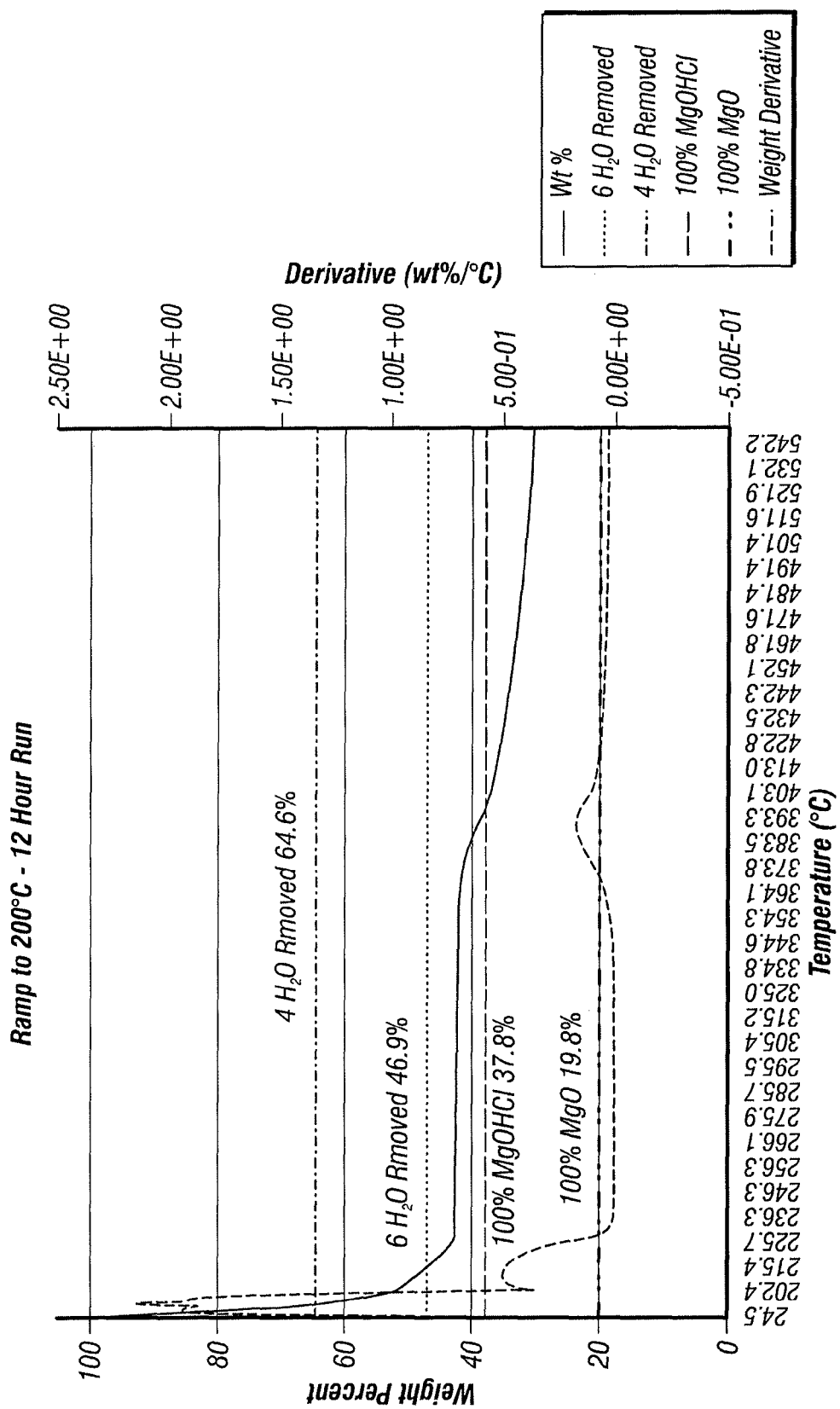

FIGS. 28-29 show graphs of the mass percentages of heated samples of $MgCl_2 \cdot 6H_2O$. The initial masses of the samples were approximately 70 mg each and were each set at 100%. During the experiment, the masses of the samples were measured while they was being thermally decomposed. The temperature was ramped up to 200° C. then further increased over the course of a 12 hour run. The identities of the decomposed materials can be confirmed by comparing against the theoretical plateaus provided. FIG. 28 is a superposition of two plots, the first one being the solid line, which is a plot of time (minutes) versus temperature (° C.). The line illustrates the ramping of temperature over time; the second plot, being the dashed line is a plot of weight % (100%=original weight of sample) versus time, which illustrates the reduction of the sample's weight over time whether by dehydration or decomposition. FIG. 29 is also a superposition of two plots, the first (the solid line) is a plot of weight % versus temperature (° C.), illustrating the sample's weight decreasing as the temperature increases; the second plot (the dashed line) is a plot of the derivative of the weight % with respect to temperature (wt. %/° C.) versus temperature ° C. When this value is high it indicates a higher rate of weight loss for each change per degree. If this value is zero, the sample's weight remains the same although the temperature is increasing, indicating an absence of dehydration or decomposition. Note FIGS. 28 and 29 are of the same sample.

Figure 30:
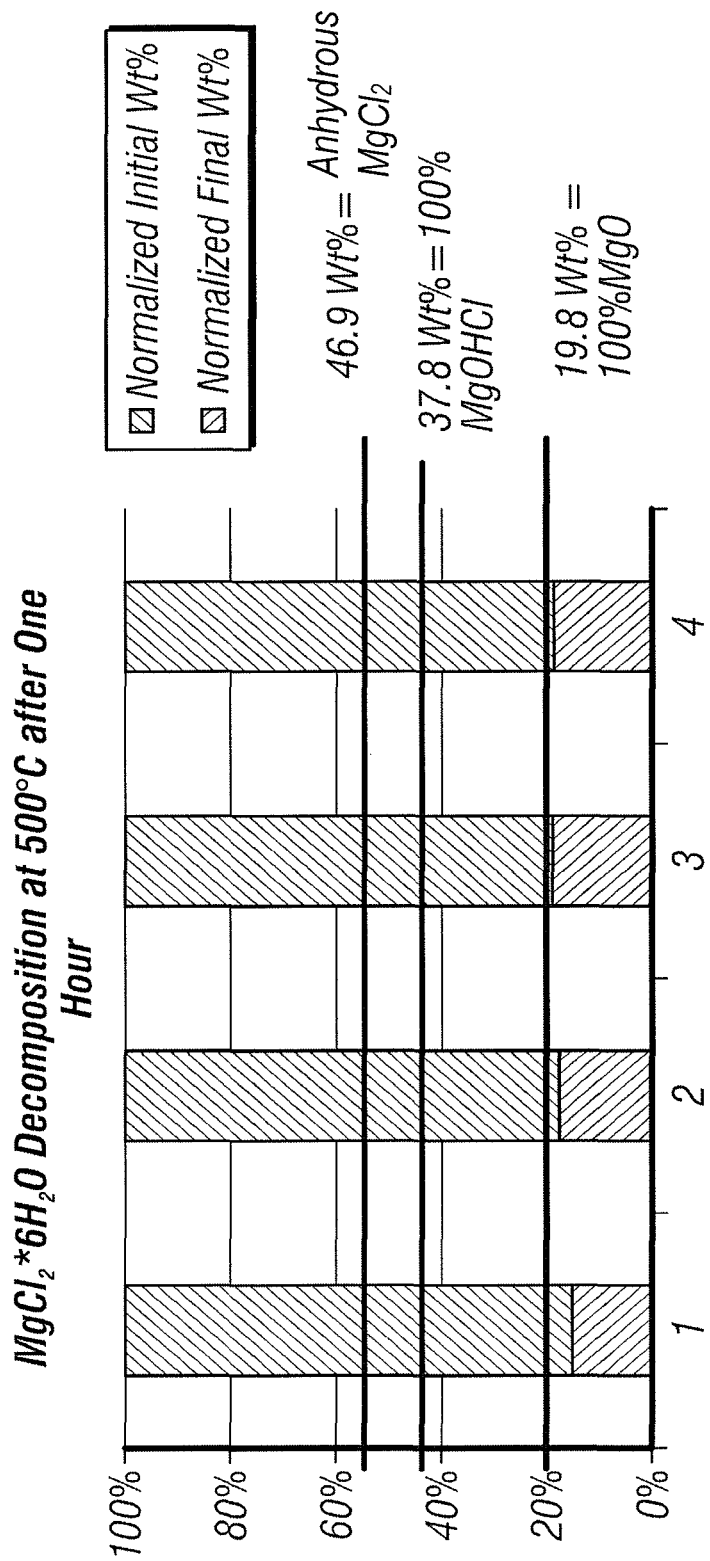

FIG. 30—$MgCl_2 \cdot 6H_2O$ Decomposition at 500° C. after One Hour. This graph shows the normalized final and initial weights of four test runs of $MgCl_2 \cdot 6H_2O$ after heating at 500° C. for one hour. The consistent final weight confirms that MgO is made by decomposition at this temperature.

Figure 31:
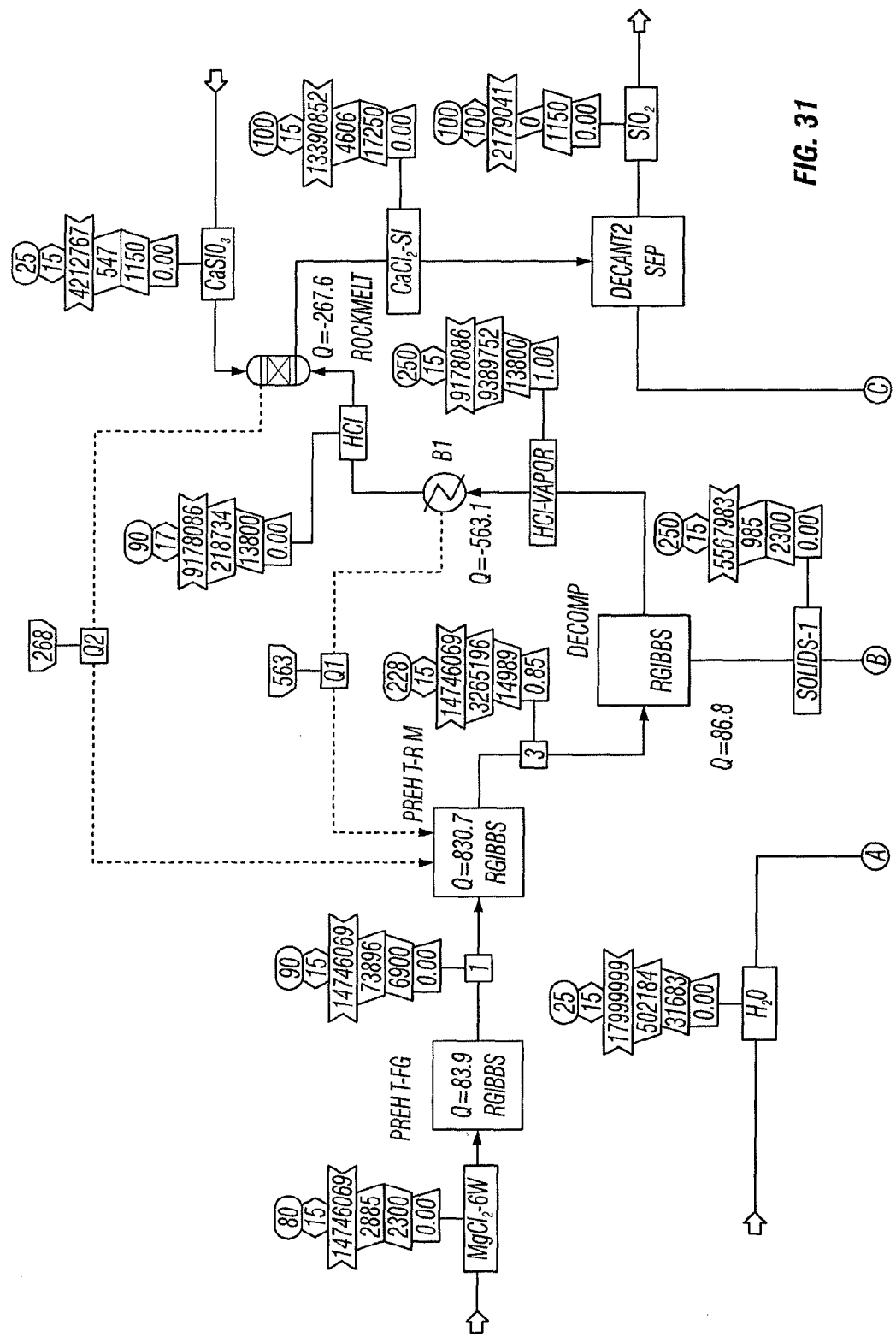
Figure 31:
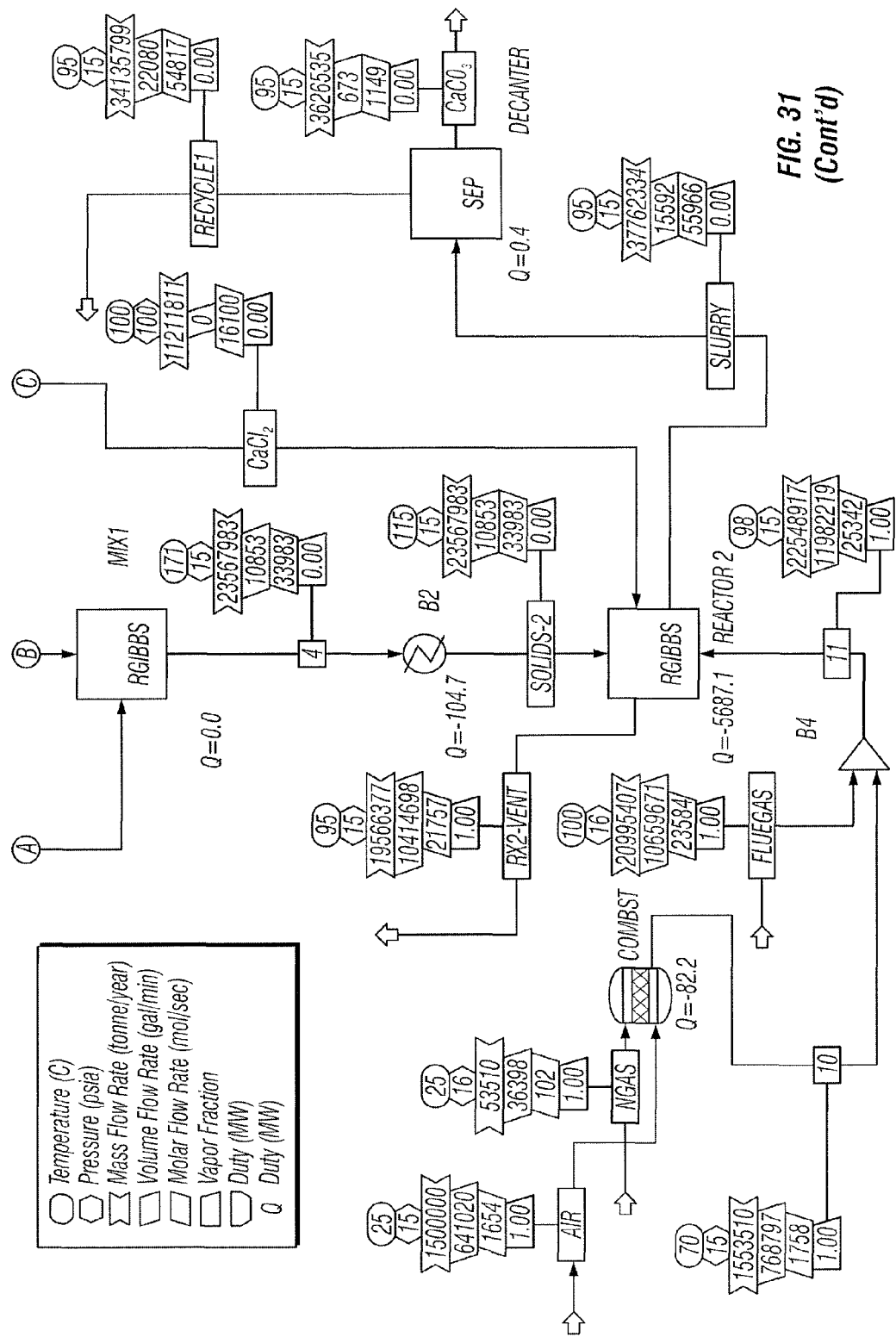

FIG. 31—Three-Chamber Decomposition. This figure shows a process flow diagram providing parameters and results from a process simulation using Aspen Plus process software. In this embodiment, heat from cold flue gas (chamber 1), heat from mineral dissolution reactor (chamber 2), and external natural gas (chamber 3) are used as heat sources. This process flow diagram illustrates a three chamber process for the decomposition to $Mg(OH)Cl$. The first chamber is heated by 200° C. flue gas to provide some initial heat about ~8.2% of the total required heat, the second chamber which relies on heat recovered from the mineral dissolution reactor to provide 83% of the needed heat for the decomposition of which 28% is from the hydrochloric acid/mineral silicate reaction and 55% is from the condensation and formation of hydrochloric acid, and finally the third chamber, which uses natural gas as an external source of the remaining heat which is 8.5% of the total heat. The $CO_2$ is from a combined cycle power natural gas plant, so very little heat is available from the power plant to power the decomposition reaction.

Figure 32:
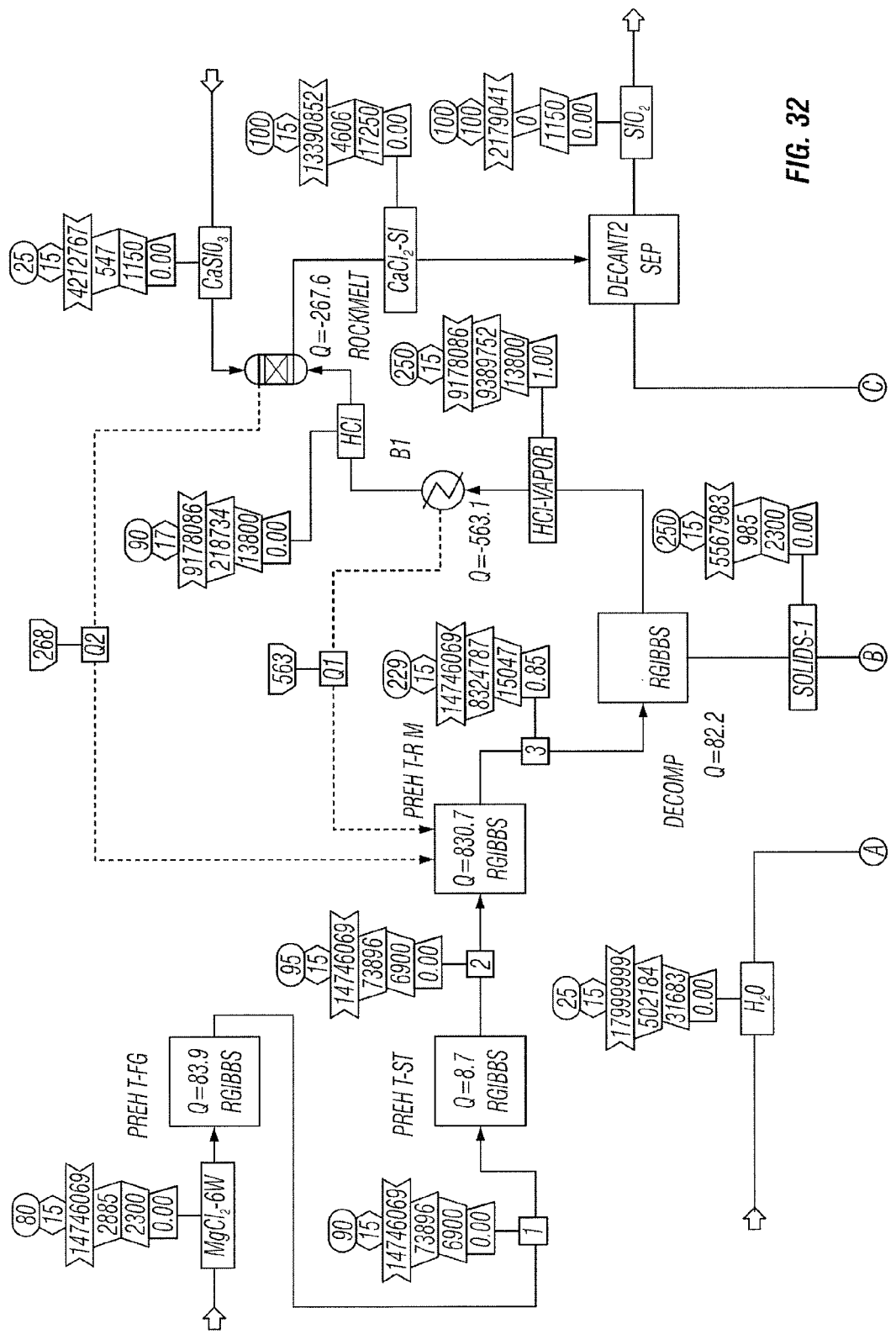
Figure 32:
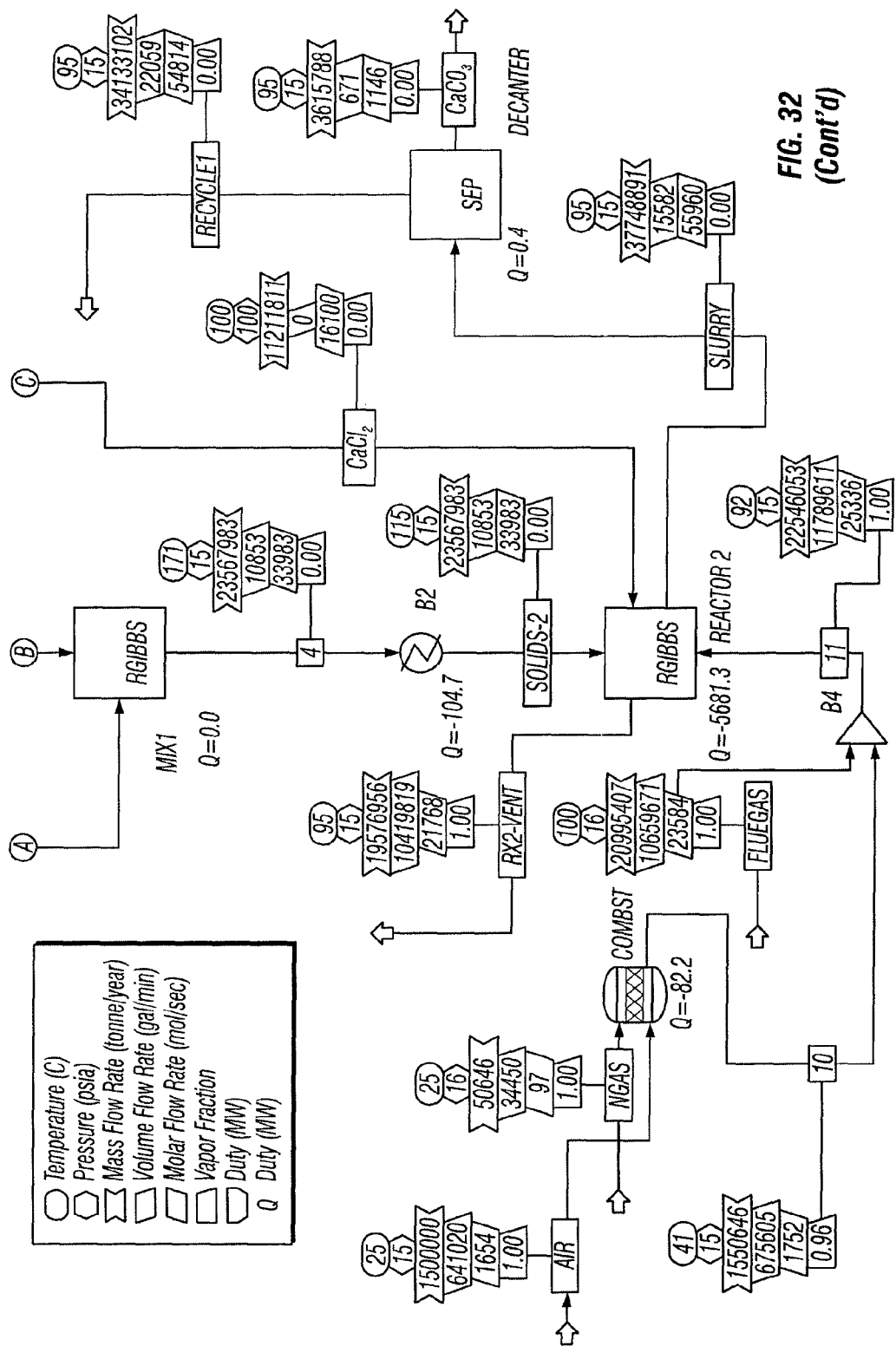

FIG. 32—Four-Chamber Decomposition. This figure shows a process flow diagram providing parameters and results from a process simulation using Aspen Plus process software. In this embodiment, heat from cold flue gas (chamber 1), heat from additional steam (chamber 2), heat from mineral dissolution reactor (chamber 3), and external natural gas (chamber 4) are used as heat sources. This process flow diagram illustrates a four chamber process for the decomposition to Mg(OH)Cl, the first chamber provides 200° C. flue gas to provide some initial heat about ~8.2% of the total required heat, the second chamber provides heat in the form of extra steam which is 0.8% of the total heat needed, the third chamber which relies on heat recovered from the mineral dissolution reactor to provide 83% of the needed heat for the decomposition of which 28% is from the hydrochloric acid/mineral silicate reaction and 55% is from the condensation and formation of hydrochloric acid, and finally the fourth chamber, which uses natural gas as an external source of the remaining heat which is 8.0% of the total heat. The $CO_2$ is from a combined cycle natural gas power plant, so very little heat is available from the power plant to power the decomposition reaction.

Figure 33:
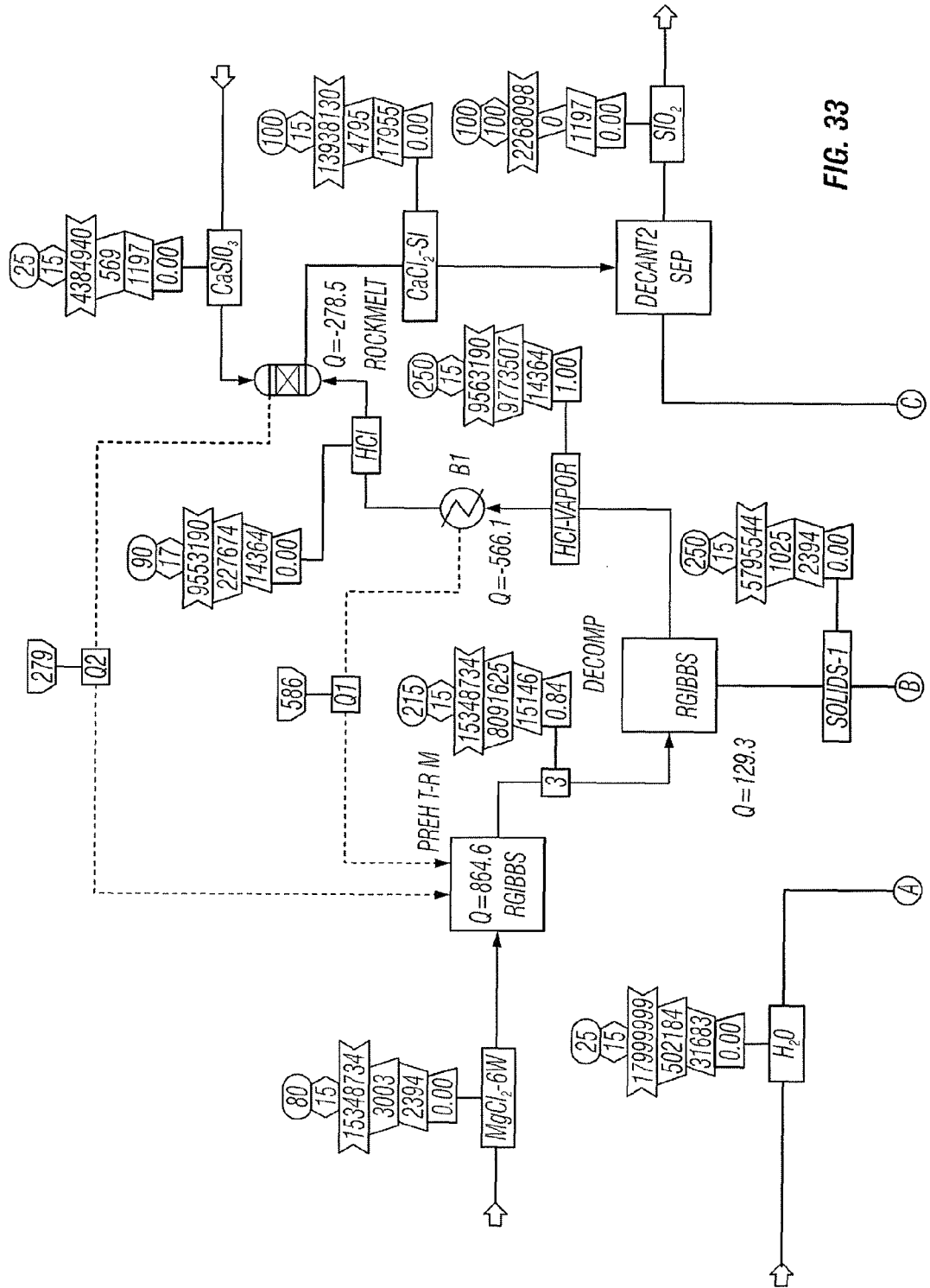
Figure 33:
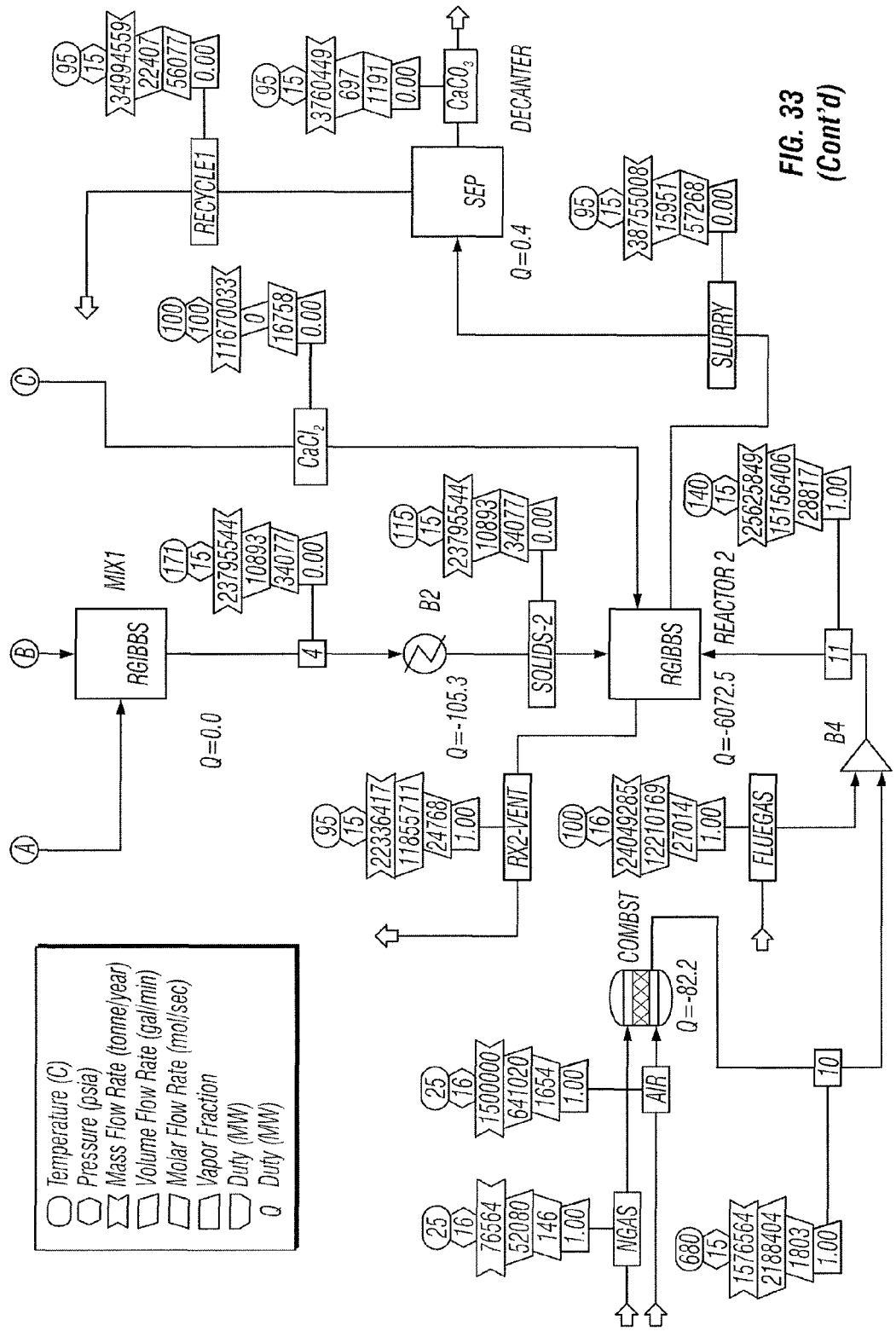

FIG. 33—Two-Chamber Decomposition. This figure shows a process flow diagram providing parameters and results from a process simulation using Aspen Plus process software. In this embodiment, heat from mineral dissolution reactor (chamber 1), and external natural gas (chamber 2) are used as heat sources. This process flow diagram illustrates a two chamber process for the decomposition to Mg(OH)Cl, the first chamber which relies on heat recovered from the mineral dissolution reactor to provide 87% of the needed heat for the decomposition of which 28% is from the hydrochloric acid/mineral silicate reaction and 59% is from the condensation and formation of hydrochloric acid, and the second chamber, which uses natural gas as an external source of the remaining heat which is 13% of the total heat. The $CO_2$ is from a combined cycle natural gas power plant, so very little heat is available from the power plant to power the decomposition reaction.

Figure 34:
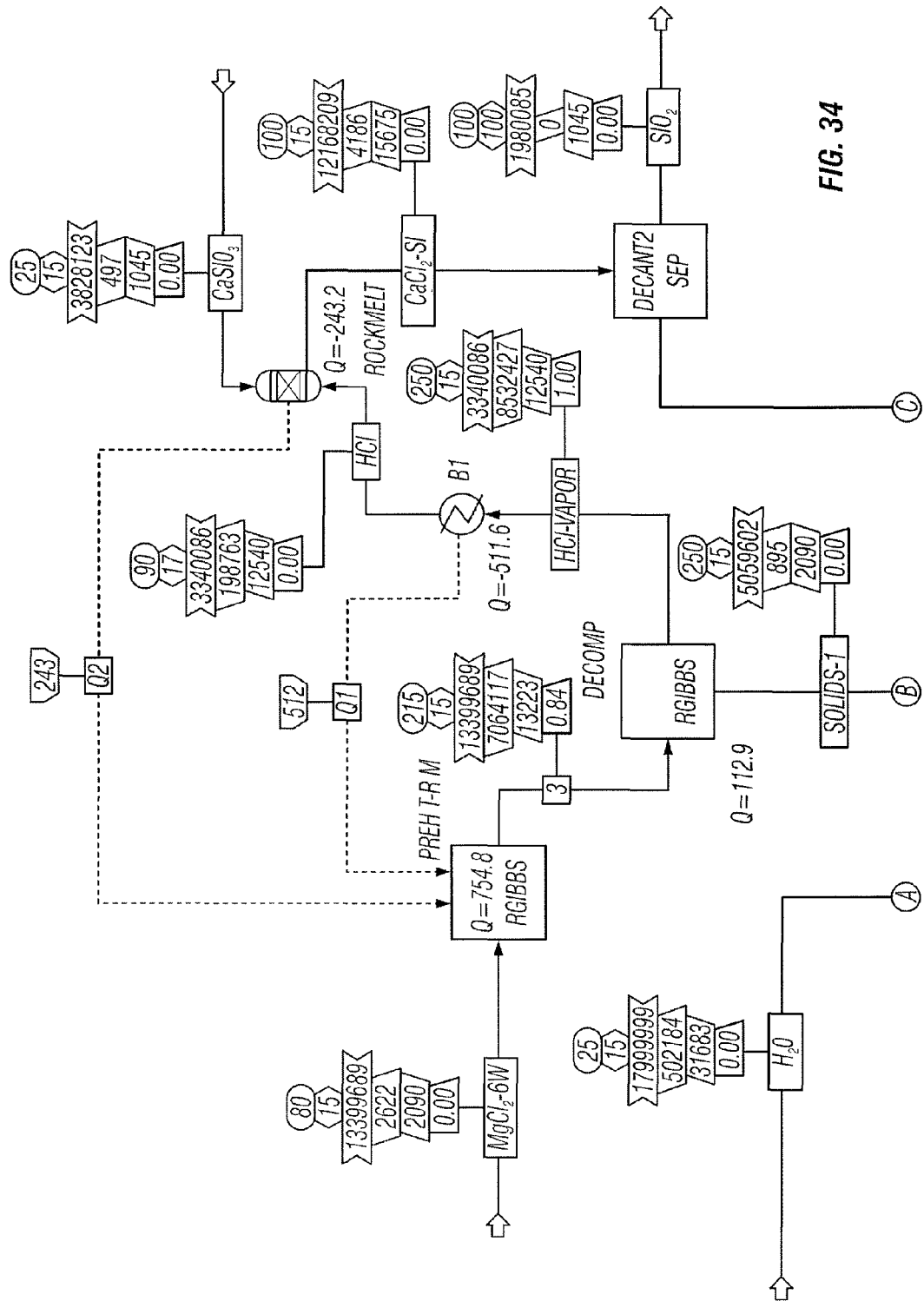
Figure 34:
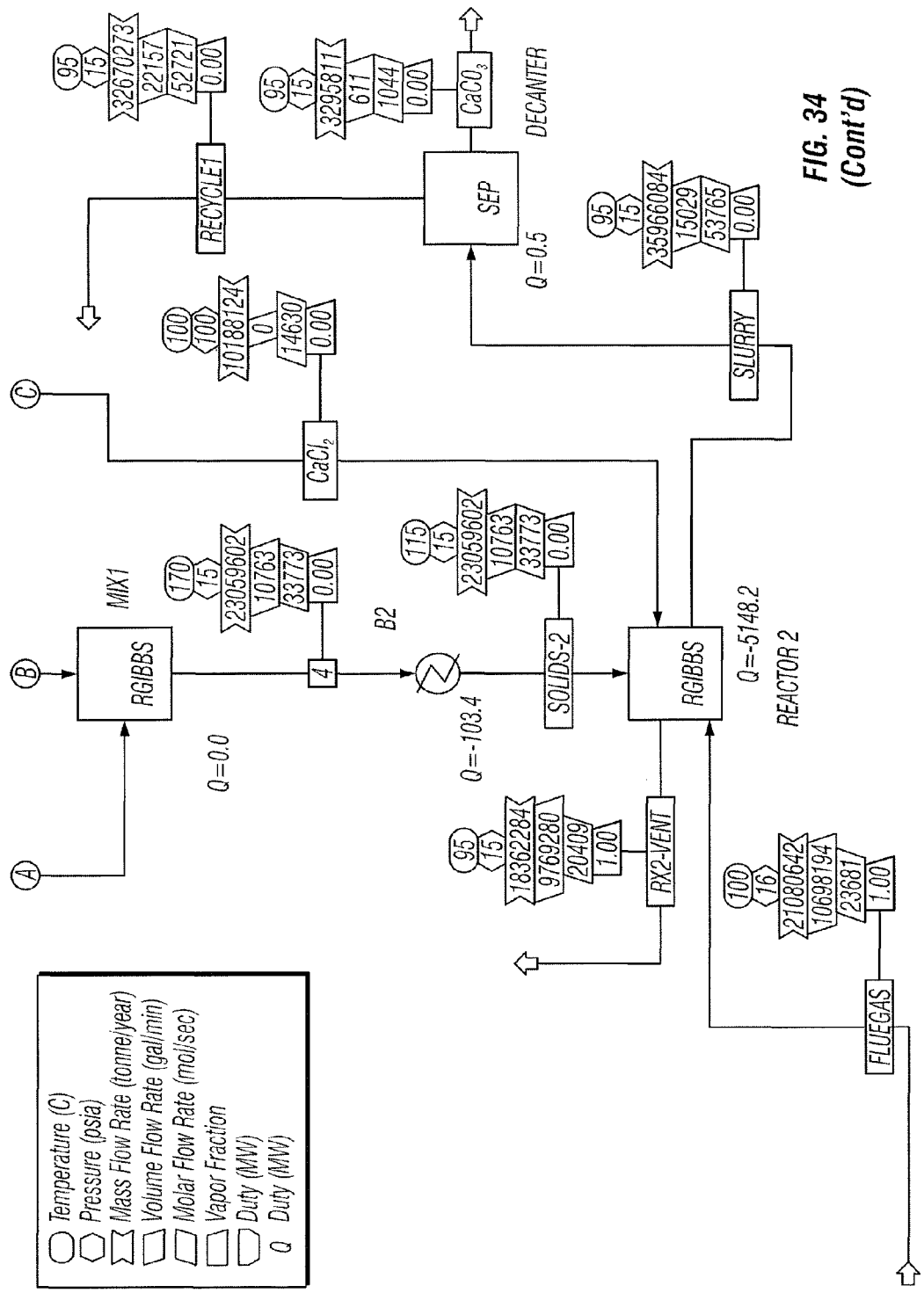

FIG. 34—Two-Chamber Decomposition. This figure shows a process flow diagram providing parameters and results from a process simulation using Aspen Plus process software. In this embodiment, heat from mineral dissolution reactor (chamber 1), and hot flue gas from open cycle natural gas plant (chamber 2) are used as heat sources. This process flow diagram illustrates a two chamber process for the decomposition to Mg(OH)Cl, the first chamber which relies on heat recovered from the mineral dissolution reactor to provide 87% of the needed heat for the decomposition of which 28% is from the hydrochloric acid/mineral silicate reaction and 59% is from the condensation and formation of hydrochloric acid, and the second chamber, which uses hot flue gas as an external source of the remaining heat which is 13% of the total heat. The $CO_2$ is from an open cycle natural gas power plant, therefore substantial heat is available from the power plant in the form of 600° C. flue gas to power the decomposition reaction.

Figure 35:
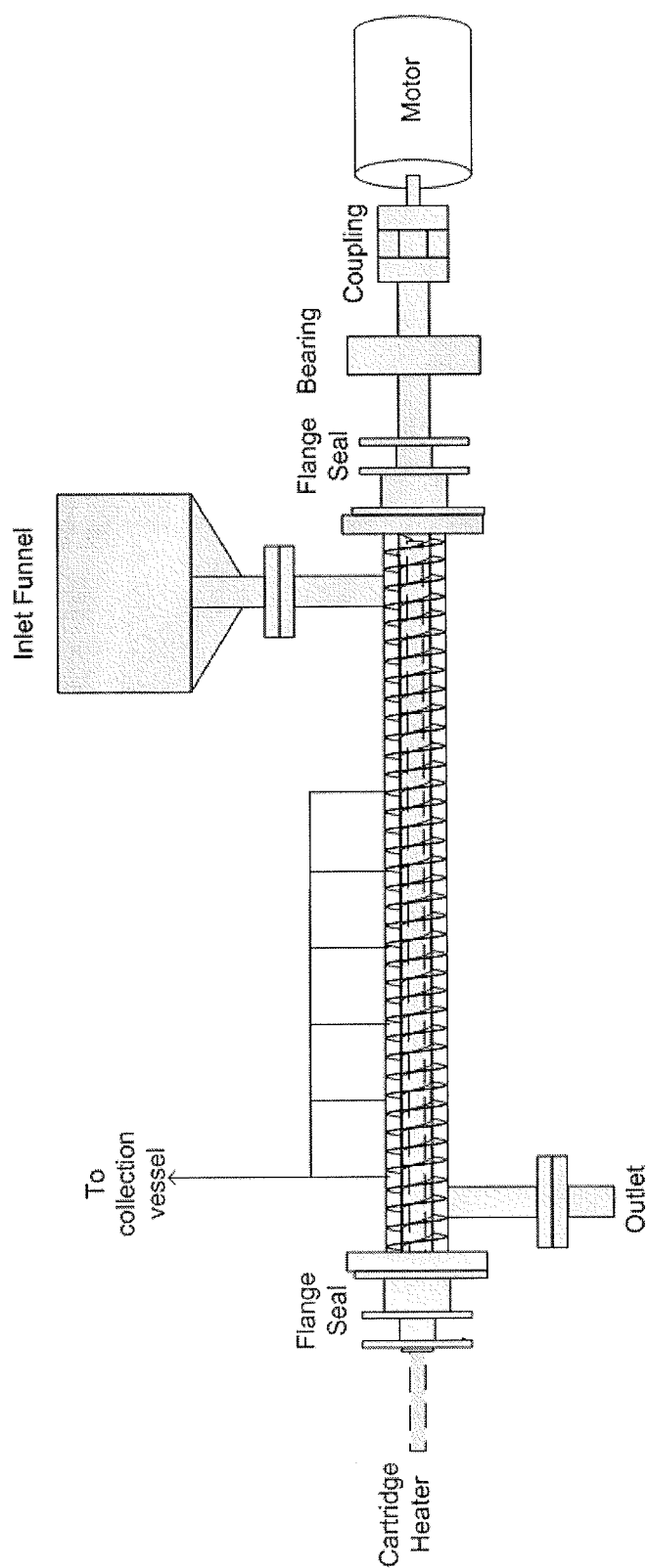

FIG. 35 shows a schematic diagram of a Auger reactor which may be used for the salt decomposition reaction, including the decomposition of $MgCl_2.6H_2O$ to M(OH)Cl or MgO. Such reactors may comprises internal heating for efficient heat utilization, external insulation for efficient heat utilization, a screw mechanism for adequate solid transport (when solid is present), adequate venting for HCl removal. Such a reactors has been used to prepare ~1.8 kg of ~90% Mg(OH)Cl.

Figure 36:
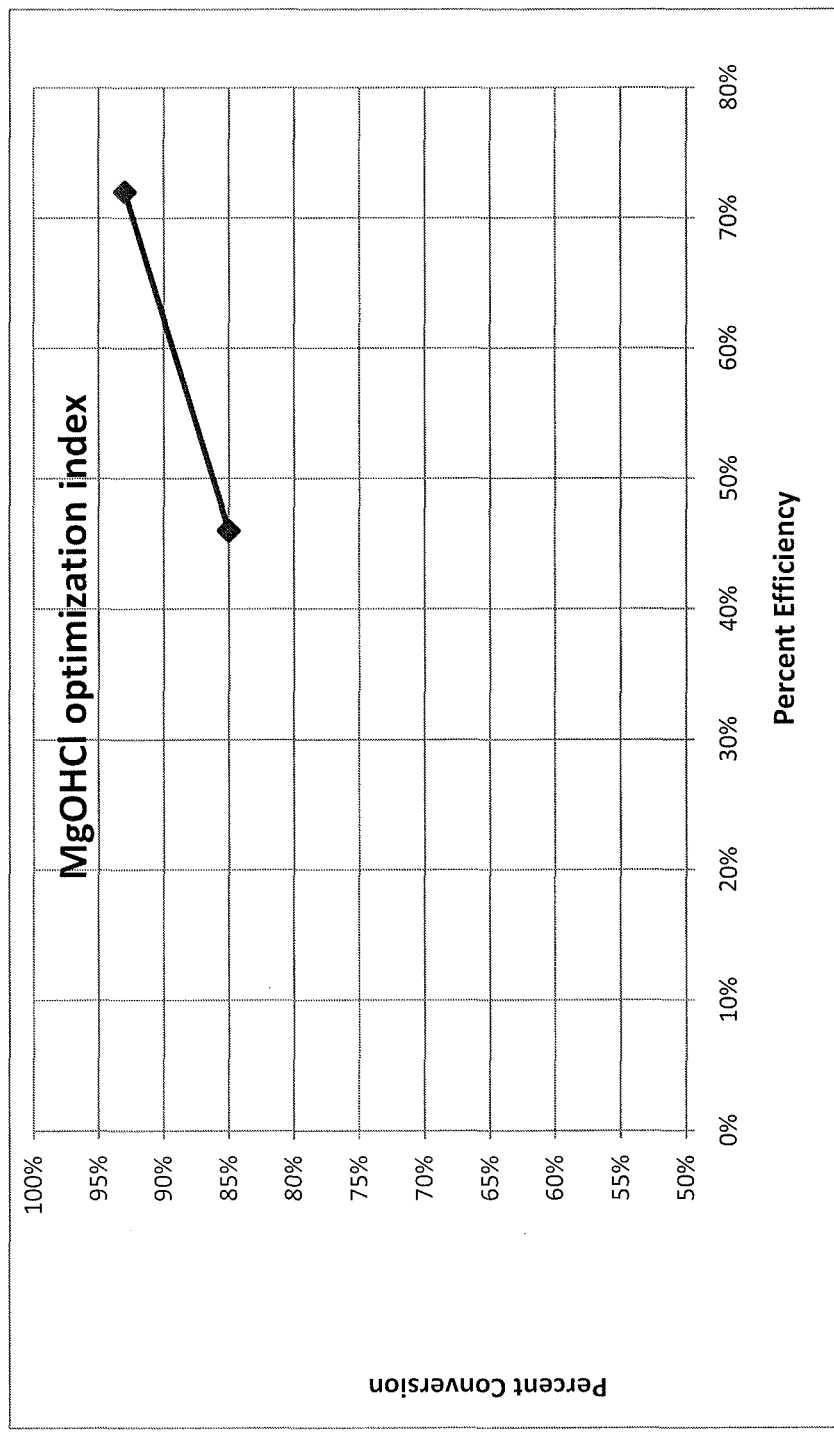

FIG. 36 shows the optimization index for two separate runs of making Mg(OH)Cl using an Auger reactor. The optimization index=% conversion×% efficiency.

Figure 37:
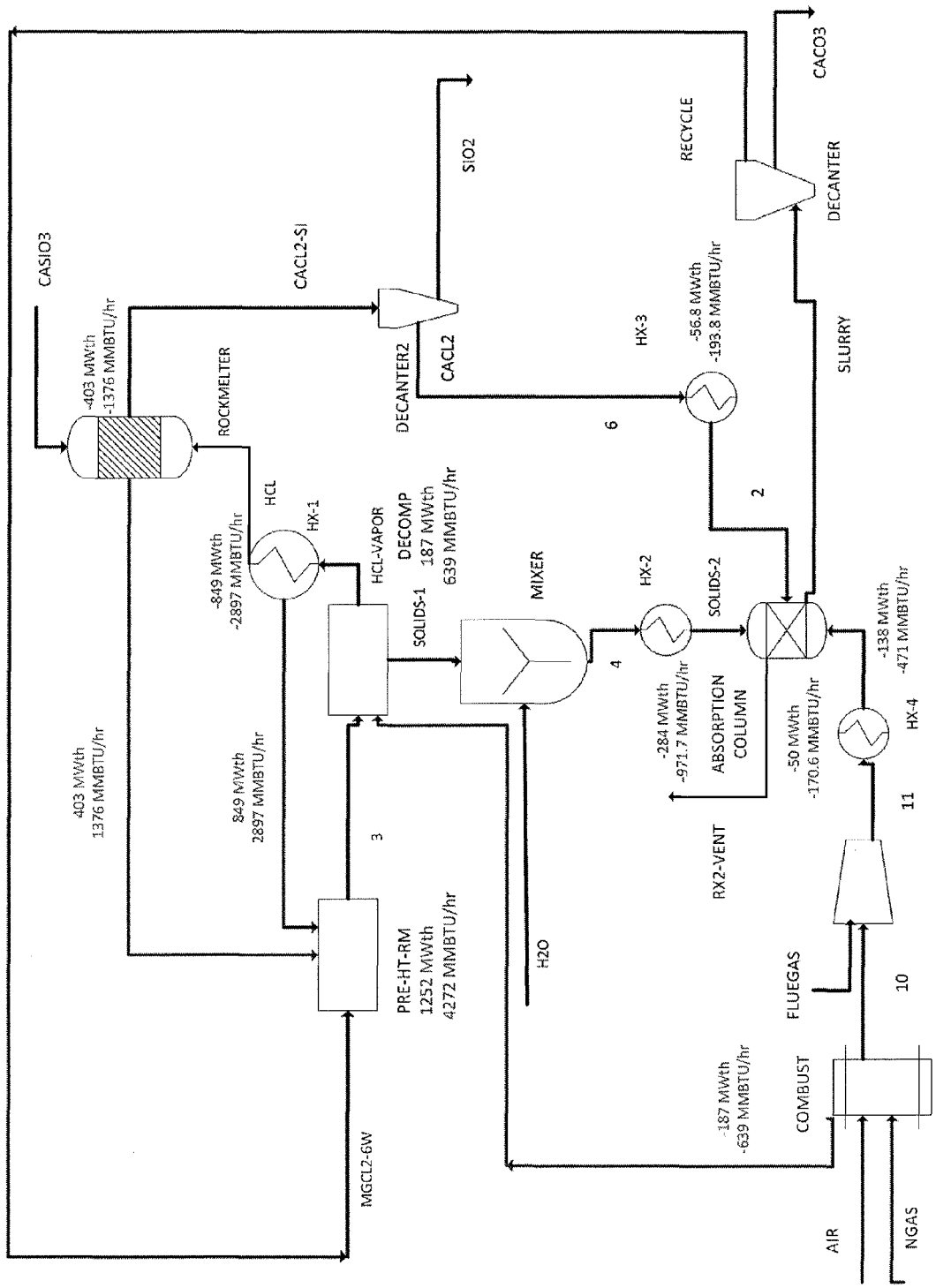

FIG. 37 shows a process flow diagram of an Aspen model that simulates an $CaSiO_3$—Mg(OH)Cl Process.

Figure 38:
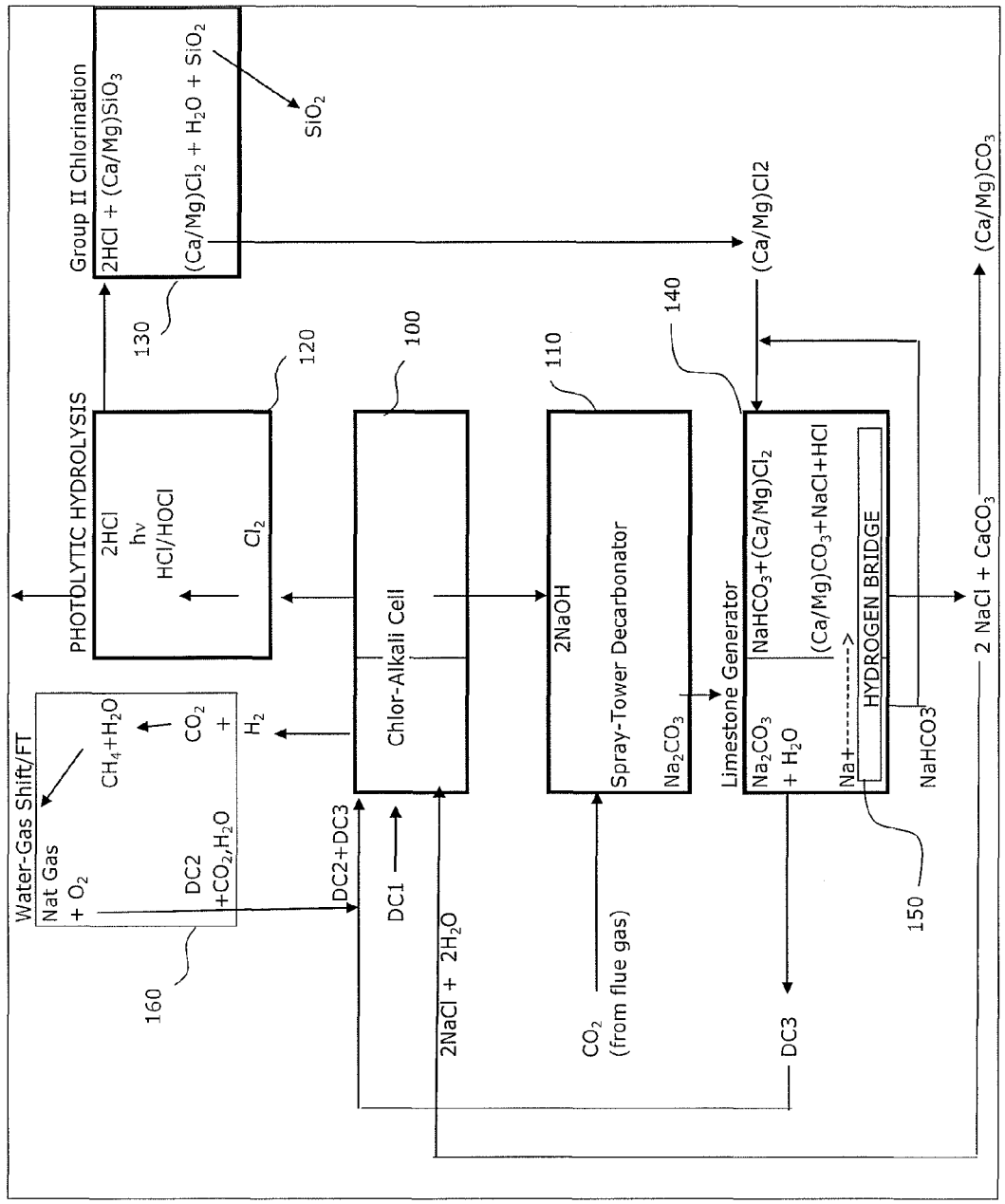

FIG. 38 is a block diagram of a system according to embodiments of the present invention. DC1, DC2 and DC3 are three separate sources of electrical energy.

Figure 39:
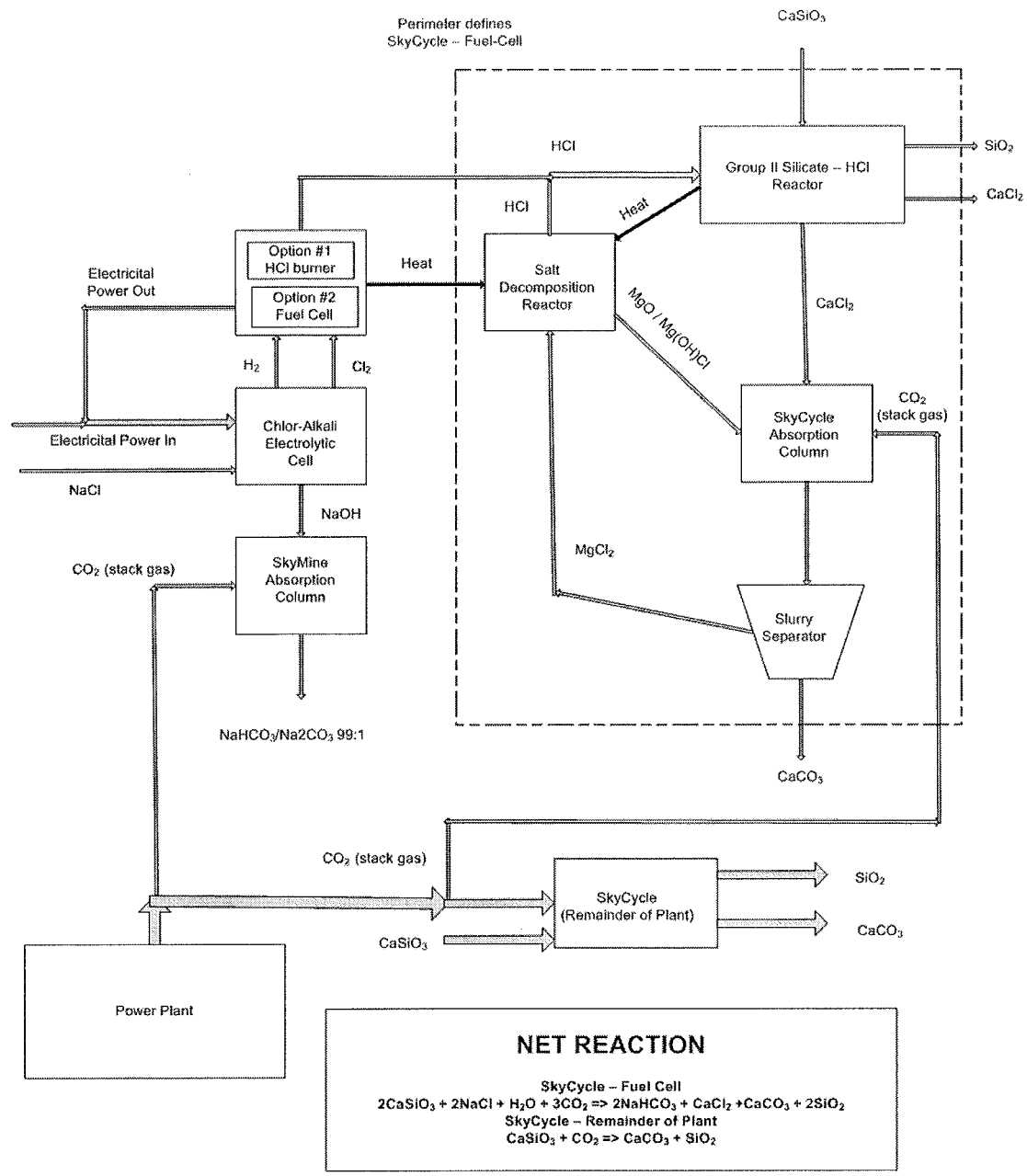

FIG. 39 is a block diagram of a system according to embodiments of the present invention.

Figure 40:
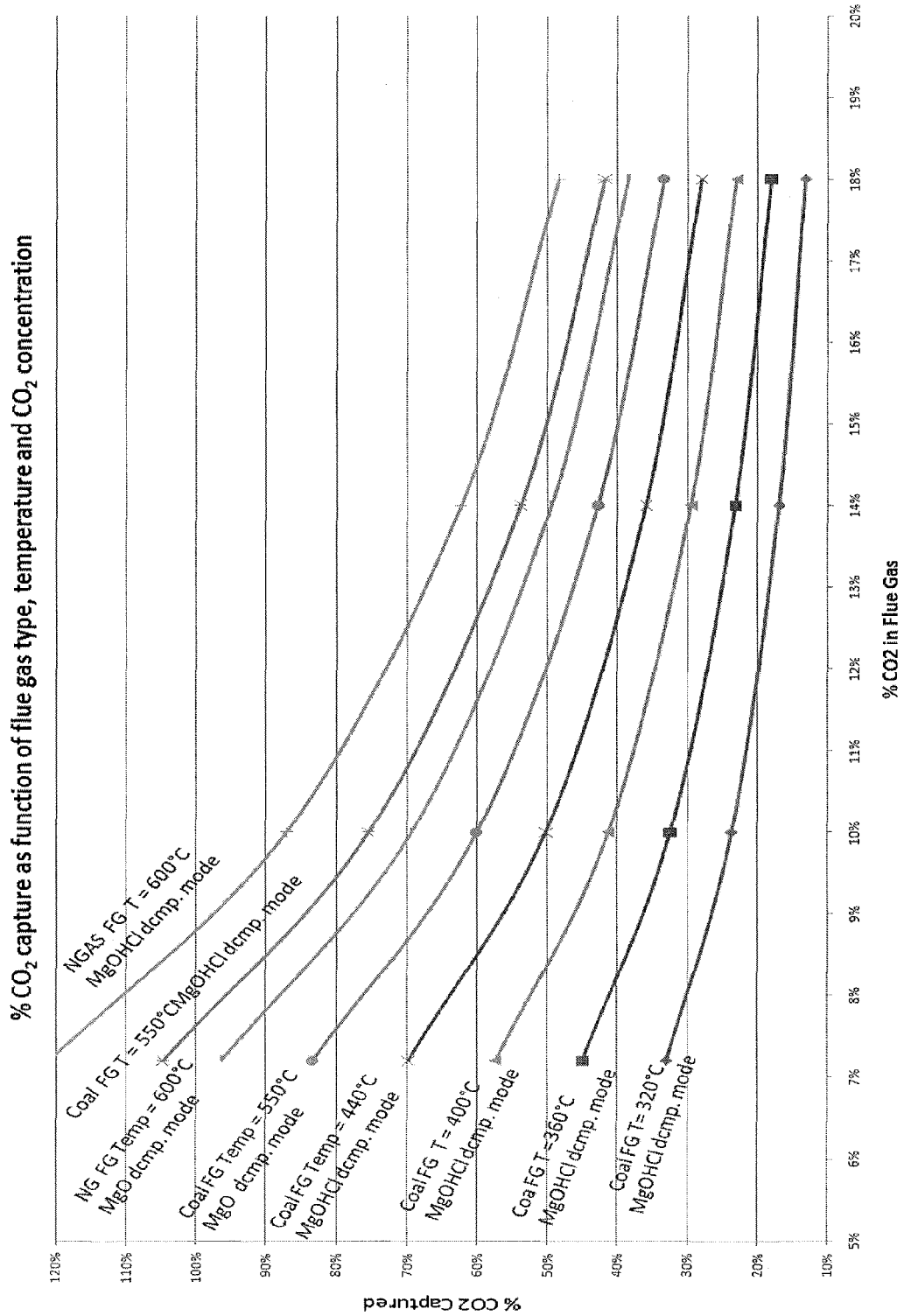

FIG. 40 shows CO2 captured versus % CO2 in stack gas, stack gas temperature and type of stack gas, e.g. derived from coal or natural gas.

DESCRIPTION OF ILLUSTRATIVE EMBODIMENTS

The present invention relates to carbon dioxide sequestration, including energy-efficient processes in which Group 2 chlorides are converted to Group 2 hydroxides and hydrogen chloride, which are then used to remove carbon dioxide from waste streams. In some embodiments, hydrogen chloride may be further reacted with Group 2 silicates to produce additional Group 2 chloride starting materials and silica.

In some embodiments, the methods and apparatuses of the invention comprise one or more of the following general components: (1) the conversion of Group 2 silicate minerals with hydrogen chloride into Group 2 chlorides and silicon dioxide, (2) conversion of Group 2 chlorides into Group 2 hydroxides and hydrogen chloride, (3) an aqueous decarbonation whereby gaseous $CO_2$ is absorbed into an aqueous caustic mixture comprising Group 2 hydroxides to form Group 2 carbonate and/or bicarbonate products and water, (4) a separation process whereby the carbonate and/or bicarbonate products are separated from the liquid mixture, (5) the reuse or cycling of by-products, including energy, from one or more of the steps or process streams into another one or more steps or process streams. Each of these general components is explained in further detail below.

While many embodiments of the present invention consume some energy to accomplish the absorption of $CO_2$ and other chemicals from flue-gas streams and to accomplish the other objectives of embodiments of the present invention as described herein, one advantage of certain embodiments of the present invention is that they provide ecological efficiencies that are superior to those of the prior art, while absorbing most or all of the emitted $CO_2$ from a given source, such as a power plant.

Another additional benefit of certain embodiments of the present invention that distinguishes them from other $CO_2$-removal processes is that in some market conditions, the products are worth considerably more than the reactants required or the net-power or plant-depreciation costs. In other words, certain embodiments are industrial methods of producing chloro-hydro-carbonate products at a profit, while accomplishing considerable removal of $CO_2$ and incidental pollutants of concern.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

I. DEFINITIONS

As used herein, the terms "carbonates" or "carbonate products" are generally defined as mineral components containing the carbonate group, $[CO_3]^{2-}$. Thus, the terms encompass both carbonate/bicarbonate mixtures and species containing solely the carbonate ion. The terms "bicarbonates" and "bicarbonate products" are generally defined as mineral components containing the bicarbonate group, $[HCO_3]^{1-}$. Thus, the terms encompass both carbonate/bicarbonate mixtures and species containing solely the bicarbonate ion.

As used herein "Ca/Mg" signifies either Ca alone, Mg alone or a mixture of both Ca and Mg. The ratio of Ca to Mg may range from 0:100 to 100:0, including, e.g., 1:99, 5:95, 10:90, 20:80, 30:70, 40:60, 50:50, 60:40, 70:30, 80:20, 90:10, 95:5, and 99:1. The symbols "Ca/Mg", "MgxCa(1−x)" and "CaxMg(1−x)" are synonymous. In contrast, "CaMg" or "MgCa" refers to a 1:1 ratio of these two ions.

As used herein, the term "ecological efficiency" is used synonymously with the term "thermodynamic efficiency" and is defined as the amount of $CO_2$ sequestered by certain embodiments of the present invention per energy consumed (represented by the equation "$\partial CO_2/\partial E$"), appropriate units for this value are kWh/ton $CO_2$. $CO_2$ sequestration is denominated in terms of percent of total plant $CO_2$; energy consumption is similarly denominated in terms of total plant power consumption.

The terms "Group II" and "Group 2" are used interchangeably.

"Hexahydrate" refers to $MgCl_2 \cdot 6H_2O$.

In the formation of bicarbonates and carbonates using some embodiments of the present invention, the term "ion ratio" refers to the ratio of cations in the product divided by the number of carbons present in that product. Hence, a product stream formed of calcium bicarbonate ($Ca(HCO_3)_2$) may be said to have an "ion ratio" of 0.5 (Ca/C), whereas a product stream formed of pure calcium carbonate ($CaCO_3$) may be said to have an "ion ratio" of 1.0 (Ca/C). By extension, an infinite number of continuous mixtures of carbonate and bicarbonate of mono-, di- and trivalent cations may be said to have ion ratios varying between 0.5 and 3.0.

Based on the context, the abbreviation "MW" either means molecular weight or megawatts.

The abbreviation "PFD" is process flow diagram.

The abbreviation "Q" is heat (or heat duty), and heat is a type of energy. This does not include any other types of energy.

As used herein, the term "sequestration" is used to refer generally to techniques or practices whose partial or whole effect is to remove $CO_2$ from point emissions sources and to store that $CO_2$ in some form so as to prevent its return to the atmosphere. Use of this term does not exclude any form of the described embodiments from being considered "sequestration" techniques.

In the context of a chemical formula, the abbreviation "W" refers to $H_2O$.

The pyroxenes are a group of silicate minerals found in many igneous and metamorphic rocks. They share a common structure consisting of single chains of silica tetrahedra and they crystallize in the monoclinic and orthorhombic systems. Pyroxenes have the general formula $XY(Si,Al)_2O_6$, where X represents calcium, sodium, iron (II) and magnesium and more rarely zinc, manganese and lithium and Y represents ions of smaller size, such as chromium, aluminium, iron(III), magnesium, manganese, scandium, titanium, vanadium and even iron (II).

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result.

The above definitions supersede any conflicting definition in any of the reference that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

II. SEQUESTRATION OF CARBON DIOXIDE USING SALTS OF GROUP II METALS

Figure 1:
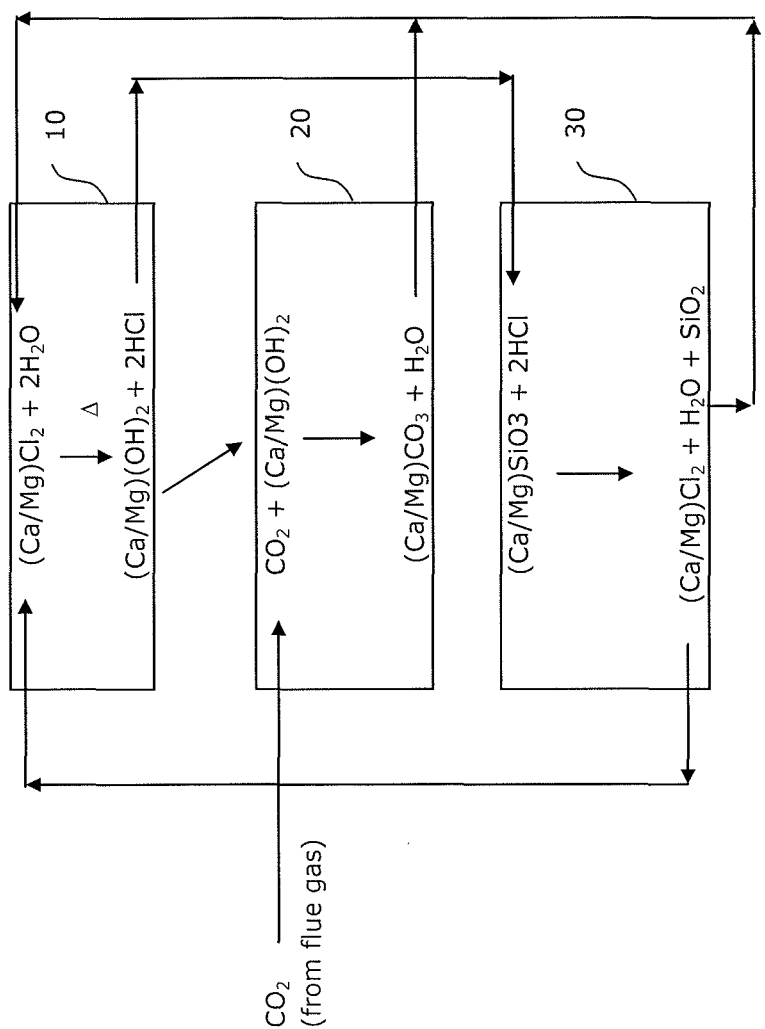
FIG. 1 is block diagram of a system for a Group 2 hydroxide-based process to sequester $CO_2$ as Group 2 carbonates according to some embodiments of the present invention.

FIG. 1 depicts a simplified process-flow diagram illustrating general, exemplary embodiments of the apparatuses and methods of the present disclosure. This diagram is offered for illustrative purposes only, and thus it merely depicts specific embodiments of the present invention and is not intended to limit the scope of the claims in any way.

In the embodiment shown in FIG. 1, reactor 10 (e.g., a road salt boiler) uses power, such as external power and/or recaptured power (e.g., heat from hot flue gas or an external source of heat such as solar concentration or combustion), to drive a reaction represented by equation 1.

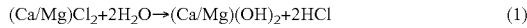

$$(Ca/Mg)Cl_2 + 2H_2O \rightarrow (Ca/Mg)(OH)_2 + 2HCl \qquad (1)$$

The water used in this reaction may be in the form of liquid, steam, a crystalline hydrate, e.g., $MgCl_2 \cdot 6H_2O$, $CaCl_2 \cdot 2H_2O$, or it may be supercritical. In some embodiments, the reaction uses $MgCl_2$ to form $Mg(OH)_2$ and/or $Mg(OH)Cl$ (see, e.g., FIG. 2). In some embodiments, the reaction uses $CaCl_2$ to form $Ca(OH)_2$. Some or all of the Group 2 hydroxide or hydroxychloride (not shown) from equation 1 may be delivered to reactor 20. In some embodiments, some or all of the Group 2 hydroxide and/or Group 2 hydroxychloride is delivered to reactor 20 as an aqueous solution. In some embodiments, some or all of the Group 2 hydroxide is delivered to reactor 20 in an aqueous suspension. In some embodiments, some or all of the Group 2 hydroxide is delivered to reactor 20 as a solid. In some embodiments, some or all of the hydrogen chloride (e.g., in the form of vapor or in the form of hydrochloric acid) may be delivered to reactor 30 (e.g., a rock melter). In some embodiments, the resulting Group 2 hydroxides are further heated to remove water and form corresponding Group 2 oxides. In some variants, some or all of these Group 2 oxides may then be delivered to reactor 20.

Carbon dioxide from a source, e.g., flue-gas, enters the process at reactor 20 (e.g., a fluidized bed reactor, a spray-tower decarbonator or a decarbonation bubbler), potentially after initially exchanging waste-heat with a waste-heat/DC generation system. In some embodiments the temperature of the flue gas is at least 125° C. The Group 2 hydroxide, some or all of which may be obtained from reactor 10, reacts with carbon dioxide in reactor 20 according to the reaction represented by equation 2.

$$(Ca/Mg)(OH)_2 + CO_2 \rightarrow (Ca/Mg)CO_3 + H_2O \quad (2)$$

The water produced from this reaction may be delivered back to reactor 10. The Group 2 carbonate is typically separated from the reaction mixture. Group 2 carbonates have a very low $K_{sp}$ (solubility product constant). So they be separated as solids from other, more soluble compounds that can be kept in solution. In some embodiments, the reaction proceeds through Group 2 bicarbonate salts. In some embodiments, Group 2 bicarbonate salts are generated and optionally then separated from the reaction mixture. In some embodiments, Group 2 oxides, optionally together with or separately from the Group 2 hydroxides, are reacted with carbon dioxide to also form Group 2 carbonate salts. In some embodiments, the flue gas, from which $CO_2$ and/or other pollutants have been removed, is released to the air.

Group 2 silicates (e.g., $CaSiO_3$, $MgSiO_3$, $MgO.Fe.SiO_2$, etc.) enter the process at reactor 30 (e.g., a rock melter or a mineral dissociation reactor). In some embodiments, these Group 2 silicates are ground in a prior step. In some embodiments, the Group 2 silicates are inosilicates. These minerals may be reacted with hydrochloric acid, either as a gas or in the form of hydrochloric acid, some or all of which may be obtained from reactor 10, to form the corresponding Group 2 metal chlorides ($CaCl_2$ and/or $MgCl_2$), water and sand ($SiO_2$). The reaction can be represented by equation 3.

$$2HCl + (Ca/Mg)SiO_3 \rightarrow (Ca/Mg)Cl_2 + H_2O + SiO_2 \quad (3)$$

Some or all of the water produced from this reaction may be delivered to reactor 10. Some or all of the Group 2 chlorides from equation 3 may be delivered to reactor 20. In some embodiments, some or all of the Group 2 chloride is delivered to reactor 20 as an aqueous solution. In some embodiments, some or all of the Group 2 chloride is delivered to reactor 20 in an aqueous suspension. In some embodiments, some or all of the Group 2 chloride is delivered to reactor 20 as a solid.

The net reaction capturing the summation of equations 1-3 is shown here as equation 4:

$$CO_2 + (Ca/Mg)SiO_3 \rightarrow (Ca/Mg)CO_3 + SiO_2 \quad (4)$$

In another embodiment, the resulting $Mg_xCa_{(1-x)}CO_3$ sequestrant is reacted with HCl in a manner to regenerate and concentrate the $CO_2$. The $Ca/MgCl_2$ thus formed is returned to the decomposition reactor to produce $CO_2$ absorbing hydroxides or hydroxyhalides.

Through the process shown in FIG. 1 and described herein, Group 2 carbonates are generated as end-sequestrant material from the captured $CO_2$. Some or all of the water, hydrogen chloride and/or reaction energy may be cycled. In some embodiments, only some or none of these are cycled. In some embodiments, the water, hydrogen chloride and reaction energy made be used for other purposes.

In some embodiments, and depending on the concentration of $CO_2$ in the flue gas stream of a given plant, the methods disclosed herein may be used to capture 33-66% of the plant's $CO_2$ using heat-only as the driver (no electrical penalty). In some embodiments, the efficiencies of the methods disclosed herein improve with lower $CO_2$-concentrations, and increase with higher (unscrubbed) flue-gas temperatures. For example, at 320° C. and 7% $CO_2$ concentration, 33% of flue-gas $CO_2$ can be mineralized from waste-heat alone. In other embodiments, e.g., at the exit temperatures of natural gas turbines approximately 100% mineralization can be achieved.

These methods and devices can be further modified, e.g., with modular components, optimized and scaled up using the principles and techniques of chemistry, chemical engineering, and/or materials science as applied by a person skilled in the art. Such principles and techniques are taught, for example, in U.S. Pat. No. 7,727,374, U.S. Patent Application Publications 2006/0185985 and 2009/0127127, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, U.S. Provisional Application No. 61/288,242, filed Jan. 20, 2010, U.S. Provisional Application No. 61/362,607, filed Jul. 8, 2010, and International Application No. PCT/US08/77122, filed Sep. 19, 2008. The entire text of each of the above-referenced disclosures (including any appendices) is specifically incorporated by reference herein.

The above examples were included to demonstrate particular embodiments of the invention. However, those of skill in the art should, in light of the present disclosure, appreciate that many changes can be made in the specific embodiments which are disclosed and still obtain a like or similar result without departing from the spirit and scope of the invention.

III. SEQUESTRATION OF CARBON DIOXIDE USING $MG^{2+}$ AS CATALYST

Figure 2:
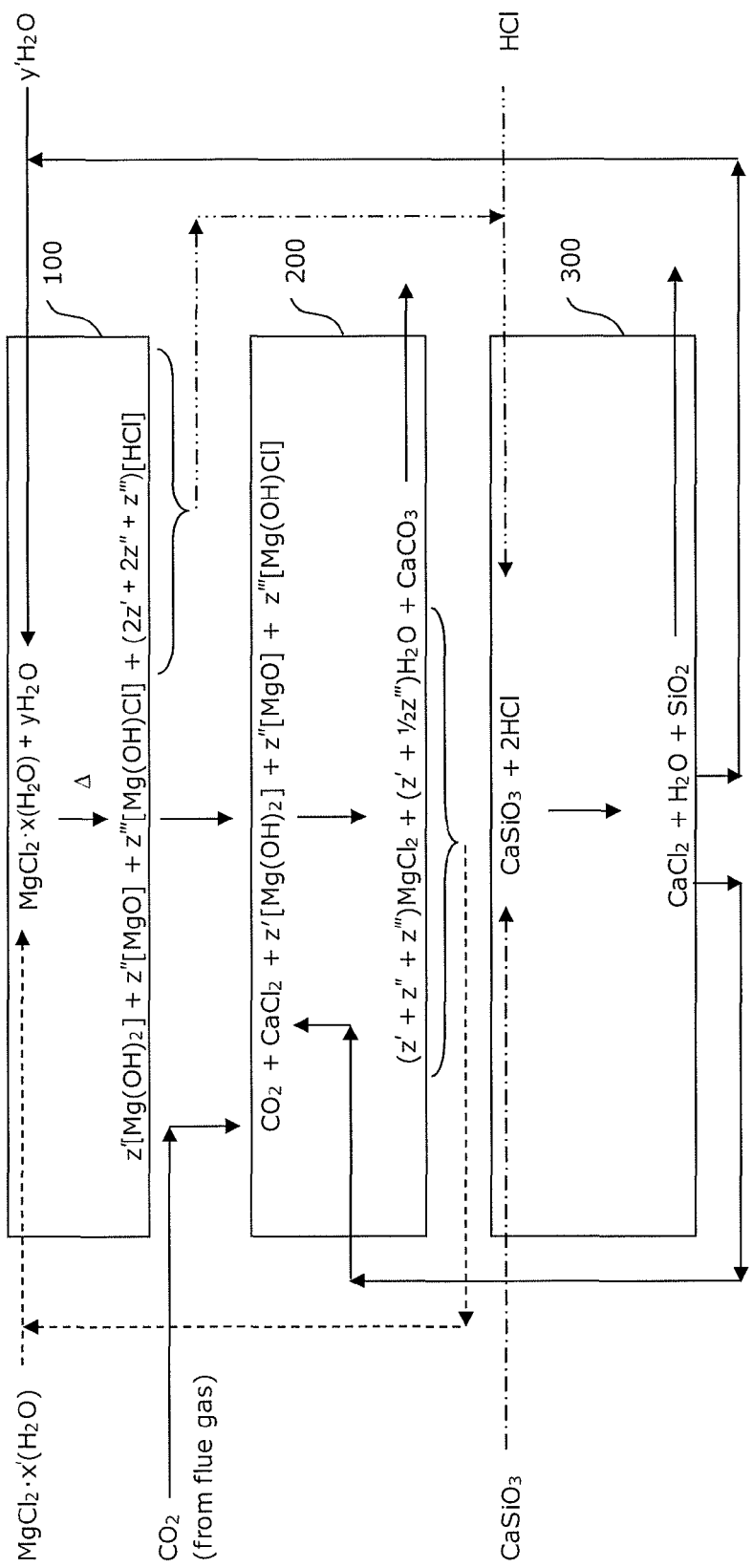
FIG. 2 is block diagram of a system in which $Mg^{2+}$ functions as a catalyst for the sequestration of $CO_2$ as calcium carbonate according to some embodiments of the present invention.
Figure 3:
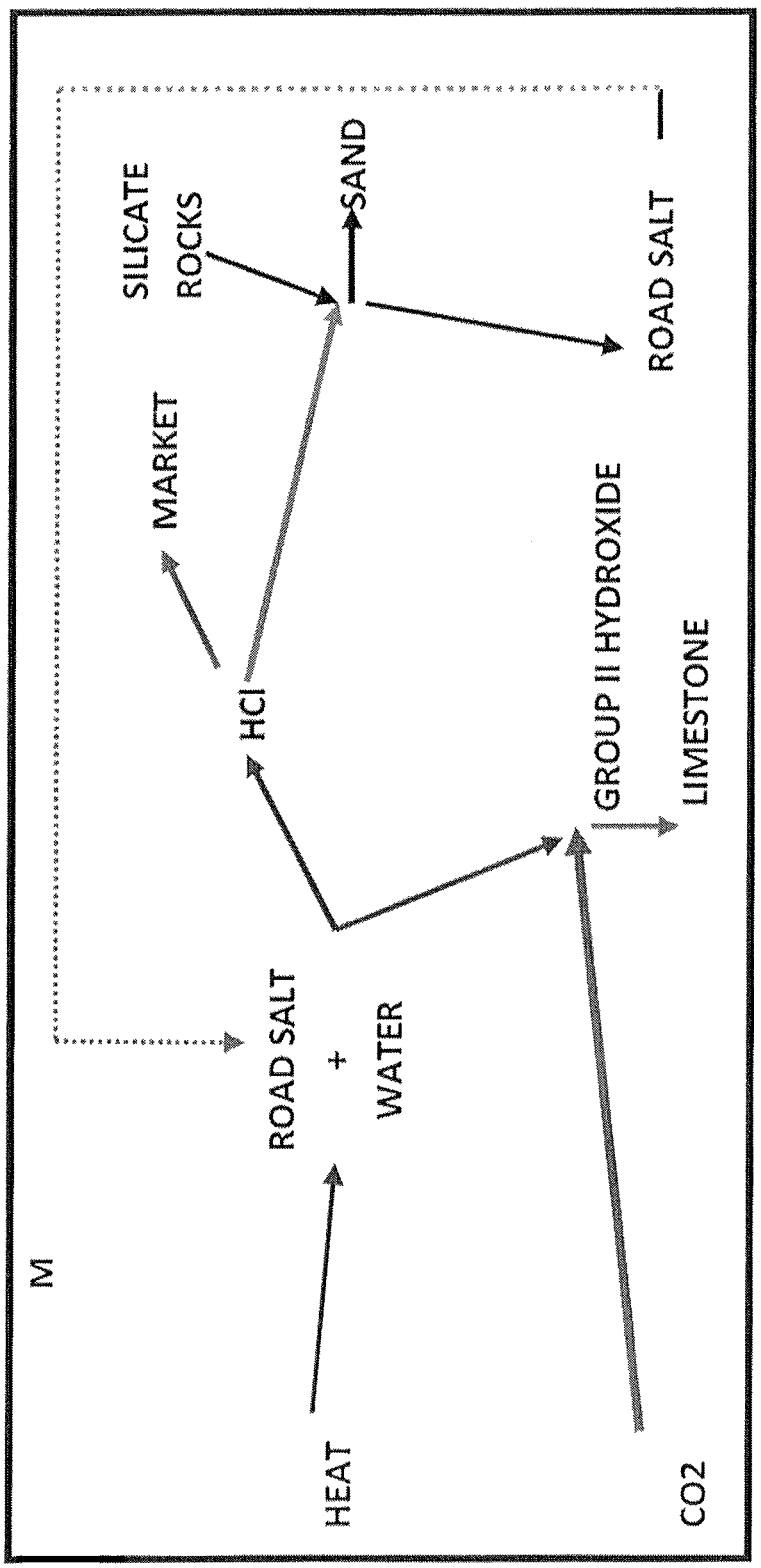
FIG. 3 is a simplified process flow diagram according to some embodiments of the processes provided herein. Shown is a Group-II hydroxide-based process, which sequesters $CO_2$ as limestone (composed largely of the mineral calcite, $CaCO_3$). The term "road salt" in this figure refers to a Group II chloride, such as $CaCl_2$ and/or $MgCl_2$, either or both of which are optionally hydrated. In embodiments comprising $MgCl_2$, heat may be used to drive the reaction between road salt and water (including water of hydration) to form HCl and magnesium hydroxide, $Mg(OH)_2$, and/or magnesium hydroxychloride, Mg(OH)Cl. In embodiments comprising $CaCl_2$, heat may be used to drive the reaction between road salt and water to form calcium hydroxide and HCl. The HCl is reacted with, for example, calcium inosilicate rocks (optionally ground), to form additional road salt, e.g., $CaCl_2$, and sand ($SiO_2$).
Figure 4:
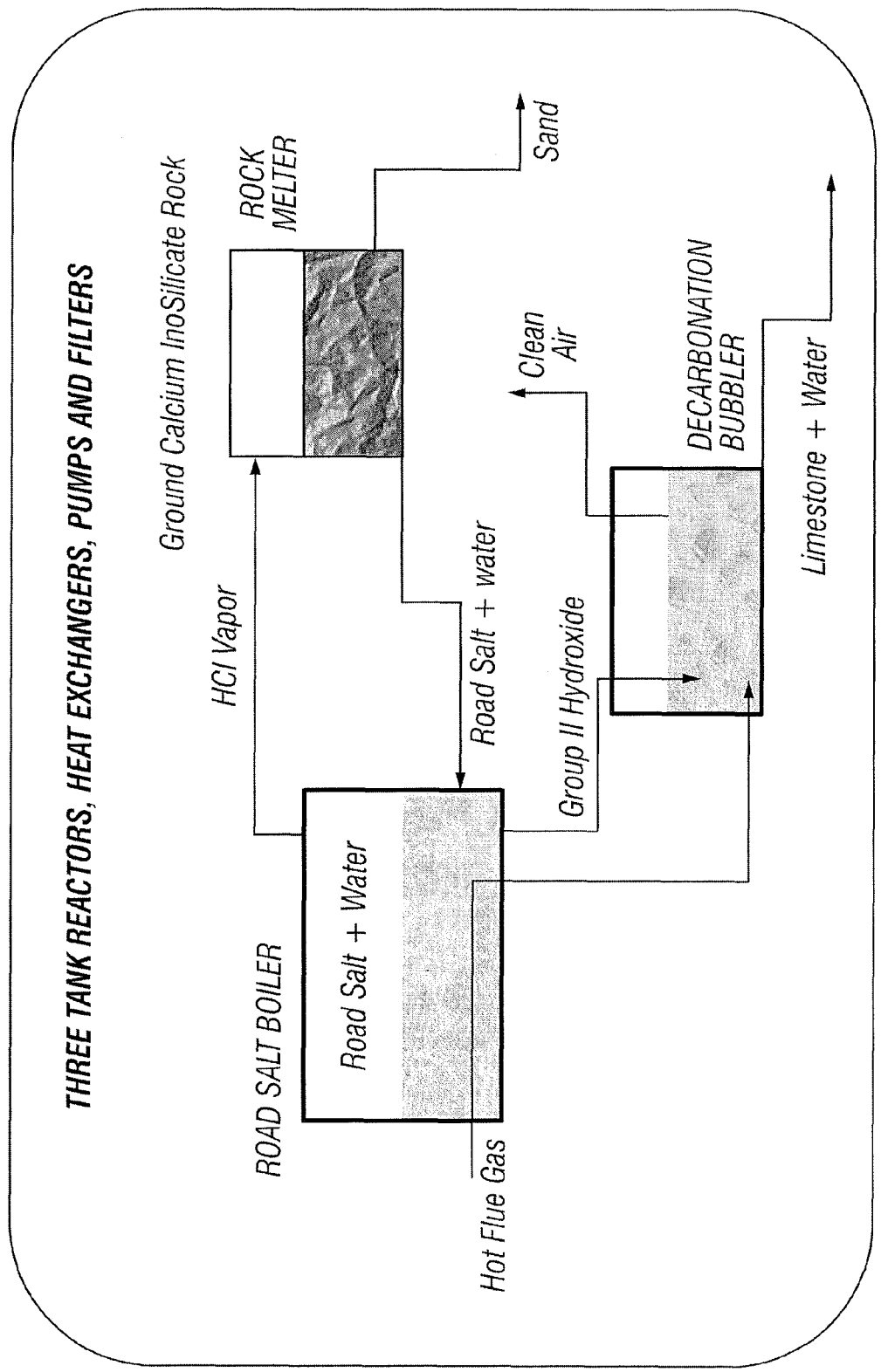
FIG. 4 is a simplified process-flow diagram corresponding to some embodiments of the present invention. Silicate rocks may be used in some embodiments of the present invention to sequester $CO_2$ as $CaCO_3$. The term "road salt" in this figure refers to a Group II chloride, such as $CaCl_2$ and/or $MgCl_2$, either or both of which are optionally hydrated. In the road salt boiler, heat may be used to drive the reaction between road salt, e.g., $MgCl_2.6H_2O$, and water (including water of hydration) to form HO and Group II hydroxides, oxides, and/or mixed hydroxide-chlorides, including, for example, magnesium hydroxide, $Mg(OH)_2$, and/or magnesium hydroxychloride, Mg(OH)Cl. In embodiments comprising $CaCl_2$, heat may be used to drive the reaction between road salt and water to form calcium hydroxide and HCl. The HCl may be sold or reacted with silicate rocks, e.g., inosilicates, to form additional road salt, e.g., $CaCl_2$, and sand ($SiO_2$). Ion exchange reaction between $Mg^{2+}$ and $Ca^{2+}$ may used, in some of these embodiments, to allow, for example, the cycling of $Mg^{2+}$ ions.

FIG. 2 depicts a simplified process-flow diagram illustrating general, exemplary embodiments of the apparatuses and methods of the present disclosure. This diagram is offered for illustrative purposes only, and thus it merely depicts specific embodiments of the present invention and is not intended to limit the scope of the claims in any way.

In the embodiment shown in FIG. 2, reactor 100 uses power, such as external power and/or recaptured power (e.g., heat from hot flue gas), to drive a decomposition-type reaction represented by equation 5.

$$MgCl_2 \cdot x(H_2O) + yH_2O \rightarrow z'[Mg(OH)_2] + z''[MgO] + z'''[MgCl(OH)] + (2z' + 2z'' + z''')[HCl] \quad (5)$$

The water used in this reaction may be in the form of a hydrate of magnesium chloride, liquid, steam and/or it may be supercritical. In some embodiments, the reaction may occur in one, two, three or more reactors. In some embodiments, the reaction may occur as a batch, semi-batch of continuous process. In some embodiments, some or all of the magnesium salt product may be delivered to reactor 200. In some embodiments, some or all of the magnesium salt product is delivered to reactor 200 as an aqueous solution. In some embodiments, some or all of the magnesium salt product is delivered to reactor 200 in an aqueous suspension. In some embodiments, some or all of the magnesium salt product is delivered to reactor 200 as a solid. In some embodiments, some or all of the hydrogen chloride (e.g., in the form of vapor or in the form of hydrochloric acid) may be delivered to reactor 300 (e.g., a rock melter). In some embodiments, the $Mg(OH)_2$ is further heated to remove water and form MgO. In some embodiments, the MgCl(OH) is further heated to remove HCl and form MgO. In some variants, one or more of Mg(OH)$_2$, MgCl(OH) and MgO may then be delivered to reactor 200.

Carbon dioxide from a source, e.g., flue-gas, enters the process at reactor 200 (e.g., a fluidized bed reactor, a spray-tower decarbonator or a decarbonation bubbler), potentially after initially exchanging waste-heat with a waste-heat/DC generation system. In some embodiments the temperature of the flue gas is at least 125° C. Admixed with the carbon dioxide is the magnesium salt product from reactor 100 and CaCl$_2$ (e.g., rock salt). The carbon dioxide reacts with the magnesium salt product and CaCl$_2$ in reactor 200 according to the reaction represented by equation 6.

$$CO_2 + CaCl_2 + z'[Mg(OH)_2] + z''[MgO] + z'''[MgCl(OH)] \rightarrow (z' + z'' + z''')MgCl_2 + (z' + \frac{1}{2}z''')H_2O + CaCO_3 \quad (6)$$

In some embodiments, the water produced from this reaction may be delivered back to reactor 100. The calcium carbonate product (e.g., limestone, calcite) is typically separated (e.g., through precipitation) from the reaction mixture. In some embodiments, the reaction proceeds through magnesium carbonate and bicarbonate salts. In some embodiments, the reaction proceeds through calcium bicarbonate salts. In some embodiments, various Group 2 bicarbonate salts are generated and optionally then separated from the reaction mixture. In some embodiments, the flue gas, from which CO$_2$ and/or other pollutants have been removed, is released to the air, optionally after one or more further purification and/or treatment steps. In some embodiments, the MgCl$_2$ product, optionally hydrated, is returned to reactor 100. In some embodiments, the MgCl$_2$ product is subjected to one or more isolation, purification and/or hydration steps before being returned to reactor 100.

Calcium silicate (e.g., 3CaO.SiO$_2$, Ca$_3$SiO$_5$; 2CaO.SiO$_2$, Ca$_2$SiO$_4$; 3CaO.2SiO$_2$, Ca$_3$Si$_2$O$_7$ and CaO.SiO$_2$, CaSiO$_3$ enters the process at reactor 300 (e.g., a rock melter). In some embodiments, these Group 2 silicates are ground in a prior step. In some embodiments, the Group 2 silicates are inosilicates. In the embodiment of FIG. 2, the inosilicate is CaSiO$_3$ (e.g., wollastonite, which may itself, in some embodiments, contain small amounts of iron, magnesium and/or manganese substituting for iron). The CaSiO$_3$ is reacted with hydrogen chloride, either gas or in the form of hydrochloric acid, some or all of which may be obtained from reactor 100, to form CaCl$_2$, water and sand (SiO$_2$). The reaction can be represented by equation 7.

$$2HCl + (Ca/Mg)SiO_3 \rightarrow (Ca/Mg)Cl_2 + H_2O + SiO_2 \quad (7)$$

| Reaction | ΔH kJ/mole** | Reaction Temp. Range |
|---|---|---|
| 2 HCl(g) + CaSiO$_3$ → CaCl$_2$ + H$_2$O + SiO$_2$ | −254 | 90° C.-150° C. |
| 2 HCl(g) + MgSiO$_3$ → MgCl$_2$(aq) + H$_2$O + SiO$_2$ | −288 | 90° C.-150° C. |

**Enthalpies are based on reaction temperatures, and temperatures of incoming reactant and outgoing product streams. Some or all of the water produced from this reaction may be delivered to reactor 100. Some or all of the CaCl$_2$ from equation 7 may be delivered to reactor 200. In some embodiments, some or all of the CaCl$_2$ is delivered to reactor 200 as an aqueous solution. In some embodiments, some or all of the CaCl$_2$ is delivered to reactor 200 in an aqueous suspension. In some embodiments, some or all of the CaCl$_2$ is delivered to reactor 200 as a solid.

The net reaction capturing the summation of equations 5-7 is shown here as equation 8:

$$CO_2 + CaSiO_3 \rightarrow CaCO_3 + SiO_2 \quad (8)$$

| Reaction | ΔH kJ/mole** | ΔG kJ/mole** |
|---|---|---|
| CO$_2$ + CaSiO$_3$ → CaCO$_3$ + SiO$_2$ | −89 | −39 |

**Measured at standard temperature and pressure (STP). Through the process shown in FIG. 2 and described herein, calcium carbonates are generated as end-sequestrant material from CO$_2$ and calcium inosilicate. Some or all of the various magnesium salts, water, hydrogen chloride and reaction energy may be cycled. In some embodiments, only some or none of these are cycled. In some embodiments, the water, hydrogen chloride and/or reaction energy made be used for other purposes.

These methods and devices can be further modified, optimized and scaled up using the principles and techniques of chemistry, chemical engineering, and/or materials science as applied by a person skilled in the art. Such principles and techniques are taught, for example, in U.S. Pat. No. 7,727,374, U.S. Patent Application Publications 2006/0185985 and 2009/0127127, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, U.S. Provisional Application No. 61/288,242, filed Jan. 20, 2010, U.S. Provisional Application No. 61/362,607, filed Jul. 8, 2010, and International Application No. PCT/US08/77122, filed Sep. 19, 2008. The entire text of each of the above-referenced disclosures (including any appendices) is specifically incorporated by reference herein.

The above examples were included to demonstrate particular embodiments of the invention. However, those of skill in the art should, in light of the present disclosure, appreciate that many changes can be made in the specific embodiments which are disclosed and still obtain a like or similar result without departing from the spirit and scope of the invention.

IV. CONVERSION OF GROUP 2 CHLORIDES INTO GROUP 2 HYDROXIDES OR GROUP II HYDROXY CHLORIDES

Disclosed herein are processes that react a Group 2 chloride, e.g., CaCl$_2$ or MgCl$_2$, with water to form a Group 2 hydroxide, a Group 2 oxide, and/or a mixed salt such as a Group 2 hydroxide chloride. Such reactions are typically referred to as decompositions. In some embodiments, the water may be in the form of liquid, steam, from a hydrate of the Group 2 chloride, and/or it may be supercritical. The steam may come from a heat exchanger whereby heat from an immensely combustible reaction, i.e. natural gas and oxygen or hydrogen and chlorine heats a stream of water. In some embodiments, steam may also be generated through the use of plant or factory waste heat. In some embodiments, the chloride salt, anhydrous or hydrated, is also heated.

In the case of Mg$^{2+}$ and Ca$^{2+}$, the reactions may be represented by equations 9 and 10, respectively:

$$MgCl_2 + 2H_2O \rightarrow Mg(OH)_2 + 2HCl(g) \quad \Delta H = 263 \text{ kJ/mole**} \quad (9)$$

$$CaCl_2 + 2H_2O \rightarrow Ca(OH)_2 + 2HCl(g) \quad \Delta H = 284 \text{ kJ/mole**} \quad (10)$$

**Measured at 100° C. The reactions are endothermic meaning energy, e.g., heat has to be applied to make these reactions occur. Such energy may be obtained from the waste-heat generated from one or more of the exothermic process steps disclosed herein. The above reactions may occur according to one of more of the following steps:

$$CaCl_2 + (x+y+z)H_2O \rightarrow Ca^{2+} \cdot xH_2O + Cl^- \cdot yH_2O + Cl^- \cdot zH_2O \quad (11)$$

$$Ca^{+2}.xH_2O+Cl^-.yH_2O+Cl^-.zH_2O \rightarrow [Ca^{2+}.(x-1)(H_2O)OH^-]^++Cl^-.(yH_2O)+Cl^-.(z-1)H_2O+H_3O^+ \quad (12)$$

$$[Ca^{2+}.(x-1)(H_2O)OH^-]^++Cl^-.(yH_2O)+Cl^-.(z-1)H_2O+H_3O^+ \rightarrow [Ca^{2+}.(x-1)(H_2O)OH^-]^++Cl^-.(yH_2O)^-+zH_2O+HCl(g)\uparrow \quad (13)$$

$$[Ca^{2+}.(x-1)(H_2O)OH^-]^++Cl^-.(yH_2O) \rightarrow [Ca^{2+}.(x-2)(H_2O)(OH^-)_2]+Cl^-.(y-1)H_2O+H_3O^+ \quad (14)$$

$$[Ca^{2+}.(x-2)(H_2O)(OH^-)_2]+Cl^-.(y-1)H_2O+H_3O^+ \rightarrow Ca(OH)_2\downarrow+(x-2)H_2O+yH_2O\uparrow \quad (15)$$

The reaction enthalpy (ΔH) for $CaCl_2+2H_2O \rightarrow Ca(OH)_2+2HCl(g)$ is 284 kJ/mole at 100° C. In some variants, the salt $MgCl_2.6H_2O$, magnesium hexahydrate, is used. Since water is incorporated into the molecular structure of the salt, direct heating without any additional steam or water may be used to initiate the decomposition. Typical reactions temperatures for the following reactions are shown here:

From 95-110° C.:

$$MgCl_2.6H_2O \rightarrow MgCl_2.4H_2O+2H_2O \quad (16)$$

$$MgCl_2.4H_2O \rightarrow MgCl_2.2H_2O+2H_2O \quad (17)$$

From 135-180° C.:

$$MgCl_2.4H_2O \rightarrow Mg(OH)Cl+HCl+3H_2O \quad (18)$$

$$MgCl_2.2H_2O \rightarrow MgCl_2.H_2O+H_2O \quad (19)$$

From 185-230° C.:

$$MgCl_2.2H_2O \rightarrow Mg(OH)Cl+HCl+H_2O \quad (20)$$

From >230° C.:

$$MgCl_2.H_2O \rightarrow MgCl_2+H_2O \quad (21)$$

$$MgCl_2.H_2O \rightarrow Mg(OH)Cl+HCl \quad (22)$$

$$Mg(OH)Cl \rightarrow MgO+HCl \quad (23)$$

| Reaction | Referenced Temp. Range | ΔH kJ/mole** | Temp. Reaction |
|---|---|---|---|
| $MgCl_2 \cdot 6H_2O \rightarrow MgCl_2 \cdot 4H_2O + 2\,H_2O(g)$ | 95° C.-110° C. | 115.7 | 100° C. |
| $MgCl_2 \cdot 4H_2O \rightarrow MgCl_2 \cdot 2H_2O + 2\,H_2O(g)$ | 95° C.-110° C. | 134.4 | 100° C. |
| $MgCl_2 \cdot 4H_2O \rightarrow Mg(OH)Cl + HCl(g) + 3\,H_2O(g)$ | 135° C.-180° C. | 275 | 160° C. |
| $MgCl_2 \cdot 2H_2O \rightarrow MgCl_2 \cdot H_2O + H_2O(g)$ | 135° C.-180° C. | 70.1 | 160° C. |
| $MgCl_2 \cdot 2H_2O \rightarrow Mg(OH)Cl + HCl(g) + H_2O(g)$ | 185° C.-230° C. | 141 | 210° C. |
| $MgCl_2 \cdot H_2O \rightarrow MgCl_2 + H_2O(g)$ | >230° C. | 76.6 | 240° C. |
| $MgCl_2 \cdot H_2O \rightarrow Mg(OH)Cl + HCl(g)$ | >230° C. | 70.9 | 240° C. |
| $Mg(OH)Cl \rightarrow MgO + HCl(g)$ | >230° C. | 99.2 | 450° C. |

**ΔH values were calculated at the temperature of reaction (column "Temp. Reaction"). See the chemical reference Kirk Othmer 4th ed. Vol. 15 p. 343 1998 John Wiley and Sons, which is incorporated herein by reference. See example 1, below, providing results from a simulation that demonstrating the ability to capture $CO_2$ from flue gas using an inexpensive raw material, $CaCl_2$, to form $CaCO_3$. See also Energy Requirements and Equilibrium in the dehydration, hydrolysis and decomposition of Magnesium Chloride-K.K. Kelley, Bureau of Mines 1941 and Kinetic Analysis of Thermal Dehydration and Hydrolysis of MgCl2•6H2O by DTA and TG-Y. Kirsh, S. Yariv and S. Shoval-Journal of Thermal Analysis, Vol. 32 (1987), both of which are incorporated herein by reference in their entireties.

V. REACTION OF GROUP 2 HYDROXIDES AND CO₂ TO FORM GROUP 2 CARBONATES

In another aspect of the present disclosure, there are provided apparatuses and methods for the decarbonation of carbon dioxide sources using Group 2 hydroxides, Group 2 oxides, and/or Group 2 hydroxide chlorides as $CO_2$ adsorbents. In some embodiments, $CO_2$ is absorbed into an aqueous caustic mixture and/or solution where it reacts with the hydroxide and/or oxide salts to form carbonate and bicarbonate products. Sodium hydroxide, calcium hydroxide and magnesium hydroxide, in various concentrations, are known to readily absorb $CO_2$. Thus, in embodiments of the present invention, Group 2 hydroxides, Group 2 oxides (such as CaO and/or MgO) and/or other hydroxides and oxides, e.g., sodium hydroxide may be used as the absorbing reagent.

For example, a Group 2 hydroxide, e.g., obtained from a Group 2 chloride, may be used in an adsorption tower to react with and thereby capture $CO_2$ based on one or both of the following reactions:

$$Ca(OH)_2+CO_2 \rightarrow CaCO_3+H_2O \quad (24)$$

ΔH=−117.92 kJ/mol**
ΔG=−79.91 kJ/mol**

$$Mg(OH)_2+CO_2 \rightarrow MgCO_3+H_2O \quad (25)$$

ΔH=−58.85 kJ/mol**
ΔG=−16.57 kJ/mol**

** Calculated at STP.

In some embodiments of the present invention, most or nearly all of the carbon dioxide is reacted in this manner. In some embodiments, the reaction may be driven to completion, for example, through the removal of water, whether through continuous or discontinous processes, and/or by means of the precipitation of bicarbonate, carbonate, or a mixture of both types of salts. See example 1, below, providing a simulation demonstrating the ability to capture $CO_2$ from flue gas using an inexpensive raw material, $Ca(CO)_2$ derived from $CaCl_2$, to form $CaCO_3$.

In some embodiments, an initially formed Group 2 may undergo an salt exchange reaction with a second Group 2 hydroxide to transfer the carbonate anion. For example:

$$CaCl_2+MgCO_3+ \rightarrow MgCl_2+CaCO_3 \quad (25a)$$

These methods and devices can be further modified, optimized and scaled up using the principles and techniques of chemistry, chemical engineering, and/or materials science as applied by a person skilled in the art. Such principles and techniques are taught, for example, in U.S. Pat. No. 7,727,374, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, U.S. Provisional Application No. 61/288,242, filed Jan. 20, 2010, U.S. Provisional Application No. 61/362,607, filed Jul. 8, 2010, and International Application No. PCT/US08/77122, filed Sep. 19, 2008. The entire text of each of the above-referenced disclosures (including any appendices) is specifically incorporated by reference herein.

VI. CHLORALKALI-COUPLED REACTIONS OF GROUP 2 HYDROXIDES AND CO₂ TO FORM GROUP 2 CARBONATES

FIG. 38 depicts a simplified process-flow diagram illustrating general, exemplary embodiments of the apparatuses and methods of the present disclosure. This diagram is offered for illustrative purposes only, and thus it merely depicts specific embodiments of the present invention and is not intended to limit the scope of the claims in any way.

In the embodiment shown in FIG. 38, the chor-alkali cell 100 uses power from three sources, external power (DC1) and recaptured power (DC2 and DC3), to drive a reaction represented by equation a.

$$2NaCl + 2H_2O \rightarrow 2NaOH + Cl_2 + H_2. \tag{a}$$

The sodium hydroxide, chlorine and hydrogen produced from this reaction are delivered to the spray-tower decarbonator 110, photolytic hydrolysis 120 and step 160, respectively.

Carbon dioxide from flue-gas enters the process at the spray-tower decarbonator 110, potentially after initially exchanging waste-heat with a waste-heat/DC generation system. Sodium hydroxide from the chloralkali cell 100 reacts with carbon dioxide in the spray-tower decarbonator 110 according to the reaction represented by equation b.

$$2NaOH + CO_2 \rightarrow Na_2CO_3 + H_2O \tag{b}$$

The water produced from this reaction is indirectly delivered back to chloralkali cell 100.

Chlorine from the chloralkali cell 100 is liquefied photolytically with water in the process at 120. The net reaction can be represented by equation c:

$$Cl_2 + 2H_2O \rightarrow 2HCl + \tfrac{1}{2}O_2 \tag{c}$$

In some embodiments, this reaction or variants thereof are catalyzed by cobalt containing catalysts. See, for example, U.S. Pat. No. 4,764,286, which is specifically incorporated herein by reference in its entirety.

Group-2 metal silicates ($CaSiO_3$ and/or $MgSiO_3$) enter the process at 130. These minerals are reacted with hydrochloric acid from the photolytic hydrolysis 120 to form the corresponding group-2 metal chlorides ($CaCl_2$ and/or $MgCl_2$), water and sand. The reaction can be represented by equation d.

$$2HCl + (Ca/Mg)SiO_3 \rightarrow (Ca/Mg)Cl_2 + H_2O + SiO_2 \tag{d}$$

The water produced from this reaction is indirectly delivered back to chloralkali cell 100.

$(Ca/Mg)Cl_2$ from the group-2 chlorination 130 is delivered to the limestone generator 140, where it reacts indirectly with sodium carbonate from the spray-tower decarbonator 110. This reaction is mediated by hydrogen bridge 150, which connects two half-cell reactions that can be represented by equations e and f.

$$Na_2CO_3 + HCl \rightarrow NaHCO_3 + NaCl \tag{e}$$

$$NaHCO_3 + (Ca/Mg)Cl_2 \rightarrow (Ca/Mg)CO_3 + HCl + NaCl \tag{f}$$

Power DC3 from the coupling of equations e and f in the form of DC current is delivered from limestone generator 140 to chloralkali cell 100. The sodium chloride produced by equations e and f is delivered to chloralkali cell 100. In this manner, the reactant required to electrolyze (NaCl) has been regenerated, and, given appropriate conditioning, is prepared to be electrolyzed and absorb another cycle of $CO_2$, thus forming a chemical loop.

The net reaction capturing the summation of equations a-f is shown here as equation g:

$$CO_2 + (Ca/Mg)SiO_3 \rightarrow (Ca/Mg)SiO_3 + SiO_2 \tag{g}$$

Hydrogen from chloralkali cell 100 is further reacted with carbon dioxide in step 160 to generate power (DC2), for example, in some embodiments mixing hydrogen with natural gas and burning this mixture in a turbine designed for natural gas power generation and connected to an electrical generator, or, for example, in other embodiments using water-gas shift and Fischer-Tropsch technology. DC2 is delivered in the form of DC current back to chloralkali cell 100.

Through the process shown in FIG. 38 and described herein, power can be returned directly and/or indirectly from some or even all of the hydrochloric-acid produced, while only group-2 carbonates are generated as end-sequestrant material and some or all of the sodium, chlorine and hydrogen is cycled. In so doing, the process effectively uses a lower-energy sodium-based chlorine-electrolysis pathway for the generation of the hydroxide used to capture the carbon-dioxide from its gaseous state.

As noted above, in certain embodiments, the apparatuses and methods of the present disclosure employ brine electrolysis for production of the sodium hydroxide that is used as the absorbent fluid in the decarbonation process. Brine electrolysis is an electrochemical process primarily used in the production of concentrated sodium hydroxide (caustic soda) and chlorine gas, and is typically described throughout the relevant literature by equation h:

$$2NaCl + 2H_2O + e^- \rightarrow 2NaOH + H_2(g) + Cl_2(g) \tag{h}$$

Brine electrolysis is typically accomplished by three general types of standard electrolysis cells: diaphragm, mercury, and membrane cells. Each of these types of cells produces the same output products from the same input reactants. They differ from each other primarily in the way the reactants and products are separated from each other.

In one embodiment, a membrane cell may be used due to several factors. First, environmental concerns over mercury have reduced the demand for the mercury cell. Second, the diaphragm cells may produce a relatively weak caustic product which contains significant concentrations of salt and chloride ion and requires considerable subsequent reprocessing/separation to remove the significant salt content from the caustic. Third, improvements in fluorinated polymer technology have increased the life-time and electrical efficiency of membrane cell technology, where lifetimes in excess of five years are routinely guaranteed in the industrial markets. Further, the power-per-ton-of-caustic efficiencies exceeds those of both diaphragm and mercury cells in preferred implementations.

Many preferred embodiments may employ membrane cells in this function.

Membrane cells have several advantages over other brine-electrolysis processes. First, membrane cells neither contain nor produce any environmentally sensitive emissions (e.g., mercury) and are electrically efficient when compared with diaphragm and mercury cells. They also employ a concentrated/dilute/make-up NaCl loop such that they may be well-suited for use as a continuous "salt loop" processing unit. Next, NaOH produced in membrane cells without further evaporation/concentration may be a naturally appropriate level of concentration for use in a decarbonation process (e.g., 30-33% NaOH by weight). Further, hydrogen produced by membrane cells is "clean," approximately "electronic grade," and relatively clear of NaCl or other contamination. As such, hydrogen may be compressed and tanked off as electronic-grade $H_2$ gas, used for power-production on-site such as combustion mix with low-grade coal or for combustion-technology gains. Alternatively, the hydrogen may be used for a boiler fuel for the separation processes, which may occur after decarbonation. Membrane cell technology may also be easily scaled from laboratory to plant-size production by the addition of small incremental units. Additionally, chlorine gas produced by the membrane process is less "wet" than that produced by other standard electrolytic processes. As such, a one-stage compression cycle may be sufficient for production of water-treatment grade chlorine.

These methods and devices can be further modified, optimized and scaled up using the principles and techniques of chemistry, chemical engineering, and/or materials science as applied by a person skilled in the art. Such principles and techniques are taught, for example, in U.S. patent application Ser. No. 12/972,006, filed Dec. 17, 2010, U.S. Patent Application Publications 2006/0185985 and 2009/0127127, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, and International Application No. PCT/US08/77122, filed Sep. 19, 2008. The entire text of each of the above-referenced disclosures (including any appendices) is specifically incorporated by reference herein without disclaimer.

The above examples were included to demonstrate particular embodiments of the invention. However, those of skill in the art should, in light of the present disclosure, appreciate that many changes can be made in the specific embodiments which are disclosed and still obtain a like or similar result without departing from the spirit and scope of the invention.

VII. COMBINED GROUP I AND GROUP II PROCESSES

In other aspects of the present disclosure, it would be preferable to combine processes in order to achieve better energy and materials optimization. For example, a sodium-chlorine based process may be compound with a Group II silicate based process.

A. Sodium-Chlorine Based Process

In some embodiments, the sodium-chlorine based process having the following total reaction may be used:

$$NaCl + CO_2 + H_2O \rightarrow NaHCO_3 + \tfrac{1}{2}H_2 + \tfrac{1}{2}Cl_2$$

The reaction may be divided into a series of steps as shown in Table I.

TABLE I

Steps of a Sodium-Chlorine Based Process

| Step | Equation | ΔG kJ/mol | ΔH kJ/mol |
|---|---|---|---|
| 1 | $NaCl(aq) + H_2O(l) \rightarrow NaOH(aq) + \tfrac{1}{2}H_2(g) + \tfrac{1}{2}Cl_2(g)$ | 211 | n/a |
| 2 | $NaOH(aq) + \tfrac{1}{2}CO_2(g) \rightarrow \tfrac{1}{2}Na_2CO_3(aq) + \tfrac{1}{2}H_2O(l)$ | −28.10 | −52.33 |
| 3 | $\tfrac{1}{2}Na_2CO_3(aq) + \tfrac{1}{2}CO_2(g) + \tfrac{1}{2}H_2O(l) \rightarrow NaHCO_3(aq)$ | −7.18 | −14.01 |
| 4 | $NaHCO_3(aq) \rightarrow NaHCO_3(s)$ | 0.88 | −16.32 |

Step 1 is a chlor-alkali electrolytic step that produces $CO_2$ absorbing NaOH. In some embodiments, steps 2 and 3 may occur in a single column absorption process to produce $NaHCO_3$. In other embodiments, for example, if the $Na_2CO_3$ and $NaHCO_3$ are produced in two separate columns then steps 2 and 3 occur in the $Na_2CO_3$ column and in the $NaHCO_3$ column, respectively.

Sodium-Chlorine based process are further discussed in U.S. Patent Application Publication 2009/0127127, which is incorporated herein by reference.

B. Group II Silicate Based Process

In some embodiments, a group II silicate based process having the following total reaction may be used:

$$CO_2 + CaSiO_3 \rightarrow SiO_2 + CaCO_3$$

The reaction may be divided into a series of steps as shown in Table II.

TABLE II

Steps of a Group II Silicate Based Process

| Step | Equation | ΔH kJ/mol |
|---|---|---|
| 1 | $2MgCl_2 \cdot 6H_2O + \Delta \rightarrow 2MgOHCl + 2HCl(g) + 10H_2O(g)$ | 796.2 |
| 2 | $2HCl(g) + 10H_2O(g) \rightarrow 2HCl(aq) + 10H_2O(l)$ | −589.2 |
| 3 | $CaSiO_3 + 2HCl(aq) \rightarrow CaCl_2(aq) + H_2O(l) + SiO_2$ | −97.16 |
| 4 | $2MgOHCl \rightarrow Mg(OH)_2 + MgCl_2(aq)$ | −123.6 |
| 5 | $Mg(OH)_2 + CaCl_2 + CO_2(g) \rightarrow MgCl_2(aq) + CaCO_3 + H_2O(l)$ | −94.05 |
| 6 | $2MgCl_2(aq) + 12H_2O(l) \rightarrow 2MgCl_2 \cdot 6H_2O$ | 20.3 |

Step 1 involves the thermal decomposition of hydrated Group II salt into a Group II hydroxide, HCl gas and steam. In this example, $MgCl_2 \cdot 6H_2O$ is the salt, and the decomposition products are MgOHCl, HCl gas and steam. The HCl gas and steam exit the decomposition reactor and flow to another vessel and react with a group II silicates feed in order to form silica $SiO_2$ and in this example $CaCl_2$. Steps 2 and 3 represent this process step. In some embodiments, the MgOHCl formed in the decomposition reactor is sent to an absorption column where it separates into water soluble $MgCl_2$ and insoluble $Mg(OH)_2$ in step 4. Then in step 5, the $Mg(OH)_2$ reacts with $CO_2$ to form carbonate and exchanges positions with a calcium ion present from the $CaCl_2$ resulting in $CaCO_3$ precipitate and $MgCl_2$ thereby providing a regeneration of the hydrated salt $MgCl_2 \cdot 6H_2O$, in step 6. FIGS. 18-23 represent process-flow diagrams for different non-limiting embodiments of a group II silicate based process. For example, the embodiment summarized in FIG. 18 comprises the reactions of listed in Table II. This embodiments, any of the other embodiments disclosed herein, or modifications thereof may be combined with a sodium-chlorine based process, including the sodium-chlorine based process discussed above.

C. Chlor-Alkali Processes

In some embodiments, products from an electrolytic chlor-alkali reaction, $H_2$ and $Cl_2$, may be reacted together to form HCl, which is an exothermic and spontaneous reaction. In some embodiments, this may be accomplished in an HCl burner. In other embodiments, it may be accomplished using an $H_2$—$Cl_2$ fuel cell. There are two modes in which this may be done; firstly in an HCl burner or secondly in a $H_2$—$Cl_2$ fuel cell.

TABLE III

Thermodynamics of $H_2$—$Cl_2$ Reactions

| | Equation | ΔG kJ/mol | ΔH kJ/mol |
|---|---|---|---|
| 1 | $\tfrac{1}{2}H_2(g) + \tfrac{1}{2}Cl_2(g) \rightarrow HCl(g)$ | −95.33 | −92.33 |
| 2 | $\tfrac{1}{2}H_2(g) + \tfrac{1}{2}Cl_2(g) + H_2O(l) \rightarrow HCl(aq)$ (actually $H_3O^+\ Cl^-$) | −131.12 | −166.77 |

Reaction 1 in Table III is the combustion of $H_2$ and $Cl_2$ to form hydrogen chloride gas. Reaction 2 in Table III is dissolution of hydrogen chloride gas in water to form hydrochloric acid.

One challenge with HCl burners is obtaining sufficient heat recovery. $H_2$—$Cl_2$ fuel cells on the other hand may attain as efficiencies of 70%. See "Evaluation of concepts for hydrogen—chlorine fuel cells" by Magnus Thomassen, Espen Sandnes, Børre Børresen and Reidar Tunold; Department of Materials Science and Engineering, Norwegian, University of Science and Technology, NO-7491, Trondheim, Norway, which is incorporated by reference herein in its entirety. The generated electrical power can be sent back to the electrochemical cell and reduce the net power load. The remaining energy, 30% in some embodiments, is generated as heat, which may be used as to power a Group II silicate based process.

D. Combined Processes

In some embodiments, the Combined Process comprises a sodium-chlorine based process or unit, one or more Group II silicate based process or units, and a chlor-alkali process or unit. In some embodiments, the Combined process comprises two Group II silicate based process or units. In some embodiments, the chlor-alkali based process or unit comprises a fuel cell and/or an HCl burner that enables energy generation through the combustion of hydrogen and chlorine, which may in turn be harnessed for additional $CO_2$ capturing processes.

FIG. 39 summarizes an embodiment of the Combined Process. In this embodiment, the Group II based process powered by fuel cell waste heat is different from the one powered by the remainder of the power plant waste heat.

In some embodiments, a two Group II silicate based process or unit is powered by waste heat from the fuel cell and an additional and larger Group II silicate based process or unit powered by waste heat from a power plant. One advantage of the Combined Process is reduces the $CO_2$ penalty value by simultaneously reducing the electrical power requirements and increasing the additional amount of $CO_2$ captured without any additional energy penalty.

In some embodiments, the $H_2$ and $Cl_2$ emanating from a chlor-alkali electrolytic cell will be sent to a $H_2$—$Cl_2$ fuel cell where they will react to form HCl. In some embodiments, the electrical power will be sent back to the chlor-alkali unit to reduce incoming electrical power requirements. In some embodiments, the waste heat will be used in a Group II silicate based process or unit to decompose a hydrated salt, for example, $MgCl_2 \cdot 6H_2O$.

In some embodiments, the Group II silicate based process or unit that is powered by the fuel cell has a decomposition chamber is simultaneously powered by heat from the fuel cell and/or from an HCl-mineral silicate reactor of the Group II silicate based process. In some embodiments, the HCl produced in the Fuel Cell is sold to market. In some embodiments, it is reacted with more $CaSiO_3$ in the HCl-Mineral Silicate reactor to form $CaCl_2$. In some embodiments, this $CaCl_2$ is an addition to the $CaCl_2$ normally produced where external HCl is utilized In some embodiments, the absorption column will consume the $CaCl_2$ up to the stoichiometric amount needed for the completion the $CO_2$ capturing reaction. See Table II, reaction 5.

In some embodiments, the net chemical reaction of the Combined Process is:

$$2CaSiO_3 + 2NaCl + H_2O + 3CO_2 \rightarrow 2NaHCO_3 + CaCl_2 + CaCO_3 + 2SiO_2$$

In some embodiments, the second Group II silicate based process or unit will use the waste heat from the remainder of the plant to perform an electrical energy penalty free carbon capture. This second Group II silicate based process or unit will typically be much larger than the fuel-cell powered Group II silicate based process or unit. Examples of Group II silicate based processes provided throughout the instant disclosure.

In some embodiments, the power and $CO_2$ penalty of a Combined Process may be assessed by performing the following calculations.
1) Ideal Chlor-Alkali.
2) Best Available Chlor-Alkali Technology.
3) Chlor-Alkali+$H_2$—$Cl_2$ Fuel Cell+SkyCycle-Fuel Cell
4) Chlor-Alkali+$H_2$—$Cl_2$ Fuel Cell+SkyCycle-Fuel Cell+ SkyCycle-Waste Heat (coal fired power plant)
5) Chlor-Alkali+$H_2$—$Cl_2$ Fuel Cell+SkyCycle-Fuel Cell+ SkyCycle-Waste Heat (natural gas power plant)

For the sample calculations below, 75,000 tonnes per year of $CO_2$ captured was used as the input. This can be converted to moles/sec $CO_2$ captured as follows: 75,000 tonnes/year× $10^6$ gm/tonne×(1 mole CO2/44.01 gm)×365 days/yr×24 hr/day×3600 sec/hr=54.04 moles/sec.

Case A: Ideal Chlor-Alkali @ 90° C. And 1 Atm. Pressure.

TABLE IV

| Reaction | Voltage |
| --- | --- |
| Half Reaction: $Cl^- \rightarrow \frac{1}{2} Cl2 + e^-$ | 1.36 V |
| Half Reaction: $H_2O + e^- \rightarrow OH^- + \frac{1}{2} H_2$ | 0.828 V |
| Net Rxn.: $NaCl_{(aq)} + H_2O_{(l)} \rightarrow NaOH_{(aq)} + \frac{1}{2} H_{2(g)} + \frac{1}{2} Cl_{2(g)}$ | 2.188 V |

At 90° C. Voltage ~2.17 V. Faraday's Constant=96,485 C/mol a) Calculate Required Power under these conditions:

2.17 Volts*96,485 C/mole*54.04 moles/sec*$10^{-6}$ MW/W=11.31 MW b) Calculate $CO_2$ emission index under these conditions:

(11.31 MW/75,000 tonnes/yr)*(1000 kW/MW*365 days/yr*24 hr/day)=1321 kWH/tonne CO2

1321 kWH/tonne CO2*(0.9072 ton/tonne)=1198 kWH/ton $CO_2$

Case B: "Best Available Technology" (BAT) Chlor-Alkali Under Standard Operating Conditions.

Using $3^{rd}$ party I-V (current voltage) data, the required power and $CO_2$ emission index is calculated for BAT. Table V represents a survey of vendor data in kWH/tonne NaOH. The data is converted to kwH/ton $CO_2$ in Table VI using the formula MW NaOH÷MW $CO_2$*0.9072 tons/tonne. The BAT, regarding $CO_2$ capture is that process point with the lowest $CO_2$ penalty and hence lowest kwH/ton $CO_2$. This point corresponds the to the expected process point for the 400 MBarg process at 2.59 Volts. The guaranteed process point is a process point that is guaranteed by the vendor to be attainable. The expected point, a lower value is still expected to be attainable but not guaranteed.

TABLE V

| | | In kWH/Tonnes NaOH | | | |
| --- | --- | --- | --- | --- | --- |
| Voltage | Curr Den | Std. Process | | 400 Mbarg | |
| Volts | Amp/m² | guaranteed | expected | guaranteed | expected |
| I 2.59 | 2000 | 1,779 | 1,745 | 1,770 | 1,738 |
| II 2.704 | 3000 | 1,858 | 1,823 | 1,848 | 1,815 |
| III 2.819 | 4000 | 1,937 | 1,900 | 1,927 | 1,892 |

TABLE V-continued

In kWH/Tonnes NaOH

| | Voltage | Curr Den | Std. Process | | 400 Mbarg | |
|---|---|---|---|---|---|---|
| | Volts | Amp/m² | guaranteed | expected | guaranteed | expected |
| IV | 2.934 | 5000 | 2,016 | 1,977 | 2,006 | 1,969 |
| V | 3.049 | 6000 | 2,095 | 2,055 | 2,084 | 2,046 |

TABLE VI

I-V Data in kWH/ton CO₂

| | | Std. Process | | 400 Mbarg Proces | |
|---|---|---|---|---|---|
| | | | | 400 | 400 |
| Voltage Voltage | Curr Den Amp/m² | Std. Process guaranteed | Std. Process expected | MBarg Process guaranteed | Mbarg Process expected |
| I | 2.59 | 2000 | 1,467 | 1,439 | 1,460 | 1,433 |
| II | 2.704 | 3000 | 1,532 | 1,503 | 1,524 | 1,497 |
| III | 2.819 | 4000 | 1,597 | 1,567 | 1,589 | 1,560 |
| IV | 2.934 | 5000 | 1,663 | 1,631 | 1,654 | 1,624 |
| V | 3.049 | 6000 | 1,728 | 1,695 | 1,719 | 1,688 |

BAT 400 MBarg Process at 2 kA/m²
a) Required Power under these conditions may be calculated as follows:

2.59 Volts*96,485 C/mole*54.04 moles/sec*10⁻⁶ MW/W=13.5 MW b) $CO_2$ penalty under these conditions may be calculated as follows:

(13.5 MW/75,000 tonnes/yr)*(1000 kW/MW*365 days/yr*24 hr/day)*(0.9072 ton/tonne)=1433 kWH/ton or 1579 kWH/tonne In this embodiment, the difference between the $CO_2$ penalty for the BAT technology and Ideal case is 1433−1198=235 kWH/ton.

Case C: Chlor-Alkali+$H_2$—$Cl_2$ Fuel Cell @70% Efficiency+Group II Silicate Based Process with Fuel Cell.

In some embodiments, it is preferable to react the resulting $H_2$ and $Cl_2$ in a fuel cell to form hydrochloric acid. The electrical power generated may then be used to subtract from the power consumed to run a chlor-alkali cell. Various tests of fuel cells have yielded efficiencies as high as 70%, as discussed above. The remainder energy will typically exit as waste heat. This waste heat in turn, serves to power another SkyCycle unit.

For a fuel cell, the power generated is based on the reversible available Gibbs Free energy. For HCl data is readily available from sources such as Perry's Handbook for Chemical Engineers, which is incorporated herein by reference. The $\Delta G_{formation}$ of aqueous hydrochloric acid from its constituents $H_2$ gas and $Cl_2$ gas is −131 kJ/mole.

TABLE VII

Info for $H_2$—$Cl_2$ fuel cell

| Half Reaction | Voltage |
|---|---|
| ½ $Cl_2$ + e⁻ → Cl⁻ | 1.36 |
| ½ $H_2$ → H + e⁻ | 0 |
| Total ½$Cl_2$ + ½$H_2$ → HCl | 1.36 |

This can also be verified using Faraday's Equation, $\Delta G=-nFE_o$, where n=1 (one electron transfer), F=Faraday's constant=96,485 C/mole, which equals −96485 C/mole*1.36V*0.001 kJ/J or −131.2 kJ/mole. This quantity agrees with the $\Delta G_{form}$ for HCl (aqueous) from Perry's.

In some embodiments, the following reactions may be combined as follows:

NaCl(aq)+$CO_{2(g)}$+$H_2O(l)$→NaHCO₃(aq)½$H_2$+½$Cl_2$

½$H_2$+½$Cl_2$→HCl(aq)

NaCl+$CO_2$+$H_2O$→NaHCO₃+HCl(aq)

In this embodiment, the stoichiometric ratio of $CO_2$ to HCl is 1:1. Hence HCl generation is 54.04 moles/sec as is the $CO_2$ generation 1) Electrical Power generated from Fuel Cell (continued) may be calculated as follows:
   A) Given 70% efficiency, power generated (has negative value since it is generated)
   B) −(70%*1.36V*96,485 C/mole*54.04 moles/sec*10⁻⁶ MW/W)=−4.96 MW
2) Total Electrical Power required may be calculated as follows:
   A) Total power required=(Power Required for Chlor-Alkali Cell)−
   B) For Ideal Chlor-Alkali Cell 11.31 MW−4.96 MW=6.35 MW
      For BAT Chlor-Alkali Cell: 13.5 MW−4.96 MW=8.54 MW
3) Fuel Cell Waste Heat may be calculated as follows:
   A) Lost efficiency=(1−70%)=30%
   B) Use ΔH not ΔG ½$H_{2(g)}$+½$Cl_{2(g)}$→HCl(aq)

ΔH=−166.8 kJ/mole=30%*(54.04 mole/sec)*(−166.8 kJ/mole)=−2.70 MW (heat generated)

4) Other Waste Heats may be calculated as follows:
   A) Heat from Fuel Cell effluent (aqueous HCl) and
   B) Group II silicate based process (e.g., HCl+CaSiO₃ (Wollastonite)

CaSiO₃+2HCl(aq)→$CaCl_2$(aq)+$SiO_2$+$H_2O(l)$

TABLE VIII

Information for HCl—CaSiO₃

| Compound | ΔH kJ/mole |
|---|---|
| CaSiO₃ | −1581.5 |
| HCl(aq) | −166.78 |
| $CaCl_2$(aq) | −875.3 |
| $SiO_2$ | −851.02 |
| $H_2O(l)$ | −285.0 |

ΔH = (−875.3) + (−851.02) + (−285) − [(2 *(−166.78)) − 1581] kJ/mole = −97.16 kJ/mole Stoichiometric ratio CaSiO₃:HCl is 1:2
Therefor consumption of is 0.5*54.04 moles/sec=27.02 moles/sec 27.02 moles/sec*(−97.16 kJ/mole)*0.001 MW/kW=−2.63 MW (heat generated)

5) Both waste heats may be calculated as follows:

2.63+2.70 MW=5.33 MW

6) The additional decomposition from the previously calculated Fuel Cell waste heats may be calculated in an iterative manner until it converges.

7) Some enthalpies of decomposition reactions are provided here:

TABLE IX

Thermodynamic Data for $MgCl_2 \cdot 6H_2O$ decomposition reaction

| Compound | ΔH kJ/mole |
|---|---|
| $MgCl_2 \cdot 6H_2O$ | −2499.1 |
| $HCl_{(g)}$ | −92.33 |
| $H_2O_{(g)}$ | −241.88 |
| MgOHCl | −799.6 |
| MgO | −601.97 |

Note that in this embodiment, HCl formed here is HCl gas, whereas the HCl formed in the fuel cell is an aqueous solution, these have very different enthalpies and Gibbs free energies of formation.

In some embodiments, the reactions can occur in two modes:

$MgCl_2.6H_2O + \Delta \rightarrow MgOHCl + HCl(g) + 5H_2O(g)//\sim 230°$ C.    Reaction #1

$\Delta H_{rxn} = (-799.6) + (-92.33) + 5*(-241.88) - (-2499.1) = 398$ kJ/mole $MgCl_2.6H_2O + \Delta \rightarrow MgO + 2HCl_{(g)} + 5H_2O_{(g)}//>450°$ C.    Example #2

$\Delta H_{rxn}(-601.97) + 2*(-92.33) + 5*(-241.88) - (-2499.1) = 503.4$ kJ/mole In some embodiments, the reaction #1 will be used.

Although the $\Delta H_{rxn}$ 398 kJ/mole, two moles of MgOHCl are required per molecule of $CO_2$ absorbed for some of the reactions specified earlier:

$2MgOHCl \rightarrow Mg(OH)_2 + MgCl_{2(aq)}$ $Mg(OH)_2 + CO_{2(g)} + CaCl_{2(aq)} \rightarrow CaCO_3 + MgCl_2 + H_2O_{(l)}$ Therefore the $\Delta H_{rxn}$ per mole of $CO_2$ absorbed is 2*398 kJ/mole=796.2 kJ/mole Also for the reaction: $CaSiO_3 + 2HCl(aq) \rightarrow CaCl_2(aq) + SiO_2 + H_2O(l)$ $\Delta H_{rxn}$ −97.16 kJ/mole (see 4 A)

8) Theoretical production of extra $CO_2$ sorbent (MgOHCl) may be calculated as follows:
From #5, added heats are 5.33 MW (generated)
A) Additional $CO_2$ absorbed by extra MgOHCl:

(5.33 MW/796.2 kJ/mole)*1000 kW/MW=6.70 moles/sec $CO_2$ absorbed

B) The HCl from additional decomposition, which reacts with $CaSiO_3$ Balancing the decomposition of $MgCl_2.6H_2O$ $2MgCl_2.6H_2O + \Delta \rightarrow 2MgOHCl + 2HCl(g) + 10H_2O(g)$    i)

$2Mg(OH)Cl \rightarrow Mg(OH)_2 + MgCl2_{(aq)}$    ii)

$Mg(OH)_2 + CO_{2(g)} + CaCl_{2(aq)} \rightarrow CaCO_3 + MgCl_2 + H_2O_{(l)}$    iii)

$CaSiO_3 + 2HCl(aq) \rightarrow CaCl_2(aq) + SiO_2 + H_2O_{(l)}$    iv)

Therefore the ratio of extra $CO_2$ absorbed (reaction iii), to extra $CaSiO_3$ reacted with HCl (reaction iv) generated from the decomposition of $MgCl_2.6H_2O$ (reaction i) is 1:1.

Extra heat, newly generated from the $HCl+CaSiO_3$ reaction.

From Section 4A this ΔH=−97.16 kJ/mole (generated)
Therefore, 6.70 moles/sec*97.16 kJ/mole*0.001 MW/kW=0.65 MW C) Total Power from heat generated:

5.33MW+0.65 MW=5.98 MW

D) Repeating step 8 B.
Sending this heat back to decomposition.

(5.98 MW/796.2 kJ/mole)*1000 kW/MW=7.51 moles/sec

Generating additional heat from the HCl-Wollastonite reaction 7.51 moles/sec*97.16 kJ/mole*0.001 MW/kW=0.73MW And adding this heat to the previous heat.

0.73 MW+5.33 MW=6.06 MW

Repeating these three steps again.

(6.06 MW/796.2 kJ/mole)*1000 kW/MW=7.61 moles/sec 7.61 moles/sec*97.16 kJ/mole*0.001 MW/kW=0.74MW 0.74+5.33 MW=6.07 MW (6.07MW/796.2 kJ/mole)*1000 kW/MW=7.63 moles/sec Value finally converges ~0.74 MW 7.63 moles/sec*97.16 kJ/mole*0.001 MW/kW=0.74MW Amount of additional $CO_2$ absorbed ~7.63 moles/sec
9) $CO_2$ emission penalty for SkyMine+Fuel Cell+SkyCycle-Fuel Cell may be calculated as follows:
A) Extra $CO_2$ absorbed in tonnes/year may be calculated as follows:
From 8 D, extra $CO_2$ absorbed=7.63 moles/sec 44.01 gm/mole $CO_2$*7.63 moles/sec*3600 sec/hr*24 hr/day*365 days/year*$10^{-6}$ tonne/gm=10,582 tonnes/year B) Total $CO_2$ absorbed may be calculated as follows:
From the beginning of Section III, the original amount of $CO_2$ captured was 75,000 tonnes/year.
C) Adding this to the extra $CO_2$ absorbed.

Total=75,000+10,582 tonnes/year=85,582 tonnes/year

D) Final Calculation for $CO_2$ emission penalty.
  i) Ideal Chlor-Alkali Cell
    Given the net power requirement for Chlor-alkali and $H_2/Cl_2$ Fuel Cell at 70% (section 2B) is 6.35 MW and a capture rate of 85,582 tonnes/year.

6.35 MW/85,582 tonnes/yr.*(1000 kW/MW*365 days/yr*24 hr/day)*(0.9072 tons/tonne)

589 kWH/ton
or 650 kWH/tonne
The percentage of $CO_2$ captured by SkyMine is 75,000/85,582=87.6%

And the percentage of $CO_2$ captured by the fuel cell waste heat SkyCycle is 10,582/85,582=12.4% ii) BAT Chlor-Alkali Cell 8.54 MW/85,582 tonnes/yr.*(1000 kW/MW*365 days/yr*24 hr/day)*(0.9072 tons/tonne)=793 kWH/ton or 874 kWH/tonne In some embodiments, the percentage $CO_2$ captured by a sodium-chlorine based process and a Group II silicate based process are the same as for the ideal Chlor-Alkali Cell.

Case 4: Chlor-Alkali+H2-Cl2 Fuel Cell @70% Efficiency+SkyCycle-Fuel Cell+SkyCycle-Remainder of Plant Waste Heat.

In this embodiment (Case 4) the remainder of the plant's waste heat is used, whether coal-fired or natural gas-fired power plant to power an additional Group II silicate based process unit. Using, for examples, the embodiments summarized in FIGS. 18-23, the tabulated value of carbon dioxide capture for each process, percent concentration of carbon dioxide and type of power plant, is listed below. For a plot see FIG. 29.

TABLE X

Percent CO2 capture versus % CO2 in the flue gas, mineral silicate composition, decomposition mode, stack gas temperature and type.

| % $CO_2$ | $CaSiO_3$—MgOHCl FG at 320° C. COAL | $CaSiO_3$—MgOHCl FG at 360° C. COAL | $CaSiO_3$—MgOHCl FG at 400° C. COAL | $CaSiO_3$—MgOHCl FG at 440° C. COAL |
|---|---|---|---|---|
| 7% | 33% | 45% | 57% | 70% |
| 10% | 24% | 32% | 41% | 50% |
| 14% | 17% | 23% | 29% | 36% |
| 18% | 13% | 18% | 23% | 28% |

| % $CO_2$ | $CaSiO_3$—MgOHCl FG at 550° C. COAL | $CaSiO_3$—MgO FG at 550° C. COAL | $CaSiO_3$—MgOHCl FG at 600° C. NGAS | $CaSiO_3$—MgO FG at 600° C. NGAS |
|---|---|---|---|---|
| 7% | 105% | 83% | 121% | 96% |
| 10% | 75% | 60% | 87% | 69% |
| 14% | 54% | 43% | 62% | 50% |
| 18% | 42% | 33% | 48% | 39% |

The process used for these comparisons is the $CaSiO_3$—MgOHCl using the reactions as listed in Table II.

From the Aspen generated plots, the waste heat from the Group II silicate based process from the stack gas of a natural gas power plant captures 87% of the $CO_2$ emissions (see $CaSiO_3$—MgOHCl FG at 600° C. NGAS and 10% $CO_2$. By contrast, the stack gas of a coal fired power plant captures 41% of the $CO_2$ emissions (see $CaSiO_3$—MgOHCl FG at 400° C. Coal and 10% $CO_2$).

Therefore, in some embodiments, a sodium-chlorine based process may be used to trap the remaining 13% (100%–87%) and 59% (100%–41%) of the remaining $CO_2$ for the two cases respectively.

From section 9D of Case III, the $CO_2$ emissions for the theoretical chlor-alkali cell+$H_2$/$Cl_2$ Fuel Cell at 70% efficiency+Fuel Cell Group II Silicate Based Process case was 589 kwH/ton.

From part D of Case 3, the percent captured by a Sodium-Chlorine Based Process is 87.16% and the percent captured by a Group II Silicate Based Process is 12.4%.

A) For Coal derived waste heat at 400° C. Coal and 10% $CO_2$:

The $CO_2$ emission penalty is:

100%–41%=59%

59%*589 kwH/ton=347 kwH/ton or 382 kwH/tonne

Percentage of $CO_2$ capture due to the Sodium-Chlorine Based Process:

87.6%*59%=51.7%

Percentage due to the Group II Silicate Based Process:

(12.4%*59%)+41%=48.3%

B) For Natural Gas derived waste heat at 600° C. Coal and 10% $CO_2$:

The $CO_2$ emission penalty is:

100%–87%=13%

13%*589 kwH/ton=76 kwH/ton or 84 kwH/tonne

Percentage $CO_2$ capture due to the Sodium-Chlorine Based Process:

87.6%*13%=11.4%

Percentage due to the Group II Silicate Based Process (12.4%*13%)+87%=88.6%

TABLE XI

Percentage of $CO_2$ capture mode, i.e. SkyMine or SkyCycle for each case.

| Technology Configuration | Case | $CO_2$ penalty kWh/ton | SkyMine | SkyCycle |
|---|---|---|---|---|
| Ideal Chlor-Alkali | 1 | 1198 | 100% | 0% |
| BAT Chlor-Alkali | 2 | 1433 | 100% | 0% |
| Ideal Chlor-Alkali + $H_2$—$Cl_2$ FC 70% eff. + FC Group II Silicate Based Process | 3 | 589 | 87.6% | 12.4% |

TABLE XI-continued

Percentage of $CO_2$ capture mode, i.e. SkyMine or SkyCycle for each case.

| Technology Configuration | Case | $CO_2$ penalty kWh/ton | SkyMine | SkyCycle |
|---|---|---|---|---|
| Ideal Chlor-Alkali + $H_2$—$Cl_2$ FC 70% eff. + FC Group II Silicate Based Process + WH Group II Silicate Based Process Coal | 4 ex. 1 | 347 | 51.7% | 48.3% |
| Ideal Chlor-Alkali + $H_2$—$Cl_2$ FC 70% eff. + FC Group II Silicate Based Process + WH Group II Silicate Based Process NG | 4 ex. 2 | 76 | 11.4% | 88.6% |

VIII. SILICATE MINERALS FOR THE SEQUESTRATION OF CARBON DIOXIDE

In aspects of the present invention there are provided methods of sequestering carbon dioxide using silicate minerals. The silicate minerals make up one of the largest and most important classes of rock-forming minerals, constituting approximately 90 percent of the crust of the Earth. They are classified based on the structure of their silicate group. Silicate minerals all contain silicon and oxygen. In some aspects of the present invention, Group 2 silicates may be used to accomplish the energy efficient sequestration of carbon dioxide.

In some embodiments, compositions comprising Group 2 inosilicates may be used. Inosilicates, or chain silicates, have interlocking chains of silicate tetrahedra with either $SiO_3$, 1:3 ratio, for single chains or $Si_4O_{11}$, 4:11 ratio, for double chains.

In some embodiments, the methods disclosed herein use compositions comprising Group 2 inosilicates from the pyroxene group. For example, enstatite ($MgSiO_3$) may be used.

In some embodiments, compositions comprising Group 2 inosilicates from the pyroxenoid group are used. For example, wollastonite ($CaSiO_3$) may be used. In some embodiments, compositions comprising mixtures of Group 2 inosilicates may be employed, for example, mixtures of enstatite and wollastonite. In some embodiments, compositions comprising mixed-metal Group 2 inosilicates may be used, for example, diopside ($CaMgSi_2O_6$).

Wollastonite usually occurs as a common constituent of a thermally metamorphosed impure limestone. Typically wollastonite results from the following reaction (equation 26) between calcite and silica with the loss of carbon dioxide:

(26)

In some embodiments, the present invention has the result of effectively reversing this natural process. Wollastonite may also be produced in a diffusion reaction in skarn. It develops when limestone within a sandstone is metamorphosed by a dyke, which results in the formation of wollastonite in the sandstone as a result of outward migration of calcium ions.

In some embodiments, the purity of the Group 2 inosilicate compositions may vary. For example, it is contemplated that the Group 2 inosilicate compositions used in the disclosed processes may contain varying amounts of other compounds or minerals, including non-Group 2 metal ions. For example, wollastonite may itself contain small amounts of iron, magnesium, and manganese substituting for calcium.

In some embodiments, compositions comprising olivine and/or serpentine may be used. $CO_2$ mineral sequestration processes utilizing these minerals have been attempted. The techniques of Goldberg et al. (2001) are incorporated herein by reference.

The mineral olivine is a magnesium iron silicate with the formula $(Mg,Fe)_2SiO_4$. When in gem-quality, it is called peridot. Olivine occurs in both mafic and ultramafic igneous rocks and as a primary mineral in certain metamorphic rocks. Mg-rich olivine is known to crystallize from magma that is rich in magnesium and low in silica. Upon crystallization, the magna forms mafic rocks such as gabbro and basalt. Ultramafic rocks, such as peridotite and dunite, can be residues left after extraction of magmas and typically are more enriched in olivine after extraction of partial melts. Olivine and high pressure structural variants constitute over 50% of the Earth's upper mantle, and olivine is one of the Earth's most common minerals by volume. The metamorphism of impure dolomite or other sedimentary rocks with high magnesium and low silica content also produces Mg-rich olivine, or forsterite.

IX. GENERATION OF GROUP 2 CHLORIDES FROM GROUP 2 SILICATES

Group 2 silicates, e.g., $CaSiO_3$, $MgSiO_3$, and/or other silicates disclosed herein, may be reacted with hydrochloric acid, either as a gas or in the form of aqueous hydrochloric acid, to form the corresponding Group 2 metal chlorides ($CaCl_2$ and/or $MgCl_2$), water and sand. In some embodiments the HCl produced in equation 1 is used to regenerate the $MgCl_2$ and/or $CaCl_2$ in equation 3. A process loop is thereby created. Table 1 below depicts some of the common calcium/magnesium containing silicate minerals that may be used, either alone or in combination. Initial tests by reacting olivine and serpentine with HCl have been successful. $SiO_2$ was observed to precipitate out and $MgCl_2$ and $CaCl_2$ were collected.

TABLE 1

Calcium/Magnesium Minerals.

| Mineral | Formula (std. notation) | Formula (oxide notation) | Ratio Group 2:$SiO_2$ | Ratio Group 2: total |
|---|---|---|---|---|
| Olivine | $(Mg,Fe)_2[SiO_4]$ | $(MgO,FeO)_2 \cdot SiO_2$ | 1:1 | 1:2 |
| Serpentine | $Mg_6[OH]_8[Si_4O_{10}]$ | $6MgO \cdot 4SiO_2 \cdot 4H_2O$ | 3:2 | undefined |
| Sepiolite | $Mg_4[(OH)_2Si_6O_{15}]6H_2O$ | $3MgO \cdot Mg(OH)_2 \cdot 6SiO_2 \cdot 6H_2O$ | 2:3 | undefined |
| Enstatite | $Mg_2[Si_2O_6]$ | $2MgO \cdot 2SiO_2$ | 1:1 | undefined |
| Diopside | $CaMg[Si_2O_6]$ | $CaO \cdot MgO \cdot 2SiO_2$ | 1:1 | undefined |
| Tremolite | $Ca_2Mg_5\{[OH]Si_4O_{11}\}_2$ | $2CaO \cdot 5MgO \cdot 8SiO_2H_2O$ | 7:8 | undefined |
| Wollastonite | $CaSiO_3$ | $CaO \cdot SiO_2$ | 1:1 | undefined |

See "Handbook of Rocks, Minerals & Gemstones by Walter Schumann Published 1993, Houghton Mifflin Co., Boston, New York, which is incorporated herein by reference.

X. FURTHER EMBODIMENTS

In some embodiments, the conversion of carbon dioxide to mineral carbonates may be defined by two salts. The first salt is one that may be heated to decomposition until it becomes converted to a base (hydroxide and/or oxide) and emits an acid, for example, as a gas. This same base reacts with carbon dioxide to form a carbonate, bicarbonate or basic carbonate salt.

For example, in some embodiments, the present disclosure provides processes that react one or more salts from Tables A-C below with water to form a hydroxides, oxides, and/or a mixed hydroxide halides. Such reactions are typically referred to as decompositions. In some embodiments, the water may be in the form of liquid, steam, and/or from a hydrate of the selected salt. The steam may come from a heat exchanger whereby heat from an immensely combustible reaction, i.e. natural gas and oxygen or hydrogen and chlorine heats a stream of water. In some embodiments, steam may also be generated through the use of plant or factory waste heat. In some embodiments, the halide salt, anhydrous or hydrated, is also heated.

TABLE A

Decomposition Salts

| | $Li^+$ | | $Na^+$ | | $K^+$ | | $Rb^+$ | | $Cs^+$ | |
|---|---|---|---|---|---|---|---|---|---|---|
| $F^-$ | NC | N | 4747 | N | NC | N | 10906 | N | 7490 | N |
| $Cl^-$ | 3876 | N | 19497 | N | 8295 | N | 13616 | N | 7785 | N |
| $Br^-$ | 3006 | N | 4336 | N | 9428 | N | 13814 | N | 8196 | N |
| $I^-$ | 6110 | N | 6044 | N | 11859 | N | 9806 | N | 8196 | N |

TABLE B

Decomposition Salts (cont.)

| | $Mg^{+2}$ | | $Ca^{+2}$ | | $Sr^{+2}$ | | $Ba^{+2}$ | |
|---|---|---|---|---|---|---|---|---|
| $F^-$ | 4698 | N | 3433 | N | 10346 | N | 6143 | N |
| $Cl^-$ | 4500* | 6W* | 5847 | 2W | 9855 | 6W | 8098 | 2W |
| $Br^-$ | 5010 | 6W | 2743 | N | 10346 | 6W | 8114 | 2W |
| $I^-$ | 2020 | N | 4960 | N | 9855 | 6W | 10890 | 2W |

*Subsequent tests have proven the heat of reaction within 1.5-4% of the thermodynamically derived value using TGA (thermogravinometric analysis) of heated samples and temperature ramp settings.

TABLE C

Decomposition Salts (cont.)

| | $Mn^{+2}$ | | $Fe^{+2}$ | | $Co^{+2}$ | | $Ni^{+2}$ | | $Zn^{+2}$ | |
|---|---|---|---|---|---|---|---|---|---|---|
| $F^-$ | 3318 | N | 2101 | N | 5847 | N | 5847 | N | 3285 | N |
| $Cl^-$ | 5043 | 6W | 3860 | 4W | 3860 | 6W | 4550 | 6W | 8098 | 4W |
| $Br^-$ | 5256 | 6W | 11925 | 4W | 9855 | 6W | 5010 | 6W | 4418 | 4W |
| $I^-$ | 5043 | 6W | 3055 | 4W | 4123 | 6W | 5831 | 6W | 4271 | 4W |
| $SO_4^{-2}$ | NC | 4W | 13485 | 4W | 3351 | 4W | 8985 | 6W | 8344 | 7W |

TABLE D

Decomposition Salts (cont.)

| | $Ag^+$ | | $La^{+3}$ | |
|---|---|---|---|---|
| $F^-$ | 2168 | N | 13255 | 7W |
| $Cl^-$ | 5486 | N | 7490 | 7W |
| $Br^-$ | 6242 | N | 5029 | 7W |
| $I^-$ | 6110 | N | 4813 | 7W |
| $SO_4^{-2}$ | 6159 | N | 10561 | 6W |

For Tables A-D, the numerical data corresponds to the energy per amount of $CO_2$ captured in kWh/tonne, NC=did not converge, and NA=data not available.

This same carbonate, bicarbonate or basic carbonate of the first salt reacts with a second salt to do a carbonate/bicarbonate exchange, such that the anion of second salt combines with the cation of the first salt and the cation of the second salt combines with the carbonate/bicarbonate ion of the first salt, which forms the final carbonate/bicarbonate.

In some cases the hydroxide derived from the first salt is reacted with carbon dioxide and the second salt directly to form a carbonate/bicarbonate derived from (combined with the cation of) the second salt. In other cases the carbonate/bicarbonate/basic carbonate derived from (combined with the cation of) the first salt is removed from the reactor chamber and placed in a second chamber to react with the second salt. FIG. 27 shows an embodiment of this 2-salt process.

This reaction may be beneficial when making a carbonate/bicarbonate when a salt of the second metal is desired, and this second metal is not as capable of decomposing to form a $CO_2$ absorbing hydroxide, and if the carbonate/bicarbonate compound of the second salt is insoluble, i.e. it precipitates from solution. Below is a non-exhaustive list of examples of such reactions that may be used either alone or in combination, including in combination with one or more either reactions discussed herein.

Examples for a Decomposition of a Salt-1

$2NaI + H_2O \rightarrow Na_2O + 2HI$ and/or $Na_2O + H_2O \rightarrow 2NaOH$ $MgCl_2 \cdot 6H_2O \rightarrow MgO + 5H_2O + 2HCl$ and/or $MgO + H_2O \rightarrow Mg(OH)_2$ Examples of a Decarbonation $2NaOH + CO_2 \rightarrow Na_2CO_3 + H_2O$ and/or $Na_2CO_3 + CO_2 + H_2O \rightarrow 2NaHCO_3$ $Mg(OH)_2 + CO_2 \rightarrow MgCO_3 + H_2O$ and/or $Mg(OH)_2 + 2CO_2 \rightarrow Mg(HCO_3)_2$ Examples of a Carbonate exchange with a Salt-2

$Na_2CO_3 + CaCl_2 \rightarrow CaCO_3 \downarrow + 2NaCl$ $Na_2CO_3 + 2AgNO_3 \rightarrow Ag_2CO_3 \downarrow + 2NaNO_3$ $Ca(OH)_2 + Na_2CO_3 \rightarrow CaCO_3 \downarrow + 2NaOH^*$

* In this instance the carbonate, $Na_2CO_3$ is Salt-2, and the salt decomposed to form $Ca(OH)_2$, i.e. $CaCl_2$ is the Salt-1. This is the reverse of some of the previous examples in that the carbonate ion remains with Salt-1.

Known carbonate compounds include $H_2CO_3$, $Li_2CO_3$, $Na_2CO_3$, $K_2CO_3$, $Rb_2CO_3$, $Cs_2CO_3$, $BeCO_3$, $MgCO_3$, $CaCO_3$, $SrCO_3$, $BaCO_3$, $MnCO_3$, $FeCO_3$, $CoCO_3$, $CuCO_3$, $ZnCO_3$, $Ag_2CO_3$, $CdCO_3$, $Al_2(CO_3)_3$, $Tl_2CO_3$, $PbCO_3$, and $La_2(CO_3)_3$. Group IA elements are known to be stable bicarbonates, e.g., $LiHCO_3$, $NaHCO_3$, $RbHCO_3$, and $CsHCO_3$. Group IIA and some other elements can also form bicarbonates, but in some cases, they may only be stable in solution. Typically rock-forming elements are H, C, O, F, Na, Mg, Al, Si, P, S, Cl, K, Ca, Ti, Mg and Fe. Salts of these that can be thermally decomposed into corresponding hydroxides by the least amount of energy per mole of $CO_2$ absorbing hydroxide may therefore be considered potential Salt-1 candidates.

Based on the energies calculated in Tables A-D, several salts have lower energies than $MgCl_2 \cdot 6H_2O$. Table E below, summarizes these salts and the percent penalty reduction through their use relative to $MgCl_2 \cdot 6H_2O$.

TABLE E

Section Lower Energy Alternative Salts

| Compound | kw-hr/tonne | % reduction |
|---|---|---|
| $MgCl_2 \cdot 6H2O$ | 4500 | 0% |
| LiCl | 3876 | 16% |
| LiBr | 3006 | 50% |
| NaBr | 4336 | 4% |
| $MgI_2$ | 2020 | 123% |
| $CaF_2$ | 3433 | 31% |
| $CaBr_2$ | 2743 | 64% |
| $MnF_2$ | 3318 | 36% |
| $FeF_2$ | 2102 | 114% |
| $FeCl_2 \cdot 4H_2O$ | 3860 | 17% |
| $FeI_2 \cdot 4H_2O$ | 3055 | 47% |
| $CoCl_2 \cdot 6H_2O$ | 3860 | 17% |
| $CoI_2 \cdot 6H_2O$ | 4123 | 9% |
| $CoSO_4 \cdot 4H_2O$ | 3351 | 34% |
| $ZnF_2 \cdot 2H_2O$ | 3285 | 37% |
| $ZnBr_2 \cdot 4H_2O$ | 4418 | 2% |
| $ZnI_2 \cdot 4H_2O$ | 4271 | 5% |
| $CdF_2$ | 3137 | 43% |
| AgF | 2168 | 108% |

The following salts specify a decomposition reaction through their respective available MSDS information.

TABLE F

| Compound | Decomposition Energy | Notes |
|---|---|---|
| $MgCl_2 \cdot 6H_2O$ | 4500 | |
| $MnCl_2 \cdot 4H_2O$ | 5043 | only $Mn^{+2}$ forms a stable carbonate |
| $NaI \cdot 2H_2O$ | 1023 | too rare |
| $CoI_2 \cdot 6H_2O$ | 4123 | too rare |
| $FeCl_2 \cdot 4H_2O$ | 3860 | May oxidize to ferric oxide, this will not form a stable carbonate |
| LiBr | 3006 | too rare |
| $Mg(NO_3)_2 \cdot 4H_2O$ | 1606 | leaves Nox |
| $CoSO_4 \cdot 4H_2O$ | 3351 | somewhat rare leaves $SO_3$ |
| $CdCl_2 \cdot 2.5H_2O$ | not aval. | toxic byproducts |
| $Ca(NO_3)_2 \cdot 4H_2O$ | 2331 | leaves $NO_2$ |

| Compound | References |
|---|---|
| $MgCl_2 \cdot 6H_2O$ | |
| $MnCl_2 \cdot 4H_2O$ | http://avogadro.chem.iastate.edu/MSDS/MnCl2.htm |
| $NaI_2 \cdot H_2O$ | http://www.chemicalbook.com/ProductMSDSDetailCB6170714_EN.htm |
| $CoI_2 \cdot 6H_2O$ | http://www.espimetals.com/index.php/msds/527-cobalt-iodide |
| $FeCl_2 \cdot 4H_2O$ | |
| LiBr | http://www.chemcas.com/material/cas/archive/7550-35-8_v1.asp |
| $Mg(NO_3)_2 \cdot 4H_2O$ | http://avogadro.chem.iastate.edu/MSDS/MgNO3-6H2O.htm |
| $CoSO_4 \cdot 4H_2O$ | http://www.chemicalbook.com/ProductMSDSDetailCB0323842_EN.htm |
| $CdCl_2 \cdot 2.5H2O$ | http://www.espimetals.com/index.php/msds/460-cadmium-chloride |
| $Ca(NO_3)_2 \cdot 4H2O$ | http://avogadro.chem.iastate.edu/MSDS/Ca%28NO3%292-4H2O.htm |

XI. LIMESTONE GENERATION AND USES

In aspects of the present invention there are provided methods of sequestering carbon dioxide in the form of limestone. Limestone is a sedimentary rock composed largely of the mineral calcite (calcium carbonate: $CaCO_3$). This mineral has many uses, some of which are identified below.

Limestone in powder or pulverized form, as formed in some embodiments of the present invention, may be used as a soil conditioner (agricultural lime) to neutralize acidic soil conditions, thereby, for example, neutralizing the effects of acid rain in ecosystems. Upstream applications include using limestone as a reagent in desulfurizations.

Limestone is an important stone for masonry and architecture. One of its advantages is that it is relatively easy to cut into blocks or more elaborate carving. It is also long-lasting and stands up well to exposure. Limestone is a key ingredient of quicklime, mortar, cement, and concrete.

Calcium carbonate is also used as an additive for paper, plastics, paint, tiles, and other materials as both white pigment and an inexpensive filler. Purified forms of calcium carbonate may be used in toothpaste and added to bread and cereals as a source of calcium. $CaCO_3$ is also commonly used medicinally as an antacid.

Currently, the majority of calcium carbonate used in industry is extracted by mining or quarrying. By co-generating this mineral as part of carbon dioxide sequestration in some embodiments, this invention provides a non-extractive source of this important product.

XII. MAGNESIUM CARBONATE GENERATION AND USES

In aspects of the present invention there are provided methods of sequestering carbon dioxide in the form of magnesium carbonate. Magnesium carbonate, $MgCO_3$, is a white solid that occurs in nature as a mineral. The most common magnesium carbonate forms are the anhydrous salt called magnesite ($MgCO_3$) and the di, tri, and pentahydrates known as barringtonite ($MgCO_3.2H_2O$), nesquehonite ($MgCO_3.3H_2O$), and lansfordite ($MgCO_3.5H_2O$), respectively. Magnesium carbonate has a variety of uses; some of these are briefly discussed below.

Magnesium carbonate may be used to produce magnesium metal and basic refractory bricks. $MgCO_3$ is also used in flooring, fireproofing, fire extinguishing compositions, cosmetics, dusting powder, and toothpaste. Other applications are as filler material, smoke suppressant in plastics, a reinforcing agent in neoprene rubber, a drying agent, a laxative, and for color retention in foods. In addition, high purity magnesium carbonate is used as antacid and as an additive in table salt to keep it free flowing.

Currently magnesium carbonate is typically obtained by mining the mineral magnesite. By co-generating this mineral as part of carbon dioxide sequestration in some embodiments, this invention provides a non-extractive source of this important product.

XIII. SILICON DIOXIDE GENERATION AND USES

In aspects of the present invention there are provided methods of sequestering carbon dioxide that produce silicon dioxide as a byproduct. Silicon dioxide, also known as silica, is an oxide of silicon with a chemical formula of $SiO_2$ and is known for its hardness. Silica is most commonly found in nature as sand or quartz, as well as in the cell walls of diatoms. Silica is the most abundant mineral in the Earth's crust. This compound has many uses; some of these are briefly discussed below.

Silica is used primarily in the production of window glass, drinking glasses and bottled beverages. The majority of optical fibers for telecommunications are also made from silica. It is a primary raw material for many whiteware ceramics such as earthenware, stoneware and porcelain, as well as industrial Portland cement.

Silica is a common additive in the production of foods, where it is used primarily as a flow agent in powdered foods, or to absorb water in hygroscopic applications. In hydrated form, silica is used in toothpaste as a hard abrasive to remove tooth plaque. Silica is the primary component of diatomaceous earth which has many uses ranging from filtration to insect control. It is also the primary component of rice husk ash which is used, for example, in filtration and cement manufacturing.

Thin films of silica grown on silicon wafers via thermal oxidation methods can be quite beneficial in microelectronics, where they act as electric insulators with high chemical stability. In electrical applications, it can protect the silicon, store charge, block current, and even act as a controlled pathway to limit current flow.

Silica is typically manufactured in several forms including glass, crystal, gel, aerogel, fumed silica, and colloidal silica. By co-generating this mineral as part of carbon dioxide sequestration in some embodiments, this invention provides another source of this important product.

XIV. SEPARATION OF PRODUCTS

Separation processes may be employed to separate carbonate and bicarbonate products from the liquid solution and/or reaction mixture. By manipulating the basic concentration, temperature, pressure, reactor size, fluid depth, and degree of carbonation, precipitates of one or more carbonate and/or bicarbonate salts may be caused to occur. Alternatively, carbonate/bicarbonate products may be separated from solution by the exchange of heat energy with incoming flue-gases.

The exit liquid streams, depending upon reactor design, may include water, $CaCO_3$, $MgCO_3$, $Ca(HCO_3)_2$, $Mg(HCO_3)_2$, $Ca(OH)_2$, $Ca(OH)_2$, $NaOH$, $NaHCO_3$, $Na_2CO_3$, and other dissolved gases in various equilibria. Dissolved trace emission components such as $H_2SO_4$, $HNO_3$, and Hg may also be found. In one embodiment, removing/separating the water from the carbonate product involves adding heat energy to evaporate water from the mixture, for example, using a reboiler. Alternatively, retaining a partial basic solution and subsequently heating the solution in a separating chamber may be used to cause relatively pure carbonate salts to precipitate into a holding tank and the remaining hydroxide salts to recirculate back to the reactor. In some embodiments, pure carbonate, pure bicarbonate, and mixtures of the two in equilibrium concentrations and/or in a slurry or concentrated form may then be periodically transported to a truck/tank-car. In some embodiments, the liquid streams may be displaced to evaporation tanks/fields where the liquid, such as water, may be carried off by evaporation.

The release of gaseous products includes a concern whether hydroxide or oxide salts will be released safely, i.e., emitting "basic rain." Emission of such aerosolized caustic salts may be prevented in some embodiments by using a simple and inexpensive condenser/reflux unit.

In some embodiments, the carbonate salt may be precipitated using methods that are used separately or together with a water removal process. Various carbonate salt equilibria have characteristic ranges where, when the temperature is raised, a given carbonate salt, e.g., $CaCO_3$ will naturally precipitate and collect, which makes it amenable to be withdrawn as a slurry, with some fractional NaOH drawn off in the slurry.

XV. RECOVERY OF WASTE-HEAT

Because certain embodiments of the present invention are employed in the context of large emission of $CO_2$ in the form of flue-gas or other hot gases from combustion processes, such as those which occur at a power plant, there is ample opportunity to utilize this 'waste' heat, for example, for the conversion of Group 2 chlorides salts into Group 2 hydroxides. For instance, a typical incoming flue-gas temperature (after electro-static precipitation treatment, for instance) is approximately 300° C. Heat exchangers can lower that flue-gas to a point less than 300° C., while warming the water and/or Group 2 chloride salt to facilitate this conversion.

Generally, since the flue-gas that is available at power-plant exits at temperatures between 100° C. (scrubbed typical), 300° C. (after precipitation processing), and 900° C. (precipitation entrance), or other such temperatures, considerable waste-heat processing can be extracted by cooling the incoming flue-gas through heat-exchange with a power-recovery cycle, for example an ammonia-water cycle (e.g., a "Kalina" cycle), a steam cycle, or any such cycle that accomplishes the same thermodynamic means. Since some embodiments of the present invention rely upon DC power to accomplish the manufacture of the reagent/absorbent, the process can be directly powered, partially or wholly, by waste-heat recovery that is accomplished without the normal transformer losses associated with converting that DC power to AC power for other uses. Further, through the use of waste-heat-to-work engines, significant efficiencies can be accomplished without an electricity generation step being employed at all. In some conditions, these waste-heat recovery energy quantities may be found to entirely power embodiments of the present invention.

XVI. FURTHER EMBODIMENTS

As noted above, some embodiments of the apparatuses and methods of the present disclosure produce a number of useful intermediates, by-products, and final products from the various reaction steps, including hydrogen chloride, Group 2 carbonate salts, Group 2 hydroxide salts, etc. In some embodiments, some or all of these may be used in one or more of the methods described below. In some embodiments, some or all of one of the starting materials or intermediates employed in one or more of the steps described above are obtained using one or more of the methods outlined below.

A. Hydrogen Energy Recapture Loop

Several techniques may used recapture energy from the hydrogen generated by embodiments of the present invention. For example, the hydrogen may be co-burned with coal to improve coal-fired emissions. Another technique involves employing a hydrogen/oxygen fuel cell for the generation of DC electricity. Yet another technique involves the burning of hydrogen in a turbine connected to an electrical generator. Still another technique involves the mixing of hydrogen with natural gas and burning this mixture in a turbine designed for natural gas power generation and connected to an electrical generator. Any of these techniques may be used alone or in combination, in some cases, together with other techniques not specifically mentioned.

In one embodiment, commercial fuel-cell production of DC electricity may be advantageous due to the easy-to-handle and safe operations at sub-atmospheric pressures. Immediate consumption of the produced hydrogen may also directly reduce the electrical load cost for the brine electrolysis. Further, since the hydrogen-energy recovery cycle may be produced with off-peak electrical production, $H_2$ may be subsequently used to provide electricity during on-peak loads, the present disclosure provides for making reactants at low-cost while subsequently producing auxiliary high-cost on-peak electricity and simultaneously performing a decarbonation process. The economic utility of an $H_2$ energy recovery cycle to increase the peak power production of a plant by augmenting the current production with $H_2$ combustion capacity as either fuel or in a fuel cell may provide for the utility of a self-consumption basis.

B. Use of Chlorine for the Chlorination of Group 2 Silicates

In some embodiments the chlorine gas may be liquefied to hydrochloric acid that is then used to chlorinate Group 2 silicate minerals. Liquefaction of chlorine and subsequent use of the hydrochloric acid is particularly attractive especially in situations where the chlorine market is saturated. Liquefaction of chlorine may be accomplished according to equation 27:

$$Cl_2(g) + 2H_2O(l) + h\nu(363\ nm) \rightarrow 2HCl(l) + \tfrac{1}{2}O_2(g) \tag{27}$$

In some embodiments, the oxygen so produced may be returned to the air-inlet of the power plant itself, where it has been demonstrated throughout the course of power-industry investigations that enriched oxygen-inlet plants have (a) higher Carnot-efficiencies, (b) more concentrated $CO_2$ exit streams, (c) lower heat-exchange to warm inlet air, and (d) other advantages over non-oxygen-enhanced plants. In some embodiments, the oxygen may be utilized in a hydrogen/oxygen fuel cell. In some embodiments, the oxygen may serve as part of the oxidant in a turbine designed for natural gas power generation, for example, using a mixture of hydrogen and natural gas.

C. Use of Chlorine for the Chlorination of Group 2 Hydroxides

In some embodiments the chlorine gas may be reacted with a Group 2 hydroxide salts to yield a mixture of a chloride and a hypochlorite salts (equation 28). For example, HCl may be sold as a product and the Group 2 hydroxide salt may be used to remove excess chlorine.

$$Ca/Mg(OH)_2 + Cl_2 \rightarrow \tfrac{1}{2}Ca/Mg(OCl)_2 + \tfrac{1}{2}Ca/MgCl_2 + H_2O \tag{28}$$

The Group 2 hypochlorites may then be decomposed using a cobalt or nickel catalyst to form oxygen and the corresponding chloride (equation 29).

$$Ca/Mg(OCl)_2 \rightarrow Ca/MgCl_2 + O_2 \tag{29}$$

The calcium chloride and/or the magnesium chloride may then be recovered.

XVII. REMOVAL OF OTHER POLLUTANTS FROM SOURCE

In addition to removing $CO_2$ from the source, in some embodiments of the invention, the decarbonation conditions will also remove $SO_X$ and $NO_X$ and, to a lesser extent, mercury. In some embodiments of the present invention, the incidental scrubbing of $NO_X$, $SO_X$, and mercury compounds can assume greater economic importance; i.e., by employing embodiments of the present invention, coals that contain large amounts of these compounds can be combusted in the power plant with, in some embodiments, less resulting pollution than with higher-grade coals processed without the benefit of the $CO_2$ absorption process. Such principles and techniques are taught, for example, in U.S. Pat. No. 7,727,374, U.S. patent application Ser. No. 11/233,509, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, U.S. Provisional Application No. 61/288,242, filed Jan. 20, 2010, U.S. Provisional Application No. 61/362,607, filed Jul. 8, 2010, and International Application No. PCT/US08/77122, filed Sep. 19, 2008. The entire text of each of the above-referenced disclosures (including any appendices) is specifically incorporated by reference herein.

XVIII. EXAMPLES

The following examples are included to demonstrate some embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Process Simulation of Capture $CO_2$ from Flue Gas Using $CaCl_2$ to Form $CaCO_3$ One embodiment of the present invention was simulated using Aspen Plus v. 7.1 software using known reaction enthalpies, reaction free energies and defined parameters to determine mass and energy balances and suitable conditions for capturing $CO_2$ from a flue gas stream utilizing $CaCl_2$ and heat to form $CaCO_3$ product. These results show that it is possible to capture $CO_2$ from flue gas using inexpensive raw materials, $CaCl_2$ and water, to form $CaCO_3$.

Figure 5:
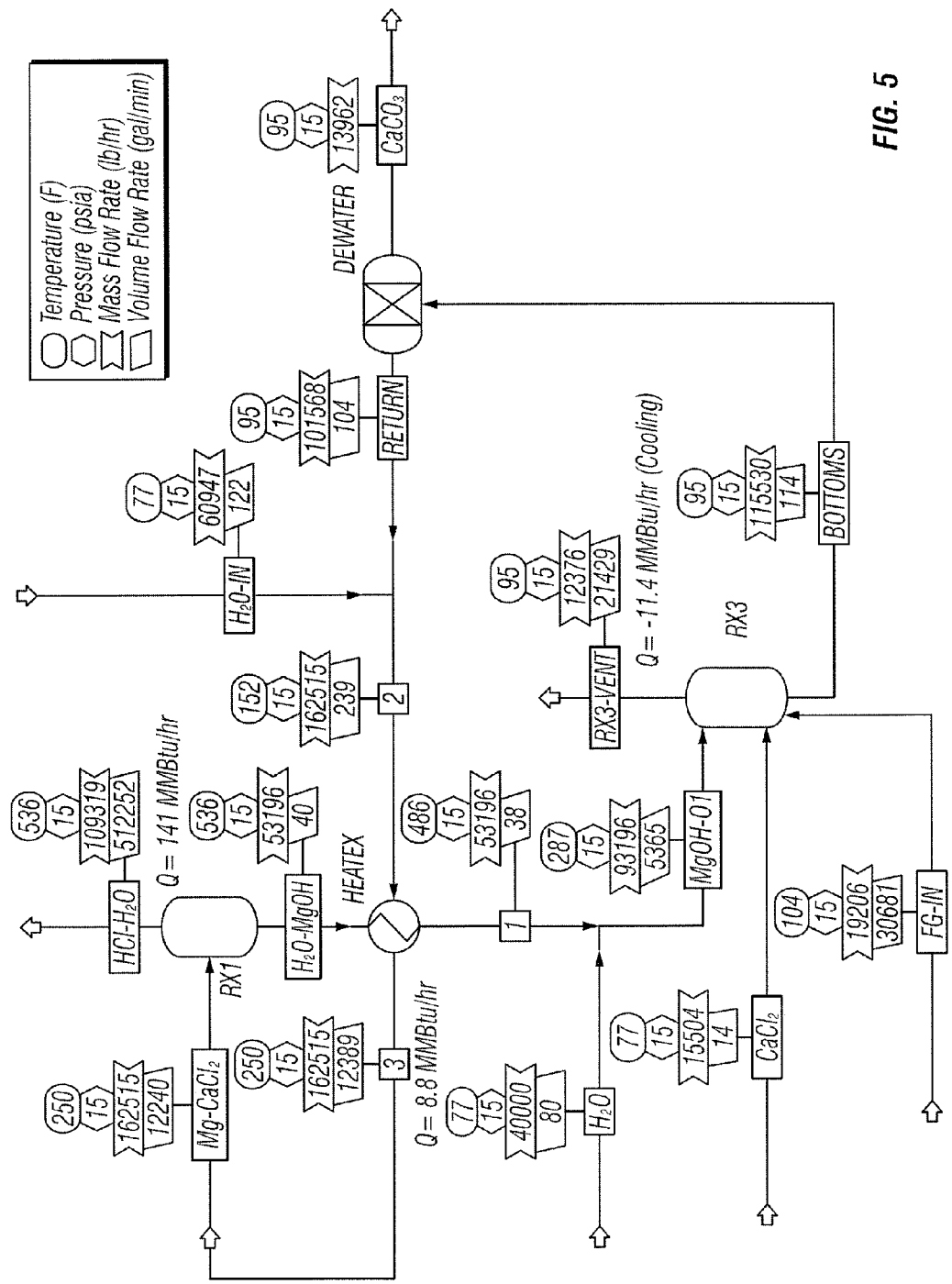
FIG. 5 is a process flow diagram showing parameters and results from a process simulation using Aspen Plus process software. In this embodiment, a 35% $MgCl_2$, 65% $H_2O$ solution is heated to 536° F. (280° C.), then the stream leaves in the stream labeled "$H_2O$—MgOH," which comprises a solution of $MgCl_2$ and solid $Mg(OH)_2$. Typically, when Mg(OH)Cl dissolves in water it forms $Mg(OH)_2$ (solid) and $MgCl_2$ (dissolved). Here the $MgCl_2$ is not used to absorb $CO_2$ directly, rather it is recycled. The net reaction is the capture of $CO_2$ from flue gas using inexpensive raw materials, $CaCl_2$ and water, to form $CaCO_3$. Results from the simulation suggest that it is efficient to recirculate a $MgCl_2$ stream and then to react it with $H_2O$ and heat to form $Mg(OH)_2$. One or more of the aforementioned compounds then reacts with a $CaCl_2/H_2O$ solution and $CO_2$ from the flue gas to ultimately form $CaCO_3$, which is filtered out of the stream. The resulting $MgCl_2$ formed is recycled to the first reactor to repeat the process.

Part of the defined parameters includes the process flow diagram shown in FIG. 5. Results from the simulation suggest that it is efficient to recirculate an $MgCl_2$ stream to react with $H_2O$ and heat to form $Mg(OH)_2$. This $Mg(OH)_2$ then reacts with a saturated $CaCl_2/H_2O$ solution and $CO_2$ from the flue gas to form $CaCO_3$, which is filtered out of the stream. The resulting $MgCl_2$ formed is recycled to the first reactor to begin the process again. This process is not limited to any particular source for $CaCl_2$. For example, it may be obtained from reacting calcium silicate with HCl to yield $CaCl_2$.

Constraints and parameters specified for this simulation include:

The reactions were run at 100% efficiencies with no losses. The simulations can be modified when pilot runs determine the reaction efficiencies.

Simulations did not account for impurities in the $CaCl_2$ feed stock or in any make-up $MgCl_2$ required due to losses from the system.

The results of this simulation indicate a preliminary net energy consumption of approximately 130 MM Btu/hr. Tables 2a and 2b provide mass and energy accounting for the various streams (the columns in the table) of the simulated process. Each stream corresponds to the stream of FIG. 5.

The process consists of two primary reaction sections and one solids filtration section. The first reactor heats $MgCl_2$/water solution causing it to break down into a $HCl/H_2O$ vapor stream and a liquid stream of $Mg(OH)_2$. The $HCl/H_2O$ vapor stream is sent to the HCl absorber column. The $Mg(OH)_2$ solution is sent to reactor 2 for further processing. The chemical reaction for this reactor can be represented by the following equation:

$$MgCl_2 + 2H_2O \rightarrow Mg(OH)_2 + 2HCl \qquad (30)$$

A $CaCl_2$ solution and a flue gas stream are added to the $MgCl_2$ in reactor 2. This reaction forms $CaCO_3$, $MgCl_2$ and water. The $CaCO_3$ precipitates and is removed in a filter or decanter. The remaining $MgCl_2$ and water are recycled to the first reactor. Additional water is added to complete the water balance required by the first reactor. The chemical reaction for this reactor can be represented by the following equation:

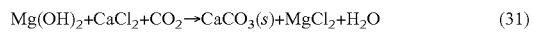

$$Mg(OH)_2 + CaCl_2 + CO_2 \rightarrow CaCO_3(s) + MgCl_2 + H_2O \qquad (31)$$

The primary feeds to this process are $CaCl_2$, flue gas ($CO_2$) and water. $MgCl_2$ in the system is used, reformed and recycled. The only $MgCl_2$ make-up required is to replace small amounts that leave the system with the $CaCO_3$ product, and small amounts that leave with the HCl/water product.

This process is a net energy user. There is cross heat exchange to recover the heat in high temperature streams to preheat the feed streams. Significant heat recovery may be obtained by reacting the concentrated HCl thus formed with silicate minerals.

TABLE 2a

Mass and Energy Accounting for Simulation of Capture $CO_2$ from Flue Gas Using $CaCl_2$ to form $CaCO_3$.

| | Process Stream Names | | | | | | | | |
|---|---|---|---|---|---|---|---|---|---|
| | 1 | 2 | 3 | BOTTOMS | $CaCl_2$ | $CaCO_3$ | FG-IN | $H_2O$ | $H_2O$—MgOH |
| Temperature F. | 485.8 | 151.6 | 250 | 95 | 77 | 95 | 104 | 0 | 536 |
| Pressure psia | 15 | 15 | 15 | 15 | 15 | 15 | 15 | 15 | 15 |
| Vapor Frac | 0 | 0 | 0.025 | 0 | 0 | | 1 | 0 | 0 |
| Mole Flow lbmol/hr | 1594.401 | 7655.248 | 7653.691 | 3568.272 | 139.697 | 139.502 | 611.154 | 2220.337 | 1594.401 |
| Mass Flow lb/hr | 53195.71 | 162514.8 | 162514.8 | 115530.1 | 15504 | 13962.37 | 19206 | 40000 | 53195.71 |
| Volume Flow gal/min | 38.289 | 238.669 | 12389.12 | 114.43 | 14.159 | | 30680.73 | 80.111 | 40.178 |
| Enthalpy MMBtu/hr | −214.568 | −918.028 | −909.155 | −574.405 | −47.795 | | −27.903 | −273.013 | −205.695 |

TABLE 2a-continued

Mass and Energy Accounting for Simulation of Capture $CO_2$ from Flue Gas Using $CaCl_2$ to form $CaCO_3$.

| | \multicolumn{9}{c}{Process Stream Names} | | | | | | | | |
|---|---|---|---|---|---|---|---|---|---|
| | 1 | 2 | 3 | BOTTOMS | $CaCl_2$ | $CaCO_3$ | FG-IN | $H_2O$ | $H_2O$—MgOH |
| $H_2O$ | 1473.175 | 105624.1 | 105603 | 33281.39 | | | 750.535 | 40000 | 1473.172 |
| $H_2$ | | | | | | | | | |
| $Cl_2$ | | | | | | | | | |
| HCl | trace | trace | 0.001 | trace | | | | | trace |
| $CO_2$ | | <0.001 | 0.091 | 0.005 | | | 6158.236 | | |
| CO | | | | | | | | | |
| $O_2$ | | 0.055 | 0.055 | 0.055 | | | 2116.894 | | |
| $N_2$ | | 0.137 | 0.137 | 0.137 | | | 10180.34 | | |
| $CaCl_2$ | | | | | 15504 | | | | |
| $Ca(OH)_2$ | | | | | | | | | |
| $CaCO_3$ | | | | | | | | | |
| $Mg(OH)_2$ | | | | | | | | | |
| $Mg(OH)Cl$ | | | | | | | | | |
| $MgCl_2$ | | | | | | | | | |
| $MgCO_3$ | | | | | | | | | |
| $Ca(O)Cl_2$ | | | | | | | | | |
| $CaCl_2O_2$ | | | | | | | | | |
| $Ca^{2+}$ | | 7.797 | trace | 7.797 | | | | | |
| $Mg^{2+}$ | 11114.84 | 14507.52 | 14506.86 | 11942.37 | | | | | 11115.59 |
| $H^+$ | <0.001 | trace | trace | trace | | | | trace | <0.001 |
| $CaOH^+$ | | <0.001 | trace | <0.001 | | | | | |
| $MgOH^+$ | 22.961 | 15.364 | 17.613 | 25.319 | | | | | 20.435 |
| HClO | | | | | | | | | |
| $MgCO_3$—3W | | | | | | | | | |
| $MgCl_2(s)$ | | | | | | | | | |
| $MgCl_2$—6W | | | | 21433.25 | | | | | |
| $MgCl_2$—4W | | | | | | | | | |
| $CaCl_2(s)$ | | | | | | | | | |
| $CaCO_3(s)$ | | | | 13962.37 | | 13962.37 | | | |
| $MgCO_3(s)$ | | 0.174 | | | | | | | |
| $CaCl_2$—6W | | | 42.623 | | | | | | |
| $CaCl_2$—4W | | | | | | | | | |
| $CaCl_2$—2W | | | | | | | | | |
| $MgCl_2$—2W | | | | | | | | | |
| $MgCl_2$—W | | | | | | | | | |
| $Ca(OH)_2(s)$ | | | | | | | | | |
| $Mg(OH)_2(s)$ | 8137.518 | 7.043 | 5.576 | 0.08 | | | | | 8139.306 |
| $ClO^-$ | | | | | | | | | |
| $HCO_3^-$ | | 0.001 | <0.001 | 0.119 | | | | | |
| $Cl^-$ | 32447.21 | 42352.6 | 42338.81 | 34877.24 | | | | | 32447.21 |
| $OH^-$ | <0.001 | 0.001 | 0.001 | <0.001 | | | | <0.001 | <0.001 |
| $CO_3^{2-}$ | | trace | trace | 0.001 | | | | | |
| $H_2O$ | 0.028 | 0.65 | 0.65 | 0.288 | | | 0.039 | 1 | 0.028 |
| $H_2$ | | | | | | | | | |
| $Cl_2$ | | | | | | | | | |
| HCl | trace | trace | 3 PPB | trace | | | | | trace |
| $CO_2$ | | trace | 563 PPB | 40 PPB | | | 0.321 | | |
| CO | | | | | | | | | |
| $O_2$ | | 336 PPB | 336 PPB | 473 PPB | | | 0.11 | | |
| $N_2$ | | 844 PPB | 844 PPB | 1 PPM | | | 0.53 | | |
| $CaCl_2$ | | | | | 1 | | | | |
| $Ca(OH)_2$ | | | | | | | | | |
| $CaCO_3$ | | | | | | | | | |
| $Mg(OH)_2$ | | | | | | | | | |
| $Mg(OH)Cl$ | | | | | | | | | |
| $MgCl_2$ | | | | | | | | | |
| $MgCO_3$ | | | | | | | | | |
| $Ca(O)Cl_2$ | | | | | | | | | |
| $CaCl_2O_2$ | | | | | | | | | |
| $Ca^{2+}$ | | 48 PPM | trace | 67 PPM | | | | | |
| $Mg^{2+}$ | 0.209 | 0.089 | 0.089 | 0.103 | | | | | 0.209 |
| $H^+$ | 1 PPB | trace | trace | trace | | | | trace | 5 PPB |
| $CAOH^+$ | | 1 PPB | trace | 1 PPB | | | | | |
| $MgOH^+$ | 432 PPM | 95 PPM | 108 PPM | 219 PPM | | | | | 384 PPM |
| HClO | | | | | | | | | |
| $MgCO_3$—3W | | | | | | | | | |
| $MgCl_2(s)$ | | | | | | | | | |
| $MgCl_2$—6W | | | | 0.186 | | | | | |
| $MgCl_2$—4W | | | | | | | | | |
| $CaCl_2(s)$ | | | | | | | | | |
| $CaCO_3(s)$ | | | | 0.121 | | 1 | | | |
| $MgCO_3(s)$ | | 1 PPM | | | | | | | |

TABLE 2a-continued

Mass and Energy Accounting for Simulation of Capture $CO_2$ from Flue Gas Using $CaCl_2$ to form $CaCO_3$.

| | Process Stream Names | | | | | | | | |
|---|---|---|---|---|---|---|---|---|---|
| | 1 | 2 | 3 | BOTTOMS | $CaCl_2$ | $CaCO_3$ | FG-IN | $H_2O$ | $H_2O$—MgOH |
| $CaCl_2$—6W | | | 262 PPM | | | | | | |
| $CaCl_2$—4W | | | | | | | | | |
| $CaCl_2$—2W | | | | | | | | | |
| $MgCl_2$—2W | | | | | | | | | |
| $MgCl_2$—W | | | | | | | | | |
| $Ca(OH)_2(s)$ | | | | | | | | | |
| $Mg(OH)_2(s)$ | 0.153 | 43 PPM | 34 PPM | 691 PPB | | | | | 0.153 |
| $ClO^-$ | | | | | | | | | |
| $HCO_3^-$ | | 5 PPB | trace | 1 PPM | | | | | |
| $Cl^-$ | 0.61 | 0.261 | 0.261 | 0.302 | | | | | 0.61 |
| $OH^-$ | trace | 6 PPB | 6 PPB | trace | | | | 2 PPB | trace |
| $CO_3^{2-}$ | | trace | trace | 12 PPB | | | | | |
| $H_2O$ | 81.774 | 5863.026 | 5861.857 | 1847.398 | | | 41.661 | 2220.337 | 81.773 |
| $H_2$ | | | | | | | | | |
| $Cl_2$ | | | | | | | | | |
| HCl | trace | trace | <0.001 | trace | | | | | trace |
| $CO_2$ | | trace | 0.002 | <0.001 | | | 139.929 | | |
| CO | | | | | | | | | |
| $O_2$ | | 0.002 | 0.002 | 0.002 | | | 66.155 | | |
| $N_2$ | | 0.005 | 0.005 | 0.005 | | | 363.408 | | |
| $CaCl_2$ | | | | | 139.697 | | | | |
| $Ca(OH)_2$ | | | | | | | | | |
| $CaCO_3$ | | | | | | | | | |
| $Mg(OH)_2$ | | | | | | | | | |
| Mg(OH)Cl | | | | | | | | | |
| $MgCl_2$ | | | | | | | | | |
| $MgCO_3$ | | | | | | | | | |
| $Ca(O)Cl_2$ | | | | | | | | | |
| $CaCl_2O_2$ | | | | | | | | | |
| $Ca^{2+}$ | | 0.195 | trace | 0.195 | | | | | |
| $Mg^{2+}$ | 457.328 | 596.922 | 596.894 | 491.376 | | | | | 457.358 |
| $H^+$ | <0.001 | trace | trace | trace | | | | trace | <0.001 |
| $CAOH^+$ | | trace | trace | trace | | | | | |
| $MgOH^+$ | 0.556 | 0.372 | 0.426 | 0.613 | | | | | 0.495 |
| HClO | | | | | | | | | |
| $MgCO_3$—3W | | | | | | | | | |
| $MgCl_2(s)$ | | | | | | | | | |
| $MgCl_2$—6W | | | | 105.426 | | | | | |
| $MgCl_2$—4W | | | | | | | | | |
| $CaCl_2(s)$ | | | | | | | | | |
| $CaCO_3(s)$ | | | | 139.502 | | 139.502 | | | |
| $MgCO_3(s)$ | | 0.002 | | | | | | | |
| $CaCl_2$—6W | | | 0.195 | | | | | | |
| $CaCl_2$—4W | | | | | | | | | |
| $CaCl_2$—2W | | | | | | | | | |
| $MgCl_2$—2W | | | | | | | | | |
| $MgCl_2$—W | | | | | | | | | |
| $Ca(OH)_2(s)$ | | | | | | | | | |
| $Mg(OH)_2(s)$ | 139.533 | 0.121 | 0.096 | 0.001 | | | | | 139.564 |
| $ClO^-$ | | | | | | | | | |
| $HCO_3^-$ | | <0.001 | trace | 0.002 | | | | | |
| $Cl^-$ | 915.211 | 1194.604 | 1194.215 | 983.753 | | | | | 915.211 |
| $OH^-$ | trace | <0.001 | <0.001 | trace | | | | trace | trace |
| $CO_3^{2-}$ | | trace | trace | <0.001 | | | | | |
| $H_2O$ | 0.051 | 0.766 | 0.766 | 0.518 | | | 0.068 | 1 | 0.051 |
| $H_2$ | | | | | | | | | |
| $Cl_2$ | | | | | | | | | |
| HCl | trace | trace | 2 PPB | trace | | | | | trace |
| $CO_2$ | | trace | 271 PPB | 29 PPB | | | 0.229 | | |
| CO | | | | | | | | | |
| $O_2$ | | 223 PPB | 223 PPB | 478 PPB | | | 0.108 | | |
| $N_2$ | | 640 PPB | 640 PPB | 1 PPM | | | 0.595 | | |
| $CaCl_2$ | | | | | 1 | | | | |
| $Ca(OH)_2$ | | | | | | | | | |
| $CaCO_3$ | | | | | | | | | |
| $Mg(OH)_2$ | | | | | | | | | |
| Mg(OH)Cl | | | | | | | | | |
| $MgCl_2$ | | | | | | | | | |
| $MgCO_3$ | | | | | | | | | |
| $Ca(O)Cl_2$ | | | | | | | | | |
| $CaCl_2O_2$ | | | | | | | | | |
| $Ca^{2+}$ | | 25 PPM | trace | 55 PPM | | | | | |
| $Mg^{2+}$ | 0.287 | 0.078 | 0.078 | 0.138 | | | | | 0.287 |
| $H^+$ | 49 PPB | trace | trace | trace | | | | 2 PPB | 156 PPB |

TABLE 2a-continued

Mass and Energy Accounting for Simulation of Capture $CO_2$ from Flue Gas Using $CaCl_2$ to form $CaCO_3$.

| | Process Stream Names | | | | | | | | |
|---|---|---|---|---|---|---|---|---|---|
| | 1 | 2 | 3 | BOTTOMS | $CaCl_2$ | $CaCO_3$ | FG-IN | $H_2O$ | $H_2O$—MgOH |
| $CaOH^+$ | | trace | trace | trace | | | | | |
| $MgOH^+$ | 349 PPM | 49 PPM | 56 PPM | 172 PPM | | | | | 310 PPM |
| HClO | | | | | | | | | |
| $MgCO_3$—3W | | | | | | | | | |
| $MgCl_2(s)$ | | | | | | | | | |
| $MgCl_2$—6W | | | | 0.03 | | | | | |
| $MgCl_2$—4W | | | | | | | | | |
| $CaCl_2(s)$ | | | | | | | | | |
| $CaCO_3(s)$ | | | | 0.039 | | 1 | | | |
| $MgCO_3(s)$ | | 269 PPB | | | | | | | |
| $CaCl_2$—6W | | | 25 PPM | | | | | | |
| $CaCl_2$—4W | | | | | | | | | |
| $CaCl_2$—2W | | | | | | | | | |
| $MgCl_2$—2W | | | | | | | | | |
| $MgCl_2$—W | | | | | | | | | |
| $Ca(OH)_2(s)$ | | | | | | | | | |
| $Mg(OH)_2(s)$ | 0.088 | 16 PPM | 12 PPM | 383 PPB | | | | | 0.088 |
| $ClO^-$ | | | | | | | | | |
| $HCO_3^-$ | | 2 PPB | trace | 547 PPB | | | | | |
| $Cl^-$ | 0.574 | 0.156 | 0.156 | 0.276 | | | | | 0.574 |
| $OH^-$ | 1 PPB | 8 PPB | 7 PPB | trace | | | | 2 PPB | 1 PPB |
| $CO_3^{2-}$ | | trace | trace | 6 PPB | | | | | |
| PH | 5.319 | 6.955 | 5.875 | 7.557 | | | | 6.999 | 5.152 |

TABLE 2b

Mass and Energy Accounting for Simulation of Capture $CO_2$ from Flue Gas Using $CaCl_2$ to form $CaCO_3$.

| | Process Stream Names | | | | | |
|---|---|---|---|---|---|---|
| | $H_2O$—IN | HCl—$H_2O$ | Mg—$CaCl_2$ | MgOH—O1 | RETURN | RX3-VENT |
| Temperature F. | 77 | 536 | 250 | 286.8 | 95 | 95 |
| Pressure psia | 15 | 15 | 15 | 15 | 15 | 15 |
| Vapor Frac | 0 | 1 | 0.025 | 0.021 | 0 | 1 |
| Mole Flow lbmol/hr | 3383.073 | 5781.846 | 7655.866 | 3814.738 | 3427.371 | 433.305 |
| Mass Flow lb/hr | 60947 | 109319.3 | 162515 | 93195.71 | 101567.8 | 12375.59 |
| Volume Flow gal/min | 122.063 | 512251.6 | 12240.14 | 5364.891 | 104.123 | 21428.56 |
| Enthalpy MMBtu/hr | −415.984 | −561.862 | −909.177 | −487.581 | −502.044 | −0.364 |
| $H_2O$ | 60947 | 99124.11 | 105634.7 | 41473.17 | 33262.52 | 59.861 |
| $H_2$ | | | | | | |
| $Cl_2$ | | | | | | |
| HCl | | 10195.18 | 0.087 | 0.009 | trace | trace |
| $CO_2$ | | | | | trace | 18.689 |
| CO | | | | | | |
| $O_2$ | | | | | 0.055 | 2116.839 |
| $N_2$ | | | | | 0.137 | 10180.2 |
| $CaCl_2$ | | | | | | |
| $Ca(OH)_2$ | | | | | | |
| $CaCO_3$ | | | | | | |
| $Mg(OH)_2$ | | | | | | |
| $Mg(OH)Cl$ | | | | | | |
| $MgCl_2$ | | | | | | |
| $MgCO_3$ | | | | | | |
| $Ca(O)Cl_2$ | | | | | | |
| $CaCl_2O_2$ | | | | | | |
| $Ca^{2+}$ | | | | | 7.797 | |
| $Mg^{2+}$ | | | 14519.48 | 11116.3 | 11938.09 | |
| $H^+$ | trace | | <0.001 | trace | trace | |
| $CaOH^+$ | | | | | <0.001 | |
| $MgOH^+$ | | | 0.112 | 17.999 | 25.309 | |
| HClO | | | | | | |
| $MgCO_3$—3W | | | | | | |
| $MgCl_2(s)$ | | | | | | |

TABLE 2b-continued

Mass and Energy Accounting for Simulation of Capture CO₂ from Flue Gas Using CaCl₂ to form CaCO₃.

| | Process Stream Names | | | | | |
|---|---|---|---|---|---|---|
| | H₂O—IN | HCl—H₂O | Mg—CaCl₂ | MgOH—O1 | RETURN | RX3-VENT |
| MgCl₂—6W | | | | | 21468.81 | |
| MgCl₂—4W | | | | | | |
| CaCl₂(s) | | | | | | |
| CaCO₃(s) | | | | | | |
| MgCO₃(s) | | | | | 0.175 | |
| CaCl₂—6W | | | | | | |
| CaCl₂—4W | | | | | | |
| CaCl₂—2W | | | | | | |
| MgCl₂—2W | | | | | | |
| MgCl₂—W | | | | | | |
| Ca(OH)₂(s) | | | | | | |
| Mg(OH)₂(s) | | | | 8141.025 | 0.024 | |
| ClO⁻ | | | | | | |
| HCO₃⁻ | | | | | trace | |
| Cl⁻ | | | 42360.62 | 32447.2 | 34864.84 | |
| OH⁻ | <0.001 | | trace | <0.001 | <0.001 | |
| CO₃²⁻ | | | | | trace | |
| Mass Frac | | | | | | |
| H₂O | 1 | 0.907 | 0.65 | 0.445 | 0.327 | 0.005 |
| H₂ | | | | | | |
| Cl₂ | | | | | | |
| HCl | | 0.093 | 534 PPB | 92 PPB | trace | trace |
| CO₂ | | | | | trace | 0.002 |
| CO | | | | | | |
| O₂ | | | | | 538 PPB | 0.171 |
| N₂ | | | | | 1 PPM | 0.823 |
| CaCl₂ | | | | | | |
| Ca(OH)₂ | | | | | | |
| CaCO₃ | | | | | | |
| Mg(OH)₂ | | | | | | |
| Mg(OH)Cl | | | | | | |
| MgCl₂ | | | | | | |
| MgCO₃ | | | | | | |
| Ca(O)Cl₂ | | | | | | |
| CaCl₂O₂ | | | | | | |
| Ca²⁺ | | | | | 77 PPM | |
| Mg²⁺ | | | 0.089 | 0.119 | 0.118 | |
| H⁺ | trace | | 2 PPB | trace | trace | |
| CaOH⁺ | | | | | 1 PPB | |
| MgOH⁺ | | | 689 PPB | 193 PPM | 249 PPM | |
| HClO | | | | | | |
| MgCO₃—3W | | | | | | |
| MgCl₂(s) | | | | | | |
| MgCl₂—6W | | | | | 0.211 | |
| MgCl₂—4W | | | | | | |
| CaCl₂(s) | | | | | | |
| CaCO₃(s) | | | | | | |
| MgCO₃(s) | | | | | 2 PPM | |
| CaCl₂—6W | | | | | | |
| CaCl₂—4W | | | | | | |
| CaCl₂—2W | | | | | | |
| MgCl₂—2W | | | | | | |
| MgCl₂—W | | | | | | |
| Ca(OH)₂(s) | | | | | | |
| Mg(OH)₂(s) | | | | 0.087 | 240 PPB | |
| ClO⁻ | | | | | | |
| HCO₃⁻ | | | | | trace | |
| Cl⁻ | | | 0.261 | 0.348 | 0.343 | |
| OH⁻ | 2 PPB | | trace | 2 PPB | trace | |
| CO₃²⁻ | | | | | trace | |
| H₂O | 3383.073 | 5502.224 | 5863.617 | 2302.111 | 1846.35 | 3.323 |
| H₂ | | | | | | |
| Cl₂ | | | | | | |
| HCl | | 279.622 | 0.002 | <0.001 | trace | trace |
| CO₂ | | | | | trace | 0.425 |
| CO | | | | | | |
| O₂ | | | | | 0.002 | 66.154 |

TABLE 2b-continued

Mass and Energy Accounting for Simulation of Capture $CO_2$ from Flue Gas Using $CaCl_2$ to form $CaCO_3$.

| | Process Stream Names | | | | | |
|---|---|---|---|---|---|---|
| | $H_2O$—IN | HCl—$H_2O$ | Mg—$CaCl_2$ | MgOH—O1 | RETURN | RX3-VENT |
| $N_2$ | | | | | 0.005 | 363.404 |
| $CaCl_2$ | | | | | | |
| $Ca(OH)_2$ | | | | | | |
| $CaCO_3$ | | | | | | |
| $Mg(OH)_2$ | | | | | | |
| Mg(OH)Cl | | | | | | |
| $MgCl_2$ | | | | | | |
| $MgCO_3$ | | | | | | |
| $Ca(O)Cl_2$ | | | | | | |
| $CaCl_2O_2$ | | | | | | |
| $Ca^{2+}$ | | | | | 0.195 | |
| $Mg^{2+}$ | | | 597.414 | 457.388 | 491.201 | |
| $H^+$ | trace | | <0.001 | trace | trace | |
| $CaOH^+$ | | | | | trace | |
| $MgOH^+$ | | | 0.003 | 0.436 | 0.613 | |
| HClO | | | | | | |
| $MgCO_3$—3W | | | | | | |
| $MgCl_2$(s) | | | | | | |
| $MgCl_2$—6W | | | | | 105.601 | |
| $MgCl_2$—4W | | | | | | |
| $CaCl_2$(s) | | | | | | |
| $CaCO_3$(s) | | | | | | |
| $MgCO_3$(s) | | | | | 0.002 | |
| $CaCl_2$—6W | | | | | | |
| $CaCl_2$—4W | | | | | | |
| $CaCl_2$—2W | | | | | | |
| $MgCl_2$—2W | | | | | | |
| $MgCl_2$—W | | | | | | |
| $Ca(OH)_2$(s) | | | | | | |
| $Mg(OH)_2$(s) | | | | 139.593 | <0.001 | |
| $ClO^-$ | | | | | | |
| $HCO_3^-$ | | | | | trace | |
| $Cl^-$ | | | 1194.83 | 915.211 | 983.403 | |
| $OH^-$ | trace | | trace | trace | trace | |
| $CO_3^{2-}$ | | | | | trace | |
| $H_2O$ | 1 | 0.952 | 0.766 | 0.603 | 0.539 | 0.008 |
| $H_2$ | | | | | | |
| $Cl_2$ | | | | | | |
| HCl | | 0.048 | 311 PPB | 62 PPB | trace | trace |
| $CO_2$ | | | | | trace | 980 PPM |
| CO | | | | | | |
| $O_2$ | | | | | 498 PPB | 0.153 |
| $N_2$ | | | | | 1 PPM | 0.839 |
| $CaCl_2$ | | | | | | |
| $Ca(OH)_2$ | | | | | | |
| $CaCO_3$ | | | | | | |
| $Mg(OH)_2$ | | | | | | |
| Mg(OH)Cl | | | | | | |
| $MgCl_2$ | | | | | | |
| $MgCO_3$ | | | | | | |
| $Ca(O)Cl_2$ | | | | | | |
| $CaCl_2O_2$ | | | | | | |
| $Ca^{2+}$ | | | | | 57 PPM | |
| $Mg^{2+}$ | | | 0.078 | 0.12 | 0.143 | |
| $H^+$ | 2 PPB | | 43 PPB | trace | trace | |
| $CaOH^+$ | | | | | trace | |
| $MgOH^+$ | | | 354 PPB | 114 PPM | 179 PPM | |
| HClO | | | | | | |
| $MgCO_3$—3W | | | | | | |
| $MgCl_2$(s) | | | | | | |
| $MgCl_2$—6W | | | | | 0.031 | |
| $MgCl_2$—4W | | | | | | |
| $CaCl_2$(s) | | | | | | |
| $CaCO_3$(s) | | | | | | |
| $MgCO_3$(s) | | | | | 607 PPB | |
| $CaCl_2$—6W | | | | | | |
| $CaCl_2$—4W | | | | | | |
| $CaCl_2$—2W | | | | | | |
| $MgCl_2$—2W | | | | | | |
| $MgCl_2$—W | | | | | | |
| $Ca(OH)_2$(s) | | | | | | |

TABLE 2b-continued

Mass and Energy Accounting for Simulation of Capture $CO_2$ from Flue Gas Using $CaCl_2$ to form $CaCO_3$.

| | Process Stream Names | | | | | |
|---|---|---|---|---|---|---|
| | $H_2O$—IN | HCl—$H_2O$ | Mg—$CaCl_2$ | MgOH—O1 | RETURN | RX3-VENT |
| $Mg(OH)_2(s)$ | | | | 0.037 | 122 PPB | |
| $ClO^-$ | | | | | | |
| $HCO_3^-$ | | | | | trace | |
| $Cl^-$ | | | 0.156 | 0.24 | 0.287 | |
| $OH^-$ | 2 PPB | | trace | 2 PPB | trace | |
| $CO_3^{2-}$ | | | | | trace | |
| PH | 6.999 | | 3.678 | 5.438 | 7.557 | |

Example 2

(Case 1)—Process Simulation of Magnesium Ion Catalyzed Capture $CO_2$ from Flue Gas Using $CaCl_2$ to Form $CaCO_3$ Results from the simulation suggest that it is efficient to heat a $MgCl_2.6H_2O$ stream in three separate dehydration reactions, each in its own chamber, followed by a decomposition reaction, also in its own chamber, to form $Mg(OH)Cl$ and HCl, i.e. total of four chambers. The $Mg(OH)Cl$ is reacted with $H_2O$ to form $MgCl_2$ and $Mg(OH)_2$, which then reacts with a saturated $CaCl_2/H_2O$ solution and $CO_2$ from the flue gas to form $CaCO_3$, which is filtered out of the stream. The resulting $MgCl_2.6H_2O$ formed is recycled along with the earlier product to the first reactor to begin the process again.

This process is not limited to any particular source for $CaCl_2$. For example, it may be obtained from reacting calcium silicate with HCl to yield $CaCl_2$.

Constraints and parameters specified for this simulation include:
  The reactions were run at 100% efficiencies with no losses. The simulations can be modified when pilot runs determine the reaction efficiencies.
  Simulations did not account for impurities in the $CaCl_2$ feed stock or in any make-up $MgCl_2$ required due to losses from the system.
  Part of the defined parameters include the process flow diagram shown in FIG. 6.

The results of this simulation indicate a preliminary net energy consumption of 5946 kwh/tonne $CO_2$. Table 3 provides mass and energy accounting for the various streams of the simulated process. Each stream corresponds to the stream of FIG. 6.

The process consists of two primary reactors and one solids filtration section. The first reactor heats $MgCl_2.6H_2O$ causing it to break down into a HCl/$H_2O$ vapor stream and a solid stream of $Mg(OH)Cl$. The HCl/$H_2O$ vapor stream is sent to a heat exchanger to recover extra heat. The $Mg(OH)_2$ formed from the $Mg(OH)Cl$ is sent to reactor 2 for further processing. Chemical reaction(s) occurring in this reactor include the following:

$$MgCl_2.6H_2O + \Delta \rightarrow Mg(OH)Cl + 5H_2O\uparrow + HCl\uparrow \quad (32)$$

$$2Mg(OH)Cl(aq) \rightarrow Mg(OH)_2 + MgCl_2 \quad (33)$$

A $CaCl_2$ solution and a flue gas stream are added to the $Mg(OH)_2$ in reactor 2. This reaction forms $CaCO_3$, $MgCl_2$ and water. The $CaCO_3$ precipitates and is removed in a filter or decanter. The remaining $MgCl_2$ and water are recycled to the first reactor. Additional water is added to complete the water balance required by the first reactor. Chemical reaction(s) occurring in this reactor include the following:

$$Mg(OH)_2 + CaCl_2 + CO_2 \rightarrow CaCO_3\downarrow(s) + MgCl_2 + H_2O \quad (34)$$

The primary feeds to this process are $CaCl_2$, flue gas ($CO_2$) and water. $MgCl_2$ in the system is used, reformed and recycled. The only $MgCl_2$ make-up required is to replace small amounts that leave the system with the $CaCO_3$ product, and small amounts that leave with the HCl/water product.

This process is a net energy user. The amount of energy is under investigation and optimization. There is cross heat exchange to recover the heat in high temperature streams to preheat the feed streams.

The steps for this process (Case 1) are summarized below:

| CASE 1 | |
|---|---|
| 3 STEP Dehydration then Decomposition | |
| Hexahydrate is dehydrated in 3 separate chambers. Step 1 hex to tetra, Step 2 tetra to di, Step 3 di to mono. Monohydrate is decomposed into 80% Mg(OH)Cl 20% $MgCl_2$ in a fourth chamber. | |
| $CO_2$ Absorbed | 53333 MTPY |
| $CaCl_2$ | 134574 MTPY |
| HCl Dry | 88368 MTPY |
| $CaCO_3$ | 105989 MTPY |
| Hexahydrate recycled | 597447 MTPY |
| HEX TO TETRA (100° C.) | 1757 kWh/tonne $CO_2$ |
| TETRA TO DI (125 C. °) | 2135 kWh/tonne $CO_2$ |
| DI TO MONO (160° C. & HCl PP) | 1150 kWh/tonne $CO_2$ |
| DECOMPOSITION (130° C.) TO 80% Mg(OH)Cl 20% $MgCl_2$ YIELDS 90% HCl VAPOR | 1051 kWh/tonne $CO_2$ |
| | 0.9 MW |
| Heat Recovery from 28% HCl vapor | 148 kWh/tonne $CO_2$ |
| TOTAL | 5946 kWh/tonne $CO_2$ |

TABLE 3a

Mass and Energy Accounting for Case 1 Simulation.

| | Process Stream Names | | | | | | | |
|---|---|---|---|---|---|---|---|---|
| | $CaCl_2$ | $CaCO_3$ | FLUEGAS | $H_2O$ | $H_2O$-1 | $H_2O$-2 | HCl-PP | HCl VAPOR |
| Temperature C. | 25 | 95 | 104 | 25 | 100 | 125 | 160 | 130 |
| Pressure psia | 14.7 | 14.7 | 15.78 | 14.7 | 16.166 | 16.166 | 16.166 | 14.696 |

TABLE 3a-continued

Mass and Energy Accounting for Case 1 Simulation.

| | Process Stream Names | | | | | | | |
|---|---|---|---|---|---|---|---|---|
| | $CaCl_2$ | $CaCO_3$ | FLUEGAS | $H_2O$ | $H_2O$-1 | $H_2O$-2 | HCl-PP | HCl VAPOR |
| Mass VFrac | 0 | 0 | 1 | 0 | 1 | 1 | 1 | 1 |
| Mass SFrac | 1 | 1 | 0 | 0 | 0 | 0 | 0 | 0 |
| Mass Flow tonne/year | 134573.943 | 121369.558 | 166332.6 | 290318.99 | 105883.496 | 105890.399 | 17179.526 | 97647.172 |
| Volume Flow gal/min | 30.929 | 22.514 | 76673.298 | 8099.644 | 82228.086 | 87740.919 | 10242.935 | 48861.42 |
| Enthalpy MW | −30.599 | −46.174 | −17.479 | −146.075 | −44.628 | −44.47 | −3.258 | −10.757 |
| Density lb/cuft | 136.522 | 169.146 | 0.068 | 1.125 | 0.04 | 0.038 | 0.053 | 0.063 |
| $H_2O$ | 0 | 0 | 6499.971 | 290318.99 | 105883.496 | 105885.779 | 5681.299 | 9278.695 |
| $H_2$ | 0 | 0 | 0 | 0 | 0 | 0 | 0 | 0 |
| $Cl_2$ | 0 | 0 | 0 | 0 | 0 | 0 | 0 | 0 |
| HCl | 0 | 0 | 0 | 0 | 0 | 4.62 | 11498.227 | 88368.477 |
| $CO_2$ | 0 | 0 | 53333.098 | 0 | 0 | 0 | 0 | 0 |
| CO | 0 | 0 | 0 | 0 | 0 | 0 | 0 | 0 |
| $O_2$ | 0 | 0 | 18333.252 | 0 | 0 | 0 | 0 | 0 |
| $N_2$ | 0 | 0 | 88166.278 | 0 | 0 | 0 | 0 | 0 |
| $CaCl_2$ | 134573.943 | 80.499 | 0 | 0 | 0 | 0 | 0 | 0 |
| $Ca(OH)_2$ | 0 | 0 | 0 | 0 | 0 | 0 | 0 | 0 |
| $CaCO_3$ | 0 | 121289.059 | 0 | 0 | 0 | 0 | 0 | 0 |
| $MgCO_3$ | 0 | 0 | 0 | 0 | 0 | 0 | 0 | 0 |
| $Ca(O)Cl_2$ | 0 | 0 | 0 | 0 | 0 | 0 | 0 | 0 |
| $MgCl_2$ | 0 | 0 | 0 | 0 | 0 | 0 | 0 | 0 |
| $MgCl_2$*W | 0 | 0 | 0 | 0 | 0 | 0 | 0 | 0 |
| $MgCl_2$*2W | 0 | 0 | 0 | 0 | 0 | 0 | 0 | 0 |
| $MgCl_2$*4W | 0 | 0 | 0 | 0 | 0 | 0 | 0 | 0 |
| $MgCl_2$*6W | 0 | 0 | 0 | 0 | 0 | 0 | 0 | 0 |
| Mg(OH)Cl | 0 | 0 | 0 | 0 | 0 | 0 | 0 | 0 |
| $Mg(OH)_2$ | 0 | 0 | 0 | 0 | 0 | 0 | 0 | 0 |
| MgO | 0 | 0 | 0 | 0 | 0 | 0 | 0 | 0 |
| $MgHCO_3^+$ | 0 | 0 | 0 | 0 | 0 | 0 | 0 | 0 |
| $H_2O$ | 0 | 0 | 0.039 | 1 | 1 | 1 | 0.331 | 0.095 |
| $H_2$ | 0 | 0 | 0 | 0 | 0 | 0 | 0 | 0 |
| $Cl_2$ | 0 | 0 | 0 | 0 | 0 | 0 | 0 | 0 |
| HCl | 0 | 0 | 0 | 0 | 0 | 0 | 0.669 | 0.905 |
| $CO_2$ | 0 | 0 | 0.321 | 0 | 0 | 0 | 0 | 0 |
| CO | 0 | 0 | 0 | 0 | 0 | 0 | 0 | 0 |
| $O_2$ | 0 | 0 | 0.11 | 0 | 0 | 0 | 0 | 0 |
| $N_2$ | 0 | 0 | 0.53 | 0 | 0 | 0 | 0 | 0 |
| $CaCl_2$ | 1 | 0.001 | 0 | 0 | 0 | 0 | 0 | 0 |
| $Ca(OH)_2$ | 0 | 0 | 0 | 0 | 0 | 0 | 0 | 0 |
| $CaCO_3$ | 0 | 0.999 | 0 | 0 | 0 | 0 | 0 | 0 |
| $MgCO_3$ | 0 | 0 | 0 | 0 | 0 | 0 | 0 | 0 |
| $Ca(O)Cl_2$ | 0 | 0 | 0 | 0 | 0 | 0 | 0 | 0 |
| $MgCl_2$ | 0 | 0 | 0 | 0 | 0 | 0 | 0 | 0 |
| $MgCl_2$*W | 0 | 0 | 0 | 0 | 0 | 0 | 0 | 0 |
| $MgCl_2$*2W | 0 | 0 | 0 | 0 | 0 | 0 | 0 | 0 |
| $MgCl_2$*4W | 0 | 0 | 0 | 0 | 0 | 0 | 0 | 0 |
| $MgCl_2$*6W | 0 | 0 | 0 | 0 | 0 | 0 | 0 | 0 |
| Mg(OH)Cl | 0 | 0 | 0 | 0 | 0 | 0 | 0 | 0 |
| $Mg(OH)_2$ | 0 | 0 | 0 | 0 | 0 | 0 | 0 | 0 |
| MgO | 0 | 0 | 0 | 0 | 0 | 0 | 0 | 0 |
| $MgHCO_3^+$ | 0 | 0 | 0 | 0 | 0 | 0 | 0 | 0 |
| $H_2O$ | 0 | 0 | 11.441 | 511.008 | 186.372 | 186.376 | 10 | 16.332 |
| $H_2$ | 0 | 0 | 0 | 0 | 0 | 0 | 0 | 0 |
| $Cl_2$ | 0 | 0 | 0 | 0 | 0 | 0 | 0 | 0 |
| HCl | 0 | 0 | 0 | 0 | 0 | 0.004 | 10 | 76.854 |
| $CO_2$ | 0 | 0 | 38.427 | 0 | 0 | 0 | 0 | 0 |
| CO | 0 | 0 | 0 | 0 | 0 | 0 | 0 | 0 |
| $O_2$ | 0 | 0 | 18.168 | 0 | 0 | 0 | 0 | 0 |
| $N_2$ | 0 | 0 | 99.8 | 0 | 0 | 0 | 0 | 0 |
| $CaCl_2$ | 38.45 | 0.023 | 0 | 0 | 0 | 0 | 0 | 0 |
| $Ca(OH)_2$ | 0 | 0 | 0 | 0 | 0 | 0 | 0 | 0 |
| $CaCO_3$ | 0 | 38.427 | 0 | 0 | 0 | 0 | 0 | 0 |
| $MgCO_3$ | 0 | 0 | 0 | 0 | 0 | 0 | 0 | 0 |
| $Ca(O)Cl_2$ | 0 | 0 | 0 | 0 | 0 | 0 | 0 | 0 |
| $MgCl_2$ | 0 | 0 | 0 | 0 | 0 | 0 | 0 | 0 |
| $MgCl_2$*W | 0 | 0 | 0 | 0 | 0 | 0 | 0 | 0 |
| $MgCl_2$*2W | 0 | 0 | 0 | 0 | 0 | 0 | 0 | 0 |
| $MgCl_2$*4W | 0 | 0 | 0 | 0 | 0 | 0 | 0 | 0 |
| $MgCl_2$*6W | 0 | 0 | 0 | 0 | 0 | 0 | 0 | 0 |
| Mg(OH)Cl | 0 | 0 | 0 | 0 | 0 | 0 | 0 | 0 |
| $Mg(OH)_2$ | 0 | 0 | 0 | 0 | 0 | 0 | 0 | 0 |
| MgO | 0 | 0 | 0 | 0 | 0 | 0 | 0 | 0 |
| $MgHCO_3^+$ | 0 | 0 | 0 | 0 | 0 | 0 | 0 | 0 |

TABLE 3b

Mass and Energy Accounting for Case 1 Simulation.

| | Process Stream Names | | | | | | | | |
|---|---|---|---|---|---|---|---|---|---|
| | $MgCl_2$—2W | $MgCl_2$—4W | $MgCl_2$—6W | RECYCIE1 | RX2-VENT | SLURRY | SOLIDS-1 | SOLIDS-2 | VAPOR |
| Temperature ° C. | 125 | 100 | 104 | 95 | 95 | 95 | 160 | 130 | 160 |
| Pressure psia | 16.166 | 16.166 | 14.696 | 14.7 | 14.7 | 14.7 | 22.044 | 14.696 | 22.044 |
| Mass VFrac | 0 | 0 | 0 | 0 | 1 | 0 | 0 | 0 | 1 |
| Mass SFrac | 1 | 1 | 1 | 0.998 | 0 | 0.999 | 1 | 1 | 0 |
| Mass Flow tonne/year | 385672.688 | 491563.087 | 597446.583 | 598447.468 | 106499.178 | 719817.026 | 332737.843 | 235090.671 | 70114.371 |
| Volume Flow gal/min | 39.902 | 39.902 | 116.892 | 147.062 | 56469.408 | 167.321 | 39.902 | 43.473 | 42506.729 |
| Enthalpy MW | −117.767 | −175.272 | −230.554 | −231.312 | 0.241 | −277.487 | −88.626 | −71.431 | −25.379 |
| Density lb/cuft | 303.274 | 386.542 | 160.371 | 127.684 | 0.059 | 134.984 | 261.649 | 169.678 | 0.052 |
| $H_2O$ | 0 | 0 | 0 | 1000 | 0 | 1000 | 0 | 0 | 58620.764 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 0 | 11493.607 |
| $CO_2$ | 0 | 0 | 0 | 0 | 0.532 | 0 | 0 | 0 | 0 |
| CO | 0 | 0 | 0 | 0 | 0 | 0 | 0 | 0 | 0 |
| $O_2$ | 0 | 0 | 0 | 0.165 | 18333.088 | 0.165 | 0 | 0 | 0 |
| $N_2$ | 0 | 0 | 0 | 0.72 | 88165.558 | 0.72 | 0 | 0 | 0 |
| $CaCl_2$ | 0 | 0 | 0 | 0 | 0 | 80.499 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 121289.059 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 49037.72 | 0 |
| $MgCl_2$*W | 0 | 0 | 0 | 0 | 0 | 0 | 332737.843 | 0 | 0 |
| $MgCl_2$*2W | 385662.96 | 0 | 0 | 0 | 0 | 0 | 0 | 0 | 0 |
| $MgCl_2$*4W | 0 | 491563.087 | 0 | 0 | 0 | 0 | 0 | 0 | 0 |
| $MgCl_2$*6W | 0 | 0 | 597446.583 | 597446.583 | 0 | 597446.583 | 0 | 0 | 0 |
| Mg(OH)Cl | 9.728 | 0 | 0 | 0 | 0 | 0 | 0 | 186052.951 | 0 |
| $Mg(OH)_2$ | 0 | 0 | 0 | 0 | 0 | 0 | 0 | 0 | 0 |
| MgO | 0 | 0 | 0 | 0 | 0 | 0 | 0 | 0 | 0 |
| $MgHCO_3^+$ | 0 | 0 | 0 | 0 | 0 | 0 | 0 | 0 | 0 |
| $H_2O$ | 0 | 0 | 0 | 0.002 | 0 | 0.001 | 0 | 0 | 0.836 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 0 | 0.164 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 0.172 | 0 | 0 | 0 | 0 |
| $N_2$ | 0 | 0 | 0 | 0 | 0.828 | 0 | 0 | 0 | 0 |
| $CaCl_2$ | 0 | 0 | 0 | 0 | 0 | 0 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0.168 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0.209 | 0 |
| $MgCl_2$*W | 0 | 0 | 0 | 0 | 0 | 0 | 1 | 0 | 0 |
| $MgCl_2$*2W | 1 | 0 | 0 | 0 | 0 | 0 | 0 | 0 | 0 |
| $MgCl_2$*4W | 0 | 1 | 0 | 0 | 0 | 0 | 0 | 0 | 0 |
| $MgCl_2$*6W | 0 | 0 | 1 | 0.998 | 0 | 0.83 | 0 | 0 | 0 |
| Mg(OH)Cl | 0 | 0 | 0 | 0 | 0 | 0 | 0 | 0.791 | 0 |
| $Mg(OH)_2$ | 0 | 0 | 0 | 0 | 0 | 0 | 0 | 0 | 0 |
| MgO | 0 | 0 | 0 | 0 | 0 | 0 | 0 | 0 | 0 |
| $MgHCO_3^+$ | 0 | 0 | 0 | 0 | 0 | 0 | 0 | 0 | 0 |
| $H_2O$ | 0 | 0 | 0 | 1.76 | 0 | 1.76 | 0 | 0 | 103.182 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 0 | 9.996 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 18.168 | 0 | 0 | 0 | 0 |
| $N_2$ | 0 | 0 | 0 | 0.001 | 99.799 | 0.001 | 0 | 0 | 0 |
| $CaCl_2$ | 0 | 0 | 0 | 0 | 0 | 0.023 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 38.427 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 16.332 | 0 |
| $MgCl_2$*W | 0 | 0 | 0 | 0 | 0 | 0 | 93.186 | 0 | 0 |
| $MgCl_2$*2W | 93.182 | 0 | 0 | 0 | 0 | 0 | 0 | 0 | 0 |
| $MgCl_2$*4W | 0 | 93.186 | 0 | 0 | 0 | 0 | 0 | 0 | 0 |
| $MgCl_2$*6W | 0 | 0 | 93.186 | 93.186 | 0 | 93.186 | 0 | 0 | 0 |
| Mg(OH)Cl | 0.004 | 0 | 0 | 0 | 0 | 0 | 0 | 76.854 | 0 |
| $Mg(OH)_2$ | 0 | 0 | 0 | 0 | 0 | 0 | 0 | 0 | 0 |

TABLE 3b-continued

Mass and Energy Accounting for Case 1 Simulation.

| | Process Stream Names | | | | | | | | |
|---|---|---|---|---|---|---|---|---|---|
| | MgCl$_2$—2W | MgCl$_2$—4W | MgCl$_2$—6W | RECYCIE1 | RX2-VENT | SLURRY | SOLIDS-1 | SOLIDS-2 | VAPOR |
| MgO | 0 | 0 | 0 | 0 | 0 | 0 | 0 | 0 | 0 |
| MgHCO$_3$$^+$ | 0 | 0 | 0 | 0 | 0 | 0 | 0 | 0 | 0 |

Example 3

Process Simulation of Magnesium Ion Catalyzed Capture CO$_2$ from Flue Gas Using CaCl$_2$ to Form CaCO$_3$ Part of the defined parameters includes the process flow diagram shown in FIG. 7. Results from the simulation suggest that it is efficient to heat a MgCl$_2$.6H$_2$O stream to form Mg(OH)Cl in two separate dehydration reactions, each in their own chambers followed by a decomposition reaction, also in its own chamber to form Mg(OH)Cl and HCl, i.e. a total of three chambers. The Mg(OH)Cl is reacted with H$_2$O to form MgCl$_2$ and Mg(OH)$_2$, which then reacts with a saturated CaCl$_2$/H$_2$O solution and CO$_2$ from the flue gas to form CaCO$_3$, which is filtered out of the stream. The resulting MgCl$_2$.6H$_2$O formed is recycled to the first reactor to begin the process again. This process is not limited to any particular source for CaCl$_2$. For example, it may be obtained from reacting calcium silicate with HCl to yield CaCl$_2$.

Constraints and parameters specified for this simulation include:

The reactions were run at 100% efficiencies with no losses. The simulations can be modified when pilot runs determine the reaction efficiencies.

Simulations did not account for impurities in the CaCl$_2$ feed stock or in any make-up MgCl$_2$ required due to losses from the system.

The results of this simulation indicate a preliminary net energy consumption of 4862 kwh/tonne CO$_2$. Table 4 provides mass and energy accounting for the various streams of the simulated process. Each stream corresponds to the stream in FIG. 7.

The process consists of two primary reactors and one solids filtration section. The first reactor heats MgCl$_2$.6H$_2$O causing it to break down into a HCl/H$_2$O vapor stream and a solid stream of Mg(OH)Cl. The HCl/H$_2$O vapor stream is sent to a heat exchanger to recover extra heat. The Mg(OH)$_2$ formed from the Mg(OH)Cl is sent to reactor 2 for further processing. Chemical reaction(s) occurring in this reactor include the following:

$$MgCl_2.6H_2O + \Delta \rightarrow Mg(OH)Cl + 5H_2O\uparrow + HCl\uparrow \quad (35)$$

$$2\,Mg(OH)Cl(aq) \rightarrow Mg(OH)_2 + MgCl_2 \quad (36)$$

A CaCl$_2$ solution and a flue gas stream are added to the Mg(OH)$_2$ in reactor 2. This reaction forms CaCO$_3$, MgCl$_2$ and water. The CaCO$_3$ precipitates and is removed in a filter or decanter. The remaining MgCl$_2$ and water are recycled to the first reactor. Additional water is added to complete the water balance required by the first reactor. Chemical reaction(s) occurring in this reactor include the following:

$$Mg(OH)_2 + CaCl_2 + CO_2 \rightarrow CaCO_3\downarrow(s) + MgCl_2 + H_2O \quad (37)$$

The primary feeds to this process are CaCl$_2$, flue gas (CO$_2$) and water. MgCl$_2$ in the system is used, reformed and recycled. The only MgCl$_2$ make-up required is to replace small amounts that leave the system with the CaCO$_3$ product, and small amounts that leave with the HCl/water product.

This process is a net energy user. The amount of energy is under investigation and optimization. There is cross heat exchange to recover the heat in high temperature streams to preheat the feed streams.

The steps for this process (Case 2) are summarized below:

CASE 2
2 STEP Dehydration then Decomposition

Hexahydrate is dehydrated in 2 separate chambers. Step 1 hex to tetra, Step 2 tetra to di. Di-hydrate is decomposed into 100% Mg(OH)Cl.

| | | |
|---|---|---|
| CO$_2$ Absorbed | 53333 | MTPY |
| CaCl$_2$ | 134574 | MTPY |
| HCl Dry | 88368 | MTPY |
| CaCO$_3$ | 105989 | MTPY |
| Hexahydrate recycled | 492737 | MTPY |
| HEX TO TETRA (100° C.) | 1445 | kWh/tonne CO$_2$ |
| TETRA TO DI (125° C.) | 1774 | kWh/tonne CO$_2$ |
| DI-HYDRATE DEHYDRATION & DECOMPOSITION TO 100% Mg(OH)Cl (130° C.) YEILDS 66% HCl VAPOR NO CARRIER MgCl$_2$ = BETTER OVERALL EFFICIENCY NO USE OF HCl PP | 1790 | kWh/tonne CO$_2$ |
| | 0.9 | |
| Heat Recovery from 28% HCl vapor | 148 | kWh/tonne CO$_2$ |
| TOTAL | 4862 | kWh/tonne CO$_2$ |

TABLE 4a

Mass and Energy Accounting for Case 2 Simulation.

| | Process Stream Names | | | | |
|---|---|---|---|---|---|
| | 5 | 7 | 8 | CaCl$_2$ | CaCO$_3$ |
| Temperature ° C. | 98 | 114.1 | 101 | 25 | 95 |
| Pressure psia | 14.696 | 14.696 | 14.696 | 14.7 | 14.7 |
| Mass VFrac | 0 | 0 | 1 | 0 | 0 |
| Mass SFrac | 1 | 1 | 0 | 1 | 1 |
| Mass Flow tonne/year | 492736.693 | 405410.587 | 306683.742 | 134573.943 | 121369.558 |
| Volume Flow gal/min | 96.405 | 32.909 | 224394.519 | 30.929 | 22.514 |

TABLE 4a-continued

Mass and Energy Accounting for Case 2 Simulation.

| | | | | | |
|---|---|---|---|---|---|
| Enthalpy MW | −190.292 | −144.291 | −98.931 | −30.599 | −46.174 |
| Density lb/cuft | 160.371 | 386.542 | 0.043 | 136.522 | 169.146 |
| $H_2O$ | 0 | 0 | 218315.265 | 0 | 0 |
| $H_2$ | 0 | 0 | 0 | 0 | 0 |
| $Cl_2$ | 0 | 0 | 0 | 0 | 0 |
| HCl | 0 | 0 | 88368.477 | 0 | 0 |
| $CO_2$ | 0 | 0 | 0 | 0 | 0 |
| CO | 0 | 0 | 0 | 0 | 0 |
| $O_2$ | 0 | 0 | 0 | 0 | 0 |
| $N_2$ | 0 | 0 | 0 | 0 | 0 |
| $CaCl_2$ | 0 | 0 | 0 | 134573.943 | 80.499 |
| $Ca(OH)_2$ | 0 | 0 | 0 | 0 | 0 |
| $CaCO_3$ | 0 | 0 | 0 | 0 | 121289.059 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 405410.587 | 0 | 0 | 0 |
| $MgCl_2*6W$ | 492736.693 | 0 | 0 | 0 | 0 |
| $Mg(OH)Cl$ | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |
| $H_2O$ | 0 | 0 | 0.712 | 0 | 0 |
| $H_2$ | 0 | 0 | 0 | 0 | 0 |
| $Cl_2$ | 0 | 0 | 0 | 0 | 0 |
| HCl | 0 | 0 | 0.288 | 0 | 0 |
| $CO_2$ | 0 | 0 | 0 | 0 | 0 |
| CO | 0 | 0 | 0 | 0 | 0 |
| $O_2$ | 0 | 0 | 0 | 0 | 0 |
| $N_2$ | 0 | 0 | 0 | 0 | 0 |
| $CaCl_2$ | 0 | 0 | 0 | 1 | 0.001 |
| $Ca(OH)_2$ | 0 | 0 | 0 | 0 | 0 |
| $CaCO_3$ | 0 | 0 | 0 | 0 | 0.999 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 1 | 0 | 0 | 0 |
| $MgCl_2*6W$ | 1 | 0 | 0 | 0 | 0 |
| $Mg(OH)Cl$ | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |
| $H_2O$ | 0 | 0 | 384.27 | 0 | 0 |
| $H_2$ | 0 | 0 | 0 | 0 | 0 |
| $Cl_2$ | 0 | 0 | 0 | 0 | 0 |
| HCl | 0 | 0 | 76.854 | 0 | 0 |
| $CO_2$ | 0 | 0 | 0 | 0 | 0 |
| CO | 0 | 0 | 0 | 0 | 0 |
| $O_2$ | 0 | 0 | 0 | 0 | 0 |
| $N_2$ | 0 | 0 | 0 | 0 | 0 |
| $CaCl_2$ | 0 | 0 | 0 | 38.45 | 0.023 |
| $Ca(OH)_2$ | 0 | 0 | 0 | 0 | 0 |
| $CaCO_3$ | 0 | 0 | 0 | 0 | 38.427 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 76.854 | 0 | 0 | 0 |
| $MgCl_2*6W$ | 76.854 | 0 | 0 | 0 | 0 |
| $Mg(OH)Cl$ | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |

| | Process Stream Names | | | | |
|---|---|---|---|---|---|
| | FLUEGAS | $H_2O$ | $H_2O$-1 | $H_2O$-2 | HCl Vapor |
| Temperature ° C. | 40 | 25 | 100 | 125 | 130 |
| Pressure psia | 15.78 | 14.7 | 14.696 | 22.044 | 14.696 |
| Mass VFrac | 1 | 0 | 1 | 1 | 1 |
| Mass SFrac | 0 | 0 | 0 | 0 | 0 |

TABLE 4a-continued

Mass and Energy Accounting for Case 2 Simulation.

| | | | | | |
|---|---|---|---|---|---|
| Mass Flow tonne/year | 166332.6 | 234646.82 | 87326.106 | 87329.947 | 132027.689 |
| Volume Flow gal/min | 63660.018 | 6546.44 | 74598.258 | 53065.241 | 80593.954 |
| Enthalpy MW | −17.821 | −118.063 | −36.806 | −36.675 | −25.187 |
| Density lb/cuft | 0.082 | 1.125 | 0.037 | 0.052 | 0.051 |
| $H_2O$ | 6499.971 | 234646.82 | 87326.106 | 87326.106 | 43663.053 |
| $H_2$ | 0 | 0 | 0 | 0 | 0 |
| $Cl_2$ | 0 | 0 | 0 | 0 | 0 |
| HCl | 0 | 0 | 0 | 3.841 | 88364.636 |
| $CO_2$ | 53333.098 | 0 | 0 | 0 | 0 |
| CO | 0 | 0 | 0 | 0 | 0 |
| $O_2$ | 18333.252 | 0 | 0 | 0 | 0 |
| $N_2$ | 88166.278 | 0 | 0 | 0 | 0 |
| $CaCl_2$ | 0 | 0 | 0 | 0 | 0 |
| $Ca(OH)_2$ | 0 | 0 | 0 | 0 | 0 |
| $CaCO_3$ | 0 | 0 | 0 | 0 | 0 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 0 | 0 | 0 | 0 |
| $MgCl_2*6W$ | 0 | 0 | 0 | 0 | 0 |
| Mg(OH)Cl | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |
| $H_2O$ | 0.039 | 1 | 1 | 1 | 0.331 |
| $H_2$ | 0 | 0 | 0 | 0 | 0 |
| $Cl_2$ | 0 | 0 | 0 | 0 | 0 |
| HCl | 0 | 0 | 0 | 0 | 0.669 |
| $CO_2$ | 0.321 | 0 | 0 | 0 | 0 |
| CO | 0 | 0 | 0 | 0 | 0 |
| $O_2$ | 0.11 | 0 | 0 | 0 | 0 |
| $N_2$ | 0.53 | 0 | 0 | 0 | 0 |
| $CaCl_2$ | 0 | 0 | 0 | 0 | 0 |
| $Ca(OH)_2$ | 0 | 0 | 0 | 0 | 0 |
| $CaCO_3$ | 0 | 0 | 0 | 0 | 0 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 0 | 0 | 0 | 0 |
| $MgCl_2*6W$ | 0 | 0 | 0 | 0 | 0 |
| Mg(OH)Cl | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |
| $H_2O$ | 11.441 | 413.016 | 153.708 | 153.708 | 76.854 |
| $H_2$ | 0 | 0 | 0 | 0 | 0 |
| $Cl_2$ | 0 | 0 | 0 | 0 | 0 |
| HCl | 0 | 0 | 0 | 0.003 | 76.851 |
| $CO_2$ | 38.427 | 0 | 0 | 0 | 0 |
| CO | 0 | 0 | 0 | 0 | 0 |
| $O_2$ | 18.168 | 0 | 0 | 0 | 0 |
| $N_2$ | 99.8 | 0 | 0 | 0 | 0 |
| $CaCl_2$ | 0 | 0 | 0 | 0 | 0 |
| $Ca(OH)_2$ | 0 | 0 | 0 | 0 | 0 |
| $CaCO_3$ | 0 | 0 | 0 | 0 | 0 |
| $MgCO_3$ | 0 | 0 | 0 | 0 | 0 |
| $Ca(O)Cl_2$ | 0 | 0 | 0 | 0 | 0 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 0 | 0 | 0 | 0 |
| $MgCl_2*6W$ | 0 | 0 | 0 | 0 | 0 |
| Mg(OH)Cl | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |

TABLE 4b

Mass and Energy Accounting for Case 2 Simulation.

| | Process Stream Names | | | | | | | | |
|---|---|---|---|---|---|---|---|---|---|
| | LIQUID | $MgCl_2$—4W | $MgCl_2$—6W | RECYCLE1 | RX2-VENT | SLURRY | SOLIDS-1 | SOLIDS-2 | VAPOR |
| Temperature ° C. | 94.9 | 100 | 75 | 95 | 95 | 95 | 125 | 130 | 118.1 |
| Pressure psia | 14.696 | 14.696 | 14.696 | 14.7 | 14.7 | 14.7 | 22.044 | 14.696 | 14.696 |
| Mass VFrac | 0.979 | 0 | 0 | 0 | 1 | 0 | 0 | 0 | 1 |
| Mass SFrac | 0 | 1 | 1 | 0.998 | 0 | 0.998 | 1 | 1 | 0 |
| Mass Flow tonne/year | 306683.742 | 405410.587 | 492736.693 | 493737.578 | 106499.178 | 615107.136 | 318080.64 | 186052.951 | 306683.742 |
| Volume Flow gal/min | 215496.035 | 32.909 | 96.405 | 126.575 | 56469.408 | 146.834 | 32.909 | 32.909 | 234621.606 |
| Enthalpy MW | −99.487 | −144.553 | −190.849 | −190.859 | 0.241 | −237.034 | −97.128 | −61.083 | −98.668 |
| Density lb/cuft | 0.045 | 386.542 | 160.371 | 122.394 | 0.059 | 131.442 | 303.277 | 177.393 | 0.041 |
| $H_2O$ | 218315.265 | 0 | 0 | 1000 | 0 | 1000 | 0 | 0 | 218315.265 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 88368.477 | 0 | 0 | 0 | 0 | 0 | 0 | 0 | 88368.477 |
| $CO_2$ | 0 | 0 | 0 | 0 | 0.532 | 0 | 0 | 0 | 0 |
| CO | 0 | 0 | 0 | 0 | 0 | 0 | 0 | 0 | 0 |
| $O_2$ | 0 | 0 | 0 | 0.165 | 18333.088 | 0.165 | 0 | 0 | 0 |
| $N_2$ | 0 | 0 | 0 | 0.72 | 88165.558 | 0.72 | 0 | 0 | 0 |
| $CaCl_2$ | 0 | 0 | 0 | 0 | 0 | 80.499 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 121289.059 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2$*W | 0 | 0 | 0 | 0 | 0 | 0 | 0 | 0 | 0 |
| $MgCl_2$*2W | 0 | 0 | 0 | 0 | 0 | 0 | 318077.568 | 0 | 0 |
| $MgCl_2$*4W | 0 | 405410.587 | 0 | 0 | 0 | 0 | 0 | 0 | 0 |
| $MgCl_2$*6W | 0 | 0 | 492736.693 | 492736.693 | 0 | 492736.693 | 0 | 0 | 0 |
| Mg(OH)Cl | 0 | 0 | 0 | 0 | 0 | 0 | 0 | 186052.951 | 0 |
| $Mg(OH)_2$ | 0 | 0 | 0 | 0 | 0 | 0 | 3.072 | 0 | 0 |
| MgO | 0 | 0 | 0 | 0 | 0 | 0 | 0 | 0 | 0 |
| $MgHCO_3^+$ | 0 | 0 | 0 | 0 | 0 | 0 | 0 | 0 | 0 |
| Mass Frac | | | | | | | | | |
| $H_2O$ | 0.712 | 0 | 0 | 0.002 | 0 | 0.002 | 0 | 0 | 0.712 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0.288 | 0 | 0 | 0 | 0 | 0 | 0 | 0 | 0.288 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 0.172 | 0 | 0 | 0 | 0 |
| $N_2$ | 0 | 0 | 0 | 0 | 0.828 | 0 | 0 | 0 | 0 |
| $CaCl_2$ | 0 | 0 | 0 | 0 | 0 | 0 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0.197 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2$*W | 0 | 0 | 0 | 0 | 0 | 0 | 0 | 0 | 0 |
| $MgCl_2$*2W | 0 | 0 | 0 | 0 | 0 | 0 | 1 | 0 | 0 |
| $MgCl_2$*4W | 0 | 1 | 0 | 0 | 0 | 0 | 0 | 0 | 0 |
| $MgCl_2$*6W | 0 | 0 | 1 | 0.998 | 0 | 0.801 | 0 | 0 | 0 |
| Mg(OH)Cl | 0 | 0 | 0 | 0 | 0 | 0 | 0 | 1 | 0 |
| $Mg(OH)_2$ | 0 | 0 | 0 | 0 | 0 | 0 | 0 | 0 | 0 |
| MgO | 0 | 0 | 0 | 0 | 0 | 0 | 0 | 0 | 0 |
| $MgHCO_3^+$ | 0 | 0 | 0 | 0 | 0 | 0 | 0 | 0 | 0 |
| $H_2O$ | 384.27 | 0 | 0 | 1.76 | 0 | 1.76 | 0 | 0 | 384.27 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 76.854 | 0 | 0 | 0 | 0 | 0 | 0 | 0 | 76.854 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 18.168 | 0 | 0 | 0 | 0 |
| $N_2$ | 0 | 0 | 0 | 0.001 | 99.799 | 0.001 | 0 | 0 | 0 |
| $CaCl_2$ | 0 | 0 | 0 | 0 | 0 | 0.023 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 38.427 | 0 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2$*W | 0 | 0 | 0 | 0 | 0 | 0 | 0 | 0 | 0 |
| $MgCl_2$*2W | 0 | 0 | 0 | 0 | 0 | 0 | 76.852 | 0 | 0 |
| $MgCl_2$*4W | 0 | 76.854 | 0 | 0 | 0 | 0 | 0 | 0 | 0 |
| $MgCl_2$*6W | 0 | 0 | 76.854 | 76.854 | 0 | 76.854 | 0 | 0 | 0 |

TABLE 4b-continued

Mass and Energy Accounting for Case 2 Simulation.

| | LIQUID | MgCl$_2$—4W | MgCl$_2$—6W | RECYCLE1 | RX2-VENT | SLURRY | SOLIDS-1 | SOLIDS-2 | VAPOR |
|---|---|---|---|---|---|---|---|---|---|
| Mg(OH)Cl | 0 | 0 | 0 | 0 | 0 | 0 | 0 | 76.854 | 0 |
| Mg(OH)$_2$ | 0 | 0 | 0 | 0 | 0 | 0 | 0.002 | 0 | 0 |
| MgO | 0 | 0 | 0 | 0 | 0 | 0 | 0 | 0 | 0 |
| MgHCO$_3^+$ | 0 | 0 | 0 | 0 | 0 | 0 | 0 | 0 | 0 |

Example 4

Process Simulation of Magnesium Ion Catalyzed Capture CO$_2$ from Flue Gas Using CaCl$_2$ to Form CaCO$_3$ Part of the defined parameters include the process flow diagram shown in FIG. 8. Results from the simulation suggest that it is efficient to heat a MgCl$_2$.6H$_2$O stream to form MgO in a single chamber. The MgO is reacted with H$_2$O to form Mg(OH)$_2$, which then reacts with a saturated CaCl$_2$/H$_2$O solution and CO$_2$ from the flue gas to form CaCO$_3$, which is filtered out of the stream. The resulting MgCl$_2$.6H$_2$O formed is recycled to the first reactor to begin the process again. This process is not limited to any particular source for CaCl$_2$. For example, it may be obtained from reacting calcium silicate with HCl to yield CaCl$_2$.

Constraints and parameters specified for this simulation include:
The reactions were run at 100% efficiencies with no losses. The simulations can be modified when pilot runs determine the reaction efficiencies.
Simulations did not account for impurities in the CaCl$_2$ feed stock or in any make-up MgCl$_2$ required due to losses from the system.

The results of this simulation indicate a preliminary net energy consumption of 3285 kwh/tonne CO$_2$. Table 5 provides mass and energy accounting for the various streams of the simulated process. Each stream corresponds to the stream of FIG. 8.

The process consists of two primary reactors and one solids filtration section. The first reactor heats MgCl$_2$.6H$_2$O causing it to break down into a HCl/H$_2$O vapor stream and a solid stream of MgO. The HCl/H$_2$O vapor stream is sent to a heat exchanger to recover extra heat. The Mg(OH)$_2$ formed from the MgO is sent to reactor 2 for further processing. Chemical reaction(s) occurring in this reactor include the following:

$$MgCl_2.6H_2O + \Delta \rightarrow MgO + 5H_2O\uparrow + 2HCl\uparrow \quad (38)$$

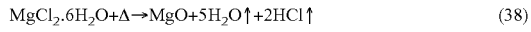

$$MgO + H_2O \; Mg(OH)_2 \quad (39)$$

A CaCl$_2$ solution and a flue gas stream are added to the Mg(OH)$_2$ in reactor 2. This reaction forms CaCO$_3$, MgCl$_2$ and water. The CaCO$_3$ precipitates and is removed in a filter or decanter. The remaining MgCl$_2$ and water are recycled to the first reactor. Additional water is added to complete the water balance required by the first reactor. Chemical reaction(s) occurring in this reactor include the following:

$$Mg(OH)_2 + CaCl_2 + CO_2 \rightarrow CaCO_3\downarrow(s) + MgCl_2 + H_2O \quad (40)$$

The primary feeds to this process are CaCl$_2$, flue gas (CO$_2$) and water. MgCl$_2$ in the system is used, reformed and recycled. The only MgCl$_2$ make-up required is to replace small amounts that leave the system with the CaCO$_3$ product, and small amounts that leave with the HCl/water product.

This process is a net energy user. The amount of energy is under investigation and optimization. There is cross heat exchange to recover the heat in high temperature streams to preheat the feed streams.

The steps for this process (Case 3) are summarized below:

CASE 3
Combined Dehydration/Decomposition to MgO

Hexahydrate is dehydrated and decomposed simultaneously at 450 C. Reactor yeilds 100% MgO.

| | | |
|---|---|---|
| CO$_2$ Absorbed | 53333 | MTPY |
| CaCl$_2$ | 134574 | MTPY |
| HCl Dry | 88368 | MTPY |
| CaCO$_3$ | 105989 | MTPY |
| Hexahydrate recycled | 246368 | MTPY |
| HEXAHYDRATE DEHYDRATION & DECOMPOSITION TO 100% MgO (450° C.) YIELDS 44.7% HCl VAPOR RECYCLES HALF AS MUCH HEXAHYDRATE BUT NEEDS HIGH QUALITY HEAT | 3778 | kWh/tonne CO2 |
| Heat Recovery from 45% HCl vapor | 493 | kWh/tonne CO2 |
| TOTAL | 3285 | kWh/tonne CO2 |

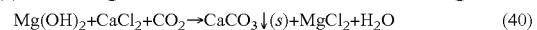

TABLE 5a

Mass and Energy Accounting for Case 3 Simulation.

| | CaCl$_2$ | CaCO$_3$ | FLUE GAS | H$_2$O | HCl VAP | MgCl$_2$ | MgCl$_2$—6W |
|---|---|---|---|---|---|---|---|
| Temperature ° C. | 25 | 95 | 104 | 25 | 120 | 353.8 | 104 |
| Pressure psia | 14.7 | 14.7 | 15.78 | 14.7 | 14.696 | 14.7 | 14.7 |
| Mass VFrac | 0 | 0 | 1 | 0 | 1 | 0 | 0 |
| Mass SFrac | 1 | 1 | 0 | 0 | 0 | 1 | 1 |
| Mass Flow tonne/year | 134573.943 | 121369.558 | 166332.6 | 125489.188 | 197526.11 | 246368.347 | 246368.347 |
| Volume Flow gal/min | 30.929 | 22.514 | 76673.298 | 3501.038 | 137543.974 | 48.203 | 48.203 |
| Enthalpy MW | −30.599 | −46.174 | −17.479 | −63.14 | −52.762 | −92.049 | −95.073 |

TABLE 5a-continued

Mass and Energy Accounting for Case 3 Simulation.

| | Process Stream Names | | | | | | |
|---|---|---|---|---|---|---|---|
| | $CaCl_2$ | $CaCO_3$ | FLUE GAS | $H_2O$ | HCl VAP | $MgCl_2$ | $MgCl_2$—6W |
| Density lb/cuft | 136.522 | 169.146 | 0.068 | 1.125 | 0.045 | 160.371 | 160.371 |
| $H_2O$ | 0 | 0 | 6499.971 | 125489.188 | 109157.633 | 0 | 0 |
| $H_2$ | 0 | 0 | 0 | 0 | 0 | 0 | 0 |
| $Cl_2$ | 0 | 0 | 0 | 0 | 0 | 0 | 0 |
| HCl | 0 | 0 | 0 | 0 | 88368.477 | 0 | 0 |
| $CO_2$ | 0 | 0 | 53333.098 | 0 | 0 | 0 | 0 |
| CO | 0 | 0 | 0 | 0 | 0 | 0 | 0 |
| $O_2$ | 0 | 0 | 18333.252 | 0 | 0 | 0 | 0 |
| $N_2$ | 0 | 0 | 88166.278 | 0 | 0 | 0 | 0 |
| $CaCl_2$ | 134573.943 | 80.499 | 0 | 0 | 0 | 0 | 0 |
| $Ca(OH)_2$ | 0 | 0 | 0 | 0 | 0 | 0 | 0 |
| $CaCO_3$ | 0 | 121289.059 | 0 | 0 | 0 | 0 | 0 |
| $MgCO_3$ | 0 | 0 | 0 | 0 | 0 | 0 | 0 |
| $Ca(O)Cl_2$ | 0 | 0 | 0 | 0 | 0 | 0 | 0 |
| $MgCl_2$ | 0 | 0 | 0 | 0 | 0 | 0 | 0 |
| $MgCl_2$*W | 0 | 0 | 0 | 0 | 0 | 0 | 0 |
| $MgCl_2$*2W | 0 | 0 | 0 | 0 | 0 | 0 | 0 |
| $MgCl_2$*4W | 0 | 0 | 0 | 0 | 0 | 0 | 0 |
| $MgCl_2$*6W | 0 | 0 | 0 | 0 | 0 | 246368.347 | 246368.347 |
| Mg(OH)Cl | 0 | 0 | 0 | 0 | 0 | 0 | 0 |
| $Mg(OH)_2$ | 0 | 0 | 0 | 0 | 0 | 0 | 0 |
| MgO | 0 | 0 | 0 | 0 | 0 | 0 | 0 |
| $H_2O$ | 0 | 0 | 0.039 | 1 | 0.553 | 0 | 0 |
| $H_2$ | 0 | 0 | 0 | 0 | 0 | 0 | 0 |
| $Cl_2$ | 0 | 0 | 0 | 0 | 0 | 0 | 0 |
| HCl | 0 | 0 | 0 | 0 | 0.447 | 0 | 0 |
| $CO_2$ | 0 | 0 | 0.321 | 0 | 0 | 0 | 0 |
| CO | 0 | 0 | 0 | 0 | 0 | 0 | 0 |
| $O_2$ | 0 | 0 | 0.11 | 0 | 0 | 0 | 0 |
| $N_2$ | 0 | 0 | 0.53 | 0 | 0 | 0 | 0 |
| $CaCl_2$ | 1 | 0.001 | 0 | 0 | 0 | 0 | 0 |
| $Ca(OH)_2$ | 0 | 0 | 0 | 0 | 0 | 0 | 0 |
| $CaCO_3$ | 0 | 0.999 | 0 | 0 | 0 | 0 | 0 |
| $MgCO_3$ | 0 | 0 | 0 | 0 | 0 | 0 | 0 |
| $Ca(O)Cl_2$ | 0 | 0 | 0 | 0 | 0 | 0 | 0 |
| $MgCl_2$ | 0 | 0 | 0 | 0 | 0 | 0 | 0 |
| $MgCl_2$*W | 0 | 0 | 0 | 0 | 0 | 0 | 0 |
| $MgCl_2$*2W | 0 | 0 | 0 | 0 | 0 | 0 | 0 |
| $MgCl_2$*4W | 0 | 0 | 0 | 0 | 0 | 0 | 0 |
| $MgCl_2$*6W | 0 | 0 | 0 | 0 | 0 | 1 | 1 |
| Mg(OH)Cl | 0 | 0 | 0 | 0 | 0 | 0 | 0 |
| $Mg(OH)_2$ | 0 | 0 | 0 | 0 | 0 | 0 | 0 |
| MgO | 0 | 0 | 0 | 0 | 0 | 0 | 0 |
| $H_2O$ | 0 | 0 | 11.441 | 220.881 | 192.135 | 0 | 0 |
| $H_2$ | 0 | 0 | 0 | 0 | 0 | 0 | 0 |
| $Cl_2$ | 0 | 0 | 0 | 0 | 0 | 0 | 0 |
| HCl | 0 | 0 | 0 | 0 | 76.854 | 0 | 0 |
| $CO_2$ | 0 | 0 | 38.427 | 0 | 0 | 0 | 0 |
| CO | 0 | 0 | 0 | 0 | 0 | 0 | 0 |
| $O_2$ | 0 | 0 | 18.168 | 0 | 0 | 0 | 0 |
| $N_2$ | 0 | 0 | 99.8 | 0 | 0 | 0 | 0 |
| $CaCl_2$ | 38.45 | 0.023 | 0 | 0 | 0 | 0 | 0 |
| $Ca(OH)_2$ | 0 | 0 | 0 | 0 | 0 | 0 | 0 |
| $CaCO_3$ | 0 | 38.427 | 0 | 0 | 0 | 0 | 0 |
| $MgCO_3$ | 0 | 0 | 0 | 0 | 0 | 0 | 0 |
| $Ca(O)Cl_2$ | 0 | 0 | 0 | 0 | 0 | 0 | 0 |
| $MgCl_2$ | 0 | 0 | 0 | 0 | 0 | 0 | 0 |
| $MgCl_2$*W | 0 | 0 | 0 | 0 | 0 | 0 | 0 |
| $MgCl_2$*2W | 0 | 0 | 0 | 0 | 0 | 0 | 0 |
| $MgCl_2$*4W | 0 | 0 | 0 | 0 | 0 | 0 | 0 |
| $MgCl_2$*6W | 0 | 0 | 0 | 0 | 0 | 38.427 | 38.427 |
| Mg(OH)Cl | 0 | 0 | 0 | 0 | 0 | 0 | 0 |
| $Mg(OH)_2$ | 0 | 0 | 0 | 0 | 0 | 0 | 0 |
| MgO | 0 | 0 | 0 | 0 | 0 | 0 | 0 |

TABLE 5b

Mass and Energy Accounting for Case 3 Simulation.

| | Mg(OH)Cl1 | Mg(OH)Cl2 | RECYCLE1 | RECYCLE2 | RECYCLE3 | RX2-VENT | SLURRY | VAPOR | VENT |
|---|---|---|---|---|---|---|---|---|---|
| Temperature °C. | 450 | 100 | 95 | 140 | 140 | 95 | 95 | 450 | 140 |
| Pressure psia | 14.696 | 14.696 | 14.7 | 14.7 | 14.7 | 14.7 | 14.7 | 14.696 | 14.7 |
| Mass VFrac | 0 | 0 | 0 | 0.004 | 0 | 1 | 0 | 1 | 1 |
| Mass SFrac | 1 | 1 | 0.996 | 0.996 | 1 | 0 | 0.997 | 0 | 0 |
| Mass Flow tonne/year | 48842.237 | 48842.237 | 247369.231 | 247369.231 | 246368.347 | 106499.178 | 368738.79 | 197526.11 | 1000.885 |
| Volume Flow gal/min | 6.851 | 6.851 | 78.372 | 994.232 | 48.203 | 56469.408 | 98.632 | 252994.849 | 946.03 |
| Enthalpy MW | −22.38 | −23 | −95.676 | −95.057 | −94.638 | 0.241 | −141.851 | −49.738 | −0.419 |
| Density lb/cuft | 223.695 | 223.695 | 99.036 | 7.807 | 160.371 | 0.059 | 117.304 | 0.024 | 0.033 |
| $H_2O$ | 0 | 0 | 1000 | 1000 | 0 | 0 | 1000 | 109157.633 | 1000 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 88368.477 | 0 |
| $CO_2$ | 0 | 0 | 0 | 0 | 0 | 0.532 | 0 | 0 | 0 |
| CO | 0 | 0 | 0 | 0 | 0 | 0 | 0 | 0 | 0 |
| $O_2$ | 0 | 0 | 0.165 | 0.165 | 0 | 18333.088 | 0.165 | 0 | 0.165 |
| $N_2$ | 0 | 0 | 0.72 | 0.72 | 0 | 88165.558 | 0.72 | 0 | 0.72 |
| $CaCl_2$ | 0 | 0 | 0 | 0 | 0 | 0 | 80.499 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0 | 121289.059 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2*W$ | 0 | 0 | 0 | 0 | 0 | 0 | 0 | 0 | 0 |
| $MgCl_2*2W$ | 0 | 0 | 0 | 0 | 0 | 0 | 0 | 0 | 0 |
| $MgCl_2*4W$ | 0 | 0 | 0 | 0 | 0 | 0 | 0 | 0 | 0 |
| $MgCl_2*6W$ | 0 | 0 | 246368.347 | 246368.347 | 246368.347 | 0 | 246368.347 | 0 | 0 |
| Mg(OH)Cl | 0 | 0 | 0 | 0 | 0 | 0 | 0 | 0 | 0 |
| $Mg(OH)_2$ | 0 | 0 | 0 | 0 | 0 | 0 | 0 | 0 | 0 |
| MgO | 48842.237 | 48842.237 | 0 | 0 | 0 | 0 | 0 | 0 | 0 |
| $H_2O$ | 0 | 0 | 0.004 | 0.004 | 0 | 0 | 0.003 | 0.553 | 0.999 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 0.447 | 0 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 0 | 0.172 | 0 | 0 | 0 |
| $N_2$ | 0 | 0 | 0 | 0 | 0 | 0.828 | 0 | 0 | 0.001 |
| $CaCl_2$ | 0 | 0 | 0 | 0 | 0 | 0 | 0 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0 | 0.329 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2*W$ | 0 | 0 | 0 | 0 | 0 | 0 | 0 | 0 | 0 |
| $MgCl_2*2W$ | 0 | 0 | 0 | 0 | 0 | 0 | 0 | 0 | 0 |
| $MgCl_2*4W$ | 0 | 0 | 0 | 0 | 0 | 0 | 0 | 0 | 0 |
| $MgCl_2*6W$ | 0 | 0 | 0.996 | 0.996 | 1 | 0 | 0.668 | 0 | 0 |
| Mg(OH)Cl | 0 | 0 | 0 | 0 | 0 | 0 | 0 | 0 | 0 |
| $Mg(OH)_2$ | 0 | 0 | 0 | 0 | 0 | 0 | 0 | 0 | 0 |
| MgO | 1 | 1 | 0 | 0 | 0 | 0 | 0 | 0 | 0 |
| $H_2O$ | 0 | 0 | 1.76 | 1.76 | 0 | 0 | 1.76 | 192.135 | 1.76 |
| $H_2$ | 0 | 0 | 0 | 0 | 0 | 0 | 0 | 0 | 0 |
| $Cl_2$ | 0 | 0 | 0 | 0 | 0 | 0 | 0 | 0 | 0 |
| HCl | 0 | 0 | 0 | 0 | 0 | 0 | 0 | 76.854 | 0 |
| $CO_2$ | 0 | 0 | 0 | 0 | 0 | 0 | 0 | 0 | 0 |
| CO | 0 | 0 | 0 | 0 | 0 | 0 | 0 | 0 | 0 |
| $O_2$ | 0 | 0 | 0 | 0 | 0 | 18.168 | 0 | 0 | 0 |
| $N_2$ | 0 | 0 | 0.001 | 0.001 | 0 | 99.799 | 0.001 | 0 | 0.001 |
| $CaCl_2$ | 0 | 0 | 0 | 0 | 0 | 0 | 0.023 | 0 | 0 |
| $Ca(OH)_2$ | 0 | 0 | 0 | 0 | 0 | 0 | 0 | 0 | 0 |
| $CaCO_3$ | 0 | 0 | 0 | 0 | 0 | 0 | 38.427 | 0 | 0 |
| $MgCO_3$ | 0 | 0 | 0 | 0 | 0 | 0 | 0 | 0 | 0 |
| $Ca(O)Cl_2$ | 0 | 0 | 0 | 0 | 0 | 0 | 0 | 0 | 0 |
| $MgCl_2$ | 0 | 0 | 0 | 0 | 0 | 0 | 0 | 0 | 0 |
| $MgCl_2*W$ | 0 | 0 | 0 | 0 | 0 | 0 | 0 | 0 | 0 |
| $MgCl_2*2W$ | 0 | 0 | 0 | 0 | 0 | 0 | 0 | 0 | 0 |
| $MgCl_2*4W$ | 0 | 0 | 0 | 0 | 0 | 0 | 0 | 0 | 0 |
| $MgCl_2*6W$ | 0 | 0 | 38.427 | 38.427 | 38.427 | 0 | 38.427 | 0 | 0 |
| Mg(OH)Cl | 0 | 0 | 0 | 0 | 0 | 0 | 0 | 0 | 0 |
| $Mg(OH)_2$ | 0 | 0 | 0 | 0 | 0 | 0 | 0 | 0 | 0 |
| MgO | 38.427 | 38.427 | 0 | 0 | 0 | 0 | 0 | 0 | 0 |

Example 5

Process Simulation of Magnesium Ion Catalyzed Capture $CO_2$ from Flue Gas Using $CaCl_2$ to Form $CaCO_3$ Part of the defined parameters include the process flow diagram shown in FIG. 9. Results from the simulation suggest that it is efficient to heat a $MgCl_2.6H_2O$ stream to form $Mg(OH)Cl$ in a single chamber. The $Mg(OH)Cl$ is reacted with $H_2O$ to form $MgCl_2$ and $Mg(OH)_2$, which then reacts with a saturated $CaCl_2/H_2O$ solution and $CO_2$ from the flue gas to form $CaCO_3$, which is filtered out of the stream. The resulting $MgCl_2.6H_2O$ formed is recycled to the first reactor to begin the process again. This process is not limited to any particular source for $CaCl_2$. For example, it may be obtained from reacting calcium silicate with HCl to yield $CaCl_2$.

Constraints and parameters specified for this simulation include:

The reactions were run at 100% efficiencies with no losses. The simulations can be modified when pilot runs determine the reaction efficiencies.

Simulations did not account for impurities in the $CaCl_2$ feed stock or in any make-up $MgCl_2$ required due to losses from the system.

The results of this simulation indicate a preliminary net energy consumption of 4681 kwh/tonne $CO_2$. Table 6 provides mass and energy accounting for the various streams of the simulated process. Each stream corresponds to the stream of FIG. 9.

The process consists of two primary reactors and one solids filtration section. The first reactor heats $MgCl_2.6H_2O$ causing it to break down into a $HCl/H_2O$ vapor stream and a solid stream of $Mg(OH)Cl$. The $HCl/H_2O$ vapor stream is sent to a heat exchanger to recover extra heat. The $Mg(OH)_2$ formed from the $Mg(OH)Cl$ is sent to reactor 2 for further processing. Chemical reaction(s) occurring in this reactor include the following:

$$MgCl_2.6H_2O + \Delta \rightarrow Mg(OH)Cl + 5H_2O\uparrow + HCl\uparrow \qquad (41)$$

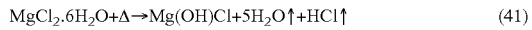

$$2Mg(OH)Cl(aq) \rightarrow Mg(OH)_2 + MgCl_2 \qquad (42)$$

A $CaCl_2$ solution and a flue gas stream are added to the $Mg(OH)_2$ in reactor 2. This reaction forms $CaCO_3$, $MgCl_2$ and water. The $CaCO_3$ precipitates and is removed in a filter or decanter. The remaining $MgCl_2$ and water are recycled to the first reactor. Additional water is added to complete the water balance required by the first reactor. Chemical reaction(s) occurring in this reactor include the following:

$$Mg(OH)_2 + CaCl_2 + CO_2 \rightarrow CaCO_3\downarrow(s) + MgCl_2 + H_2O \qquad (43)$$

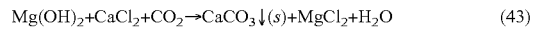

The primary feeds to this process are $CaCl_2$, flue gas ($CO_2$) and water. $MgCl_2$ in the system is used, reformed and recycled. The only $MgCl_2$ make-up required is to replace small amounts that leave the system with the $CaCO_3$ product, and small amounts that leave with the HCl/water product.

This process is a net energy user. The amount of energy is under investigation and optimization. There is cross heat exchange to recover the heat in high temperature streams to preheat the feed streams.

The steps for this process (Case 4) are summarized below:

CASE 4
Combined Dehydration/Decomposition to Mg(OH)Cl

Hexahydrate is dehydrated and decomposed simultaneously at 250° C. Reactor yields 100% Mg(OH)Cl.

| | |
|---|---|
| $CO_2$ Absorbed | 53333 MTPY |
| $CaCl_2$ | 134574 MTPY |
| HCl Dry | 88368 MTPY |
| $CaCO_3$ | 105989 MTPY |
| Hexahydrate recycled | 492737 MTPY |
| DEHYDRATION & DECOMPOSITION TO 100% Mg(OH)Cl (250° C.) YEILDS 28.8% HCl VAPOR | 5043 kWh/tonne CO2 |
| | 2.2 MW |
| Heat Recovery from 28% HCl vapor | 361 kWh/tonne CO2 |
| TOTAL | 4681 kWh/tonne CO2 |

TABLE 6a

Mass and Energy Accounting for Case 4 Simulation.

| | Process Stream Names | | | | | | | |
|---|---|---|---|---|---|---|---|---|
| | $CaCl_2$ | $CaCO_3$ | FLUEGAS | $H_2O$ | HCIVAP | $MgCl_2$ | $MgCl_2$—6W | Mg(OH)Cl1 |
| Temperature ° C. | 25 | 95 | 104 | 25 | 120 | 188 | 104 | 250 |
| Pressure psia | 14.7 | 14.7 | 15.78 | 14.7 | 14.696 | 14.7 | 14.7 | 14.696 |
| Mass VFrac | 0 | 0 | 1 | 0 | 1 | 0 | 0 | 0 |
| Mass SFrac | 1 | 1 | 0 | 0 | 0 | 1 | 1 | 1 |
| Mass Flow tonne/year | 134573.943 | 121369.558 | 166332.6 | 234646.82 | 306683.742 | 492736.693 | 492736.693 | 186052.951 |
| Volume Flow gal/min | 30.929 | 22.514 | 76673.298 | 6546.44 | 235789.67 | 96.405 | 96.405 | 32.909 |
| Enthalpy MW | −30.599 | −46.174 | −17.479 | −118.063 | −98.638 | −188.114 | −190.147 | −60.661 |
| Density lb/cuft | 136.522 | 169.146 | 0.068 | 1.125 | 0.041 | 160.371 | 160.371 | 177.393 |
| $H_2O$ | 0 | 0 | 6499.971 | 234646.82 | 218315.265 | 0 | 0 | 0 |
| $H_2$ | 0 | 0 | 0 | 0 | 0 | 0 | 0 | 0 |
| $Cl_2$ | 0 | 0 | 0 | 0 | 0 | 0 | 0 | 0 |
| HCl | 0 | 0 | 0 | 0 | 88368.477 | 0 | 0 | 0 |
| $CO_2$ | 0 | 0 | 53333.098 | 0 | 0 | 0 | 0 | 0 |
| CO | 0 | 0 | 0 | 0 | 0 | 0 | 0 | 0 |
| $O_2$ | 0 | 0 | 18333.252 | 0 | 0 | 0 | 0 | 0 |
| $N_2$ | 0 | 0 | 88166.278 | 0 | 0 | 0 | 0 | 0 |
| $CaCl_2$ | 134573.943 | 80.499 | 0 | 0 | 0 | 0 | 0 | 0 |
| $Ca(OH)_2$ | 0 | 0 | 0 | 0 | 0 | 0 | 0 | 0 |
| $CaCO_3$ | 0 | 121289.059 | 0 | 0 | 0 | 0 | 0 | 0 |
| $MgCO_3$ | 0 | 0 | 0 | 0 | 0 | 0 | 0 | 0 |
| $Ca(O)Cl_2$ | 0 | 0 | 0 | 0 | 0 | 0 | 0 | 0 |
| $MgCl_2$ | 0 | 0 | 0 | 0 | 0 | 0 | 0 | 0 |

TABLE 6a-continued

Mass and Energy Accounting for Case 4 Simulation.

| | Process Stream Names | | | | | | | |
|---|---|---|---|---|---|---|---|---|
| | $CaCl_2$ | $CaCO_3$ | FLUEGAS | $H_2O$ | HClVAP | $MgCl_2$ | $MgCl_2$—6W | $Mg(OH)Cl1$ |
| $MgCl_2*W$ | 0 | 0 | 0 | 0 | 0 | 0 | 0 | 0 |
| $MgCl_2*2W$ | 0 | 0 | 0 | 0 | 0 | 0 | 0 | 0 |
| $MgCl_2*4W$ | 0 | 0 | 0 | 0 | 0 | 0 | 0 | 0 |
| $MgCl_2*6W$ | 0 | 0 | 0 | 0 | 0 | 492736.693 | 492736.693 | 0 |
| $Mg(OH)Cl$ | 0 | 0 | 0 | 0 | 0 | 0 | 0 | 186052.951 |
| $Mg(OH)_2$ | 0 | 0 | 0 | 0 | 0 | 0 | 0 | 0 |
| $MgO$ | 0 | 0 | 0 | 0 | 0 | 0 | 0 | 0 |
| $H_2O$ | 0 | 0 | 0.039 | 1 | 0.712 | 0 | 0 | 0 |
| $H_2$ | 0 | 0 | 0 | 0 | 0 | 0 | 0 | 0 |
| $Cl_2$ | 0 | 0 | 0 | 0 | 0 | 0 | 0 | 0 |
| HCl | 0 | 0 | 0 | 0 | 0.288 | 0 | 0 | 0 |
| $CO_2$ | 0 | 0 | 0.321 | 0 | 0 | 0 | 0 | 0 |
| CO | 0 | 0 | 0 | 0 | 0 | 0 | 0 | 0 |
| $O_2$ | 0 | 0 | 0.11 | 0 | 0 | 0 | 0 | 0 |
| $N_2$ | 0 | 0 | 0.53 | 0 | 0 | 0 | 0 | 0 |
| $CaCl_2$ | 1 | 0.001 | 0 | 0 | 0 | 0 | 0 | 0 |
| $Ca(OH)_2$ | 0 | 0 | 0 | 0 | 0 | 0 | 0 | 0 |
| $CaCO_3$ | 0 | 0.999 | 0 | 0 | 0 | 0 | 0 | 0 |
| $MgCO_3$ | 0 | 0 | 0 | 0 | 0 | 0 | 0 | 0 |
| $Ca(O)Cl_2$ | 0 | 0 | 0 | 0 | 0 | 0 | 0 | 0 |
| $MgCl_2$ | 0 | 0 | 0 | 0 | 0 | 0 | 0 | 0 |
| $MgCl_2*W$ | 0 | 0 | 0 | 0 | 0 | 0 | 0 | 0 |
| $MgCl_2*2W$ | 0 | 0 | 0 | 0 | 0 | 0 | 0 | 0 |
| $MgCl_2*4W$ | 0 | 0 | 0 | 0 | 0 | 0 | 0 | 0 |
| $MgCl_2*6W$ | 0 | 0 | 0 | 0 | 0 | 1 | 1 | 0 |
| $Mg(OH)Cl$ | 0 | 0 | 0 | 0 | 0 | 0 | 0 | 1 |
| $Mg(OH)_2$ | 0 | 0 | 0 | 0 | 0 | 0 | 0 | 0 |
| $MgO$ | 0 | 0 | 0 | 0 | 0 | 0 | 0 | 0 |
| $H_2O$ | 0 | 0 | 11.441 | 413.016 | 384.27 | 0 | 0 | 0 |
| $H_2$ | 0 | 0 | 0 | 0 | 0 | 0 | 0 | 0 |
| $Cl_2$ | 0 | 0 | 0 | 0 | 0 | 0 | 0 | 0 |
| HCl | 0 | 0 | 0 | 0 | 76.854 | 0 | 0 | 0 |
| $CO_2$ | 0 | 0 | 38.427 | 0 | 0 | 0 | 0 | 0 |
| CO | 0 | 0 | 0 | 0 | 0 | 0 | 0 | 0 |
| $O_2$ | 0 | 0 | 18.168 | 0 | 0 | 0 | 0 | 0 |
| $N_2$ | 0 | 0 | 99.8 | 0 | 0 | 0 | 0 | 0 |
| $CaCl_2$ | 38.45 | 0.023 | 0 | 0 | 0 | 0 | 0 | 0 |
| $Ca(OH)_2$ | 0 | 0 | 0 | 0 | 0 | 0 | 0 | 0 |
| $CaCO_3$ | 0 | 38.427 | 0 | 0 | 0 | 0 | 0 | 0 |
| $MgCO_3$ | 0 | 0 | 0 | 0 | 0 | 0 | 0 | 0 |
| $Ca(O)Cl_2$ | 0 | 0 | 0 | 0 | 0 | 0 | 0 | 0 |
| $MgCl_2$ | 0 | 0 | 0 | 0 | 0 | 0 | 0 | 0 |
| $MgCl_2*W$ | 0 | 0 | 0 | 0 | 0 | 0 | 0 | 0 |
| $MgCl_2*2W$ | 0 | 0 | 0 | 0 | 0 | 0 | 0 | 0 |
| $MgCl_2*4W$ | 0 | 0 | 0 | 0 | 0 | 0 | 0 | 0 |
| $MgCl_2*6W$ | 0 | 0 | 0 | 0 | 0 | 76.854 | 76.854 | 0 |
| $Mg(OH)Cl$ | 0 | 0 | 0 | 0 | 0 | 0 | 0 | 76.854 |
| $Mg(OH)_2$ | 0 | 0 | 0 | 0 | 0 | 0 | 0 | 0 |
| $MgO$ | 0 | 0 | 0 | 0 | 0 | 0 | 0 | 0 |

TABLE 6b

Mass and Energy Accounting for Case 4 Simulation.

| | Process Stream Names | | | | | | | |
|---|---|---|---|---|---|---|---|---|
| | $Mg(OH)Cl_2$ | RECYCLE1 | RECYCLE2 | RECYCLE3 | RX2-VENT | SLURRY | VAPOR | VENT |
| Temperature ° C. | 100 | 95 | 113.8 | 113.8 | 95 | 95 | 250 | 113.8 |
| Pressure psia | 14.696 | 14.7 | 14.7 | 14.7 | 14.7 | 14.7 | 14.696 | 14.7 |
| Mass VFrac | 0 | 0 | 0.002 | 0 | 1 | 0 | 1 | 1 |
| Mass SFrac | 1 | 0.998 | 0.998 | 1 | 0 | 0.998 | 0 | 0 |
| Mass Flow tonne/year | 186052.95 | 493737.58 | 493737.58 | 492736.69 | 106499.18 | 615107.14 | 306683.74 | 1000.89 |
| Volume Flow gal/min | 32.909 | 126.575 | 982.405 | 96.405 | 56469.408 | 146.834 | 313756.5 | 886 |
| Enthalpy MW | −61.189 | −190.859 | −190.331 | −189.91 | 0.241 | −237.034 | −96.605 | −0.421 |
| Density lb/cuft | 177.393 | 122.394 | 15.769 | 160.371 | 0.059 | 131.442 | 0.031 | 0.035 |

TABLE 6b-continued

Mass and Energy Accounting for Case 4 Simulation.

| | Mg(OH)Cl₂ | RECYCLE1 | RECYCLE2 | RECYCLE3 | RX2-VENT | SLURRY | VAPOR | VENT |
|---|---|---|---|---|---|---|---|---|
| H₂O | 0 | 1000 | 1000 | 0 | 0 | 1000 | 218315.27 | 1000 |
| H₂ | 0 | 0 | 0 | 0 | 0 | 0 | 0 | 0 |
| Cl₂ | 0 | 0 | 0 | 0 | 0 | 0 | 0 | 0 |
| HCl | 0 | 0 | 0 | 0 | 0 | 0 | 88368.477 | 0 |
| CO₂ | 0 | 0 | 0 | 0 | 0.532 | 0 | 0 | 0 |
| CO | 0 | 0 | 0 | 0 | 0 | 0 | 0 | 0 |
| O₂ | 0 | 0.165 | 0.165 | 0 | 18333.088 | 0.165 | 0 | 0.165 |
| N₂ | 0 | 0.72 | 0.72 | 0 | 88165.558 | 0.72 | 0 | 0.72 |
| CaCl₂ | 0 | 0 | 0 | 0 | 0 | 80.499 | 0 | 0 |
| Ca(OH)₂ | 0 | 0 | 0 | 0 | 0 | 0 | 0 | 0 |
| CaCO₃ | 0 | 0 | 0 | 0 | 0 | 121289.06 | 0 | 0 |
| MgCO₃ | 0 | 0 | 0 | 0 | 0 | 0 | 0 | 0 |
| Ca(O)Cl₂ | 0 | 0 | 0 | 0 | 0 | 0 | 0 | 0 |
| MgCl₂ | 0 | 0 | 0 | 0 | 0 | 0 | 0 | 0 |
| MgCl₂*W | 0 | 0 | 0 | 0 | 0 | 0 | 0 | 0 |
| MgCl₂*2W | 0 | 0 | 0 | 0 | 0 | 0 | 0 | 0 |
| MgCl₂*4W | 0 | 0 | 0 | 0 | 0 | 0 | 0 | 0 |
| MgCl₂*6W | 0 | 492736.69 | 492736.69 | 492736.69 | 0 | 492736.69 | 0 | 0 |
| Mg(OH)Cl | 186052.95 | 0 | 0 | 0 | 0 | 0 | 0 | 0 |
| Mg(OH)₂ | 0 | 0 | 0 | 0 | 0 | 0 | 0 | 0 |
| MgO | 0 | 0 | 0 | 0 | 0 | 0 | 0 | 0 |
| H₂O | 0 | 0.002 | 0.002 | 0 | 0 | 0.002 | 0.712 | 0.999 |
| H₂ | 0 | 0 | 0 | 0 | 0 | 0 | 0 | 0 |
| Cl₂ | 0 | 0 | 0 | 0 | 0 | 0 | 0 | 0 |
| HCl | 0 | 0 | 0 | 0 | 0 | 0 | 0.288 | 0 |
| CO₂ | 0 | 0 | 0 | 0 | 0 | 0 | 0 | 0 |
| CO | 0 | 0 | 0 | 0 | 0 | 0 | 0 | 0 |
| O₂ | 0 | 0 | 0 | 0 | 0.172 | 0 | 0 | 0 |
| N₂ | 0 | 0 | 0 | 0 | 0.828 | 0 | 0 | 0.001 |
| CaCl₂ | 0 | 0 | 0 | 0 | 0 | 0 | 0 | 0 |
| Ca(OH)₂ | 0 | 0 | 0 | 0 | 0 | 0 | 0 | 0 |
| CaCO₃ | 0 | 0 | 0 | 0 | 0 | 0.197 | 0 | 0 |
| MgCO₃ | 0 | 0 | 0 | 0 | 0 | 0 | 0 | 0 |
| Ca(O)Cl₂ | 0 | 0 | 0 | 0 | 0 | 0 | 0 | 0 |
| MgCl₂ | 0 | 0 | 0 | 0 | 0 | 0 | 0 | 0 |
| MgCl₂*W | 0 | 0 | 0 | 0 | 0 | 0 | 0 | 0 |
| MgCl₂*2W | 0 | 0 | 0 | 0 | 0 | 0 | 0 | 0 |
| MgCl₂*4W | 0 | 0 | 0 | 0 | 0 | 0 | 0 | 0 |
| MgCl₂*6W | 0 | 0.998 | 0.998 | 1 | 0 | 0.801 | 0 | 0 |
| Mg(OH)Cl | 1 | 0 | 0 | 0 | 0 | 0 | 0 | 0 |
| Mg(OH)₂ | 0 | 0 | 0 | 0 | 0 | 0 | 0 | 0 |
| MgO | 0 | 0 | 0 | 0 | 0 | 0 | 0 | 0 |
| H₂O | 0 | 1.76 | 1.76 | 0 | 0 | 1.76 | 384.27 | 1.76 |
| H₂ | 0 | 0 | 0 | 0 | 0 | 0 | 0 | 0 |
| Cl₂ | 0 | 0 | 0 | 0 | 0 | 0 | 0 | 0 |
| HCl | 0 | 0 | 0 | 0 | 0 | 0 | 76.854 | 0 |
| CO₂ | 0 | 0 | 0 | 0 | 0 | 0 | 0 | 0 |
| CO | 0 | 0 | 0 | 0 | 0 | 0 | 0 | 0 |
| O₂ | 0 | 0 | 0 | 0 | 18.168 | 0 | 0 | 0 |
| N₂ | 0 | 0.001 | 0.001 | 0 | 99.799 | 0.001 | 0 | 0.001 |
| CaCl₂ | 0 | 0 | 0 | 0 | 0 | 0.023 | 0 | 0 |
| Ca(OH)₂ | 0 | 0 | 0 | 0 | 0 | 0 | 0 | 0 |
| CaCO₃ | 0 | 0 | 0 | 0 | 0 | 38.427 | 0 | 0 |
| MgCO₃ | 0 | 0 | 0 | 0 | 0 | 0 | 0 | 0 |
| Ca(O)Cl₂ | 0 | 0 | 0 | 0 | 0 | 0 | 0 | 0 |
| MgCl₂ | 0 | 0 | 0 | 0 | 0 | 0 | 0 | 0 |
| MgCl₂*W | 0 | 0 | 0 | 0 | 0 | 0 | 0 | 0 |
| MgCl₂*2W | 0 | 0 | 0 | 0 | 0 | 0 | 0 | 0 |
| MgCl₂*4W | 0 | 0 | 0 | 0 | 0 | 0 | 0 | 0 |
| MgCl₂*6W | 0 | 76.854 | 76.854 | 76.854 | 0 | 76.854 | 0 | 0 |
| Mg(OH)Cl | 76.854 | 0 | 0 | 0 | 0 | 0 | 0 | 0 |
| Mg(OH)₂ | 0 | 0 | 0 | 0 | 0 | 0 | 0 | 0 |
| MgO | 0 | 0 | 0 | 0 | 0 | 0 | 0 | 0 |

Example 6

Road Salt Boiler: Decomposition of $MgCl_2 \cdot 6H_2O$

FIG. 10 shows a graph of the mass percentage of a heated sample of $MgCl_2 \cdot 6H_2O$. The sample's initial mass was approximately 70 mg and set at 100%. During the experiment, the sample's mass was measured while it was being thermally decomposed. The temperature was quickly ramped up to 150° C., and then slowly increased by 0.5° C. per minute. At approximately 220° C., the weight became constant, consistent with the formation of Mg(OH)Cl. The absence of further weight decrease indicated that almost all the water has been removed. Two different detailed decompositional mass analyses are shown in FIGS. 28 and 29, with the theoretical plateaus of different final materials shown. FIG. 30 confirms that MgO can be made by higher temperatures (here, 500° C.) than those which produce Mg(OH)Cl.

Example 7

Dissolution of Mg(OH)Cl in $H_2O$

A sample of Mg(OH)Cl, produced by the heated decomposition of $MgCl_2.6H_2O$, was dissolved in water and stirred for a period of time. Afterwards, the remaining precipitate was dried, collected and analyzed. By the formula of decomposition, the amount of $Mg(OH)_2$ could be compared to the expected amount and analyzed. The chemical reaction can be represented as follows:

$$2Mg(OH)Cl(aq) \rightarrow Mg(OH)_2 + MgCl_2 \qquad (44)$$

The solubility data for $Mg(OH)_2$ and $MgCl_2$ is as follows:
$MgCl_2$ 52.8 gm in 100 gm. $H_2O$ (very soluble)
$Mg(OH)_2$ 0.0009 gm in 100 gm. $H_2O$ (virtually insoluble)
Theoretical weight of recovered $Mg(OH)_2$:
Given weight of sample: 3.0136 gm.
MW Mg(OH)Cl 76.764
MW $Mg(OH)_2$ 58.32
Moles $Mg(OH)_2$ formed per mole Mg(OH)Cl=½
Expected amount of $Mg(OH)_2$ $$2Mg(OH)Cl(aq) \rightarrow Mg(OH)_2 + MgCl_2$$

3.016 gm*(MW $Mg(OH)_2$÷(MW Mg(OH)Cl*½=1.1447 gm

Precipitate collected=1.1245 gm
% of theoretical collected=(1.1447÷1.1245)*100=98.24%
Analytical data:
Next the sample of $Mg(OH)_2$ was sent for analysis, XRD (X-ray-diffraction) and EDS. Results are shown in FIG. 11. The top row of peaks is that of the sample, the spikes in the middle row are the signature of $Mg(OH)_2$ while the spikes at the bottom are those of MgO. Thus verifying that the recovered precipitate from the dissolution of Mg(OH)Cl has a signal resembling that of $Mg(OH)_2$.

| Element (calc.) | k-ratio Wt % | ZAF (1-Sigma) | Atom % | Element | Wt % Err. |
|---|---|---|---|---|---|
| Mg—K | 0.9472 | 1.014 | 96.88 | 96.02 | +/−0.23 |
| Si—K | 0.0073 | 2.737 | 1.74 | 1.99 | +/−0.17 |
| Cl—K | 0.0127 | 1.570 | 1.38 | 2.00 | +/−0.16 |
| Total | 100.00 | 100.00 | | | |

Note:
Results do not include elements with Z < 11 (Na).

The EDS analysis reveals that very little chlorine [Cl] was incorporated into the precipitate. Note, this analysis cannot detect oxygen or hydrogen.

Example 8

Decarbonation Bubbler Experiment: Production of $CaCO_3$ by Reacting $CO_2$ with $Mg(OH)_2$ {or Mg(OH)Cl} and $CaCl_2$ Approximately 20 grams of $Mg(OH)_2$ was placed in a bubble column with two liters of water and $CO_2$ was bubbled though it for x minutes period of time. Afterwards some of the liquid was collected to which a solution of $CaCl_2$ was added. A precipitate immediately formed and was sent through the XRD and EDS. The chemical reaction can be represented as follows:

$$Mg(OH)_2 + CO_2 + CaCl_2 \rightarrow CaCO_3 \downarrow + H_2O \qquad (45)$$

The XRD analysis (FIG. 12) coincides with the $CaCO_3$ signature.
EDS

| Element (calc.) | k-ratio Wt % | ZAF (1-Sigma) | Atom % | Element | Wt % Err. |
|---|---|---|---|---|---|
| Mg—K | 0.0070 | 2.211 | 2.52 | 1.55 | +/−0.10 |
| Al—K | 0.0013 | 1.750 | 0.33 | 0.22 | +/−0.04 |
| Si—K | 0.0006 | 1.382 | 0.12 | 0.09 | +/−0.03 |
| Cl—K | 0.0033 | 1.027 | 0.38 | 0.34 | +/−0.03 |
| Ca—K | 0.9731 | 1.005 | 96.64 | 97.80 | +/−0.30 |
| Total | 100.00 | 100.00 | | | |

Note:
Results do not include elements with Z < 11(Na).

The EDS analysis indicates almost pure $CaCO_3$ with only a 1.55% by weight magnesium impurity and almost no Chlorine from the $CaCl_2$.

The same test was performed, except that Mg(OH)Cl from the decomposition of $MgCl_2.6H_2O$ was used instead of $Mg(OH)_2$. Although Mg(OH)Cl has half the hydroxide [OH⁻], as $Mg(OH)_2$ it is expected to absorb $CO_2$ and form precipitated $CaCO_3$ (PCC).

The XRD analysis (FIG. 13) coincides with the $CaCO_3$ signature.
EDS

| Chi-sqd = 5.83 Livetime = 300.0 Sec. Standardless Analysis PROZA Correction Acc. Volt. = 20 kV Take-off Angle = 35.00 deg Number of Iterations = 3 | | | | | |
|---|---|---|---|---|---|
| Element (calc.) | k-ratio Wt % | ZAF (1-Sigma) | Atom % | Element | Wt % Err. |
| Mg—K | 0.0041 | 2.224 | 1.48 | 0.90 | +/−0.09 |
| S—K | 0.0011 | 1.071 | 0.14 | 0.11 | +/−0.04 |
| Ca—K | 0.9874 | 1.003 | 98.38 | 98.98 | +/−0.34 |
| Total | 100.00 | 100.00 | | | |

Note:
Results do not include elements with Z < 11 (Na).

Again the results indicate almost pure $CaCO_3$, almost no Mg or Cl compounds.

Example 9A

Rock Melter Experiment: Reaction of Olivine and Serpentine with HCl

Samples of olivine $(Mg,Fe)_2SiO_4$ and serpentine $Mg_3Si_2O_5(OH)_4$ were crushed and reacted with 6.1 molar HCl over a period of approximately 72 hours. Two sets of tests were run, the first at room temperature and the second at 70° C. These minerals have variable formulae and often contain iron. After the samples were filtered, the resulting filtrand and filtrate were dried in an oven overnight. The samples then went through XRD and EDS analysis. The filtrates should have $MgCl_2$ present and the filtrand should be primarily $SiO_2$.

Olivine Filtrate Reacted with HCl at Room Temperature

| Element (calc.) | k-ratio Wt % | ZAF (1-Sigma) | Atom % | Element | Wt % Err. |
|---|---|---|---|---|---|
| Mg—K | 0.1960 | 1.451 | 37.06 | 28.45 | +/−0.18 |
| Si—K | 0.0103 | 1.512 | 1.75 | 1.56 | +/−0.11 |
| Cl—K | 0.5643 | 1.169 | 58.89 | 65.94 | +/−0.31 |
| Fe—K | 0.0350 | 1.161 | 2.30 | 4.06 | +/−0.22 |
| Total | 100.00 | 100.00 | | | |

Olivine Filtrate Reacted with HCl at 70° C.

| Element (calc.) | k-ratio Wt % | ZAF (1-Sigma) | Atom % | Element | Wt % Err. |
|---|---|---|---|---|---|
| Mg—K | 0.1172 | 1.684 | 27.39 | 19.74 | +/−0.12 |
| Si—K | 0.0101 | 1.459 | 1.77 | 1.48 | +/−0.07 |
| Cl—K | 0.5864 | 1.142 | 63.70 | 66.94 | +/−0.24 |
| Fe—K | 0.0990 | 1.144 | 6.84 | 11.33 | +/−0.21 |
| Ni—K | 0.0045 | 1.128 | 0.29 | 0.51 | +/−0.09 |
| Total | 100.00 | 100.00 | | | |

Note:
Results do not include elements with Z < 11 (Na).

Serpentine Filtrate Reacted with HCl at Room Temperature

| Element (calc.) | k-ratio Wt % | ZAF (1-Sigma) | Atom % | Element | Wt % Err. |
|---|---|---|---|---|---|
| Mg—K | 0.1674 | 1.466 | 32.47 | 24.53 | +/−0.15 |
| Al—K | 0.0025 | 1.863 | 0.55 | 0.46 | +/−0.06 |
| Si—K | 0.0033 | 1.456 | 0.55 | 0.48 | +/−0.04 |
| Cl—K | 0.6203 | 1.141 | 64.22 | 70.77 | +/−0.27 |
| Ca—K | 0.0016 | 1.334 | 0.17 | 0.21 | +/−0.05 |
| Cr—K | 0.0026 | 1.200 | 0.19 | 0.31 | +/−0.07 |
| Mn—K | 0.0011 | 1.200 | 0.08 | 0.14 | +/−0.08 |
| Fe—K | 0.0226 | 1.160 | 1.51 | 2.62 | +/−0.10 |
| Ni—K | 0.0042 | 1.128 | 0.26 | 0.48 | +/−0.10 |
| Total | 100.00 | 100.00 | | | |

Note:
Results do not include elements with Z < 11 (Na).

Serpentine Filtrate Reacted with HCl at 70° C.

| Element (calc.) | k-ratio Wt % | ZAF (1-Sigma) | Atom % | Element | Wt % Err. |
|---|---|---|---|---|---|
| Mg—K | 0.1759 | 1.455 | 33.67 | 25.59 | +/−0.14 |
| Al—K | 0.0017 | 1.886 | 0.39 | 0.33 | +/−0.06 |
| Si—K | 0.0087 | 1.468 | 1.46 | 1.28 | +/−0.04 |
| Cl—K | 0.6014 | 1.152 | 62.46 | 69.27 | +/−0.25 |
| Cr—K | 0.0016 | 1.199 | 0.12 | 0.19 | +/−0.06 |
| Fe—K | 0.0268 | 1.161 | 1.78 | 3.11 | +/−0.17 |
| Ni—K | 0.0020 | 1.130 | 0.12 | 0.22 | +/−0.08 |
| Total | 100.00 | 100.00 | | | |

Note:
Results do not include elements with Z < 11 (Na).
Note:
Results do not include elements with Z < 11 (Na).

The filtrate clearly for both minerals serpentine and olivine at ambient conditions and 70° C. all illustrate the presence of $MgCl_2$, and a small amount of $FeCl_2$ in the case of olivine.

Olivine Filtrand Reacted with HCl at Room Temperature

| Element (calc.) | k-ratio Wt % | ZAF (1-Sigma) | Atom % | Element | Wt % Err. |
|---|---|---|---|---|---|
| Mg—K | 0.2239 | 1.431 | 37.68 | 32.04 | +/−0.14 |
| Si—K | 0.3269 | 1.622 | 53.96 | 53.02 | +/−0.19 |
| Cl—K | 0.0140 | 1.658 | 1.87 | 2.32 | +/−0.06 |
| Cr—K | 0.0090 | 1.160 | 0.58 | 1.05 | +/−0.08 |
| Mn—K | 0.0013 | 1.195 | 0.08 | 0.16 | +/−0.09 |
| Fe—K | 0.0933 | 1.167 | 5.57 | 10.89 | +/−0.26 |
| Ni—K | 0.0045 | 1.160 | 0.25 | 0.52 | +/−0.11 |
| Total | 100.00 | 100.00 | | | |

Note:
Results do not include elements with Z < 11 (Na).

Olivine Filtrand Reacted with HCl at 70° C.

| Element (calc.) | k-ratio Wt % | ZAF (1-Sigma) | Atom % | Element | Wt % Err. |
|---|---|---|---|---|---|
| Mg—K | 0.2249 | 1.461 | 38.87 | 32.86 | +/−0.16 |
| Si—K | 0.3030 | 1.649 | 51.12 | 49.94 | +/−0.21 |
| Cl—K | 0.0223 | 1.638 | 2.96 | 3.65 | +/−0.14 |
| Ca—K | 0.0033 | 1.220 | 0.29 | 0.41 | +/−0.05 |
| Cr—K | 0.0066 | 1.158 | 0.42 | 0.76 | +/−0.08 |
| Mn—K | 0.0023 | 1.193 | 0.15 | 0.28 | +/−0.10 |
| Fe—K | 0.0937 | 1.163 | 5.61 | 10.89 | +/−0.29 |
| Ni—K | 0.0074 | 1.158 | 0.42 | 0.86 | +/−0.13 |
| Cu—K | 0.0029 | 1.211 | 0.16 | 0.35 | +/−0.16 |
| Total | 100.00 | 100.00 | | | |

Note:
Results do not include elements with Z < 11 (Na).

Given that the formula for olivine is $(Mg,Fe)_2SiO_4$, and this is a magnesium rich olivine. The raw compound has a Mg:Si ratio of 2:1. However the filtrand, that which does not pass through the filter has a (Mg+Fe:Si) ratio of (37+5.5:52) or 0.817:1. (Atom % on the chart), evidently more than 50% of the magnesium passed through the filter.

Serpentine Filtrand Reacted with HCl at Room Temperature

| Element (calc.) | k-ratio Wt % | ZAF (1-Sigma) | Atom % | Element | Wt % Err. |
|---|---|---|---|---|---|
| Mg—K | 0.1930 | 1.595 | 37.32 | 30.78 | +/−0.15 |
| Si—K | 0.2965 | 1.670 | 51.94 | 49.50 | +/−0.20 |
| Cl—K | 0.0065 | 1.633 | 0.88 | 1.06 | +/−0.06 |
| Cr—K | 0.0056 | 1.130 | 0.36 | 0.63 | +/−0.08 |
| Fe—K | 0.1532 | 1.155 | 9.33 | 17.69 | +/−0.31 |
| Ni—K | 0.0029 | 1.159 | 0.17 | 0.34 | +/−0.12 |
| Total | 100.00 | 100.00 | | | |

Note:
Results do not include elements with Z < 11 (Na).

Serpentine Filtrand Reacted with HCl at 70° C.

| Element (calc.) | k-ratio Wt % | ZAF (1-Sigma) | Atom % | Element | Wt % Err. |
|---|---|---|---|---|---|
| Mg—K | 0.1812 | 1.536 | 33.53 | 27.83 | +/−0.13 |
| Si—K | 0.3401 | 1.593 | 56.49 | 54.18 | +/−0.18 |
| Cl—K | 0.0106 | 1.651 | 1.45 | 1.75 | +/−0.11 |
| Cr—K | 0.0037 | 1.142 | 0.24 | 0.43 | +/−0.07 |
| Mn—K | 0.0009 | 1.188 | 0.05 | 0.10 | +/−0.08 |
| Fe—K | 0.1324 | 1.159 | 8.05 | 15.35 | +/−0.26 |

-continued

| Element (calc.) | k-ratio Wt % | ZAF (1-Sigma) | Atom % | Element | Wt % Err. |
|---|---|---|---|---|---|
| Ni—K | 0.0032 | 1.160 | 0.18 | 0.37 | +/−0.11 |
| Total | 100.00 | 100.00 | | | |

Note:
Results do not include elements with Z < 11 (Na).

Given that the formula of serpentine is $(Mg,Fe)_3Si_2O_5(OH)_4$ the initial 1.5:1 ratio of (Mg+Fe) to Si has been whittled down to (37+9.3:56.5)=0.898:1.

Example 9B

Temperature/Pressure Simulation for Decomposition of $MgCl_2.6(H_2O)$

Pressure and temperature was varied, as shown below (Table 7) and in FIG. 14, to determine the effect this has on the equilibrium of the decomposition of $MgCl_2.6(H_2O)$. Inputs are:
1) $MgCl_2.6H_2O$
2) $CaCl_2$
3) The temperature of the hot stream leaving the heat exchanger (MX) labeled Mg(OH)Cl (see FIGS. 7-8).
4) Percentage of Solids separated in decanter.
5) Water needed labeled $H_2O$
6) Flue Gas.

TABLE 7

| VARY 1 REACTOR1 PARAM TEMP °C. | VARY 2 REACTOR1 PARAM PRES PSIA | INPUT MOL/SEC | Mg(OH)Cl MOL/SEC | MgO MOL/SEC | Q MW | kWh/tonne CO2 |
|---|---|---|---|---|---|---|
| 400 | 5 | 51.08399 | 25.31399 | 25.77001 | 23.63765 | 3883 |
| 410 | 5 | 38.427 | 0 | 38.427 | 19.85614 | 3261 |
| 420 | 5 | 38.427 | 0 | 38.427 | 19.87482 | 3264 |
| 430 | 5 | 38.427 | 0 | 38.427 | 19.89354 | 3268 |
| 440 | 5 | 38.427 | 0 | 38.427 | 19.9123 | 3271 |
| 450 | 5 | 38.427 | 0 | 38.427 | 19.93111 | 3274 |
| 400 | 7 | 76.854 | 76.854 | 0 | 31.37484 | 5153 |
| 410 | 7 | 53.24627 | 29.63854 | 23.60773 | 24.31186 | 3993 |
| 420 | 7 | 38.427 | 0 | 38.427 | 19.87482 | 3264 |
| 430 | 7 | 38.427 | 0 | 38.427 | 19.89354 | 3268 |
| 440 | 7 | 38.427 | 0 | 38.427 | 19.9123 | 3271 |
| 450 | 7 | 38.427 | 0 | 38.427 | 19.93111 | 3274 |
| 400 | 9 | 76.854 | 76.854 | 0 | 31.37484 | 5153 |
| 410 | 9 | 72.85115 | 68.84829 | 4.002853 | 30.20646 | 4961 |
| 420 | 9 | 50.2148 | 23.5756 | 26.6392 | 23.42411 | 3847 |
| 430 | 9 | 38.427 | 0 | 38.427 | 19.89354 | 3268 |
| 440 | 9 | 38.427 | 0 | 38.427 | 19.9123 | 3271 |
| 450 | 9 | 38.427 | 0 | 38.427 | 19.93111 | 3274 |
| 400 | 11 | 76.854 | 76.854 | 0 | 31.37484 | 5153 |
| 410 | 11 | 76.854 | 76.854 | 0 | 31.41 | 5159 |
| 420 | 11 | 64.78938 | 52.72476 | 12.06462 | 27.81251 | 4568 |
| 430 | 11 | 44.67748 | 12.50096 | 32.17652 | 21.77822 | 3577 |
| 440 | 11 | 38.427 | 0 | 38.427 | 19.9123 | 3271 |
| 450 | 11 | 38.427 | 0 | 38.427 | 19.93111 | 3274 |
| 400 | 13 | 76.854 | 76.854 | 0 | 31.37484 | 5153 |
| 410 | 13 | 76.854 | 76.854 | 0 | 31.41 | 5159 |
| 420 | 13 | 76.854 | 76.854 | 0 | 31.44515 | 5165 |
| 430 | 13 | 55.59535 | 34.3367 | 21.25865 | 25.07026 | 4118 |
| 440 | 13 | 38.427 | 0 | 38.427 | 19.9123 | 3271 |
| 450 | 13 | 38.427 | 0 | 38.427 | 19.93111 | 3274 |
| 400 | 15 | 76.854 | 76.854 | 0 | 31.37484 | 5153 |
| 410 | 15 | 76.854 | 76.854 | 0 | 31.41 | 5159 |
| 420 | 15 | 76.854 | 76.854 | 0 | 31.44515 | 5165 |
| 430 | 15 | 66.51322 | 56.17244 | 10.34078 | 28.36229 | 4659 |
| 440 | 15 | 46.41875 | 15.98351 | 30.43525 | 22.32544 | 3667 |
| 450 | 15 | 38.427 | 0 | 38.427 | 19.93111 | 3274 |
| 200 | 5 | 127 | 76.854 | 0 | 47.51946 | 7805 |
| 210 | 5 | 85 | 76.854 | 0 | 33.34109 | 5476 |
| 220 | 5 | 77 | 76.854 | 0 | 30.74184 | 5049 |
| 230 | 5 | 77 | 76.854 | 0 | 30.77702 | 5055 |
| 240 | 5 | 77 | 76.854 | 0 | 30.8122 | 5061 |
| 250 | 5 | 77 | 76.854 | 0 | 30.84739 | 5067 |
| 200 | 7 | 184 | 76.854 | 0 | 66.57309 | 10935 |
| 210 | 7 | 125 | 76.854 | 0 | 46.75184 | 7679 |
| 220 | 7 | 85 | 76.854 | 0 | 33.32609 | 5474 |
| 230 | 7 | 77 | 76.854 | 0 | 30.777 | 5055 |
| 240 | 7 | 77 | 76.854 | 0 | 30.81218 | 5061 |
| 250 | 7 | 77 | 76.854 | 0 | 30.84737 | 5067 |
| 200 | 9 | 297 | 76.854 | 0 | 89.51079 | 14702 |
| 210 | 9 | 165 | 76.854 | 0 | 60.16258 | 9882 |
| 220 | 9 | 113 | 76.854 | 0 | 42.92123 | 7050 |
| 230 | 9 | 78 | 76.854 | 0 | 31.04401 | 5099 |
| 240 | 9 | 77 | 76.854 | 0 | 30.81217 | 5061 |
| 250 | 9 | 77 | 76.854 | 0 | 30.84735 | 5067 |

TABLE 7-continued

| VARY 1 REACTOR1 PARAM TEMP °C. | VARY 2 REACTOR1 PARAM PRES PSIA | INPUT MOL/SEC | Mg(OH)Cl MOL/SEC | MgO MOL/SEC | Q MW | kWh/tonne CO2 |
|---|---|---|---|---|---|---|
| 200 | 11 | 473 | 76.854 | 0 | 136.5784 | 22433 |
| 210 | 11 | 205 | 76.854 | 0 | 73.57332 | 12084 |
| 220 | 11 | 142 | 76.854 | 0 | 52.51638 | 8626 |
| 230 | 11 | 98 | 76.854 | 0 | 38.01558 | 6244 |
| 240 | 11 | 77 | 76.854 | 0 | 30.81216 | 5061 |
| 250 | 11 | 77 | 76.854 | 0 | 30.84734 | 5067 |
| 200 | 13 | 684 | 76.854 | 0 | 192.9858 | 31698 |
| 210 | 13 | 303 | 76.854 | 0 | 91.43505 | 15018 |
| 220 | 13 | 170 | 76.854 | 0 | 62.11152 | 10202 |
| 230 | 13 | 119 | 76.854 | 0 | 44.98715 | 7389 |
| 240 | 13 | 83.3323 | 76.854 | 0 | 33.00459 | 5421 |
| 250 | 13 | 76.854 | 76.854 | 0 | 30.84733 | 5067 |
| 200 | 15 | 930.5287 | 76.854 | 0 | 258.7607 | 42502 |
| 210 | 15 | 422.9236 | 76.854 | 0 | 123.7223 | 20322 |
| 220 | 15 | 198.7291 | 76.854 | 0 | 71.70666 | 11778 |
| 230 | 15 | 139.6567 | 76.854 | 0 | 51.95871 | 8534 |
| 240 | 15 | 98.51739 | 76.854 | 0 | 38.14363 | 6265 |
| 250 | 15 | 76.854 | 76.854 | 0 | 30.84733 | 5067 |

Examples 10-21

The following remaining examples are concerned with obtaining the necessary heat to perform the decomposition reaction using waste heat emissions from either coal or natural gas power plants. In order to obtain the necessary heat from coal flue gas emissions, the heat source may be located prior to the baghouse where the temperature ranges from 320-480° C. in lieu of the air pre-heater. See Reference: pages 11-15 of "The structural design of air and gas ducts for power stations and industrial Boiler Applications," Publisher: American Society of Civil Engineers (August 1995), which is incorporated by reference herein in its entirety. Open cycle natural gas plants have much higher exhaust temperatures of 600° C. See Reference: pages 11-15 of "The structural design of air and gas ducts for power stations and industrial Boiler Applications," Publisher: American Society of Civil Engineers (August 1995), which is incorporated by reference herein in its entirety. Additionally, the decomposition reaction of $MgCl_2 \cdot 6H_2O$ may also run in two different modes, complete decomposition to MgO or a partial decomposition to Mg(OH)Cl. The partial decomposition to Mg(OH)Cl requires in some embodiments a temperature greater than 180° C. whereas the total decomposition to MgO requires in some embodiments a temperature of 440° C. or greater.

Additionally the incoming feed to the process can be represented as a continuum between 100% Calcium Silicate ($CaSiO_3$) and 100% Magnesium Silicate ($MgSiO_3$) with Diopside ($MgCa(SiO_3)_2$) (or a mixture of $CaSiO_3$ and $MgSiO_3$ in a 1:1 molar ratio) representing an intermediate 50% case. For each of these cases the resulting output will range in some embodiments from calcium carbonate ($CaCO_3$) to magnesium carbonate ($MgCO_3$) with Dolomite $CaMg(CO_3)_2$ representing the intermediate case. The process using 100% calcium silicate is the Ca—Mg process used in all of the previously modeled embodiments. It is also important to note that the 100% magnesium silicate process uses no calcium compounds; whereas the 100% calcium silicate incoming feed process does use magnesium compounds, but in a recycle loop, only makeup magnesium compounds are required.

Further details regarding the Ca—Mg, Mg only, Diopside processes, for example, using complete and partial decomposition of hydrated $MgCl_2$ to MgO and Mg(OH)Cl, respectively, are depicted below.

I) Ca—Mg Process

Overall reaction $CaSiO_3 + CO_2 \rightarrow CaCO_3 + SiO_2$ a) Full decomposition ("the $CaSiO_3$—MgO process"):

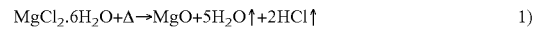

A thermal decomposition reaction.

A rock melting reaction.

Note $5H_2O$ will be present per 2 moles of HCl during the reaction.

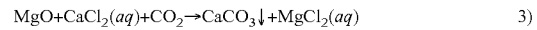

Some versions of this equation use $Mg(OH)_2$ which is formed from MgO and $H_2O$.

Regeneration of $MgCl_2 \cdot 6H_2O$, return to #1.

b) Partial decomposition ("the $CaSiO_3$—Mg(OH)Cl process"):

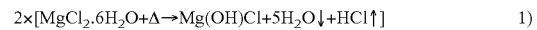

Thermal decomposition.

Twice as much $MgCl_2 \cdot 6H_2O$ is needed to trap the same amount of $CO_2$.

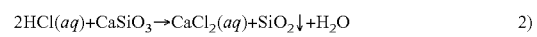

Rock melting reaction.

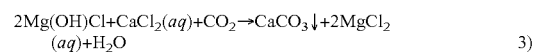

$CO_2$ capture reaction

Regeneration of $MgCl_2 \cdot 6H_2O$, return to #1.

II) Mg Only Process

Overall reaction $MgSiO_3+CO_2 \rightarrow MgCO_3+SiO_2$ c) Full decomposition ("the $MgSiO_3$—MgO process")

$$2HCl(aq)+MgSiO_3+(x-1)H_2O \rightarrow MgCl_2+SiO_2\downarrow+xH_2O \quad\quad 1)$$

Rock melting reaction.

$$MgCl_2.xH_2O+\Delta\downarrow MgO+(x-1)H_2O\uparrow+2HCl\uparrow \quad\quad 2)$$

Thermal decomposition reaction.

Note "x−1" moles $H_2O$ will be produced per 2 moles of HCl.

$$MgO+CO_2 \rightarrow MgCO_3 \quad\quad 3)$$

$CO_2$ capture reaction.

Note, in this embodiment no recycle of $MgCl_2$ is required. The value of x, the number of waters of hydration is much lower than 6 because the $MgCl_2$ from the rock melting reaction is hot enough to drive much of the water into the vapor phase. Therefore the path from the rock melting runs at steady state with "x" as modeled with a value of approximately 2.

d) Partial decomposition ("the $MgSiO_3$—Mg(OH)Cl process")

$$2HCl(aq)+MgSiO_3 \rightarrow MgCl_2+SiO_2\downarrow+H_2O \quad\quad 1)$$

Rock melting reaction.

Note "x−1" $H_2O$ will be present per mole of HCl during the reaction.

$$2\times[MgCl_2.xH_2O+\Delta \rightarrow Mg(OH)Cl+(x-1)H_2O\uparrow+HCl\uparrow] \quad\quad 2)$$

Decomposition.

Twice as much $MgCl_2.(x-1)H_2O$ is needed to trap the same amount of $CO_2$.

$$2Mg(OH)Cl+CO_2 \rightarrow MgCO_3\downarrow+MgCl_2+H_2O \quad\quad 3)$$

$CO_2$ capture reaction.

$$MgCl_2(aq)+6H_2O \rightarrow MgCl_2.6H_2O \quad\quad 4)$$

Regenerate $MgCl_2.6H_2O$, Return to #1.

Note, in this embodiment half of the $MgCl_2$ is recycled. The value of x, the number of waters of hydration is somewhat lower than 6 because half of the $MgCl_2$ is from the rock melting reaction which is hot enough to drive much of the water into the vapor phase and the remaining half is recycled from the absorption column. Therefore the number of hydrations for the total amount of $MgCl_2$ at steady state will have a value of approximately 4, being the average between the $MgCl_2.6H_2O$ and $MgCl_2.2H_2O$.

III) Diopside or Mixed process:

Note diopside is a mixed calcium and magnesium silicate and dolomite is a mixed calcium and magnesium carbonate.

Overall reaction: $½CaMg(SiO_3)_2+CO_2 \rightarrow ½CaMg(CO_3)_2+SiO_2$ e) Full decomposition ("the Diopside-MgO process"):

$$MgCl_2.6H_2O+\Delta \rightarrow MgO+5H_2O\uparrow+2HCl\uparrow \quad\quad 1)$$

Thermal decomposition.

$$HCl+½CaMg(SiO_3)_2 \rightarrow ½CaCl_2+½MgSiO_3\downarrow+½SiO_2\downarrow+½H_2O \quad\quad 2)$$

First rock melting reaction.

$$HCl+½MgSiO_3 \rightarrow ½MgCl_2+½SiO_2\uparrow+½H_2O \quad\quad 3)$$

Second rock melting reaction. The $MgCl_2$ returns to #1.

$$MgO+½CaCl_2+CO_2 \rightarrow ½CaMg(CO_3)_2\downarrow+½MgCl_2 \quad\quad 4)$$

$$½MgCl_2+3H_2O \rightarrow ½MgCl_2.6H2O \quad\quad 5)$$

Regenerate $MgCl_2.6H_2O$, return to #1.

f) Partial decomposition ("the Diopside-Mg(OH)Cl process"):

$$2\times[MgCl_2.6H_2O+\Delta \rightarrow Mg(OH)Cl+5H_2O\uparrow+HCl\uparrow] \quad\quad 1)$$

Thermal decomposition.

Twice as much $MgCl_2.6H_2O$ is needed to trap the same amount of $CO_2$.

$$HCl+½CaMg(SiO_3)_2 \rightarrow ½CaCl_2+½MgSiO_3\downarrow+½SiO_2\downarrow+½H_2O \quad\quad 2)$$

First rock melting reaction.

$$HCl+½MgSiO_3 \rightarrow ½MgCl_2+½SiO_2\uparrow+½H_2O \quad\quad 3)$$

Second rock melting reaction. Here the $MgCl_2$ returns to #1.

$$2Mg(OH)Cl+½CaCl_2+CO_2 \rightarrow ½CaMg(CO_3)_2\downarrow+3/2MgCl_2 \quad\quad 4)H_2O$$

$$3/2MgCl_2+9H_2O \rightarrow 3/2MgCl_2.6H_2O \quad\quad 5)$$

Regenerate $MgCl_2.6H_2O$, return to #1

TABLE 9

Summary of Processes

| Example | Process | Flue gas source | Temp. °C.[1] | % $CO_2$ of flue gas[2] | Detailed mass and energy balance of each process stream |
|---|---|---|---|---|---|
| 10 | $CaSiO_3$—Mg(OH)Cl | Coal | 320-550 | 7.2%-18% | Table 14 |
| 11 | $CaSiO_3$—Mg(OH)Cl | Nat. gas | 600 | 7.2%-18% | Table 14 |
| 12 | $CaSiO_3$—MgO | Coal | 550 | 7.2%-18% | Table 15 |
| 13 | $CaSiO_3$—MgO | Nat. gas | 600 | 7.2%-18% | Table 15 |
| 14 | $MgSiO_3$—Mg(OH)Cl | Coal | 320-550 | 7.2%-18% | Table 16 |
| 15 | $MgSiO_3$—Mg(OH)Cl | Nat. gas | 600 | 7.2%-18% | Table 16 |
| 16 | $MgSiO_3$—MgO | Coal | 550 | 7.2%-18% | Table 17 |
| 17 | $MgSiO_3$—MgO | Nat. gas | 600 | 7.2%-18% | Table 17 |
| 18 | Diopside-Mg(OH)Cl | Coal | 320-550 | 7.2%-18% | Table 18 |
| 19 | Diopside-Mg(OH)Cl | Nat. gas | 600 | 7.2%-18% | Table 18 |
| 20 | Diopside-MgO | Coal | 550 | 7.2%-18% | Table 19 |
| 21 | Diopside-MgO | Nat. gas | 600 | 7.2%-18% | Table 19 |

[1] The temperature range of 320-550° C. includes models run at 320, 360, 400, 440 and 550° C. respectively.
[2] The $CO_2$ percentage of flue gas 7.2%-18% includes models run at 7.2%, 10%, 14% and 18% respectively.

Calcium Silicate Process:

The CaSiO$_3$—MgO and CaSiO$_3$—Mg(OH)Cl decomposition processes are further divided into two stages, the first step consists of a dehydration reaction where MgCl$_2$.6H$_2$O is converted to MgCl$_2$.2H$_2$O+4H$_2$O and the second step in which the MgCl$_2$.2H$_2$O is converted to Mg(OH)Cl+HCl+H$_2$O if partial decomposition is desired or required and MgO+2HCl+H$_2$O if total decomposition is desired or required. FIG. 15 describes a layout of this process.

Magnesium Silicate Process:

The MgSiO$_3$—MgO and MgSiO$_3$—Mg(OH)Cl processes consists of a one chamber decomposition step in which the HCl from the decomposition chamber reacts with MgSiO$_3$ in the rock-melting reactor and the ensuing heat of reaction leaves the MgCl$_2$ in the dihydrate form MgCl$_2$.2H$_2$O as it leaves the rock-melting chamber in approach to the decomposition reactor where it is converted to either MgO or Mg(OH)Cl as described earlier. This process may be preferred if calcium silicates are unavailable. The HCl emitted from the decomposition reacts with MgSiO$_3$ to form more MgCl$_2$. The magnesium silicate process follows a different path from the calcium. The process starts from the "rock melting reaction HCl+silicate", and then moves to the "decomposition reaction (MgCl$_2$+heat)," and lastly the absorption column. In the calcium silicate process, all the magnesium compounds rotate between the decomposition reaction and the absorption reaction. FIG. 16 describes the layout of this process.

Mixed Magnesium and Calcium Silicate "Diopside" Process:

The intermediate process Diopside-MgO and Diopside-Mg(OH)Cl also involve a two stage decomposition consisting of the dehydration reaction MgCl$_2$.6H$_2$O+Δ→MgCl$_2$.2H$_2$O+4H$_2$O followed by the decomposition reaction MgCl$_2$.2H$_2$O+Δ→MgO+2HCl+H$_2$O (full decomposition) or MgCl$_2$.2H$_2$O+Δ→Mg(OH)Cl+HCl+H$_2$O partial decomposition. FIG. 17 describes a layout of this process.

The ensuing HCl from the decomposition then reacts with the Diopside CaMg(SiO$_3$)$_2$ in a two step "rock melting reaction." The first reaction creates CaCl$_2$ through the reaction 2HCl+CaMg(SiO$_3$)$_2$→CaCl$_2$(aq)+MgSiO$_3$↓+SiO$_2$↓+H$_2$O. The solids from the previous reaction are then reacted with HCl a second time to produce MgCl$_2$ through the reaction MgSiO$_3$+2HCl→MgCl$_2$+SiO$_2$↓+H$_2$O. The CaCl$_2$ from the first rock melter is transported to the absorption column and the MgCl$_2$ from the second rock melter is transported to the decomposition reactor to make Mg(OH)Cl or MgO.

Basis of the Reaction:

All of these examples assume 50% CO$_2$ absorption of a reference flue gas from a known coal fired plant of interest. This was done to enable a comparison between each example. The emission flow rate of flue gas from this plant is 136,903,680 tons per year and the CO$_2$ content of this gas is 10% by weight. This amount of CO$_2$ is the basis for examples 10 through 21 which is:

Amount of CO$_2$ present in the flue gas per year:

136,903,680 tons per year*10%=13,690,368 tons per year

Amount of CO$_2$ absorbed per year.

13,690,368 tons per year*50%=6,845,184 tons per year of CO$_2$.

Since the amount of CO$_2$ absorbed is a constant, the consumption of reactants and generation of products is also a constant depending on the reaction stoichiometry and molecular weight for each compound.

For all the examples of both the CaSiO$_3$—MgO and CaSiO$_3$—Mg(OH)Cl process (examples 10-13) the overall reaction is:

CaSiO$_3$+CO$_2$→CaCO$_3$+SiO$_2$

For all the examples of both the MgSiO$_3$—MgO and the MgSiO$_3$—Mg(OH)Cl process (examples 14-17) the overall reaction is:

MgSiO$_3$+CO$_2$→MgCO$_3$+SiO$_2$

For all the examples of both the Diopside-MgO and the Diopside-Mg(OH)Cl process (examples 18-21) the overall reaction is:

½CaMg(SiO$_3$)$_2$+CO$_2$→½CaMg(CO$_3$)$_2$+SiO$_2$

The Aspen model enters the required inputs for the process and calculates the required flue gas to provide the heat needed for the decomposition reaction to produce the carbon dioxide absorbing compounds MgO, Mg(OH)$_2$ or Mg(OH)Cl. This flue gas may be from a natural gas or a coal plant and in the case of coal was tested at a range of temperatures from 320° C. to 550° C. This flue gas should not be confused with the reference flue gas which was used a standard to provide a specific amount of CO$_2$ removal for each example. A process with a higher temperature flue gas would typically require a lesser amount of flue gas to capture the same amount of carbon dioxide from the basis. Also a flue gas with a greater carbon dioxide concentration would typically result in greater amount of flue gas needed to capture the carbon dioxide because there is a greater amount of carbon dioxide that needs to be captured.

The consumption of reactants and generation of products can be determined from the basis of CO$_2$ captured and the molecular weights of each input and each output for each example.

TABLE 10

Molecular Masses of Inputs and Outputs (all embodiments).

| Compound | Molecular Weight |
| --- | --- |
| CaSiO$_3$ | 116.16 |
| MgSiO$_3$ | 99.69 |
| Diopside* | 215.85 |
| CaCO$_3$ | 100.09 |
| MgCO$_3$ | 84.31 |
| Dolomite* | 184.40 |
| SiO$_2$ | 60.08 |
| CO$_2$ | 44.01 |

*Number of moles must be divided by 2 to measure comparable CO$_2$ absorption with the other processes, For Examples 10-13:

The CaSiO$_3$ consumption is:

6,845,184 tons per year*(116.16/44.01)=18,066,577 tons per year.

The CaCO$_3$ production is:

6,845,184 tons per year*(100.09/44.01)=15,559,282 tons per year.

The SiO$_2$ production is:

6,845,184 tons per year*(60.08/44.01)=9,344,884 tons per year

The same type of calculations may be done for the remaining examples. This following table contains the inputs and outputs for examples 10 through 21. Basis: 6,845,184 tons CO$_2$ absorbed per year.

TABLE 11

Mass Flows of Inputs and Outputs for Examples 10-21.
All measurements are in tons per year (TPY)

|  | Examples | | |
| --- | --- | --- | --- |
|  | 10-13 | 14-17 | 18-21 |
| CO₂ absorbed | 6,845,184 | 6,845,184 | 6,845,184 |
| INPUTS | | | |
| Flue Gas for CO₂ Capture | 136,903,680 | 136,903,680 | 136,903,680 |
| 10% CO₂ | 13,690,368 | 13,690,368 | 13,690,368 |
| CaSiO₃ | 18,066,577 | | |
| MgSiO₃ | | 15,613,410 | |
| Diopside | | | 16,839,993 |
| OUTPUTS | | | |
| SiO₂ | 9,344,884 | 9,344,884 | 9,344,884 |
| CaCO₃ | 15,559,282 | | |
| MgCO₃ | | 13,111,817 | |
| Dolomite | | | 14,319,845 |

Running the Aspen models generated the following results for the heat duty for each step of the decomposition reaction, dehydration and decomposition. The results for each example are summarized in the table below.

TABLE 12

Power (Rate of Energy for each process at the particular basis of CO₂ absorption).

| HEAT BALANCE | Process | | | | | |
| --- | --- | --- | --- | --- | --- | --- |
|  | CaSiO₃—Mg(OH)Cl | CaSiO₃—MgO | MgSiO₃—Mg(OH)Cl | MgSiO₃—MgO | Diop.-Mg(OH)Cl | Diop.-MgO |
| Examples | 10, 11 | 12, 13 | 14, 15 | 16, 17 | 18, 19 | 20, 21 |
| Dehydration Chamber (MW) | 2670 | 1087 | n/a | n/a | 2614 | 1306 |
| HEX TO DI (210° C.) | | | | | | |
| Source | | | HCl reacting with silicate | | | |
| Decomposition Chamber (MW) | 1033 | 1297 | 1226 | 1264 | 1231 | 1374 |
| Decomposition Temp. ° C. | 210 | 450 | 210 | 450 | 210 | 450 |
| Source | | | Flue Gas | | | |
| Total heat used for D&D* (MW) | 3703 | 2384 | 1226 | 1264 | 3854 | 2680 |

*D&D equals dehydration and decomposition

TABLE 13

Percentage CO₂ captured as a function of flue gas temperature and CO₂ concentration. Examples 10 through 13.

| | Process | | | | | | | |
| --- | --- | --- | --- | --- | --- | --- | --- | --- |
| | CaSiO₃—Mg(OH)Cl | | | | | CaSiO₃—MgO | CaSiO₃—Mg(OH)Cl | CaSiO₃—MgO |
| | Flue Gas Source/Temp. | | | | | | | |
| | Coal 320° C. | Coal 360° C. | Coal 400° C. | Coal 440° C. | Coal 550° C. | Coal 550° C. | Nat. gas 600° C. | Nat. gas 600° C. |
| Example # | 10 | 10 | 10 | 10 | 10 | 12 | 11 | 13 |
| % CO₂ | | | | | | | | |
| 7% | 33% | 45% | 57% | 70% | 105% | 83% | 121% | 96% |
| 10% | 24% | 32% | 41% | 50% | 75% | 60% | 87% | 69% |
| 14% | 17% | 23% | 29% | 36% | 54% | 43% | 62% | 50% |
| 18% | 13% | 18% | 23% | 28% | 42% | 33% | 48% | 39% |

A value of over 100% means that excess heat is available to produce more Mg(OH)Cl or MgO. FIG. 24 illustrates the percent CO₂ captured for varying CO₂ flue gas concentrations, varying temperatures, whether the flue gas was originated from coal or natural gas, and also whether the process relied on full or partial decomposition for examples 10 through 13 of the CaSiO₃—Mg(OH)Cl and CaSiO₃—MgO processes.

TABLE 14

Percentage $CO_2$ captured as a function of flue gas temperature and $CO_2$ concentration. Examples 14 through 17.

| | Process | | | | | | | |
|---|---|---|---|---|---|---|---|---|
| | $MgSiO_3$—$Mg(OH)Cl$ | | | | | $MgSiO_3$—$MgO$ | $MgSiO_3$—$Mg(OH)Cl$ | $MgSiO_3$—$MgO$ |
| | Flue Gas Source/Temp. | | | | | | | |
| | Coal 320° C. | Coal 360° C. | Coal 400° C. | Coal 440° C. | Coal 550° C. | Coal 550° C. | Ngas 600° C. | Ngas 600° C. |
| Example # | 14 | 14 | 14 | 14 | 14 | 16 | 15 | 17 |
| % $CO_2$ | | | | | | | | |
| 7% | 24% | 34% | 45% | 55% | 84% | 86% | 93% | 96% |
| 10% | 17% | 25% | 32% | 40% | 61% | 62% | 67% | 69% |
| 14% | 12% | 18% | 23% | 28% | 43% | 44% | 48% | 49% |
| 18% | 10% | 14% | 18% | 22% | 34% | 34% | 37% | 38% |

FIG. 25 illustrates the percent $CO_2$ captured for varying $CO_2$ flue gas concentrations, varying temperatures, whether the flue gas was originated from coal or natural gas, and also whether the process relied on full or partial decomposition for examples 14 through 17 of the $MgSiO_3$—$Mg(OH)Cl$ and $MgSiO_3$—$MgO$ processes.

TABLE 15

Percentage $CO_2$ captured as a function of flue gas temperature and $CO_2$ concentration. Examples 18 through 21.

| | Process | | | | | | | |
|---|---|---|---|---|---|---|---|---|
| | Diopside-$Mg(OH)Cl$ | | | | | Diop-$MgO$ | Diop-$Mg(OH)Cl$ | Diop-$MgO$ |
| | Flue Gas Source/Temp. | | | | | | | |
| | Coal 320° C. | Coal 360° C. | Coal 400° C. | Coal 440° C. | Coal 550° C. | Coal 550° C. | Ngas 600° C. | Ngas 600° C. |
| Example # | 18 | 18 | 18 | 18 | 18 | 20 | 19 | 21 |
| % $CO_2$ | | | | | | | | |
| 7% | 28% | 38% | 48% | 59% | 88% | 79% | 101% | 91% |
| 10% | 20% | 27% | 35% | 42% | 63% | 57% | 73% | 65% |
| 14% | 14% | 19% | 25% | 30% | 45% | 40% | 52% | 47% |
| 18% | 11% | 15% | 19% | 23% | 35% | 31% | 41% | 36% |

*Note Diop equals Diopside

FIG. 26 illustrates the percent $CO_2$ captured for varying $CO_2$ flue gas concentrations, varying temperatures, whether the flue gas was originated from coal or natural gas, and also whether the process relied on full or partial decomposition for examples 18 through 21 of the Diopside-$Mg(OH)Cl$ and Diopside-$MgO$ processes.

TABLE 16a

Mass and Energy Accounting for Examples 10 and 11 Simulation.

| | Process Stream Names | | | | | | | | | |
|---|---|---|---|---|---|---|---|---|---|---|
| | 1 | 2 | $CaCl_2$ | $CaCl_2$—Si | $CaCO_3$ | $CaSiO_3$ | FLUE GAS | $H_2O$ | HCl | HCl Vapor |
| PH | | | | | | | | | | |
| Temperature ° C. | 112.6 | 95 | 149.9 | 150 | 95 | 25 | 100 | 25 | 200 | 250 |
| Pressure psia | 14.696 | 15 | 100 | 14.696 | 14.7 | 14.696 | 15.78 | 14.7 | 14.696 | 14.696 |
| Mass VFrac | 0 | 0.793 | 0 | 0 | 0 | 0 | 1 | 0 | 1 | 1 |
| Mass SFrac | 1 | 0.207 | 0 | 0.163 | 1 | 1 | 0 | 0 | 0 | 0 |
| Mass Flow tonne/year | 5.73E+07 | 3.96E+07 | 4.36E+07 | 5.21E+07 | 1.41E+07 | 164E+07 | 6.21E+07 | 1.80E+07 | 3.57E+07 | 3.57E+07 |
| Volume Flow gal/min | 11216.8 | 2.2E+07 | 17031.4 | 18643.542 | 2616.633 | 2126.004 | 3.11E+07 | 502184.16 | 3.30E+07 | 3.65E+07 |
| Enthalpy MW | −22099.5 | −3288.21 | −17541.7 | −21585.353 | −5368.73 | −7309.817 | −2926.806 | −9056.765 | −11331.898 | −11240.08 |

TABLE 16a-continued

Mass and Energy Accounting for Examples 10 and 11 Simulation.

| | Process Stream Names | | | | | | | | | |
|---|---|---|---|---|---|---|---|---|---|---|
| | 1 | 2 | $CaCl_2$ | $CaCl_2$—Si | $CaCO_3$ | $CaSiO_3$ | FLUE GAS | $H_2O$ | HCl | HCl Vapor |
| Density lb/cuft | 160.371 | 0.059 | 80.305 | 87.619 | 169.173 | 241.725 | 0.063 | 1.125 | 0.034 | 0.031 |
| $H_2O$ | 0 | 1.80E+07 | 2.79E+07 | 2.79E+07 | 0 | 0 | 3.10E+06 | 1.80E+07 | 2.54E+07 | 2.54E+07 |
| HCl | 0 | 0 | 0.004 | 0.004 | 0 | 0 | 0 | 0 | 1.03E+07 | 1.03E+07 |
| $CO_2$ | 0 | 0 | 0 | 0 | 0 | 0 | 6.21E+06 | 0 | 0 | 0 |
| $O_2$ | 0 | 0 | 0 | 0 | 0 | 0 | 6.21E+06 | 0 | 0 | 0 |
| $N_2$ | 0 | 0 | 0 | 0 | 0 | 0 | 4.65E+07 | 0 | 0 | 0 |
| $CaCO_3$ | 0 | 0 | 0 | 0 | 1.41E+07 | 0 | 0 | 0 | 0 | 0 |
| $MgCl_2$ | 0 | 0 | 0 | 0 | 0 | 0 | 0 | 0 | 0 | 0 |
| $MgCl_2*W$ | 0 | 0 | 0 | 0 | 0 | 0 | 0 | 0 | 0 | 0 |
| $MgCl_2*2W$ | 0 | 0 | 0 | 0 | 0 | 0 | 0 | 0 | 0 | 0 |
| $MgCl_2*4W$ | 0 | 0 | 0 | 0 | 0 | 0 | 0 | 0 | 0 | 0 |
| $MgCl_2*6W$ | 5.73E+07 | 0 | 0 | 0 | 0 | 0 | 0 | 0 | 0 | 0 |
| Mg(OH)Cl | 0 | 0 | 0 | 0 | 0 | 0 | 0 | 0 | 0 | 0 |
| $Mg(OH)_2$ | 0 | 8.22E+06 | 0 | 0 | 0 | 0 | 0 | 0 | 0 | 0 |
| MgO | 0 | 0 | 0 | 0 | 0 | 0 | 0 | 0 | 0 | 0 |
| $MgHCO_3^+$ | 0 | 0 | 0 | 0 | 0 | 0 | 0 | 0 | 0 | 0 |
| $SO_2$ | 0 | 0 | 0 | 0 | 0 | 0 | 0 | 0 | 0 | 0 |
| $NO_2$ | 0 | 0 | 0 | 0 | 0 | 0 | 0 | 0 | 0 | 0 |
| NO | 0 | 0 | 0 | 0 | 0 | 0 | 0 | 0 | 0 | 0 |
| $Mg^{2+}$ | 0 | 3.43E+06 | 0 | 0 | 0 | 0 | 0 | 0 | 0 | 0 |
| $Ca^{2+}$ | 0 | 0 | 5.65E+06 | 5.65E+06 | 0 | 0 | 0 | 0 | 0 | 0 |
| $Cl^-$ | 0 | 1.00E+07 | 1.00E+07 | 1.00E+07 | 0 | 0 | 0 | 0 | 0 | 0 |
| $CO3^{2-}$ | 0 | 0 | 0 | 0 | 0 | 0 | 0 | 0 | 0 | 0 |
| $HCO_3^-$ | 0 | 0 | 0 | 0 | 0 | 0 | 0 | 0 | 0 | 0 |
| $OH^-$ | 0 | 0 | 0 | 0 | 0 | 0 | 0 | 0 | 0 | 0 |
| $CaSiO_3$ | 0 | 0 | 0 | .007 | 0 | 1.64E+07 | 0 | 0 | 0 | 0 |
| $SiO_2$ | 0 | 0 | 0 | 8.47E+06 | 0 | 0 | 0 | 0 | 0 | 0 |

TABLE 16b

Mass and Energy Accounting for Examples 10 and 11 Simulation.

| | Process Stream Names | | | | | | | |
|---|---|---|---|---|---|---|---|---|
| | $MgCl_2$—2W | $MgCl_2$—6W | RECYCLE1 | RX2-VENT | $SiO_2$ | SLURRY | SOLIDS-1 | SOLIDS-2 |
| PH | | | 9.453 | | | 9.453 | | |
| Temperature C | 215 | 80 | 95 | 95 | 149.9 | 95 | 250 | 115 |
| Pressure psia | 14.696 | 14.696 | 14.7 | 14.7 | 100 | 14.7 | 14.696 | 14.696 |
| Mass VFrac | .502 | 0 | 0 | 1 | 0 | 0 | 0 | .165 |
| Mass SFrac | .498 | 1 | 0 | 0 | 1 | .152 | 1 | .207 |
| Mass Flow tonne/year | 5.73E+07 | 5.73E+07 | 7.84E+07 | 5.27E+07 | 8.47E+06 | 9.26E+07 | 2.16E+07 | 3.96E+07 |
| Volume Flow gal/min | 3.03E+07 | 11216.796 | 33789.492 | 282E+07 | 1607.826 | 32401.78 | 3828.933 | 6.33E+06 |
| Enthalpy MW | −1877.989 | −22191.287 | −32705.27 | 120.09 | 0 | −38074.2 | −7057.97 | −4070.06 |
| Density lb/cuft | .059 | 160.371 | 72.846 | 0.059 | 165.327 | 89.628 | 177.393 | 0.197 |
| $H_2O$ | 2.54E+07 | 0 | 5.16E+07 | 0 | 0 | 5.16E+07 | 0 | 1.80E+07 |
| HCl | 3.40E+06 | 0 | 0 | 0 | 0 | 0 | 0 | 0 |
| $CO_2$ | 0 | 0 | 0.074 | 25.781 | 0 | 0.074 | 0 | 0 |
| $O_2$ | 0 | 0 | 2510.379 | 6.20E+06 | 0 | 2510.379 | 0 | 0 |
| $N_2$ | 0 | 0 | 8109.244 | 4.65E+07 | 0 | 8109.245 | 0 | 0 |
| $CaCO_3$ | 0 | 0 | 0 | 0 | 0 | 1.41E+07 | 0 | 0 |
| $MgCl_2$ | 0 | 0 | 0 | 0 | 0 | 0 | 0 | 0 |
| $MgCl_2*W$ | 2.14E+07 | 0 | 0 | 0 | 0 | 0 | 0 | 0 |
| $MgCl_2*2W$ | 0 | 0 | 0 | 0 | 0 | 0 | 0 | 0 |
| $MgCl_2*4W$ | 0 | 0 | 0 | 0 | 0 | 0 | 0 | 0 |
| $MgCl_2*6W$ | 0 | 5.73E+07 | 0 | 0 | 0 | 0 | 0 | 0 |
| Mg(OH)Cl | 7.15E+06 | 0 | 0 | 0 | 0 | 0 | 2.16E+07 | 0 |
| $Mg(OH)_2$ | 0 | 0 | 0 | 0 | 0 | 0 | 0 | 8.22E+06 |
| MgO | 0 | 0 | 0 | 0 | 0 | 0 | 0 | 0 |
| $MgHCO_3^+$ | 0 | 0 | 3324.433 | 0 | 0 | 3324.433 | 0 | 0 |
| $SO_2$ | 0 | 0 | 0 | 0 | 0 | 0 | 0 | 0 |
| $NO_2$ | 0 | 0 | 0 | 0 | 0 | 0 | 0 | 0 |
| NO | 0 | 0 | 0 | 0 | 0 | 0 | 0 | 0 |

TABLE 16b-continued

Mass and Energy Accounting for Examples 10 and 11 Simulation.

Process Stream Names

| | MgCl$_2$—2W | MgCl$_2$—6W | RECYCLE1 | RX2-VENT | SiO$_2$ | SLURRY | SOLIDS-1 | SOLIDS-2 |
|---|---|---|---|---|---|---|---|---|
| Mg$^{2+}$ | 0 | 0 | 6.85E+06 | 0 | 0 | 6.85E+06 | 0 | 3.43E+06 |
| Ca$^{2+}$ | 0 | 0 | 1644.031 | 0 | 0 | 1644.031 | 0 | 0 |
| Cl$^-$ | 0 | 0 | 2.00E+07 | 0 | 0 | 2.00E+07 | 0 | 1.00E+07 |
| CO$_3$ | 0 | 0 | 61.424 | 0 | 0 | 61.424 | 0 | 0 |
| HCO$_3$ | 0 | 0 | 27.297 | 0 | 0 | 27.297 | 0 | 0 |
| OH$^-$ | 0 | 0 | 690.278 | 0 | 0 | 690.278 | 0 | 0 |
| CaSiO$_3$ | 0 | 0 | 0 | 0 | 0.007 | 0 | 0 | 0 |
| SiO$_2$ | 0 | 0 | 0 | 0 | 8.47E+06 | 0 | 0 | 0 |

TABLE 17a

Mass and Energy Accounting for Examples 12 and 13 Simulation.

Process Stream Names

| | 1 | 2 | CaCl$_2$ | CaCl$_2$—Si | CaCO$_3$ | CaSiO$_3$ | FLUE GAS | H$_2$O | HCl | HCl Vapor |
|---|---|---|---|---|---|---|---|---|---|---|
| PH | | | | | | | | | | |
| Temperature °C. | 271 | 255.5 | 149.8 | 150 | 95 | 25 | 100 | 25 | 200 | 450 |
| Pressure psia | 14.696 | 15 | 100 | 14.696 | 14.7 | 14.696 | 15.78 | 14.7 | 14.696 | 14.696 |
| Mass VFrac | 0 | 0 | 0 | 0 | 0 | 0 | 1 | 0 | 1 | 1 |
| Mass SFrac | 1 | 1 | 0 | 0.215 | 1 | 1 | 0 | 0 | 0 | 0 |
| Mass Flow tonne/year | 2.87E+07 | 2.37E+07 | 3.09E+07 | 3.94E+07 | 1.41E+07 | 1.64E+07 | 6.21E+07 | 1.80E+07 | 2.30E+07 | 2.30E+07 |
| Volume Flow gal/min | 5608.398 | 10220.835 | 10147.12 | 11758.176 | 2616.827 | 2126.004 | 3.11E+07 | 502184.16 | 1.93E+07 | 2.94E+07 |
| Enthalpy MW | −10826.6 | −11660.74 | −11347.9 | −15391.633 | −5369.12 | −7309.817 | −2926.806 | −9056.765 | −6056.076 | −5786.994 |
| Density lb/cuft | 160.371 | 72.704 | 95.515 | 105.035 | 169.173 | 241.725 | 0.063 | 1.125 | 0.037 | 0.024 |
| H$_2$O | 0 | 1.55E+07 | 1.52E+07 | 1.52E+07 | 0 | 0 | 3.10E+06 | 1.80E+07 | 1.27E+07 | 1.27E+07 |
| HCl | 0 | 0 | 0.015 | 0.015 | 0 | 0 | 0 | 0 | 1.03E+07 | 1.03e+07 |
| CO$_2$ | 0 | 0 | 0 | 0 | 0 | 0 | 6.21E+06 | 0 | 0 | 0 |
| O$_2$ | 0 | 0 | 0 | 0 | 0 | 0 | 6.21E+06 | 0 | 0 | 0 |
| N$_2$ | 0 | 0 | 0 | 0 | 0 | 0 | 4.65E+07 | 0 | 0 | 0 |
| CaCO$_3$ | 0 | 0 | 0 | 0 | 1.41E+07 | 0 | 0 | 0 | 0 | 0 |
| MgCl$_2$ | 0 | 0 | 0 | 0 | 0 | 0 | 0 | 0 | 0 | 0 |
| MgCl$_2$*W | 0 | 0 | 0 | 0 | 0 | 0 | 0 | 0 | 0 | 0 |
| MgCl$_2$*2W | 0 | 0 | 0 | 0 | 0 | 0 | 0 | 0 | 0 | 0 |
| MgCl$_2$*4W | 0 | 0 | 0 | 0 | 0 | 0 | 0 | 0 | 0 | 0 |
| MgCl$_2$*6W | 2.87E+07 | 0 | 0 | 0 | 0 | 0 | 0 | 0 | 0 | 0 |
| Mg(OH)Cl | 0 | 0 | 0 | 0 | 0 | 0 | 0 | 0 | 0 | 0 |
| Mg(OH)$_2$ | 0 | 8.22E+06 | 0 | 0 | 0 | 0 | 0 | 0 | 0 | 0 |
| MgO | 0 | 0 | 0 | 0 | 0 | 0 | 0 | 0 | 0 | 0 |
| MgHCO$_3$$^+$ | 0 | 0 | 0 | 0 | 0 | 0 | 0 | 0 | 0 | 0 |
| SO$_2$ | 0 | 0 | 0 | 0 | 0 | 0 | 0 | 0 | 0 | 0 |
| NO$_2$ | 0 | 0 | 0 | 0 | 0 | 0 | 0 | 0 | 0 | 0 |
| NO | 0 | 0 | 0 | 0 | 0 | 0 | 0 | 0 | 0 | 0 |
| Mg$^{2+}$ | 0 | 0 | 0 | 0 | 0 | 0 | 0 | 0 | 0 | 0 |
| Ca$^{2+}$ | 0 | 0 | 5.65E+06 | 5.65E+06 | 0 | 0 | 0 | 0 | 0 | 0 |
| Cl$^-$ | 0 | 0 | 1.00E+07 | 1.00E+07 | 0 | 0 | 0 | 0 | 0 | 0 |
| CO$_3$$^{2-}$ | 0 | 0 | 0 | 0 | 0 | 0 | 0 | 0 | 0 | 0 |
| HCO$_3$$^-$ | 0 | 0 | 0 | 0 | 0 | 0 | 0 | 0 | 0 | 0 |
| OH$^-$ | 0 | 0 | 0 | 0 | 0 | 0 | 0 | 0 | 0 | 0 |
| CaSiO$_3$ | 0 | 0 | 0 | 0.023 | 1.64E+07 | 0 | 0 | 0 | 0 | 0 |
| SiO$_2$ | 0 | 0 | 0 | 8.47E+06 | 0 | 0 | 0 | 0 | 0 | 0 |

TABLE 17b

Mass and Energy Accounting for Examples 12 and 13 Simulation.

Process Stream Names

| | MgCl$_2$-2W | MgCl$_2$-6W | RECYCLE1 | RX2-VENT | SiO$_2$ | SLURRY | SOLIDS-1 | SOLIDS-2 |
|---|---|---|---|---|---|---|---|---|
| PH | | | 9.304 | | | 9.304 | | |
| Temperature °C. | 215 | 80 | 95 | 95 | 149.8 | 95 | 450 | 115 |

TABLE 17b-continued

Mass and Energy Accounting for Examples 12 and 13 Simulation.

Process Stream Names

|  | $MgCl_2$-2W | $MgCl_2$-6W | RECYCLE1 | RX2-VENT | $SiO_2$ | SLURRY | SOLIDS-1 | SOLIDS-2 |
|---|---|---|---|---|---|---|---|---|
| Pressure psia | 14.696 | 14.696 | 14.7 | 14.7 | 100 | 14.7 | 14.696 | 14.696 |
| Mass VFrac | 0.502 | 0 | 0 | 1 | 0 | 0 | 0 | 0 |
| Mass SFrac | 0.498 | 1 | 0 | 0 | 1 | 0.221 | 1 | 1 |
| Mass Flow tonne/year | 2.87E+07 | 2.87E+07 | 4.98E+07 | 5.27E+07 | 8.47E+06 | 6.39E+07 | 5.68E+06 | 2.37E+07 |
| Volume Flow gal/min | 1.51E+07 | 5608.398 | 25330.305 | 2.82E+07 | 1607.826 | 22988.79 | 797.11 | 10220.84 |
| Enthalpy MW | −9388.949 | −11095.644 | −21589.89 | 120.08 | 0 | −26959.3 | −2603.98 | −11955.9 |
| Density lb/cuft | 0.059 | 160.371 | 61.662 | 0.059 | 165.327 | 87.199 | 223.695 | 72.704 |
| $H_2O$ | 1.27E+07 | 0 | 3.63E+07 | 0 | 0 | 3.63E+07 | 0 | 1.55E+07 |
| HCl | 1.70E+07 | 0 | 0 | 0 | 0 | 0 | 0 | 0 |
| $CO_2$ | 0 | 0 | 0.145 | 79.255 | 0 | 0.145 | 0 | 0 |
| $O_2$ | 0 | 0 | 1919.222 | 6.20E+06 | 0 | 1919.222 | 0 | 0 |
| $N_2$ | 0 | 0 | 6199.3 | 4.65E+07 | 0 | 6199.301 | 0 | 0 |
| $CaCO_3$ | 0 | 0 | 0 | 0 | 0 | 1.41E+07 | 0 | 0 |
| $MgCl_2$ | 0 | 0 | 0 | 0 | 0 | 0 | 0 | 0 |
| $MgCl_2$*W | 1.07E+07 | 0 | 0 | 0 | 0 | 0 | 0 | 0 |
| $MgCl_2$*2W | 0 | 0 | 0 | 0 | 0 | 0 | 0 | 0 |
| $MgCl_2$*4W | 0 | 0 | 0 | 0 | 0 | 0 | 0 | 0 |
| $MgCl_2$*6W | 0 | 2.87E+07 | 0 | 0 | 0 | 0 | 0 | 0 |
| Mg(OH)Cl | 3.58E+06 | 0 | 0 | 0 | 0 | 0 | 0 | 0 |
| $Mg(OH)_2$ | 0 | 0 | 0 | 0 | 0 | 0 | 0 | 8.22E+06 |
| MgO | 0 | 0 | 0 | 0 | 0 | 0 | 5.68E+06 | 0 |
| $MgHCO_3^+$ | 0 | 0 | 2208.676 | 0 | 0 | 2208.676 | 0 | 0 |
| $SO_2$ | 0 | 0 | 0 | 0 | 0 | 0 | 0 | 0 |
| $NO_2$ | 0 | 0 | 0 | 0 | 0 | 0 | 0 | 0 |
| NO | 0 | 0 | 0 | 0 | 0 | 0 | 0 | 0 |
| $Mg^{2+}$ | 0 | 0 | 3.43E+06 | 0 | 0 | 3.43E+06 | 0 | 0 |
| $Ca^{2+}$ | 0 | 0 | 1225.309 | 0 | 0 | 1225.309 | 0 | 0 |
| $Cl^-$ | 0 | 0 | 1.00E+07 | 0 | 0 | 1.00E+07 | 0 | 0 |
| $CO_3^{2-}$ | 0 | 0 | 110.963 | 0 | 0 | 110.963 | 0 | 0 |
| $HCO_3^-$ | 0 | 0 | 63.12 | 0 | 0 | 63.12 | 0 | 0 |
| $OH^-$ | 0 | 0 | 519.231 | 0 | 0 | 519.231 | 0 | 0 |
| $CaSiO_3$ | 0 | 0 | 0 | 0 | 0.023 | 0 | 0 | 0 |
| $SiO_2$ | 0 | 0 | 0 | 0 | 8.47E+06 | 0 | 0 | 0 |

TABLE 18a

Mass and Energy Accounting for Examples 14 and 15 Simulation.

Process Stream Names

|  | FLUE GAS | $H_2O$ | $H_2O$ | HCl Vapor | $MgCl_2$--2 | $MgCl_2$-2w | $MgCl_2$—Si |
|---|---|---|---|---|---|---|---|
| PH |  |  |  |  |  |  |  |
| Temperature °C. | 100 | 25 | 26 | 250 | 200.7 | 200 | 200 |
| Pressure psia | 15.78 | 1 | 14.696 | 14.696 | 15 | 14.696 | 14.696 |
| Mass VFrac | 1 | 0 | 0.798 | 1 | 0.238 | 0 | 0.169 |
| Mass SFrac | 0 | 0 | 0.186 | 0 | 0 | 1 | 0.289 |
| Mass Flow tons/year | 1.37E+08 | 1.00E+07 | 1.58E+08 | 1.69E+07 | 2.31E+07 | 4.08E+07 | 3.26E+07 |
| Volume Flow gal/min | 62.21E+07 | 4569.619 | 4.91E+07 | 1.22E+07 | 5.22E+06 | 3828.933 | 5.33E+06 |
| Enthalpy MW | −5853.92 | −4563.814 | −13984.7 | −2861.732 | 0 | −11194.13 | −10932.15 |
| Density lb/cuft | 0.063 | 62.249 | 0.091 | 0.04 | 0.126 | 303.28 | 0.174 |
| $H_2O$ | 6.85E+06 | 1.00e+07 | 5.19E+06 | 5.60E+06 | 8.37E+06 | 0 | 8.37E+06 |
| HCl | 0 | 0 | 0 | 1.13E+07 | 126399.9 | 0 | 126399.87 |
| $CO_2$ | 1.37E+07 | 0 | 6.85E+06 | 0 | 0 | 0 | 0 |
| $O_2$ | 1.37E+07 | 0 | 1.37E+07 | 0 | 0 | 0 | 0 |
| $N_2$ | 1.03E+08 | 0 | 1.03E+08 | 0 | 0 | 0 | 0 |
| $MgCO_3$ | 0 | 0 | 0 | 0 | 0 | 0 | 0 |
| $MgCl_2$ | 0 | 0 | 0 | 0 | 0 | 0 | 0 |
| $MgCl_2$*W | 0 | 0 | 0 | 0 | 0 | 0 | 0 |
| $MgCl_2$*2W | 0 | 0 | 0 | 0 | 0 | 4.08E+07 | 0 |
| $MgCl_2$*4W | 0 | 0 | 1.09E+07 | 0 | 0 | 0 | 0 |
| $MgCl_2$*6W | 0 | 0 | 1.83E+07 | 0 | 0 | 0 | 0 |
| Mg(OH)Cl | 0 | 0 | 0 | 0 | 0 | 0 | 0 |
| $Mg(OH)_2$ | 0 | 0 | 0 | 0 | 0 | 0 | 0 |

TABLE 18a-continued

Mass and Energy Accounting for Examples 14 and 15 Simulation.

| | Process Stream Names | | | | | | |
|---|---|---|---|---|---|---|---|
| | FLUE GAS | $H_2O$ | $H_2O$ | HCl Vapor | $MgCl_2$--2 | $MgCl_2$-2w | $MgCl_2$—Si |
| MgO | 0 | 0 | 0 | 0 | 0 | 0 | 0 |
| $MgHCO_3^+$ | 0 | 0 | 0.001 | 0 | 0 | 0 | 0 |
| $SO_2$ | 0 | 0 | 0 | 0 | 0 | 0 | 0 |
| $NO_2$ | 0 | 0 | 0 | 0 | 0 | 0 | 0 |
| NO | 0 | 0 | 0 | 0 | 0 | 0 | 0 |
| $Mg^{2+}$ | 0 | 0 | 0 | 0 | 3.74E+06 | 0 | 3.74E+06 |
| $Cl^-$ | 0 | 0 | 0 | 0 | 1.09E+07 | 0 | 1.09E+07 |
| $CO_3^{2-}$ | 0 | 0 | 0 | 0 | 0 | 0 | 0 |
| $HCO_3^-$ | 0 | 0 | 0 | 0 | 0 | 0 | 0 |
| $OH^-$ | 0 | 0 | 0 | 0 | 0 | 0 | 0 |
| $SiO_2$ | 0 | 0 | 0 | 0 | 0 | 0 | 9.24E+06 |
| $MgSiO_3$ | 0 | 0 | 0 | 0 | 0 | 0 | 174011.19 |

TABLE 18b

Mass and Energy Accounting for Examples 14 and 15 Simulation.

| | Process Stream Names | | | | | | |
|---|---|---|---|---|---|---|---|
| | $MgCO_3$ | $MgSiO_3$ | RX2-VENT | $SiO_2$ | SLURRY | SOLIDS-1 | SOLIDS-2 |
| PH | | | | | .0864 | | 6.24 |
| Temperature °C. | 26 | 25 | | 200.7 | 60 | 250 | 95 |
| Pressure psia | 14.696 | 14.696 | | 15 | 44.088 | 14.696 | 44.088 |
| Mass VFrac | 0 | 0 | | 0 | 0 | 0 | 0 |
| Mass SFrac | 1 | 1 | | 1 | 0.248 | 1 | 0.268 |
| Mass Flow tons/year | 1.31E+07 | 1.56E+07 | 0 | 9.41E+06 | 1.71E+08 | 2.39E+07 | 3.39E+07 |
| Volume Flow gal/min | 1985.546 | 2126.004 | | 1613.601 | 178707.499 | 3828.933 | 8016.874 |
| Enthalpy MW | 0 | −6925.208 | 0 | 0 | −18961.843 | −7057.974 | −12123.17 |
| Density lb/cuft | 187.864 | 208.902 | | 165.967 | 27.184 | 177.393 | 120.206 |
| $H_2O$ | 0 | 0 | | 0 | 5.19E+06 | 0 | 1.00E+07 |
| HCl | 0 | 0 | | 0 | 0 | 0 | 0 |
| $CO_2$ | 0 | 0 | | 0 | 6.85E+06 | 0 | 0 |
| $O_2$ | 0 | 0 | | 0 | 1.37E+07 | 0 | 0 |
| $N_2$ | 0 | 0 | | 0 | 1.03E+08 | 0 | 0 |
| $MgCO_3$ | 1.31E+07 | 0 | | 0 | 1.31E+07 | 0 | 0 |
| $MgCl_2$ | 0 | 0 | | 0 | 0 | 0 | 0 |
| $MgCl_2$*W | 0 | 0 | | 0 | 0 | 0 | 0 |
| $MgCl_2$*2W | 0 | 0 | | 0 | 0 | 0 | 0 |
| $MgCl_2$*4W | 0 | 0 | | 0 | 1.09E+07 | 0 | 0 |
| $MgCl_2$*6W | 0 | 0 | | 0 | 1.83E+07 | 0 | 0 |
| Mg(OH)Cl | 0 | 0 | | 0 | 0 | 2.39E+07 | 0 |
| $Mg(OH)_2$ | 0 | 0 | | 0 | 0 | 0 | 9.07E+06 |
| MgO | 0 | 0 | | 0 | 0 | 0 | 0 |
| $MgHCO_3^+$ | 0 | 0 | | 0 | 0.001 | 0 | 0 |
| $SO_2$ | 0 | 0 | | 0 | 0 | 0 | 0 |
| $NO_2$ | 0 | 0 | | 0 | 0 | 0 | 0 |
| NO | 0 | 0 | | 0 | 0 | 0 | 0 |
| $Mg^{2+}$ | 0 | 0 | | 0 | 0 | 0 | 3.78E+06 |
| $Cl^-$ | 0 | 0 | | 0 | 0 | 0 | 1.10E+07 |
| $CO3^{2-}$ | 0 | 0 | | 0 | 0 | 0 | 0 |
| $HCO_3^-$ | 0 | 0 | | 0 | 0 | 0 | 0 |
| $OH^-$ | 0 | 0 | | 0 | 0 | 0 | 0.029 |
| $SiO_2$ | 0 | 0 | | 9.24E+06 | 0 | 0 | 0 |
| $MgSiO_3$ | 0 | 1.56E+07 | | 174011.19 | 0 | 0 | 0 |

TABLE 19a

Mass and Energy Accounting for Examples 16 and 17 Simulation.

Process Stream Names

| | FLUE GAS | $H_2O$ | $H_2O$ | HCl Vapor | $MgCl_2$--2 | $MgCl_2$-2w | $MgCl_2$—Si |
|---|---|---|---|---|---|---|---|
| PH | | | 6.583 | | | | |
| Temperature °C. | 100 | 25 | 59.6 | 450 | 200 | 200 | 200 |
| Pressure psia | 15.78 | 1 | 14.696 | 14.696 | 15 | 14.696 | 14.696 |
| Mass VFrac | 1 | 0 | 0.004 | 1 | 0 | 0 | 0 |
| Mass SFrac | 0 | 0 | 0 | 0 | 1 | 1 | 1 |
| Mass Flow tons/year | 1.37E+08 | 1.00E+07 | 1.70E+07 | 1.41E+07 | 2.04E+07 | 2.04E+07 | 2.98e+07 |
| Volume Flow gal/min | 6.21E+07 | 4569.619 | 40446.86 | 1.26E+07 | 1914.466 | 1914.466 | 3522.292 |
| Enthalpy MW | −5853.92 | 4563.814 | −7633.28 | −1728.6 | 0 | −5597.066 | −9628.072 |
| Density lb/cuft | 0.063 | 62.249 | 11.94 | 0.032 | 303.28 | 303.28 | 240.308 |
| $H_2O$ | 685.E+06 | 1.00E+07 | 1.68E+07 | 2.80E+06 | 0 | 0 | 0 |
| HCl | 0 | 0 | 0 | 1.13E+07 | 0 | 0 | 0 |
| $CO_2$ | 1.37E+07 | 0 | 56280.04 | 0 | 0 | 0 | 0 |
| $O_2$ | 1.37E+07 | 0 | 18848.97 | 0 | 0 | 0 | 0 |
| $N_2$ | 1.03E+08 | 0 | 56346.51 | 0 | 0 | 0 | 0 |
| $MgCO_3$ | 0 | 0 | 0 | 0 | 0 | 0 | 0 |
| $MgCl_2$ | 0 | 0 | 0 | 0 | 0 | 0 | 0 |
| $MgCl_2$*W | 0 | 0 | 0 | 0 | 0 | 0 | 0 |
| $MgCl_2$*2W | 0 | 0 | 0 | 0 | 2.04E+07 | 2.04E+07 | 2.04E+07 |
| $MgCl_2$*4W | 0 | 0 | 0 | 0 | 0 | 0 | 0 |
| $MgCl_2$*6W | 0 | 0 | 0 | 0 | 0 | 0 | 0 |
| Mg(OH)Cl | 0 | 0 | 0 | 0 | 0 | 0 | 0 |
| $Mg(OH)_2$ | 0 | 0 | 0 | 0 | 0 | 0 | 0 |
| MgO | 0 | 0 | 0 | 0 | 0 | 0 | 0 |
| $MgHCO_3^+$ | 0 | 0 | 77.467 | 0 | 0 | 0 | 0 |
| $SO_2$ | 0 | 0 | 0 | 0 | 0 | 0 | 0 |
| $NO_2$ | 0 | 0 | 0 | 0 | 0 | 0 | 0 |
| NO | 0 | 0 | 0 | 0 | 0 | 0 | 0 |
| $Mg^{2+}$ | 0 | 0 | 744.857 | 0 | 0 | 0 | 0 |
| $Cl^-$ | 0 | 0 | 0 | 0 | 0 | 0 | 0 |
| $CO_3^{2-}$ | 0 | 0 | 1.19 | 0 | 0 | 0 | 0 |
| $HCO_3^-$ | 0 | 0 | 3259.779 | 0 | 0 | 0 | 0 |
| $OH^-$ | 0 | 0 | 0.109 | 0 | 0 | 0 | 0 |
| $SiO_2$ | 0 | 0 | 0 | 0 | 0 | 0 | 9.34E+06 |
| $MgSiO_3$ | 0 | 0 | 0 | 0 | 0 | 0 | 0 |

TABLE 19b

Mass and Energy Accounting for Examples 16 and 17 Simulation.

Process Stream Names

| | $MgCO_3$ | $MgSiO_3$ | RX2-VENT | $SiO_2$ | SLURRY | SOLIDS-1 | SOLIDS-2 |
|---|---|---|---|---|---|---|---|
| PH | | | | | 6.583 | | 8.537 |
| Temperature °C. | 59.6 | 25 | 60 | 200 | 60 | 450 | 95 |
| Pressure psia | 14.696 | 14.696 | 44.088 | 15 | 44.088 | 14.696 | 44.088 |
| Mass VFrac | 0 | 0 | 1 | 0 | 0 | 0 | 0 |
| Mass SFrac | 1 | 1 | 0 | 1 | 0.436 | 1 | 0.558 |
| Mass Flow tons/year | 1.31E+07 | 1.56E+07 | 1.23E+08 | 9.34E+06 | 3.01E+07 | 6.27E+06 | 1.63E+07 |
| Volume Flow gal/min | 1983.661 | 2126.004 | 1.76E+07 | 1607.826 | 9945.342 | 797.11 | 5155.55 |
| Enthalpy MW | 0 | −6925.208 | −1613.054 | 0 | −12593.788 | −2603.979 | −7331.893 |
| Density lb/cuft | 187.864 | 208.902 | 0.199 | 165.327 | 86.031 | 223.695 | 89.76 |
| $H_2O$ | 0 | 0 | 0 | 0 | 1.68E+07 | 0 | 7.20E+06 |
| HCl | 0 | 0 | 0 | 0 | 0 | 0 | 0 |
| $CO_2$ | 0 | 0 | 6.78E+06 | 0 | 56280.036 | 0 | 0 |
| $O_2$ | 0 | 0 | 1.37E+07 | 0 | 18848.966 | 0 | 0 |
| $N_2$ | 0 | 0 | 1.03E+08 | 0 | 56346.51 | 0 | 0 |
| $MgCO_3$ | 1.31E+07 | 0 | 0 | 0 | 1.31E+07 | 0 | 0 |
| $MgCl_2$ | 0 | 0 | 0 | 0 | 0 | 0 | 0 |
| $MgCl_2$*W | 0 | 0 | 0 | 0 | 0 | 0 | 0 |
| $MgCl_2$*2W | 0 | 0 | 0 | 0 | 0 | 0 | 0 |
| $MgCl_2$*4W | 0 | 0 | 0 | 0 | 0 | 0 | 0 |
| $MgCl_2$*6W | 0 | 0 | 0 | 0 | 0 | 0 | 0 |

TABLE 19b-continued

Mass and Energy Accounting for Examples 16 and 17 Simulation.

Process Stream Names

| | $MgCO_3$ | $MgSiO_3$ | RX2-VENT | $SiO_2$ | SLURRY | SOLIDS-1 | SOLIDS-2 |
|---|---|---|---|---|---|---|---|
| Mg(OH)Cl | 0 | 0 | 0 | 0 | 0 | 0 | 0 |
| $Mg(OH)_2$ | 0 | 0 | 0 | 0 | 0 | 0 | 9.07E+06 |
| MgO | 0 | 0 | 0 | 0 | 0 | 6.27E+06 | 0 |
| $MgHCO_3^+$ | 0 | 0 | 343.415 | 0 | 77.467 | 0 | 0 |
| $SO_2$ | 0 | 0 | 0 | 0 | 0 | 0 | 0 |
| $NO_2$ | 0 | 0 | 0 | 0 | 0 | 0 | 0 |
| NO | 0 | 0 | 0 | 0 | 0 | 0 | 0 |
| $Mg^{2+}$ | 0 | 0 | 2722.849 | 0 | 744.857 | 0 | 14.282 |
| $Cl^-$ | 0 | 0 | 0 | 0 | 0 | 0 | 0 |
| $CO_3^{2-}$ | 0 | 0 | 4.344 | 0 | 1.19 | 0 | 0 |
| $HCO_3^-$ | 0 | 0 | 14439.982 | 0 | 3259.779 | 0 | 0 |
| $OH^-$ | 0 | 0 | 0.481 | 0 | 0.109 | 0 | 19.989 |
| $SiO_2$ | 0 | 0 | 0 | 9.34E+06 | 0 | 0 | 0 |
| $MgSiO_3$ | 0 | 1.56E+07 | 0 | 0 | 0 | 0 | 0 |

TABLE 20a

Mass and Energy Accounting for Examples 18 and 19 Simulation.

Process Stream Names

| | 5 | $CaCl_2$-2W | FLUE GAS | $H_2O$ | HCl | HCl-VENT | HCl VAP2 |
|---|---|---|---|---|---|---|---|
| PH | | | | | | | |
| Temperature °C. | 200 | 160 | 100 | 25 | 250 | 100 | 349.1 |
| Pressure psia | 14.696 | 14.696 | 15.78 | 1 | 14.696 | 14.696 | 14.696 |
| Mass VFrac | 0.378 | 0.473 | 1 | 0 | 1 | 1 | 1 |
| Mass SFrac | 0.622 | 0 | 0 | 0 | 0 | 0 | 0 |
| Mass Flow tons/year | 6.32E+07 | 2.40E+07 | 1.37E+08 | 1.00E+07 | 3.94E+07 | 0.001 | 197E+07 |
| Volume Flow gal/min | 2.29E+07 | 1.02E+07 | 6.21E+07 | 4569.619 | 3.64E+07 | 0.001 | 1.82E+07 |
| Enthalpy MW | −19530.7 | −8042.026 | −5853.92 | −4563.814 | −11241.7 | 0 | −5620.856 |
| Density lb/cuft | 0.079 | 0.067 | 0.063 | 62.249 | 0.031 | 0.075 | 0.031 |
| $H_2O$ | 2.29E+07 | 1.54E+07 | 6.85E+06 | 1.00E+07 | 2.08E+07 | 0 | 1.40E+07 |
| HCl | 983310.7 | 0 | 0 | 0 | 1.13E+07 | 0.001 | 5.67E+06 |
| $CO_2$ | 0 | 0 | 1.37E+07 | 0 | 0 | 0 | 0 |
| $O_2$ | 0 | 0 | 1.37E+07 | 0 | 0 | 0 | 0 |
| $N_2$ | 0 | 0 | 1.03E+08 | 0 | 0 | 0 | 0 |
| $MgCl_2$ | 0 | 0 | 0 | 0 | 0 | 0 | 0 |
| $MgCl_2$*W | 0 | 0 | 0 | 0 | 0 | 0 | 0 |
| $MgCl_2$*2W | 3.73E+07 | 0 | 0 | 0 | 0 | 0 | 0 |
| $MgCl_2$MW | 0 | 0 | 0 | 0 | 0 | 0 | 0 |
| $MgCl_2$*6W | 0 | 0 | 0 | 0 | 0 | 0 | 0 |
| Mg(OH)Cl | 2.07E+06 | 0 | 0 | 0 | 0 | 0 | 0 |
| $Mg(OH)_2$ | 0 | 0 | 0 | 0 | 0 | 0 | 0 |
| MgO | 0 | 0 | 0 | 0 | 0 | 0 | 0 |
| $MgHCO_3^+$ | 0 | 0 | 0 | 0 | 0 | 0 | 0 |
| $SO_2$ | 0 | 0 | 0 | 0 | 0 | 0 | 0 |
| $NO_2$ | 0 | 0 | 0 | 0 | 0 | 0 | 0 |
| NO | 0 | 0 | 0 | 0 | 0 | 0 | 0 |
| $Mg^{2+}$ | 0 | 2494.617 | 0 | 0 | 0 | 0 | 0 |
| $Ca^{2+}$ | 0 | 3.11E+06 | 0 | 0 | 0 | 0 | 0 |
| $Cl^-$ | 0 | 5.51E+06 | 0 | 0 | 0 | 0 | 0 |
| $CO_3^{2-}$ | 0 | 0 | 0 | 0 | 0 | 0 | 0 |
| $HCO_3^-$ | 0 | 0 | 0 | 0 | 0 | 0 | 0 |
| $OH^-$ | 0 | 0 | 0 | 0 | 0 | 0 | 0 |
| $CaSiO_3$ | 0 | 0 | 0 | 0 | 0 | 0 | 0 |
| $SiO_2$ | 0 | 0 | 0 | 0 | 0 | 0 | 0 |
| $MgSiO_3$ | 0 | 0 | 0 | 0 | 0 | 0 | 0 |
| DIOPSIDE | 0 | 0 | 0 | 0 | 0 | 0 | 0 |
| DOLOMITE | 0 | 0 | 0 | 0 | 0 | 0 | 0 |

TABLE 20a-continued

Mass and Energy Accounting for Examples 18 and 19 Simulation.

| | | HCl Vapor | HCl VENT2 | MELT1 | MELT2 | MELT3 |
|---|---|---|---|---|---|---|
| | PH | | | | | |
| | Temperature °C. | 349.1 | 160 | 160 | 160 | 100 |
| | Pressure psia | 14.696 | 14.696 | 14.696 | 14.696 | 14.696 |
| | Mass VFrac | 1 | 1 | 0.311 | 0 | 0 |
| | Mass SFrac | 0 | 0 | 0.342 | 1 | 0.291 |
| | Mass Flow tons/year | 1.97E+07 | 26.688 | 3.65E+07 | 1.25E+07 | 3.22E+07 |
| | Volume Flow gal/min | 1.82E+07 | 11.834 | 1.02E+07 | 1866.916 | 9636.543 |
| | Enthalpy MW | −5620.856 | −0.002 | −13498.19 | −5456.154 | −12759.563 |
| | Density lb/cuft | 0.031 | 0.064 | 0.102 | 190.163 | 94.933 |
| | $H_2O$ | 1.40E+07 | 0 | 1.54E+07 | 0 | 1.54E+07 |
| | HCl | 5.67E+06 | 26.688 | 26.688 | 0 | 0.001 |
| | $CO_2$ | 0 | 0 | 0 | 0 | 0 |
| | $O_2$ | 0 | 0 | 0 | 0 | 0 |
| | $N_2$ | 0 | 0 | 0 | 0 | 0 |
| | $MgCl_2$ | 0 | 0 | 0 | 0 | 0 |
| | $MgCl_2*W$ | 0 | 0 | 0 | 0 | 0 |
| | $MgCl_2*2W$ | 0 | 0 | 0 | 0 | 0 |
| | $MgCl_2MW$ | 0 | 0 | 0 | 0 | 0 |
| | $MgCl_2*6W$ | 0 | 0 | 0 | 0 | 0 |
| | Mg(OH)Cl | 0 | 0 | 0 | 0 | 0 |
| | $Mg(OH)_2$ | 0 | 0 | 0 | 0 | 0 |
| | MgO | 0 | 0 | 0 | 0 | 0 |
| | $MgHCO_3^+$ | 0 | 0 | 0 | 0 | 0 |
| | $SO_2$ | 0 | 0 | 0 | 0 | 0 |
| | $NO_2$ | 0 | 0 | 0 | 0 | 0 |
| | NO | 0 | 0 | 0 | 0 | 0 |
| | $Mg^{2+}$ | 0 | 0 | 2494.617 | 0 | 1.89E+06 |
| | $Ca^{2+}$ | 0 | 0 | 3.11E+06 | 0 | 4128.267 |
| | $Cl^-$ | 0 | 0 | 5.51E+06 | 0 | 5.51E+06 |
| | $CO_3^{2-}$ | 0 | 0 | 0 | 0 | 0 |
| | $HCO_3^-$ | 0 | 0 | 0 | 0 | 0 |
| | $OH^-$ | 0 | 0 | 0 | 0 | 0 |
| | $CaSiO_3$ | 0 | 0 | 11965.659 | 11965.659 | 0 |
| | $SiO_2$ | 0 | 0 | 4.67E+06 | 4.67E+06 | 9.34E+06 |
| | $MgSiO_3$ | 0 | 0 | 7.80E+06 | 7.80E+06 | 36.743 |
| | DIOPSIDE | 0 | 0 | 0 | 0 | 0 |
| | DOLOMITE | 0 | 0 | 0 | 0 | 0 |

TABLE 20b

Mass and Energy Accounting for Examples 18 and 19 Simulation.

| | $MgCaSiO_3$ | $MgCl_2$—H | $MgCl_2$—H | RECYCLE | RECYCLE- | $SiO_2$ |
|---|---|---|---|---|---|---|
| PH | | | | | | |
| Temperature °C. | 25 | 100 | 100 | 95 | 95 | 100 |
| Pressure psia | 14.696 | 14.696 | 14.696 | 14.696 | 14.696 | 14.696 |
| Mass VFrac | 0 | 0 | 0 | 0 | 0 | 0 |
| Mass SFrac | 1 | 0 | 1 | 0.828 | 1 | 1 |
| Mass Flow tons/year | 168E+07 | 2.28E+07 | 4.74E+07 | 5.73E+07 | 1.58E+07 | 9.34E+06 |
| Volume Flow gal/min | 1063.002 | 8028.716 | 8412.597 | 13075.55 | 2804.199 | 1607.827 |
| Enthalpy MW | −7167.458 | 0 | −16601.2 | −21023.6 | −5537.26 | 0 |
| Density lb/cuft | 450.627 | 80.836 | 160.371 | 124.605 | 160.371 | 165.327 |
| $H_2O$ | 0 | 1.54E+07 | 0 | 9.84E+07 | 0 | 0 |
| HCl | 0 | 0 | 0 | 0 | 0 | 0 |
| $CO_2$ | 0 | 0 | 0 | 0 | 0 | 0 |
| $O_2$ | 0 | 0 | 0 | 0 | 0 | 0 |
| $N_2$ | 0 | 0 | 0 | 0 | 0 | 0 |
| $MgCl_2$ | 0 | 0 | 0 | 0 | 0 | 0 |

TABLE 20b-continued

Mass and Energy Accounting for Examples 18 and 19 Simulation.

| | | | | | | |
|---|---|---|---|---|---|---|
| $MgCl_2*W$ | 0 | 0 | 0 | 0 | 0 | 0 |
| $MgCl_2*2W$ | 0 | 0 | 0 | 0 | 0 | 0 |
| $MgCl_2*4W$ | 0 | 0 | 0 | 0 | 0 | 0 |
| $MgCl_2*6W$ | 0 | 0 | 4.74E+07 | 4.74E+07 | 1.58E+07 | 0 |
| $Mg(OH)Cl$ | 0 | 0 | 0 | 0 | 0 | 0 |
| $Mg(OH)_2$ | 0 | 0 | 0 | 12011.06 | 0 | 0 |
| $MgO$ | 0 | 0 | 0 | 0 | 0 | 0 |
| $MgHCO_3^+$ | 0 | 0 | 0 | 11.135 | 0 | 0 |
| $SO_2$ | 0 | 0 | 0 | 0 | 0 | 0 |
| $NO_2$ | 0 | 0 | 0 | 0 | 0 | 0 |
| $NO$ | 0 | 0 | 0 | 0 | 0 | 0 |
| $Mg^{2+}$ | 0 | 1.89E+06 | 0 | 0 | 0 | 0 |
| $Ca^{2+}$ | 0 | 4128.267 | 0 | 0 | 0 | 0 |
| $Cl^-$ | 0 | 5.51E+06 | 0 | 4.627 | 0 | 0 |
| $CO_3^{2-}$ | 0 | 0 | 0 | 0 | 0 | 0 |
| $HCO_3^-$ | 0 | 0 | 0 | 0 | 0 | 0 |
| $OH^-$ | 0 | 0 | 0 | 0 | 0 | 0 |
| $CaSiO_3$ | 0 | 0 | 0 | 0 | 0 | 0 |
| $SiO_2$ | 0 | 0 | 0 | 0 | 0 | 9.34E+06 |
| $MgSiO_3$ | 0 | 0 | 0 | 0 | 0 | 36.743 |
| DIOPSIDE | 1.68E+07 | 0 | 0 | 0 | 0 | 0 |
| DOLOMITE | 0 | 0 | 0 | 0 | 0 | 0 |

| | Process Stream Names | | | | |
|---|---|---|---|---|---|
| | SLURRY | SOLIDS | SOLIDS-1 | SOLIDS-2 | VENT |
| PH | 5.163 | | | 6.252 | |
| Temperature ° C. | 95 | 95 | 250 | 95 | 95 |
| Pressure psia | 14.696 | 14.696 | 14.696 | 14.696 | 14.696 |
| Mass VFrac | 0 | 0 | 0 | 0 | 1 |
| Mass SFrac | 0.317 | 1 | 1 | 0.268 | 0 |
| Mass Flow tons/year | 1.95E+08 | 1.43E+07 | 2.39E+07 | 3.39E+07 | 1.23E+08 |
| Volume Flow gal/min | 185622 | 2276.765 | 3828.933 | 8017.333 | 5.85E+07 |
| Enthalpy MW | −27714.4 | 0 | −7057.97 | −12113.4 | −1510.76 |
| Density lb/cuft | 29.855 | 178.921 | 177.393 | 120.2 | 0.06 |
| $H_2O$ | 9.84E+06 | 0 | 0 | 1.00E+07 | 0 |
| HCl | 0 | 0 | 0 | 0 | 0 |
| $CO_2$ | 6.85E+06 | 0 | 0 | 0 | 6.85E+06 |
| $O_2$ | 1.37E+07 | 0 | 0 | 0 | 1.37E+07 |
| $N_2$ | 1.03E+08 | 0 | 0 | 0 | 1.03E+08 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 0 | 0 | 0 | 0 |
| $MgCl_2*6W$ | 4.74E+07 | 0 | 0 | 0 | 0 |
| $Mg(OH)Cl$ | 0 | 0 | 2.39E+07 | 0 | 0 |
| $Mg(OH)_2$ | 12011.06 | 0 | 0 | 9.07E+06 | 0 |
| $MgO$ | 0 | 0 | 0 | 0 | 0 |
| $MgHCO_3^+$ | 11.135 | 0 | 0 | 0 | 0 |
| $SO_2$ | 0 | 0 | 0 | 0 | 0 |
| $NO_2$ | 0 | 0 | 0 | 0 | 0 |
| $NO$ | 0 | 0 | 0 | 0 | 0 |
| $Mg^{2+}$ | 0 | 0 | 0 | 3.78E+06 | 0 |
| $Ca^{2+}$ | 0 | 0 | 0 | 0 | 0 |
| $Cl^-$ | 4.627 | 0 | 0 | 1.10E+07 | 0 |
| $CO_3^{2-}$ | 0 | 0 | 0 | 0 | 0 |
| $HCO_3^-$ | 0 | 0 | 0 | 0 | 0 |
| $OH^-$ | 0 | 0 | 0 | 0.03 | 0 |
| $CaSiO_3$ | 0 | 0 | 0 | 0 | 0 |
| $SiO_2$ | 0 | 0 | 0 | 0 | 0 |
| $MgSiO_3$ | 0 | 0 | 0 | 0 | 0 |
| DIOPSIDE | 0 | 0 | 0 | 0 | 0 |
| DOLOMITE | 1.43E+07 | 1.43E+07 | 0 | 0 | 0 |

TABLE 21a

Mass and Energy Accounting for Examples 20 and 21 Simulation.

| | \multicolumn{7}{c}{Process Stream Names} | | | | | | |
|---|---|---|---|---|---|---|---|
| | 5 | $CaCl_2$-2W | FLUE GAS | $H_2O$ | HCl | HCl-VENT | HCl VAP2 |
| PH | | | | | | | |
| Temperature °C. | 200 | 160 | 100 | 25 | 450 | 100 | 449.5 |
| Pressure psia | 14.696 | 14.696 | 15.78 | 1 | 14.696 | 14.696 | 14.696 |
| Mass VFrac | 0.378 | 0.256 | 1 | 0 | 1 | 1 | 1 |
| Mass SFrac | 0.622 | 0 | 0 | 0 | 0 | 0 | 0 |
| Mass Flow tons/year | 3.16E+07 | 1.70E+07 | 1.37E+08 | 1.00E+07 | 2.54E+07 | 0.006 | 1.27E+07 |
| Volume Flow gal/min | 1.14E+07 | 3.91E+06 | 6.21E+07 | 4569.619 | 2.94E+07 | 0.002 | 1.47E+07 |
| Enthalpy MW | −9765.36 | −5388.055 | −5853.92 | −4563.814 | −5787.5 | 0 | −2893.751 |
| Density lb/cuft | 0.079 | 0.124 | 0.063 | 62.249 | 0.025 | 0.075 | 0.025 |
| $H_2O$ | 1.15E+07 | 8.41E+06 | 6.85E+06 | 1.00E+07 | 1.40e+07 | 0 | 7.00E+06 |
| HCl | 491655.4 | 0 | 0 | 0 | 1.13E+07 | 0.006 | 5.67E+06 |
| $CO_2$ | 0 | 0 | 1.37E+07 | 0 | 0 | 0 | 0 |
| $O_2$ | 0 | 0 | 1.37E+07 | 0 | 0 | 0 | 0 |
| $N_2$ | 0 | 0 | 1.03E+08 | 0 | 0 | 0 | 0 |
| $MgCl_2$ | 0 | 0 | 0 | 0 | 0 | 0 | 0 |
| $MgCl_2$*W | 0 | 0 | 0 | 0 | 0 | 0 | 0 |
| $MgCl_2$*2W | 1.86E+07 | 0 | 0 | 0 | 0 | 0 | 0 |
| $MgCl_2$*4W | 0 | 0 | 0 | 0 | 0 | 0 | 0 |
| $MgCl_2$*6W | 0 | 0 | 0 | 0 | 0 | 0 | 0 |
| Mg(OH)Cl | 1.04E+06 | 0 | 0 | 0 | 0 | 0 | 0 |
| $Mg(OH)_2$ | 0 | 0 | 0 | 0 | 0 | 0 | 0 |
| MgO | 0 | 0 | 0 | 0 | 0 | 0 | 0 |
| $MgHCO_3^+$ | 0 | 0 | 0 | 0 | 0 | 0 | 0 |
| $SO_2$ | 0 | 0 | 0 | 0 | 0 | 0 | 0 |
| $NO_2$ | 0 | 0 | 0 | 0 | 0 | 0 | 0 |
| NO | 0 | 0 | 0 | 0 | 0 | 0 | 0 |
| $Mg^{2+}$ | 0 | 2494.624 | 0 | 0 | 0 | 0 | 0 |
| $Ca^{2+}$ | 0 | 3.11E+06 | 0 | 0 | 0 | 0 | 0 |
| $Cl^-$ | 0 | 5.51E+06 | 0 | 0 | 0 | 0 | 0 |
| $CO_3^{2-}$ | 0 | 0 | 0 | 0 | 0 | 0 | 0 |
| $HCO_3^-$ | 0 | 0 | 0 | 0 | 0 | 0 | 0 |
| $OH^-$ | 0 | 0 | 0 | 0 | 0 | 0 | 0 |
| $CaSiO_3$ | 0 | 0 | 0 | 0 | 0 | 0 | 0 |
| $SiO_2$ | 0 | 0 | 0 | 0 | 0 | 0 | 0 |
| $MgSiO_3$ | 0 | 0 | 0 | 0 | 0 | 0 | 0 |
| DIOPSIDE | 0 | 0 | 0 | 0 | 0 | 0 | 0 |
| DOLOMITE | 0 | 0 | 0 | 0 | 0 | 0 | 0 |

| | \multicolumn{5}{c}{Process Stream Names} | | | | |
|---|---|---|---|---|---|
| | HCl Vapor | HCl VENT2 | MELT1 | MELT2 | MELT3 |
| PH | | | | | |
| Temperature °C. | 449.5 | 160 | 160 | 160 | 100 |
| Pressure psia | 14.696 | 14.696 | 14.696 | 14.696 | 14.696 |
| Mass VFrac | 1 | 1 | 0.148 | 0 | 0 |
| Mass SFrac | 0 | 0 | 0.423 | 1 | 0.371 |
| Mass Flow tons/year | 1.27E+07 | 10.275 | 2.95E+07 | 1.25E+07 | 2.52E+07 |
| Volume Flow gal/min | 1.47E+07 | 4.556 | 3.91E+06 | 1866.915 | 6342.437 |
| Enthalpy MW | −2893.751 | −.0001 | −10844.21 | −5456.149 | −9602.42 |
| Density lb/cuft | 0.025 | 0.064 | 0.215 | 190.163 | 112.823 |
| $H_2O$ | 7.00E+06 | 0 | 8.41E+06 | 0 | 8.41.E+06 |
| HCl | 5.67E+06 | 10.275 | 10.275 | 0 | 0.006 |
| $CO_2$ | 0 | 0 | 0 | 0 | 0 |
| $O_2$ | 0 | 0 | 0 | 0 | 0 |
| $N_2$ | 0 | 0 | 0 | 0 | 0 |
| $MgCl_2$ | 0 | 0 | 0 | 0 | 0 |
| $MgCl_2$*W | 0 | 0 | 0 | 0 | 0 |
| $MgCl_2$*2W | 0 | 0 | 0 | 0 | 0 |
| $MgCl_2$*4W | 0 | 0 | 0 | 0 | 0 |
| $MgCl_2$*6W | 0 | 0 | 0 | 0 | 0 |
| Mg(OH)Cl | 0 | 0 | 0 | 0 | 0 |
| $Mg(OH)_2$ | 0 | 0 | 0 | 0 | 0 |
| MgO | 0 | 0 | 0 | 0 | 0 |
| $MgHCO_3^+$ | 0 | 0 | 0 | 0 | 0 |
| $SO_2$ | 0 | 0 | 0 | 0 | 0 |

TABLE 21a-continued

Mass and Energy Accounting for Examples 20 and 21 Simulation.

| | | | | | |
|---|---|---|---|---|---|
| $NO_2$ | 0 | 0 | 0 | 0 | 0 |
| NO | 0 | 0 | 0 | 0 | 0 |
| $Mg^{2+}$ | 0 | 0 | 2494.624 | 0 | 1.89E+06 |
| $Ca^{2+}$ | 0 | 0 | 3.11E+06 | 0 | 4119.258 |
| $Cl^-$ | 0 | 0 | 5.51E+06 | 0 | 5.51E+06 |
| $CO_3^{2-}$ | 0 | 0 | 0 | 0 | 0 |
| $HCO_3^-$ | 0 | 0 | 0 | 0 | 0 |
| $OH^-$ | 0 | 0 | 0 | 0 | 0 |
| $CaSiO_3$ | 0 | 0 | 11939.547 | 11939.547 | 0 |
| $SiO_2$ | 0 | 0 | 4.67E+06 | 4.67E+06 | 9.34E+06 |
| $MgSiO_3$ | 0 | 0 | 7.80E+06 | 7.80E+06 | 14.153 |
| DIOPSIDE | 0 | 0 | 0 | 0 | 0 |
| DOLOMITE | 0 | 0 | 0 | 0 | 0 |

TABLE 21b

Mass and Energy Accounting for Examples 20 and 21 Simulation.

| | Process Stream Names | | | | | |
|---|---|---|---|---|---|---|
| | $MgCaSiO_3$ | $MgCl_2$—H | $MgCl_2$—H | RECYCLE | RECYCLE- | $SiO_2$ |
| PH | | | | −0.879 | | |
| Temperature ° C. | 25 | 100 | 100 | 95 | 95 | 100 |
| Pressure psia | 14.696 | 14.696 | 14.696 | 14.696 | 14.696 | 14.696 |
| Mass VFrac | 0 | 0 | 0 | 0 | 0 | 0 |
| Mass SFrac | 1 | 0 | 1 | 0 | 0.484 | 1 |
| Mass Flow tons/year | 1.68E+07 | 1.58E+07 | 1.58E+07 | 3.27E+07 | 1.58E+07 | 9.34E+06 |
| Volume Flow gal/min | 1063.002 | 4734.61 | 2804.199 | 10786.59 | 2804.199 | 1607.826 |
| Enthalpy MW | −7167.458 | 0 | −5533.74 | −13087 | −5537.26 | 0 |
| Density lb/cuft | 450.627 | 94.994 | 160.371 | 86.167 | 160.371 | 165.327 |
| $H_2O$ | 0 | 8.41E+06 | 0 | 1.68E+07 | 0 | 0 |
| HCl | 0 | 0 | 0 | 0 | 0 | 0 |
| $CO_2$ | 0 | 0 | 0 | 0 | 0 | 0 |
| $O_2$ | 0 | 0 | 0 | 0 | 0 | 0 |
| $N_2$ | 0 | 0 | 0 | 0 | 0 | 0 |
| $MgCl_2$ | 0 | 0 | 0 | 0 | 0 | 0 |
| $MgCl_2*W$ | 0 | 0 | 0 | 0 | 0 | 0 |
| $MgCl_2*2W$ | 0 | 0 | 0 | 0 | 0 | 0 |
| $MgCl_2*4W$ | 0 | 0 | 0 | 0 | 0 | 0 |
| $MgCl_2*6W$ | 0 | 0 | 1.58E+07 | 1.58E+07 | 1.58E+07 | 0 |
| $Mg(OH)Cl$ | 0 | 0 | 0 | 0 | 0 | 0 |
| $Mg(OH)_2$ | 0 | 0 | 0 | 11678.01 | 0 | 0 |
| MgO | 0 | 0 | 0 | 0 | 0 | 0 |
| $MgHCO_3^+$ | 0 | 0 | 0 | 908.901 | 0 | 0 |
| $SO_2$ | 0 | 0 | 0 | 0 | 0 | 0 |
| $NO_2$ | 0 | 0 | 0 | 0 | 0 | 0 |
| NO | 0 | 0 | 0 | 0 | 0 | 0 |
| $Mg^{2+}$ | 0 | 1.89E+06 | 0 | 0 | 0 | 0 |
| $Ca^{2+}$ | 0 | 4119.258 | 0 | 0 | 0 | 0 |
| $Cl^-$ | 0 | 5.51E+06 | 0 | 377.667 | 0 | 0 |
| $CO_3^{2-}$ | 0 | 0 | 0 | 0 | 0 | 0 |
| $HCO_3^-$ | 0 | 0 | 0 | 0.006 | 0 | 0 |
| $OH^-$ | 0 | 0 | 0 | 0 | 0 | 0 |
| $CaSiO_3$ | 0 | 0 | 0 | 0 | 0 | 0 |
| $SiO_2$ | 0 | 0 | 0 | 0 | 0 | 9.34E+06 |
| $MgSiO_3$ | 0 | 0 | 0 | 0 | 0 | 14.153 |
| DIOPSIDE | 1.68E+07 | 0 | 0 | 0 | 0 | 0 |
| DOLOMITE | 0 | 0 | 0 | 0 | 0 | 0 |

| | Process Stream Names | | | | |
|---|---|---|---|---|---|
| | SLURRY | SOLIDS | SOLIDS-1 | SOLIDS-2 | VENT |
| PH | 5.271 | | | 8.545 | |
| Temperature ° C. | 95 | 95 | 450 | 95 | 95 |
| Pressure psia | 14.696 | 14.696 | 14.696 | 14.696 | 14.696 |
| Mass VFrac | 0 | 0 | 0 | 0 | 1 |
| Mass SFrac | 1 | 0.177 | 1 | 1 | 0.558 |
| Mass Flow tons/year | 1.70E+08 | 1.43E+07 | 6.27E+06 | 1.63E+07 | 1.23E+08 |

TABLE 21b-continued

Mass and Energy Accounting for Examples 20 and 21 Simulation.

| | | | | | |
|---|---|---|---|---|---|
| Volume Flow gal/min | 183332.5 | 2276.772 | 797.11 | 5155.892 | 5.85E+07 |
| Enthalpy MW | −19788.2 | 0 | −2603.98 | −7331.92 | −1510.64 |
| Density lb/cuft | 26.409 | 178.921 | 223.695 | 89.754 | 0.06 |
| $H_2O$ | 1.68E+07 | 0 | 0 | 7.20E+06 | 0 |
| HCl | 0 | 0 | 0 | 0 | 0 |
| $CO_2$ | 6.85E+06 | 0 | 0 | 0 | 6.85E+06 |
| $O_2$ | 1.37E+07 | 0 | 0 | 0 | 1.37E+07 |
| $N_2$ | 1.03E+08 | 0 | 0 | 0 | 1.03E+08 |
| $MgCl_2$ | 0 | 0 | 0 | 0 | 0 |
| $MgCl_2*W$ | 0 | 0 | 0 | 0 | 0 |
| $MgCl_2*2W$ | 0 | 0 | 0 | 0 | 0 |
| $MgCl_2*4W$ | 0 | 0 | 0 | 0 | 0 |
| $MgCl_2*6W$ | 1.58E+07 | 0 | 0 | 0 | 0 |
| Mg(OH)Cl | 0 | 0 | 0 | 0 | 0 |
| $Mg(OH)_2$ | 11678.01 | 0 | 0 | 9.07E+06 | 0 |
| MgO | 0 | 0 | 6.27E+06 | 0 | 0 |
| $MgHCO_3^+$ | 908.901 | 0 | 0 | 0 | 0 |
| $SO_2$ | 0 | 0 | 0 | 0 | 0 |
| $NO_2$ | 0 | 0 | 0 | 0 | 0 |
| NO | 0 | 0 | 0 | 0 | 0 |
| $Mg^{2+}$ | 0 | 0 | 0 | 14.555 | 0 |
| $Ca^{2+}$ | 0 | 0 | 0 | 0 | 0 |
| $Cl^-$ | 377.667 | 0 | 0 | 0 | 0 |
| $CO_3^{2-}$ | 0 | 0 | 0 | 0 | 0 |
| $HCO_3^-$ | 0.006 | 0 | 0 | 0 | 0 |
| $OH^-$ | 0 | 0 | 0 | 0 | 0 |
| $CaSiO_3$ | 0 | 0 | 0 | 0 | 0 |
| $SiO_2$ | 0 | 0 | 0 | 0 | 0 |
| $MgSiO_3$ | 0 | 0 | 0 | 0 | 0 |
| DIOPSIDE | 0 | 0 | 0 | 0 | 0 |
| DOLOMITE | 1.43E+07 | 1.43E+07 | | | |

Example 22

Decomposition of Other Salts

The thermal decomposition of other salts has been measured in lab. A summary of some test results are shown in the table below.

TABLE 22

Decomposition of other salts.

| Salt | Temp.° C. | Time (min.) | Results |
|---|---|---|---|
| $Mg(NO_3)_2$ | 400 | 30 | 63% decomposition. Reaction is $Mg(NO_3)_2 \rightarrow MgO + 2NO_2 + \frac{1}{2}O_2$. |
| $Mg(NO_3)_2$ | 400 | 45 | 64% decomposition. |
| $Mg(NO_3)_2$ | 400 | 90 | 100% decomposition |
| $Mg(NO_3)_2$ | 400 | 135 | 100% decomposition |
| $Ca(NO_3)_2$ | 400 | 30 | <25% decomposition Reaction is $Ca(NO_3)_2 \rightarrow CaO + 2NO_2 + \frac{1}{2}O_2$ |
| $Ca(NO_3)_2$ | 600 | 50 | 61% decomposition |
| $Ca(NO_3)_2$ | 600 | Overnight | 100% decomposition |
| LiCl | 450 | 120 | ~0% decomposition |

Example 22

Two, Three and Four-Chamber Decomposition Models

Table 23 (see below) is a comparison of the four configurations corresponding to FIGS. 31-34. Depicted are the number and description of the chambers, the heat consumed in MW (Megawatts), the percentage of heat from that particular source and the reduction of required external heat in kW-H/tonne of $CO_2$ because of available heat from other reactions in the process, namely the hydrochloric acid reaction with mineral silicates and the condensation of hydrochloric acid. In the FIG. 34 example, the hot flue gas from the open-cycle natural gas plant also qualifies.

Example 23

Output Mineral Compared with Input Minerals—Coal

In this case study involving flue gas from a coal-based power plant, Table 24 illustrates that the volume of mineral outputs (limestone and sand) are 83% of the volume of input minerals (coal and inosilicate). The results summarized in Table 24 are based on a 600 MWe coal plant; total 4.66 E6 tonne $CO_2$, includes $CO_2$ for process-required heat.

Example 24

Output Mineral Compared with Input Minerals—Natural Gas

In this case study summarized in Table 25 (below) involving flue gas from a natural gas-based power plant, the "rail-back volume" of minerals is 92% of the "rail-in volume" of minerals. The results summarized in Table 25 are (based on a 600 MWe CC natural gas plant; total 2.41 E6 tonne $CO_2$, which includes $CO_2$ for process-required heat.

TABLE 23

Two, Three and Four-Chamber Decomposition Results

| | | Chamber Description | | | | |
|---|---|---|---|---|---|---|
| | | Pre-heat | Pre Heat | Pre-Heat Mineral Dissolution Reactor | | |
| Example | No. of Chambers | Cold Flue Gas | from Steam | Silicate Reaction | HCl Heat Recovery | Decomposition |
| FIG. 31 Cold Flue Gas Pre Heat | | | | | | |
| MW of Heat | 3 | 83.9 | Not used | 286 | 563 | 86.8 |
| Percentage of Total Heat | | 8.2% | Not used | 28.0% | 55.2% | 8.5% |
| Reduction kW-Hr/tonne | | −506.7 | Not used | −1727.4 | −3400.5 | Not a reduction |
| FIG. 32 Cold Flue Gas and Steam Pre -Heat | | | | | | |
| MW of Heat | 4 | 83.9 | 8.7 | 286 | 563 | 82.2 |
| Percentage of Total Heat | | 8.2% | 0.8% | 27.9% | 55.0% | 8.0% |
| Reduction kW-Hr/tonne | | −506.7 | −52.5 | −1727.4 | −3400.5 | Not a reduction |
| FIG. 33 Nat Gas Only | | | | | | |
| MW of Heat | 2 | Not used | Not used | 279 | 586 | 129.3 |
| Percentage of Total Heat | | Not used | Not used | 28% | 59% | 13% |
| Reduction kW-Hr/tonne | | Not used | Not used | −1685.1 | −3539.4 | Not a reduction |
| FIG. 34 Hot Flue Gas Only | | | | | | |
| MW of Heat | 2 | Not used | Not used | 243 | 512 | 112.9 |
| Percentage of Total Heat | | Not used | Not used | 28% | 59% | 13% |
| Reduction kW-Hr/tonne | | Not used | Not used | −1467.7 | −3092.4 | −681.9 |

TABLE 24

Coal Scenario-Volume of Mineral Outputs Compared with Volume of Mineral Inputs

| | | Metric Units | | English Units | |
|---|---|---|---|---|---|
| Parameter | Bulk Density (Tonne/m$^3$) | Mass ($10^6$ Tonne/yr) | Volume ($10^6$ m$^3$/yr) | Mass ($10^6$ Ton/yr) | Volume ($10^6$ ft$^3$/yr) |
| Coal | 0.8 | 1.57 | 1.97 | 1.73 | 69.5 |
| CaSiO$_3$ | 0.71 | 12.30 | 17.32 | 13.56 | 611.8 |
| Coal + CaSiO$_3$ | | | | | 681.25 |
| CaCO$_3$ | 0.9 | 10.60 | 11.78 | 11.68 | 415.9 |
| SiO$_2$ | 1.5 | 6.35 | 4.23 | 7.00 | 149.5 |
| CaCO$_3$ + SiO$_2$ | n/a | 16.95 | 16.01 | 18.68 | 565.4 |
| RATIO OF MINERAL VOLUME OUT/MINERAL VOLUME IN = | | | | | 83.00% |

TABLE 25

Natural Gas Scenario-Volume of Mineral Outputs Compared with Volume of Mineral Inputs

| | | Metric Units | | English Units | |
|---|---|---|---|---|---|
| Parameter | Bulk Density (Tonne/m$^3$) | Mass ($10^6$ Tonne/yr) | Volume ($10^6$ m$^3$/yr) | Mass ($10^6$ Ton/yr) | Volume ($10^6$ ft$^3$/yr) |
| Coal | 0.8 | 1.57 | 1.97 | 1.73 | 69.5 |
| CaSiO$_3$ | 0.71 | 12.30 | 17.32 | 13.56 | 611.8 |
| Coal + CaSiO$_3$ | | | | | 681.25 |
| CaCO$_3$ | 0.9 | 10.60 | 11.78 | 11.68 | 415.9 |
| SiO$_2$ | 1.5 | 6.35 | 4.23 | 7.00 | 149.5 |
| CaCO$_3$ + SiO$_2$ | n/a | 16.95 | 16.01 | 18.68 | 565.4 |
| RATIO OF MINERAL VOLUME OUT/MINERAL VOLUME IN = | | | | | 83.00% |

All of the methods disclosed and claimed herein can be made and executed without undue experimentation in light of the present disclosure. While the compositions and methods of this invention have been described in terms of particular embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

U.S. Prov. Appln. 60/612,355
U.S. Prov. Appln. 60/642,698
U.S. Prov. Appln. 60/718,906
U.S. Prov. Appln. 60/973,948
U.S. Prov. Appln. 61/032,802
U.S. Prov. Appln. 61/033,298
U.S. Prov. Appln. 61/288,242
U.S. Prov. Appln. 61/362,607
U.S. patent application Ser. No. 11/233,509
U.S. patent application Ser. No. 12/235,482
U.S. Patent Pubn. 2006/0185985
U.S. Patent Pubn. 2009/0127127
U.S. Pat. No. 7,727,374
PCT Appln. PCT/US08/77122
Goldberg et al., *Proceedings of First National Conference on Carbon Sequestration,* 14-17 May 2001, Washington, D.C., section 6c, United States Department of Energy, National Energy Technology Laboratory. available at: http://www.netl.doe.gov/publications/proceedings/01/carbon_seq/6c1.pdf.
*Proceedings of First National Conference on Carbon Sequestration,* 14-17 May 2001, Washington, D.C. United States Department of Energy, National Energy Technology Laboratory. CD-ROM USDOE/NETL-2001/1144; also available at http://www.netl.doe.gov/publications/proceedings/01/carbon_seq/carbon_seq01.html.

What is claimed is:

1. A method of sequestering carbon dioxide produced by a source, comprising:
   (a) heating a magnesium chloride salt or a hydrate thereof and water in a first admixture to form (i) magnesium hydroxide, magnesium oxide and/or MgCl(OH) and (ii) hydrogen chloride;
   (b) admixing (i) magnesium hydroxide, magnesium oxide and/or MgCl(OH), (ii) $CaCl_2$ and (iii) carbon dioxide produced by the source in a second admixture under conditions suitable to form (iv) calcium carbonate, (v) a magnesium chloride salt, and (vi) water;
   (c) separating the calcium carbonate from the second admixture; and
   (d) admixing a Group 2 silicate mineral with hydrogen chloride under conditions suitable to form a Group 2 chloride salt, water, and silicon dioxide, where some the hydrogen chloride in this step is obtained from step (a) and wherein some of the hydrogen chloride is obtained from a chlor-alkali electrolytic cell,
   whereby the carbon dioxide is sequestered into a mineral product form.

2. The method of claim 1, wherein some or all of the hydrogen chloride of step (a) is admixed with water to form hydrochloric acid.

3. The method of claim 1, where some or all of the magnesium hydroxide, magnesium oxide and/or MgCl(OH) of step (b)(i) is obtained from step (a)(i).

4. The method of claim 1, where some or all of the water in step (a) is present in the form of a hydrate of the magnesium chloride salt.

5. The method of claim 1, wherein step (a) occurs in one, two or three chambers.

6. The method of claim 1, wherein step (a) occurs in one chamber.

7. The method of claim 1, wherein the magnesium hydroxide, magnesium oxide and/or MgCl(OH) of step (a)(i) is greater than 90% by weight Mg(OH)Cl.

8. The method of claim 1, wherein the magnesium chloride salt is greater than 90% by weight $MgCl_2 \cdot 6(H_2O)$.

9. The method of claim 1, wherein step (d) further comprises agitating the Group 2 silicate mineral with the hydrochloric acid.

10. The method of claim 1, where some or all of the magnesium chloride salt in step (a) is obtained from step (d).

11. The method of claim 1, further comprising a separation step, wherein the silicon dioxide is removed from the Group 2 chloride salt formed in step (d).

12. The method of claim 1, where some or all of the water of step (a) is obtained from the water of step (d).

13. The method of claim 1, wherein the Group 2 silicate mineral of step (d) comprises a Group 2 inosilicate.

14. The method of claim 1, wherein the Group 2 silicate mineral of step (d) comprises $CaSiO_3$.

15. The method of claim 1, wherein the Group 2 silicate mineral of step (d) comprises $MgSiO_3$.

16. The method of claim 1, wherein the Group 2 silicate mineral of step (d) comprises olivine.

17. The method of claim 1, wherein the Group 2 silicate mineral of step (d) comprises serpentine.

18. The method of claim 1, wherein the Group 2 silicate mineral of step (d) comprises sepiolite, enstatite, diopside, and/or tremolite.

19. The method of claim 1, wherein the Group 2 silicate further comprises mineralized iron and or manganese.

20. The method according to claim 1, wherein step (b) further comprises admixing $CaCl_2$ and water to the second admixture.

21. The method according to claim 1, further comprising:
   (e) heating a magnesium chloride salt and water in a third admixture to form (i) magnesium hydroxide, magnesium oxide and/or MgCl(OH) and (ii) hydrogen chloride;
   (f) admixing (i) magnesium hydroxide, magnesium oxide and/or MgCl(OH), (ii) $CaCl_2$ and (iii) carbon dioxide produced by the source in a fourth admixture under conditions suitable to form (iv) calcium carbonate, (v) a magnesium chloride salt, and (vi) water;
   (g) separating the calcium carbonate from the fourth admixture; and
   (h) admixing a Group 2 silicate mineral with hydrogen chloride under conditions suitable to form a Group 2 chloride salt, water, and silicon dioxide, where some or all of the hydrogen chloride in this step is obtained from step (e),
   whereby the carbon dioxide is sequestered into a mineral product form.

22. The method of claim 21, wherein all of the hydrogen chloride in step (h) is obtained from step (e).

23. The method according to claim 1, further comprising: admixing (i) sodium hydroxide produced from the chlor-alkali electrolytic cell, and (ii) the carbon dioxide produced by the source in a fifth admixture under conditions suitable to form (iii) sodium bicarbonate and/or sodium carbonate.

* * * * *